(12) United States Patent
van Os et al.

(10) Patent No.: US 9,047,691 B2
(45) Date of Patent: Jun. 2, 2015

(54) ROUTE DISPLAY AND REVIEW

(71) Applicant: Apple Inc., Cupertino, CA (US)

(72) Inventors: Marcel van Os, San Francisco, CA (US); Emanuele Vulcano, San Francisco, CA (US); Christopher Blumenberg, San Francisco, CA (US); Bradford A. Moore, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 64 days.

(21) Appl. No.: 13/632,110

(22) Filed: Sep. 30, 2012

(65) Prior Publication Data
US 2013/0325341 A1 Dec. 5, 2013

Related U.S. Application Data

(60) Provisional application No. 61/655,995, filed on Jun. 5, 2012, provisional application No. 61/655,997, filed on Jun. 5, 2012, provisional application No. 61/656,015, filed on Jun. 6, 2012, provisional (Continued)

(51) Int. Cl.
*G01C 21/00* (2006.01)
*G06T 19/00* (2011.01)
(Continued)

(52) U.S. Cl.
CPC ............ *G06T 19/00* (2013.01); *G01C 21/3611* (2013.01); *G01C 21/3614* (2013.01); *G01C 21/3664* (2013.01); *G01C 21/3676* (2013.01); *G01C 21/00* (2013.01); *G01C 21/3626* (2013.01); *G01C 21/367* (2013.01); *G06F 3/041* (2013.01); *G06F 3/0482* (2013.01); *G06F 3/0484* (2013.01); *G06F 17/30991* (2013.01); *G09B 29/00* (2013.01); *G01C 21/3617* (2013.01); *G01C 21/3673* (2013.01); *G01C 21/3682* (2013.01); *G06F 17/30* (2013.01)

(58) Field of Classification Search
None
See application file for complete search history.

(56) References Cited

U.S. PATENT DOCUMENTS 5,289,572 A  2/1994  Yano et al.
5,862,511 A  1/1999  Croyle et al.
(Continued)

FOREIGN PATENT DOCUMENTS

EP  0572129  12/1993
EP  0822529  2/1998
(Continued)

OTHER PUBLICATIONS

Chris Ruhs. (Jun. 24, 2011). My Favorite Android Apps: Maps [Video file]. Retrieved from https://www.youtube.com/watch?v=v2aRkLkLT3s.*

(Continued)

*Primary Examiner* — Thomas Tarcza
*Assistant Examiner* — Richard Goldman
(74) *Attorney, Agent, or Firm* — Adeli LLP

(57) ABSTRACT

For a device running a mapping application that includes a display area for displaying a map and a set of graphical user interface (GUI) items, a method for providing routes is described. The method computes a route between a starting location and a destination location. The route includes a sequence of maneuvering instructions for guiding a user through the route. The method provides a movable GUI item for showing each maneuvering instruction in the sequence in order to allow a user to navigate the route by moving the GUI items in and out of the display area.

27 Claims, 66 Drawing Sheets

Related U.S. Application Data application No. 61/656,032, filed on Jun. 6, 2012, provisional application No. 61/656,043, filed on Jun. 6, 2012, provisional application No. 61/656,080, filed on Jun. 6, 2012, provisional application No. 61/657,858, filed on Jun. 10, 2012, provisional application No. 61/657,864, filed on Jun. 10, 2012, provisional application No. 61/657,880, filed on Jun. 10, 2012, provisional application No. 61/699,842, filed on Sep. 11, 2012, provisional application No. 61/699,855, filed on Sep. 11, 2012, provisional application No. 61/699,851, filed on Sep. 11, 2012.

(51) Int. Cl.

| | | |
|---|---|---|
| *G01C 21/36* | (2006.01) | |
| *G06F 3/041* | (2006.01) | |
| *G06F 3/0482* | (2013.01) | |
| *G06F 3/0484* | (2013.01) | |
| *G06F 17/30* | (2006.01) | |
| *G09B 29/00* | (2006.01) | |

(56) References Cited

U.S. PATENT DOCUMENTS

| | | | |
|---|---|---|---|
| 5,878,368 A | 3/1999 | DeGraaf | |
| 6,029,111 A | 2/2000 | Croyle | |
| 6,163,269 A | 12/2000 | Millington et al. | |
| 6,178,380 B1* | 1/2001 | Millington | 701/455 |
| 6,295,503 B1 | 9/2001 | Inoue et al. | |
| 6,360,167 B1 | 3/2002 | Millington et al. | |
| 6,374,180 B1 | 4/2002 | Slominski et al. | |
| 6,480,783 B1 | 11/2002 | Myr | |
| 6,615,130 B2 | 9/2003 | Myr | |
| 7,054,742 B2 | 5/2006 | Khavakh et al. | |
| 7,194,356 B2 | 3/2007 | Sano | |
| 7,433,780 B2 | 10/2008 | Machino | |
| 7,437,279 B2* | 10/2008 | Agrawala et al. | 703/6 |
| 7,551,172 B2 | 6/2009 | Yaron et al. | |
| 7,561,169 B2* | 7/2009 | Carroll | 345/619 |
| 7,702,456 B2* | 4/2010 | Singh | 701/425 |
| 7,706,973 B2 | 4/2010 | McBride et al. | |
| 7,761,227 B2 | 7/2010 | Kropp | |
| 7,949,546 B1 | 5/2011 | Klieman et al. | |
| 8,195,383 B2* | 6/2012 | Wipplinger et al. | 701/409 |
| 8,237,713 B2 | 8/2012 | Yaron et al. | |
| 8,301,378 B2 | 10/2012 | Nishibashi et al. | |
| 8,306,730 B2 | 11/2012 | Nishibashi et al. | |
| 8,335,642 B2* | 12/2012 | Wipplinger et al. | 701/409 |
| 8,355,862 B2 | 1/2013 | Matas et al. | |
| 8,438,481 B2* | 5/2013 | Lau et al. | 715/716 |
| 8,464,182 B2* | 6/2013 | Blumenberg et al. | 715/863 |
| 8,489,641 B1* | 7/2013 | Seefeld et al. | 707/792 |
| 8,589,075 B1* | 11/2013 | Jones | 701/527 |
| 8,606,516 B2* | 12/2013 | Vertelney et al. | 701/439 |
| 8,645,056 B2* | 2/2014 | Wipplinger et al. | 701/408 |
| 8,798,918 B2 | 8/2014 | Onishi et al. | |
| 2001/0056325 A1 | 12/2001 | Pu et al. | |
| 2002/0059296 A1 | 5/2002 | Hayashi et al. | |
| 2002/0103599 A1* | 8/2002 | Sugiyama et al. | 701/211 |
| 2004/0128066 A1 | 7/2004 | Kudo et al. | |
| 2005/0049786 A1* | 3/2005 | Odachi et al. | 701/211 |
| 2005/0125148 A1 | 6/2005 | Van Buer et al. | |
| 2005/0177305 A1* | 8/2005 | Han | 701/211 |
| 2006/0015246 A1 | 1/2006 | Hui | |
| 2006/0025923 A1 | 2/2006 | Dotan et al. | |
| 2006/0195259 A1* | 8/2006 | Pinkus et al. | 701/211 |
| 2006/0287818 A1 | 12/2006 | Okude et al. | |
| 2007/0061071 A1 | 3/2007 | Torii | |
| 2007/0088897 A1 | 4/2007 | Wailes et al. | |
| 2007/0150179 A1* | 6/2007 | Pinkus et al. | 701/208 |
| 2007/0233371 A1 | 10/2007 | Stoschek et al. | |
| 2008/0114541 A1* | 5/2008 | Shintani et al. | 701/209 |
| 2008/0204462 A1* | 8/2008 | Reed et al. | 345/520 |
| 2008/0238941 A1 | 10/2008 | Kinnan et al. | |
| 2008/0320419 A1* | 12/2008 | Matas et al. | 715/863 |
| 2009/0005981 A1 | 1/2009 | Forstall et al. | |
| 2009/0171561 A1 | 7/2009 | Geelen | |
| 2009/0171575 A1* | 7/2009 | Kim et al. | 701/209 |
| 2009/0171580 A1* | 7/2009 | Nezu | 701/211 |
| 2009/0228841 A1 | 9/2009 | Hildreth | |
| 2009/0287408 A1 | 11/2009 | Gerdes et al. | |
| 2010/0057358 A1 | 3/2010 | Winer et al. | |
| 2010/0100310 A1* | 4/2010 | Eich et al. | 701/201 |
| 2010/0123737 A1* | 5/2010 | Williamson et al. | 345/672 |
| 2010/0256902 A1* | 10/2010 | Coch et al. | 701/208 |
| 2010/0312466 A1 | 12/2010 | Katzer et al. | |
| 2011/0252364 A1* | 10/2011 | Anzures et al. | 715/790 |
| 2011/0282567 A1 | 11/2011 | Nortrup | |
| 2012/0109509 A1 | 5/2012 | Nesbitt et al. | |
| 2012/0158290 A1* | 6/2012 | Bharathan et al. | 701/425 |
| 2012/0253659 A1 | 10/2012 | Pu et al. | |
| 2012/0254804 A1 | 10/2012 | Sheha et al. | |
| 2012/0259539 A1 | 10/2012 | Sumizawa | |
| 2012/0259541 A1 | 10/2012 | Downey et al. | |
| 2012/0287114 A1* | 11/2012 | Hallock et al. | 345/418 |
| 2013/0035853 A1 | 2/2013 | Stout et al. | |
| 2013/0110633 A1* | 5/2013 | Waldman et al. | 705/14.58 |
| 2013/0227473 A1* | 8/2013 | Corvo | 715/799 |
| 2013/0304373 A1* | 11/2013 | Kuo et al. | 701/412 |

FOREIGN PATENT DOCUMENTS

| | | |
|---|---|---|
| EP | 1102037 | 5/2001 |
| EP | 1655677 | 5/2006 |
| EP | 1995564 | 11/2008 |
| EP | 2672226 | 12/2013 |
| JP | 2002-243480 | 8/2002 |
| WO | WO 2007/056450 | 5/2007 |
| WO | WO 2011/124273 | 10/2011 |
| WO | WO 2011/146141 | 11/2011 |
| WO | WO 2012/034581 | 3/2012 |
| WO | WO 2013/184447 | 12/2013 |
| WO | WO 2013/184449 | 12/2013 |

OTHER PUBLICATIONS

Updated portions of prosecution history of EP13169892, Feb. 24, 2014 (mailing date), Apple Inc.
WO 2011/084156, Jul. 14, 2011, Apple Inc.
PCT/US2013/042933, May 28, 2013 (filing date), Apple Inc.
Partial International Search Report for PCT/US2013/042933, Aug. 28, 2013 (mailing date), Apple Inc.
EP13169892, May 30, 2013 (filing date), Apple Inc.
Portions of prosecution history of EP13169892, Aug. 26, 2013 (date of completion), Apple Inc.
Author Unknown, "'Touch & Go' Owner's Manual," Jul. 2011, 218 pages, Toyota, United Kingdom.
Invitation to Pay Additional Fees and, Where Applicable, Protest Fee for PCT/US2013/042937, Nov. 29, 2013 (mailing date), Apple Inc.
Author Unknown, "Android 2.3.4 User's Guide", May 20, 2011, pp. 1-384, Google, Inc.
International Search Report and Written Opinion for PCT/US2013/042937, Mar. 6, 2014 (mailing date), Apple Inc.

\* cited by examiner

Map Display      Virtual Camera Inside Scene
1701
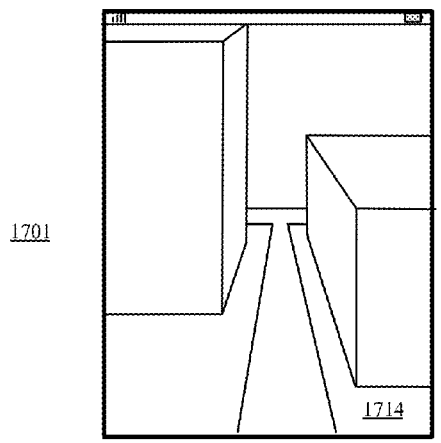
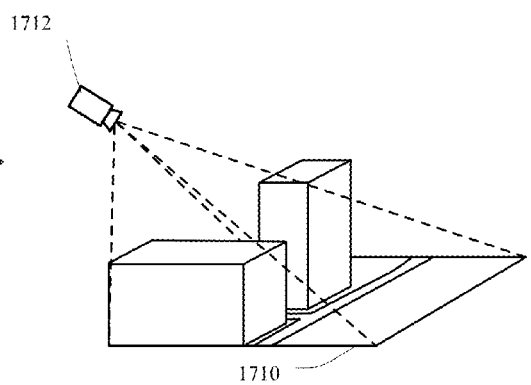
1702
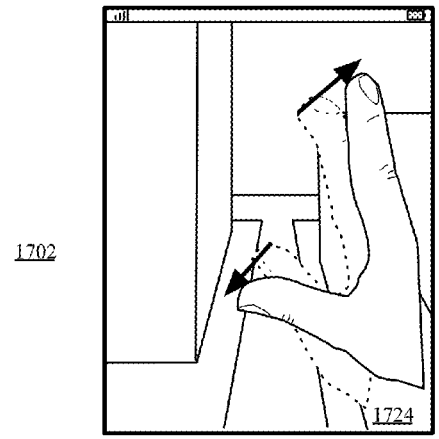
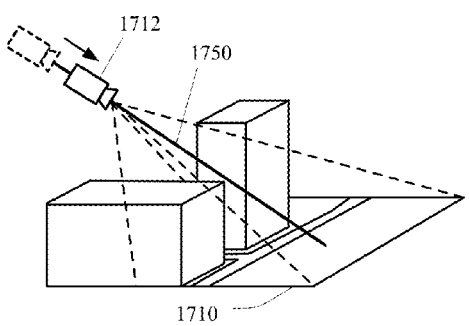
1703
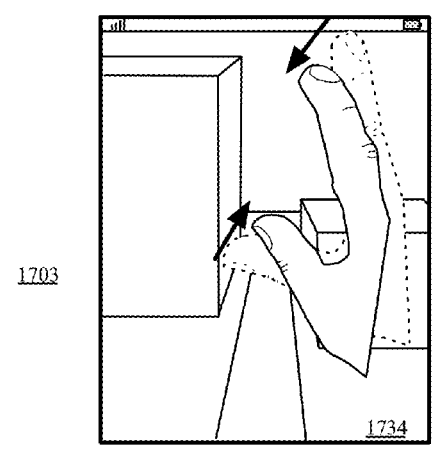
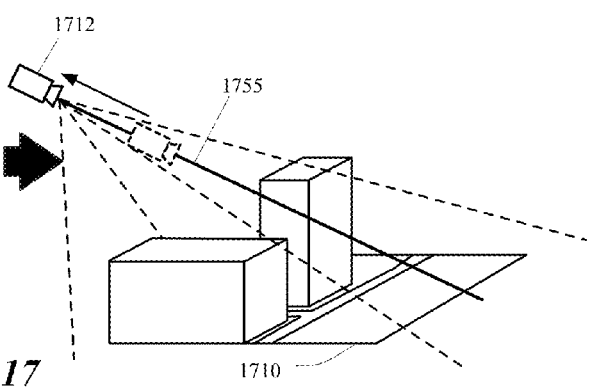
*Figure 17*

ROUTE DISPLAY AND REVIEW

CLAIM OF BENEFIT TO PRIOR APPLICATIONS

This application claims the benefit of U.S. Provisional Patent Application 61/655,995, filed Jun. 5, 2012; U.S. Provisional Application 61/655,997, filed Jun. 5, 2012; U.S. Provisional Patent Application 61/656,015, filed Jun. 6, 2012; U.S. Provisional Application 61/656,032, filed Jun. 6, 2012; U.S. Provisional Application 61/656,043, filed Jun. 6, 2012; U.S. Provisional Patent Application 61/656,080, filed Jun. 6, 2012; U.S. Provisional Application 61/657,858, filed Jun. 10, 2012; U.S. Provisional Application 61/657,864, filed Jun. 10, 2012; U.S. Provisional Application 61/657,880, filed Jun. 10, 2012; U.S. Provisional Patent Application 61/699,842, filed Sep. 11, 2012; U.S. Provisional Application 61/699,855, filed Sep. 11, 2012; and U.S. Provisional Patent Application 61/699,851, filed Sep. 11, 2012. U.S. Applications 61/655,995, 61/655,997, 61/656,015, 61/656,032, 61/656,043, 61/656,080, 61/657,858, 61/657,864, 61/657,880, 61/699,842, 61/699,855, and 61/699,851 are incorporated herein by reference.

BACKGROUND

With proliferation of mobile devices such as smartphones, users are enjoying numerous applications of numerous kinds that can be run on their devices. One popular type of such application is mapping and navigation applications that allow user to browse maps and get route directions. Despite their popularity, these mapping and navigation applications have shortcomings with their user interfaces and features that cause inconvenience to the users.

BRIEF SUMMARY

Some embodiments of the invention provide an integrated mapping application that includes several useful modalities, including location browsing, map searching, route identifying and route navigating operations. These operations are complex tasks that, while complementary, each have very different user interface (UI) requirements. The mapping application in some embodiments has a novel UI design that addresses the difficult challenges of integrating the needed controls for each of its different modalities into a seamless and cohesive application user interface. The novel UI design and the application are defined to be executed by a device that has a touch-sensitive screen that displays the output of the application. In some embodiments, this device has a multi-touch interface for allowing a user to provide touch and gestural inputs through the screen to interact with the application.

In some embodiments, a goal of the mapping application UI is that on-screen controls are kept to a minimum in order to display as much of the interactive map as possible. One element in this design is a button cluster that floats on top of the content itself rather than taking up the full-width of the screen, as typical in phone UI elements. Additionally, this cluster adapts to the task at hand, adjusting its contents in an animated fashion when a user moves between the different modalities (e.g., between browsing, searching, routing and navigating). This common element with an adaptive nature enables the mapping application to optimize for different tasks while maintaining a consistent look and interaction model while moving between those tasks.

One example of an adaptive, floating control in some embodiments is the list control. When there are opportunities to display a list of items, be it a list of instructions in a route or a list of search results when multiple results are found for a given query, the mapping application of some embodiments displays a list button as one of the floating controls. Tapping the list button brings up a modal list view in some embodiments. Having a modal list view keeps the mapping application simple and the map front and center. In some embodiments, the list view itself is adapted and optimized for the type of list being displayed, in that search results will be displayed with star ratings when available and route steps will include instructional arrows.

Another floating control is a control for viewing map or inspecting a route in three dimensions (3D). The mapping application provides the 3D control as a quick mechanism of getting into and out of 3D. This control also serves as (1) an indicator that the current view is a 3D view, and (2) an indicator that a 3D perspective is available for a given map view (e.g., a map view that is zoomed out might not have a 3D view available).

In addition to the 3D control, the mapping application of some embodiments allows a user to transition a map view from a two-dimensional (2D) presentation to a 3D presentation through gestural inputs of the multi-touch interface of the device. For instance, through a two finger gestural input, the user can be made to experience "pushing" down a 2D map view into a 3D map view, or "pulling" up a 3D map view into a 2D map view. This can also be thought of as pulling down a virtual camera from a 2D (directly from above) view into a 3D (side angle) view through the two-finger gesture. As further described below, the 3D view of the map is generated in some embodiments by rendering the map view from a particular position that can be conceptually thought of as the position of a virtual camera that is capturing the map view.

Through gestural inputs, the mapping application allows a user to also rotate a 2D or 3D map in some embodiments. The mapping application in some embodiments is a vector mapping application that allows for direct manipulations (such as rotation and 2D/3D manipulations) of the map while browsing it. However, some of the effects to the map can be disorienting. Without an easy way to get back to north-up orientation (i.e., an orientation where the north direction is aligned with the top of the device), some users may have difficulty interacting with the map views. To solve this, the mapping application of some embodiments provides an unobtrusive floating compass control on the map that serves both as an indicator that points to north and as a button to restore a north-up orientation. To further minimize clutter on the map, the mapping application only shows the button only in a limited number of situations (such as when the map is rotated, etc.).

In order to minimize the number of on-screen controls, certain less frequently used actions are placed in a secondary UI screen behind a "page curl" that is displayed on a map view that is provided by the application. In some embodiments, the page curl is permanently displayed on at least some of the map views that the application provides. For instance, in some embodiments, the application displays the page curl permanently on the initial map view that it provides for allowing a user to browse or search a location or to identify a route. In some embodiments, the page curl is a controllable UI item that has different appearances in different embodiments such as a button, a curled up corner of a page, a highlighted corner of a map, etc. The page curl (1) indicates the location of another set of controls that are conceptually "behind" the current view, and (2) when selected, directs the application to present an animation that "peels" off the current view to display another view that shows the other set of controls. The mapping application allows the user to control the page curl using a number of different gestures (e.g., selecting, dragging, tapping, sliding, rotating, etc.). In some embodiments, the mapping application displays an animation of the page being folded, lift up, and/or curled in different combination of angles and rotation as the user provides different gestural inputs as if the user is manipulating a sheet of paper by grabbing a corner of the sheet.

The use of the page curl allows the application to display more of the map while offering an unobtrusive way to access further functionality that is provided by the other set of controls. Additionally, in some embodiments, the application does not use the page curl in map views where the additional functionality is deemed to be inappropriate to the task at hand. For instance, in some embodiments, the application does not display this page curl while presenting the map view that is used during navigation.

In some embodiments, the application displays the page curl for every map view that the application provides. In other embodiments, the application does not display the page curl with every map view that the application provides. For instance, the application of these embodiments does not display the page curl when a map view is used during navigation. However, in some embodiments, the page curl returns when the application is showing the overview of the route during navigation.

The search field of the mapping application in some embodiments is another UI tool that the application employs to make the transition between the different modalities seamless. In some embodiments, a user can initiate a search by tapping in the search field. This directs the application to present an animation that (1) presents an on-screen keyboard and (2) opens a search table full of invaluable completions. This table has some important subtleties. When the search field is tapped and before the terms are edited, or when the search field is empty, the table contains a list of "recents," which in some embodiments are recent searches and route directions that the user has requested. This makes it very easy to quickly bring up recently accessed results.

After any edit in the search field, the table is filled with search completions both from local sources (e.g., bookmarks, contacts, recent searches, recent route directions, etc.) and remote servers. Some embodiments, however, include recent route directions only when the user has not yet entered any text into the search field. Once text is entered, the mapping application removes recent route directions from the search completions table. The incorporation of the user's contact card into the search interface adds additional flexibility to the design. When showing recents, a route from current location to the user's home is always offered in some embodiments, while it is offered in the contexts that are deemed to be "appropriate" in other embodiments. Also, when the search term matches at least part of an address label (e.g., 'ork' for 'Work'), the application presents the user's labeled address as a completion in the search table in some embodiments. Together these behaviors make the search UI a very powerful way to get results onto a map from a variety of sources. In addition to allowing a user to initiate a search, the presence of the text field in the primary map view in some embodiments also allows users to see the query corresponding to search results on the map and to remove those search results by clearing the query.

Another way that the mapping application tightly integrates the search and route identification experience is by providing several different ways to get directions. As mentioned above, the search table provides quick access to recently used routes. For any location selected on the map view, the mapping application in some embodiments also presents an info display banner (e.g., a window) that displays a quick-route navigation UI control (e.g., button) that fetches a route (e.g., a driving route) from the current location to that pin without ever leaving the map view. In addition, the mapping application also provides a selectable direction UI control (e.g., button) on the main map view (e.g., on the top left corner), which when selected presents a modal directions editing interface that enables the user to request more customized routes, such as routes that do not begin from the current location or a walking route instead of just driving routes. In some embodiments, the mapping application provides several different selectable routes based on a route query that it receives through the direction UI control. In such embodiments, the user can then select one of the routes. In some embodiments, one of the routes is presented as a default selected route, and the user can change the selected route to be one of the other presented routes. It should be noted that while neither the route history entries in the search field nor quick-route navigation control perform actions that cannot be achieved with the direction item, they serve as important accelerators that make it much easier to obtain the most commonly desired routes.

Once route directions have been obtained, they remain present until they are expressly cleared. This enables the mapping application to enter a mode that is optimized for navigation. The navigation mode has many novel features. One novel feature is that at any time while navigating, the user can move between a full-screen mode that presents a display view optimized for turn-by-turn directions and an overview mode that presents a display view of the remaining route that better accommodates browsing. Some embodiments also allow for a search to be performed while navigating in the overview mode. For instance, some embodiments provide a pull down handle that allows the search field to be pulled into the overview display. Alternatively, or conjunctively, some embodiments allow for searches to be performed during navigation through a voice-recognition input of the device of some embodiments.

Continuity between the overview mode and the full-screen mode is achieved by an in-place transition in the map and a constant set of controls. To enter full-screen mode, the application in some embodiments (1) automatically hides the floating controls and a bar (containing UI controls) along the top, and (2) completely uncurls the map. During the full-screen mode, the application restricts touch interaction with the map. In some embodiments, a tap is required to access the controls that were automatically hidden, and even then they are adapted towards a full-screen navigation look, with a prominent display of the ETA in the bar along the top.

The mapping application of some embodiments allows the user to stop navigation in both overview and full-screen modes by selecting a control to end navigation at any time while navigating. The mapping application of some embodiments also allows the user to modify the turn-by-turn navigation view to see alternative three-dimensional (3D) views or to present a two-dimensional (2D) view at any time while navigating. In some embodiments, the 3D turn-by-turn navigation is an animated rendering of navigated route that is rendered from the vantage point of a virtual camera that traverses along the direction of the route based on the traversal direction and speed of the user, which in some embodiments is captured by directional data (e.g., GPS data, triangulated cell-tower data, etc.) associated with the device.

While navigating, the mapping application of some embodiments allows a user to change the position of the virtual camera (i.e., the position from which the navigated route is rendered) through gestural input on the device's screen. Movement of the virtual camera (i.e., movement of the position from which the route is rendered) allows the mapping application to present alternative 3D view. Some embodiments even use the virtual camera to render a top-down 2D view for the turn-by-turn navigation, while other embodiments render the top-down 2D view by zooming in and out of a 2D map. In some embodiments, the mapping application presents a 3D button that serves both as 3D indicator and 3D initiator/toggle.

Different embodiments provide different gestural inputs to adjust the 3D/2D view during turn-by-turn navigation. In some embodiments, the gestural input is a two-finger pinching/spreading operation to adjust the zoom level. This adjustment of the zoom level inherently adjusts the position and rotation of the camera with respect to the route direction, and thereby changes the 3D perspective view of the route direction. Alternatively, other embodiments provide other gestural inputs (e.g., a finger drag operation) that change the position of the camera instead of or in addition to the zoom operation. In yet other embodiments, a gestural input (e.g., a finger drag operation) momentarily changes the viewing direction of the camera to allow a user to momentarily glance to a side of the navigated route. In these embodiments, the application returns the camera to its previous view along the route after a short time period.

The mapping application of some embodiments provide realistic-looking road signs that are used during navigation and during the browsing of an identified route. In some embodiments, the signs are textured images that bear a strong resemblance to actual highway signs, and they include instructional arrows, text, shields, and distance. The mapping application of some embodiments presents a wide number of variants in a large number of different contexts. For maneuvers that are close together, a secondary sign is presented hanging just beneath the primary sign. Signs are presented in different colors according to the regional norms in some embodiments. Also, as one maneuver is passed during navigation, the mapping application animates the sign away with a motion that mimics a sign passing overhead on the highway. When a maneuver is approached, the mapping application draws attention to the sign with a subtle animation (e.g., a shimmer across the entire sign).

As mentioned above, the mapping application of some embodiments uses the realistic-looking road signs to provide a novel method of browsing a route that it has identified. For instance, in some embodiments, the mapping application allows a user to select and scroll through the signs of the junctures along an identified route when it presents the identified route to the user. As the user scrolls through each sign, the portion of the route associated with the currently in-focus sign is presented or highlighted (e.g., through color highlighting or through another geometry (e.g., a circle or other mark) marking the portion). Alternatively, or conjunctively, the user can scroll through each sign by selecting different junctures of the route in order to view the sign associated with that juncture. Some of these embodiments provide this interaction only for routes that are not defined between a user's current location and a destination. In other words, these embodiments do not provide this browsing experience when a route is presented that connects the user's current location to a destination. Other embodiments, however, provide the route browsing experience through the road signs in other or all other contexts in which a route is displayed.

The above-described features as well as some other features of the mapping application of some embodiments are further described below. In the description above and below, many of the features are described as part of an integrated mapping application that provides novel location browsing, locating searching, route identifying and route navigating operations. However, one of ordinary skill will realize that these novel operations are performed in other embodiments by applications that do not perform all of these operations, or perform other operations in addition to these operations.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 17 illustrates a zoom adjustment feature provided by the mapping application of some embodiments.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide an integrated mapping application that includes several useful modalities, including location browsing, map searching, route identifying and route navigating operations. The mapping application in some embodiments is defined to be executed by a device that has a touch-sensitive screen that displays the output of the application. In some embodiments, this device has a multi-touch interface for allowing a user to provide touch and gestural inputs through the screen to interact with the application. Examples of such a device are smartphones (e.g., iPhone® sold by Apple Inc., phones operating the Android® operating system, phones operating the Windows 8® operating system, etc.).

Several detailed embodiments of the invention are described below. Section I describes UI controls and map browsing experience that the mapping application of some embodiments provides. Section II then describes behaviors of the novel search field of the mapping application. Section III follows with a description of a novel UI for presenting different types of details information about a location. Next, Section IV describes several different ways for the user to get route directions from the mapping application. Section V then describes different operational modes of the integrated mapping application of some embodiments. Section VI describes example electronic systems with which some embodiments of the invention are implemented. Finally, Section VII describes a map service operating environment.

I. Map Browsing

A. General Controls

Figure 1:
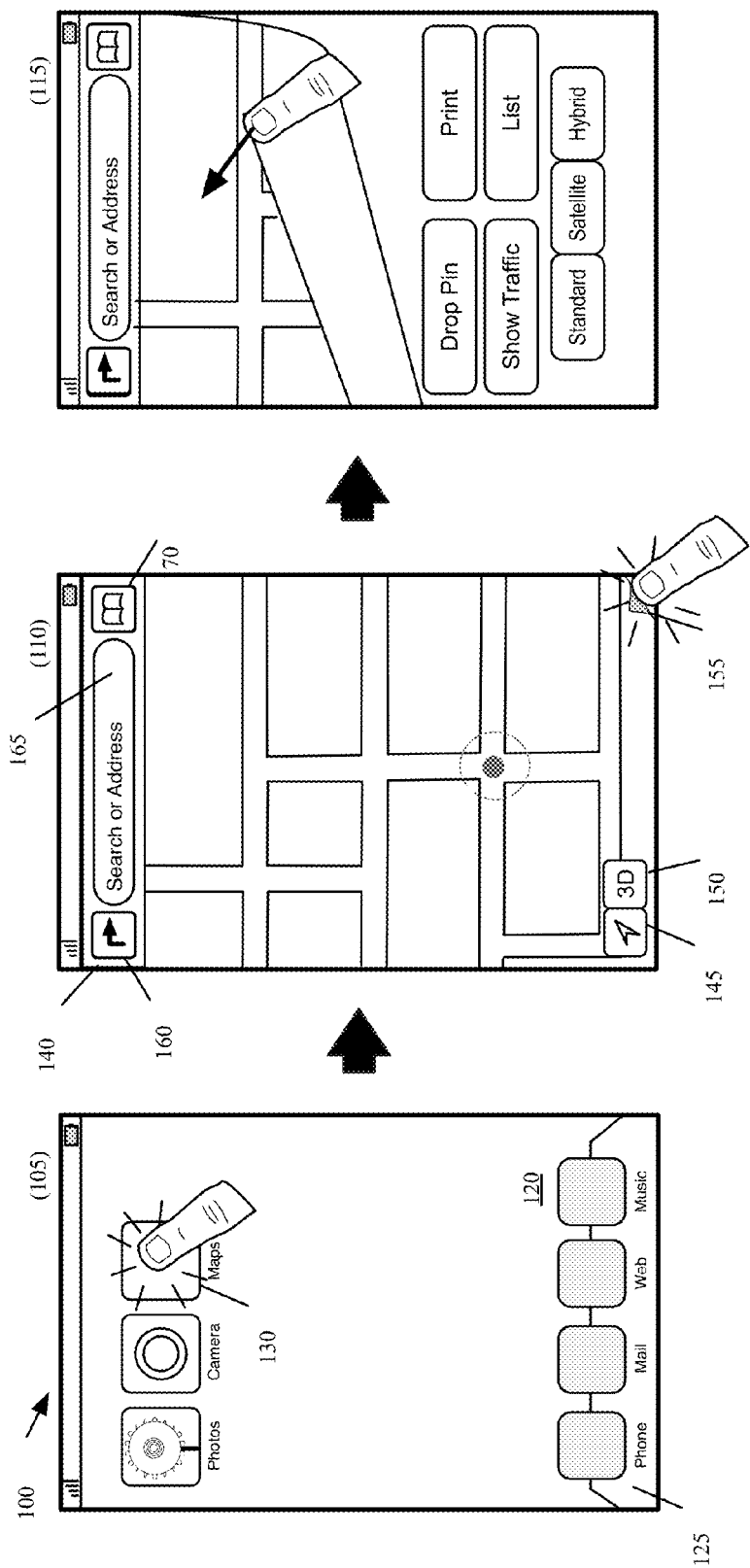
FIG. 1 illustrates an example of a device that executes an integrated mapping application of some embodiments.

FIG. 1 illustrates an example of a device 100 that executes an integrated mapping application of some embodiments of the invention. This application has a novel user interface (UI) design that seamlessly and cohesively integrates the controls for each of its different modalities by using a minimum set of on-screen controls that floats on top of the content in order to display as much of the content as possible. Additionally, this cluster adapts to the task at hand, adjusting its contents in an animated fashion when a user moves between the different modalities (e.g., between browsing, searching, routing and navigating). This common element with an adaptive nature enables the mapping application to optimize for different tasks while maintaining a consistent look and interaction model while moving between those tasks.

FIG. 1 shows three stages 105, 110, and 115 of interaction with the mapping application. The first stage 105 shows device's UI 120, which includes several icons of several applications in a dock area 125 and on a page of the UI. One of the icons on this page is the icon for the mapping application 130. The first stage shows a user's selection of the mapping application through touch contact with the device's screen at the location of this application on the screen.

The second stage 110 shows the device after the mapping application has opened. As shown in this stage, the mapping application's UI has a starting page that in some embodiments (1) displays a map of the current location of the device, and (2) several UI controls arranged in a top bar 140, and as floating controls. As shown in FIG. 1, the floating controls include a position control 145, a 3D control 150, and a page curl control 155, while the top bar 140 includes a direction control 160, a search field 165, and a bookmark control 170.

The direction control 160 opens a page through which a user can request a route to be identified between a starting location and an ending location. As further described below, this control is one of three mechanisms through which the mapping application can be directed to identify and display a route between two locations; the two other mechanisms are (1) a control in an information banner that is displayed for a selected item in the map, and (2) recent routes identified by the device that are displayed in the search field 165. Accordingly, the information banner control and the search field 165 are two UI tools that the application employs to make the transition between the different modalities seamless.

In some embodiments, a user can initiate a search by tapping in the search field 165. This directs the application to present an animation that (1) presents an on-screen keyboard and (2) opens a search table full of invaluable completions. This table has some important subtleties. When the search field is tapped and before the terms are edited, or when the search field is empty, the table contains a list of "recents," which in some embodiments are recent searches and route directions that the user has requested. This makes it very easy to quickly bring up recently accessed results.

After any edit in the search field, the table is filled with search completions both from local sources (e.g., bookmarks, contacts, recent searches, recent route directions, etc.) and remote servers. Some embodiments, however, include recent route directions only when the user has not yet entered any text into the search field. Once text is entered, the mapping application removes recent route directions from the search completions table. The incorporation of the user's contact card into the search interface adds additional flexibility to the design. When showing recents, a route from current location to the user's home is always offered in some embodiments, while it is offered in the contexts that are deemed to be "appropriate" in other embodiments. Also, when the search term matches at least part of an address label (e.g., 'ork' for 'Work'), the application presents the user's labeled address as a completion in the search table in some embodiments. Together these behaviors make the search UI a very powerful way to get results onto a map from a variety of sources. In addition to allowing a user to initiate a search, the presence of the text field in the primary map view in some embodiments also allows users to see the query corresponding to search results on the map and to remove those search results by clearing the query.

The bookmark control 170 (e.g., button) allows location and routes to be bookmarked by the application. The position control 145 allows the current position of the device to be specifically noted on the map. Once this position control is selected, the application maintains the current position of the device in the center of the map as the device is moving in some embodiments. In some embodiments, it can also identify the direction to which the device currently points. The mapping application of some embodiments identifies the location of the device using the coordinates (e.g., longitudinal, altitudinal, and latitudinal coordinates) in the GPS signal that the device receives at the location of the device. Alternatively or conjunctively, the mapping application uses other methods (e.g., cell tower triangulation) to compute the current location.

The 3D control 150 is a control for viewing map or inspecting a route in three dimensions (3D). The mapping application provides the 3D control as a quick mechanism of getting into and out of 3D. This control also serves as (1) an indicator that the current view is a 3D view, and (2) an indicator that a 3D perspective is available for a given map view (e.g., a map view that is zoomed out might not have a 3D view available). In some embodiments, the 3D control 150 provides at least three different appearances corresponding to some of these indications. For instance, the 3D control gets colored grey when the 3D view of the map is unavailable, black when the 3D view is available but the map is in the 2D view, and blue when the map is in the 3D view. In some embodiments, the 3D control has a fourth appearance (e.g., a button showing a building image or shape) when the immersive 3D map presentation is available at a given zoom level. Immersive and non-immersive 3D presentations are described further in U.S. patent application Ser. No. 13/632,035, now published as U.S. Patent Publication No. 2013/0322702, entitled "Rendering Maps," concurrently filed with this application. This concurrently filed U.S. patent application Ser. No. 13/632,035, now published as U.S. Patent Publication No. 2013/0322702, is incorporated herein by reference.

The page curl control 155 is a control that allows the application to minimize the number of on-screen controls, by placing certain less frequently used actions in a secondary UI screen, which is accessible through the "page curl" control displayed on the map. In some embodiments, the page curl is permanently displayed on at least some of the map views that the application provides. For instance, in some embodiments, the application displays the page curl permanently on the starting page (illustrated in second stage 110) that it provides for allowing a user to browse or search a location or to identify a route.

The page curl indicates the location of another set of controls that are conceptually "behind" the current view. When the page curl control 155 is selected, the application presents an animation that "peels" off the current view to display another view that shows the other set of controls. The third stage 115 illustrates an example of such an animation. As shown by this stage, the "peeling" of the starting page reveals several controls, which in this example are the drop pin, print, show traffic, list, standard, satellite, and hybrid controls. In some embodiments, these controls perform the same operations as similar controls do in currently available smartphones, such as iPhones operating iOS®.

The use of the page curl allows the application to display more of the map while offering an unobtrusive way to access further functionality that is provided by the other set of controls. Additionally, in some embodiments, the application does not use the page curl in map views where the additional functionality is deemed to be inappropriate to the task at hand. For instance, in some embodiments, the application does not display this page curl while presenting the map view during navigation.

Also, the third stage 115 illustrates that the user drags a corner or an edge of the page to peel off the page in some embodiments. However, in other embodiments, the animation that peels off the page is displayed by simply tapping the page curl control 155 without dragging the corner or the edge.

B. Adaptive Button Cluster

Figure 2:
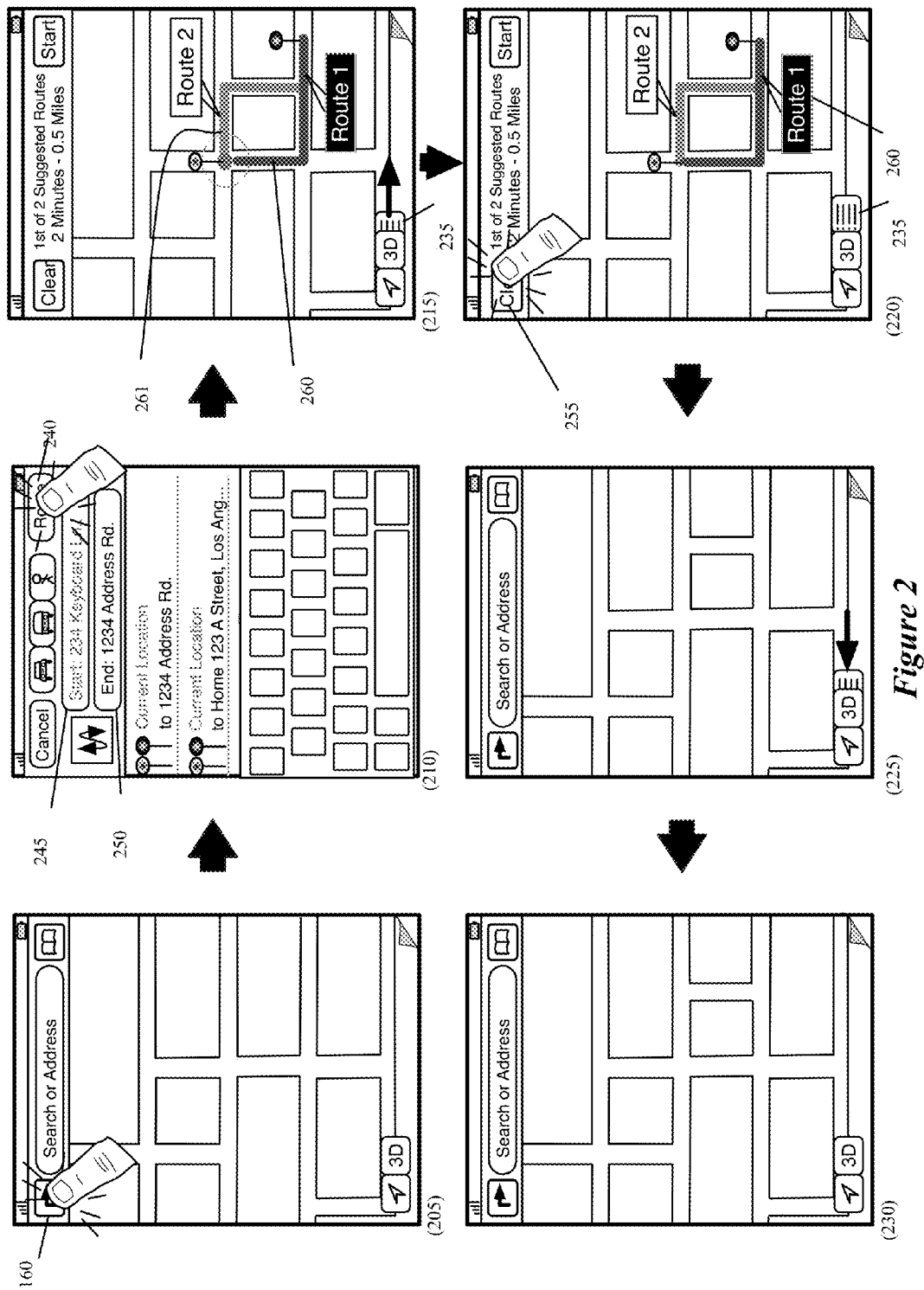
FIG. 2 illustrates an example of an integrated application adaptively modifying a floating control cluster.

As mentioned above, the mapping application in some embodiments adaptively adds and removes controls to the floating control cluster set in order to adapt this cluster to the different tasks while maintaining a consistent look and interaction model between those tasks. FIG. 2 illustrates an example of the application adaptively modifying the floating control cluster to add and remove a list view control 235. This example is provided in the context of using the direction indicator 160 to obtain a route between two locations.

This example is also provided in terms of six stages 205-530 of interactions with the mapping application. The first stage 205 illustrates the selection of the direction indicator 160. The second stage 210 next illustrates the selection of a route generation control 240 after the user has entered starting and ending locations for the route in the starting and ending fields 245 and 250. The second stage 210 also shows that the mapping application is displaying several recently used route generation requests below the fields for entering the starting and ending locations.

The third stage 215 shows two routes 260 and 261 that the mapping application has identified for the provided starting and ending locations. In some embodiments, the mapping application highlights one of the routes to indicate that the highlighted route is a default route that the mapping application recommends. This stage also illustrate the start of an animation that shows the list view control 235 sliding out from under the 3D icon 150. When there are opportunities to display a list of items, be it a list of instructions in a route or a list of search results when multiple results are found for a given query, the mapping application of some embodiments displays a list control as one of the floating controls. Tapping the list control brings up a modal list view in some embodiments. Having a modal list view keeps the mapping application simple and the map front and center. In some embodiments, the list view itself is adapted and optimized for the type of list being displayed, in that search results will be displayed with star ratings when available and route steps will include instructional arrows.

The fourth stage 220 shows the selection of a clear control 255 to clear the identified routes 260 and 261 from the illustrated map. In response to this selection, the routes 260 and 261 are removed from the map and an animation starts to show the list control 235 sliding back under the 3D control 150, as illustrated in the fifth stage 225. The sixth stage 230 shows the application UI after the animation has ended and the list control has been removed from the floating control set.

Figure 3:
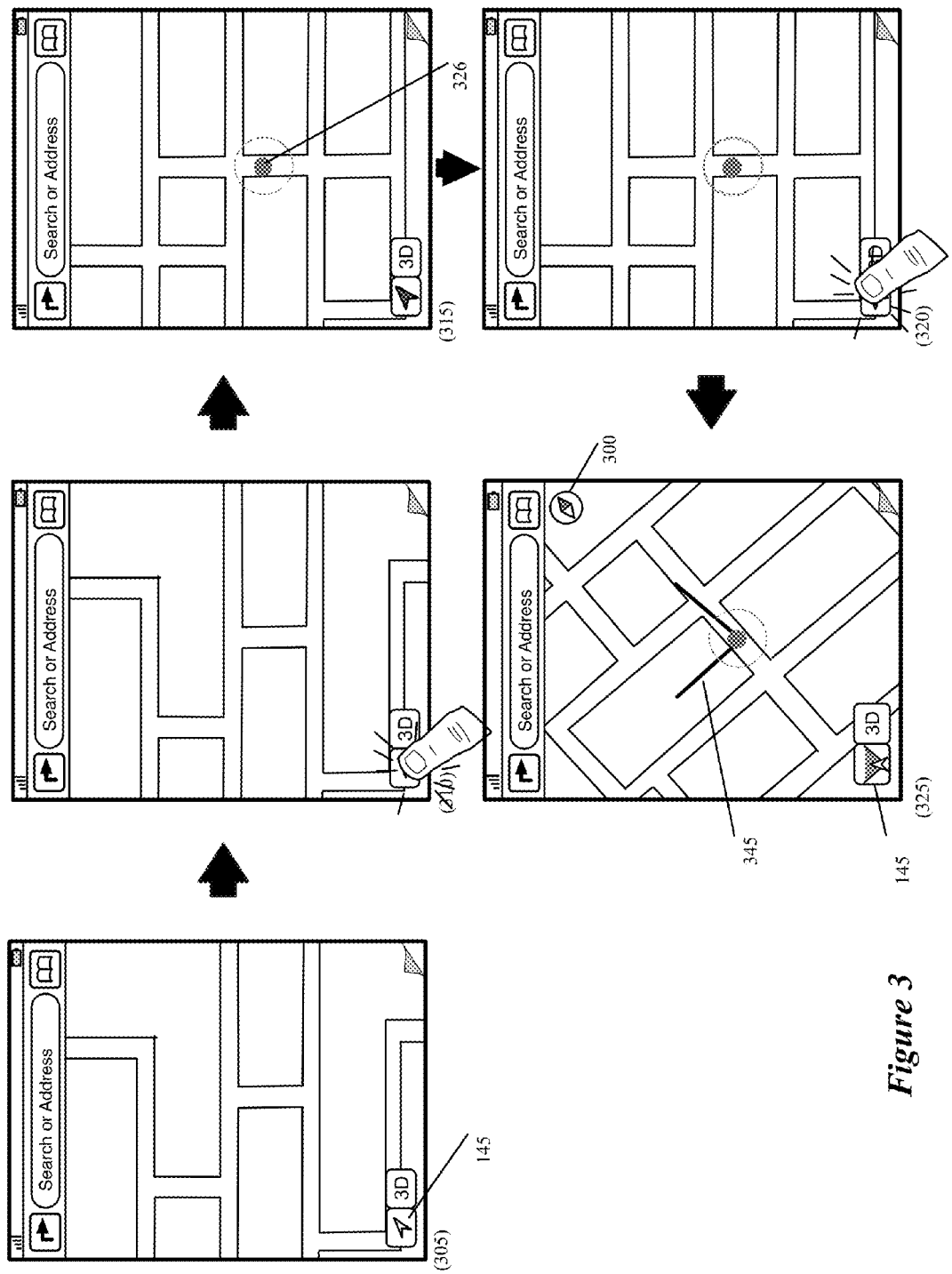
FIG. 3 illustrates an example of an integrated application adaptively modifying a floating control cluster.

Another floating control that the mapping application of some embodiments employs is a compass. FIG. 3 illustrates an example of the application adaptively modifying the floating control cluster to add and remove a compass 300. This example is provided in the context of using the position control 145 to view the current position and orientation of the device on the map presented by the device. In some embodiments, the position control 145 can cause the mapping application to operate in three different states. For instance, when the position control 145 is not selected, the mapping application displays a map view. Upon receiving a first selection of the position control 145, the mapping application shifts the map to display a region of the map that includes the current location of the device in the center of the region. The mapping application of some embodiments, from then on, tracks the current location of the device as the device moves.

In some embodiments, the mapping application maintains the current location indicator in the center of the display area and shifts the map from one region to another as the device moves from one region to another region. Upon receiving a second selection of the position control 145 while the mapping application is maintaining the current location of the device in the center of the displayed region, the mapping application displays a simulated light projection in the map from the identified current position in the direction that the device currently faces. When the position control 145 is selected again while the mapping application is displaying a simulated light projection, the mapping application returns back to the state that was before receiving the first selection. That is, the projection will disappear and the current position of the device is not tracked.

The example illustrated in this figure is provided in terms of five stages 305-325 of interactions with the mapping application. The first stage 305 illustrates that the mapping application is displaying a map region that happens to not include the current location of the device (i.e., the current location indicator is not displayed in the map region).

The second stage 310 illustrates the position control 145 being selected once. As mentioned above, the first selection of the position control 145 will result in shifting the map to display a map region that has the current location indicator 326 in the center. The third stage 315 shows the result of selecting the position control 145. Some embodiments identify the device's current position by using the current location indicator 326. The current location indicator 326 has different appearances in different embodiments. For instance, the current location indicator 326 of some embodiments has appearance of a colored dot (e.g., a blue dot) on the map. Identification of the current position is useful when the user has explored (e.g., through gestural swipe operation) the displayed map such that the device is not currently displaying the user's current location on the map.

The fourth stage 320 illustrates the position control 145 being selected again. The second selection of the position control 145 in some embodiments will cause the application to display a simulated light projection 345 in the map from the identified current position 326 in the direction that the device currently faces. This projection helps the user identifies the direction that the device faces at any time. In some embodiments, this projection always points towards the top of the device (i.e., the location along which the search field 165 is positioned while the device is held in the portrait direction).

This projection 345 is illustrated in the fifth stage 310. This stage also shows that in this mode, the mapping application presents a floating compass 300. This compass serves as an indicator that the user can use to identify the direction to the North Pole. In some embodiments, this compass is in the shape of two isosceles triangles that abut at their bases, with one of the triangles pointing north (in a direction away from the abutting bases) and having a color (e.g., orange) that differentiates it from the other triangle. As further described below, the compass can also be used to restore a north-up orientation after the user has rotated a 2D or 3D view of the map. In some embodiments, the compass may remain in the map view after the mapping application receives another selection of the position control 145. In some embodiments, the compass will not disappear until the mapping application receives a user input to remove the compass (e.g., selection of the compass).

The fifth stage 325 also shows that the map has rotated to maintain the projection's direction to the top of the device. This is because the device has been facing a different direction than the direction to the top of the device in the previous stage 320. As the direction of the device moves, so will the direction of the compass 300 with respect to the top of the device. The compass has moved to indicate the device is facing a northwest direction.

In some embodiments, the mapping application changes the appearance of the position control 145 once after the first selection and another time after the second selection. The fifth stage 325 shows the appearance of the position control 145 after the second selection, which is different than the appearance of the position control 145 after the first selection.

C. 2D or 3D 1. 3D Button

The mapping application in some embodiments can display a location in the map in either a 2D mode or a 3D mode. It also allows the user to browse a location in the map in either a 2D mode or a 3D mode. As mentioned above, one of the floating controls is the 3D control 150 that allows a user to view a map or inspect a route in three dimensions (3D). This control also serves as (1) an indicator that the current view is a 3D view, and (2) an indicator that a 3D perspective is available for a given map view (e.g., a map view that is zoomed out might not have a 3D view available).

Figure 4:
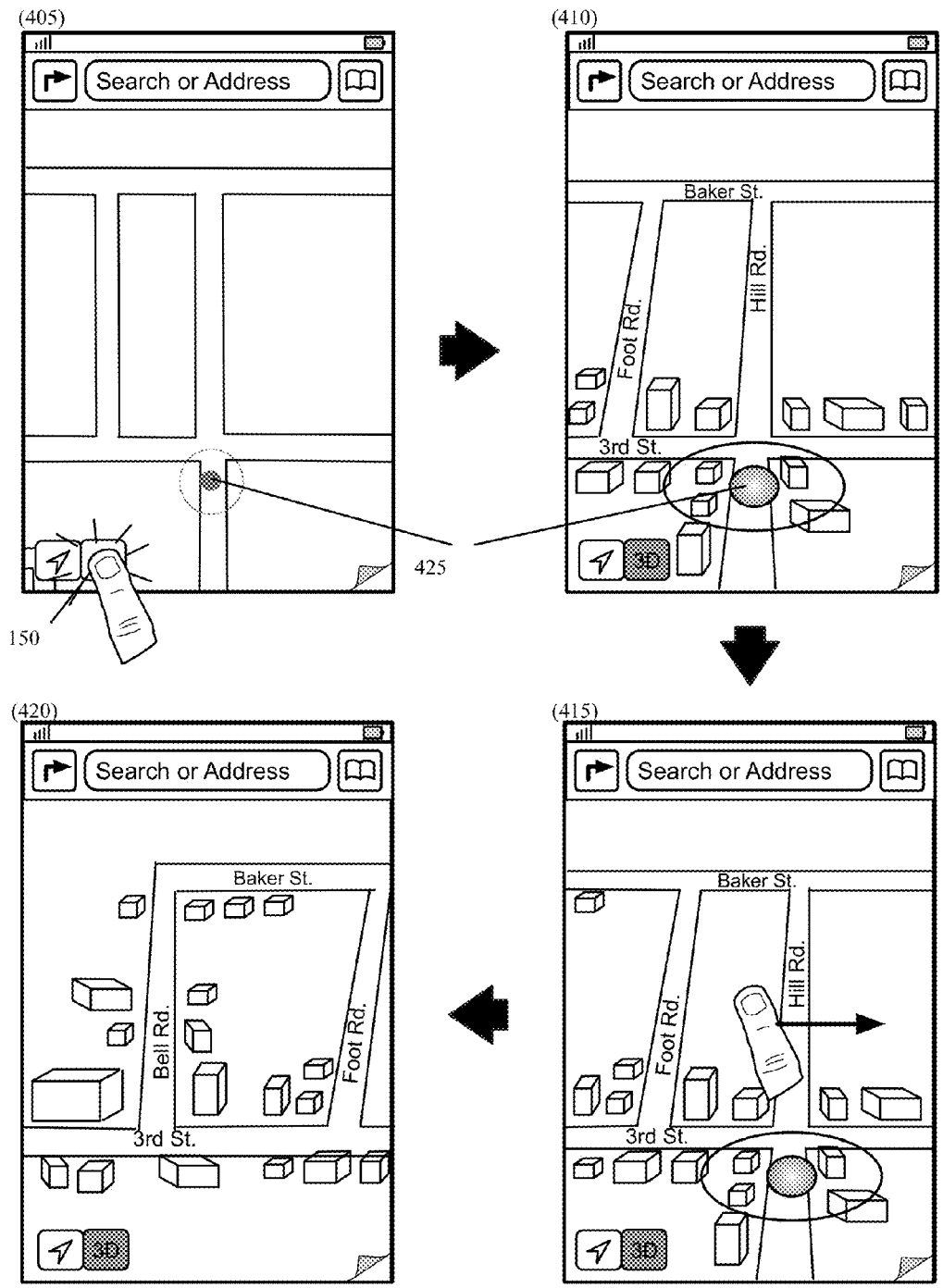
FIG. 4 illustrates how the mapping application of some embodiments provides a 3D control as a quick mechanism of entering a 3D mode for viewing a map location in three dimensions.

FIG. 4 illustrates how the mapping application of some embodiments provides the 3D control 150 as a quick mechanism of entering a 3D mode for viewing a map location in three dimensions. This figure illustrates this operation in four stages 405-420. The first stage 405 illustrates the user selecting the 3D control 150 while viewing a two-dimensional presentation of an area about the user's current location 425. The top bar, the floating controls, and the page curl are not depicted in this figure for simplicity of description.

The second stage 410 shows a three dimensional presentation of the user's current location on the map. As mentioned above, the mapping application generates the 3D view of the map in some embodiments by rendering the map view from a particular position in the three dimensional scene that can be conceptually thought of as the position of a virtual camera that is capturing the map view. This rendering will be further described below by reference to FIG. 5.

The third stage 415 shows the user browsing about the current location by performing a swipe operation (e.g., by dragging a finger across the touch-sensitive screen of the device). This swipe operation changes the 3D map view presented on the device to display a new location on the 3D map. This new location is illustrated in the fourth stage 420.

In some embodiments, the mapping application presents the 3D view of the map while the mapping application is operating in a navigation mode (i.e., while the mapping application is presenting turn-by-turn navigation view). In order to provide visual distinction between the 3D view of the map during navigation and the 3D view of the map during map browsing, the mapping application of some embodiments use different stylesheets that define rendered graphics differently. For instance, the mapping application of some embodiments uses a stylesheet that defines grey colors for buildings, white colors for roads, and rounded corners for blocks in the 3D view of the map during map browsing. The mapping application of some embodiment uses a stylesheet that defines white colors for buildings, grey colors for roads, and sharp corners for blocks in the 3D view of the map during navigation. In some embodiments, the mapping application applies these stylesheets to the same map tiles for a given region of the map. In other embodiments, the mapping application applies these stylesheets to different map tiles (e.g., map tiles, navigation tiles, etc.) for the given region. Using stylesheets to render maps are further described in U.S. patent application Ser. No. 13/632,035, now published as U.S. Patent Publication No. 2013/0322702, entitled "Rendering Maps," concurrently filed with this application. This concurrently filed U.S. patent application Ser. No. 13/632,035, now published as U.S. Patent Publication No. 2013/0322702. is incorporated herein by reference.

2. Virtual Camera

Figure 5:
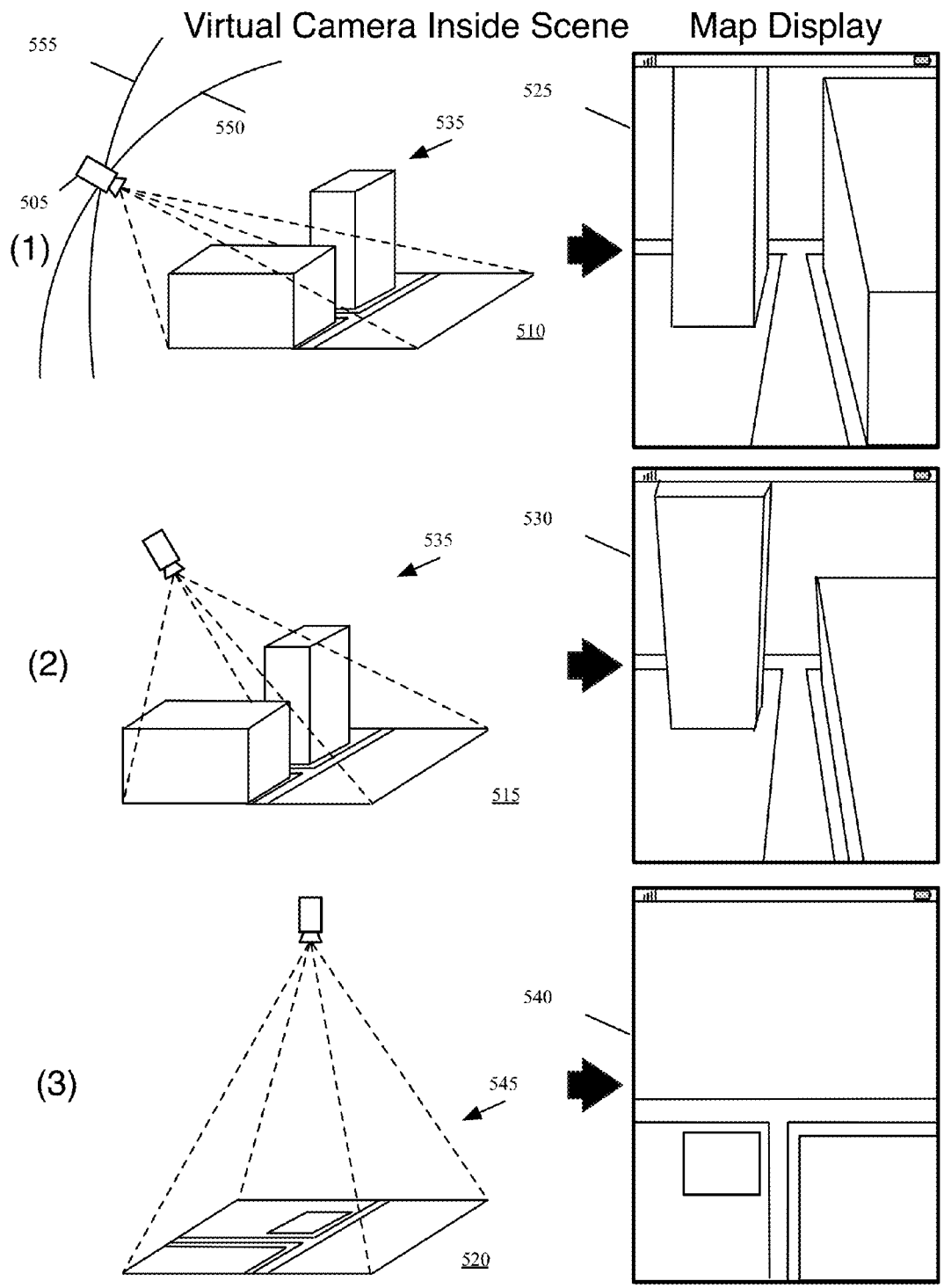
FIG. 5 presents a simplified example to illustrate the concept of a virtual camera.

FIG. 5 presents a simplified example to illustrate the concept of a virtual camera 505. When rendering a 3D map, a virtual camera is a conceptualization of the position in the 3D map scene from which the device renders the scene to generate a 3D view of the map. FIG. 5 illustrates a location in a 3D map scene 535 that includes four objects, which are two buildings and two intersecting roads. To illustrate the virtual camera concept, this figure illustrates three scenarios, each of which corresponds to a different virtual camera location (i.e., a different rendering position) and a different resulting view that is displayed on the device.

The first stage 510 shows the virtual camera at a first perspective position pointing downwards towards the 3D scene at a first angle (e.g., −30°). In this position, the camera is pointing to a location that may be a stationary position of the device or of a location being explored, or a moving position in front of a moving location of the device in a case where the map is used for navigation. In some embodiments, the default position of the camera is to be at a particular orientation with respect to the current location, but this orientation can be modified when the user rotates the map. Rendering the 3D scene from the first angle results in the 3D map view 525.

The second stage 515 shows the virtual camera at a different second perspective position pointing downwards towards the scene at a larger second angle (e.g. −45°). Rendering the 3D scene from this angle results in the 3D map view 530 the buildings and the roads smaller than their illustration in the first map view 525.

The third stage 520 shows the virtual camera at a top-down view that looks downwards on a location on a 2D map 545 that corresponds to the location in the 3D map scene 535 that was used to render the 3D views 525 and 530. The scene that is rendered from this perspective is the 2D map view 540. Unlike the 3D rendering operations of the first and second stages that in some embodiments are perspective 3D rendering operations, the rendering operation in the third stage is relatively simple as it only needs to crop a portion of the 2D map that is identified by a zoom level specified by the application or the user. Accordingly, the virtual camera characterization in this situation somewhat unnecessarily complicates the description of the operation of the application as cropping a portion of a 2D map is not a perspective rendering operation.

As in the third stage 520, the mapping application in some embodiments switches from rendering a 3D scene from a particular perspective direction to cropping a 2D scene when the camera switches from the 3D perspective view to a 2D top-down view. This is because in these embodiments, the application is designed to use a simplified rendering operation that is easier and that does not generate unnecessary perspective artifacts. In other embodiments, however, the mapping application uses a perspective rendering operation to render a 3D scene from a top-down virtual camera position. In these embodiments, the 2D map view that is generated is somewhat different than the map view 540 illustrated in the third stage 520, because any object that is away from the center of the view is distorted, with the distortions being more, the further the object's distance from the center of the view.

The virtual camera 505 moves along different trajectories or arcs in different embodiments. Two such trajectories 550 and 555 are illustrated in FIG. 5. In both these trajectories, the camera moves in an arc and rotates more downward as the camera moves upwards on the arc. The trajectory 555 differs from the trajectory 550 in that, in the trajectory 555, the camera moves backwards from the current location as it moves up the arc.

While moving along one of the arcs, the camera rotates to maintain a desired location on the map at the focal point of the camera. The desired location in some cases is a stationary location of the device or a stationary location that the user is browsing on the map. In other cases, the desired location is a moving location in front of the moving location of the device as the user is moving with the device.

Besides (or instead of) having the navigation application control the camera (e.g., turning from 3D to 2D when going around corners) some embodiments also allow the user to adjust the position of the camera. Some embodiments allow the user to make a command gesture with two fingers to adjust the distance (height) and angle of the camera. Some embodiments even allow multiple types of gestures to control the camera.

Figure 6:
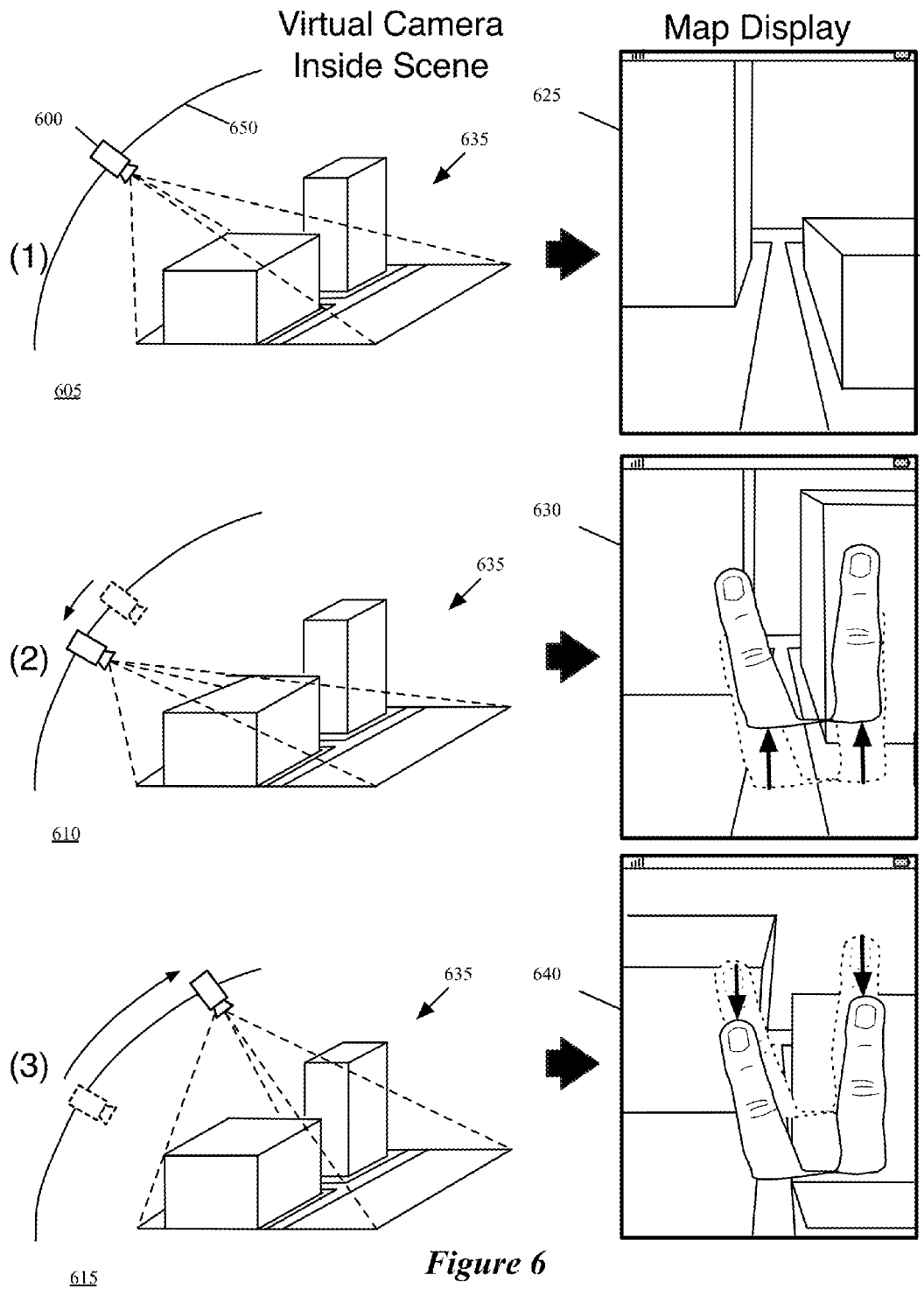
FIG. 6 conceptually illustrates a perspective adjustment feature provided by a mapping application of some embodiments.

FIG. 6 conceptually illustrates a perspective adjustment feature provided by a mapping application of some embodiments. Specifically, FIG. 6 illustrates a virtual camera 600 at three different stages 605-615 that show the adjustment of the virtual camera 600's position in response to a perspective adjustment. As shown, FIG. 6 illustrates a location in a 3D map 635 that includes four objects, which are two buildings and two intersecting roads.

The first stage 605 shows the virtual camera 600 at a first perspective position pointing downwards towards the 3D map 635 at a first angle (e.g., 45 degrees) with respect to the horizon. In this position, the camera 600 is pointing to a location that may be a stationary position of the device or of a location being explored, or a moving position in front of a moving location of the device in a case where the map is used for navigation. In some embodiments, the default position of the camera 600 is to be at a particular orientation with respect to the current location, but this orientation can be modified when the user rotates the map. Rendering a 3D map view of based on the virtual camera 600's position results in the 3D map view 625.

The second stage 610 shows the virtual camera 600 at a different second perspective position pointing at a lower perspective towards the 3D map 635 at a smaller second angle (e.g., 30 degrees) with respect to the horizon. The stage 610 also shows that a user has provided input to adjust the perspective of the view of the 3D map 635 by touching two fingers on the screen and dragging the two fingers in an upward direction (e.g., a swipe gesture). The scene rising is accomplished by the virtual camera 600 lowering and decreasing the viewing angle with respect to the horizon. Rendering a 3D map view using the virtual camera 600 positioned at this angle results in a 3D map view 630 in which the buildings and the roads are taller than their illustration in the first map view 625. As indicated by the dashed-line version of the virtual camera 600, the virtual camera 600 moved farther downwards along arc 650 while tilting (e.g., pitching) farther up.

The third stage 615 shows the virtual camera 600 at a different third perspective position pointing at a higher perspective towards a location (e.g., the virtual camera 600's point of focus) on the 3D map 635 at a larger third angle (e.g., 80°) with respect to the horizon. The stage 615 also shows that the user has provided input to adjust the perspective of the view of the 3D map 635 by touching two fingers on the screen and dragging the two fingers in a downward direction (e.g., a swipe gesture). The scene dropping or flattening out is accomplished by the virtual camera 600 rising and increasing its angle with respect to the horizon. As shown at this stage 615, in some embodiments, the mapping application flattens the buildings (e.g., reduces the z-axis component of the polygons to the ground level) in the 3D map 635 when the virtual camera 600 is positioned in a top-down or near top-down position so that 3D map views rendered using the virtual camera 600 appear 2D. Rendering a 3D map view using the virtual camera 600 positioned at the angle in the third stage 615 results in a 3D map view 640 in which the buildings appear smaller, flatter and the roads appear smaller than their illustration in the second map view 630. As shown by the dashed-line version of the virtual camera 600, the virtual camera 600 moved farther upwards along arc 650 while tilting (e.g., pitching) farther down.

In some embodiments, the virtual camera 600 can be made to move in this manner when the mapping application receives input for adjusting the perspective for viewing the 3D map 635. In some of these embodiments, the mapping application switches to a top-down mode (where the rendering position faces straight down) that produces 2D map views when the zoom level reaches a particular zoom out level.

While moving along an arc, the virtual camera rotates to maintain a desired location on the map at the focal point of the camera. The desired location in some cases is a stationary location of the device or a stationary location that the user is browsing on the map. In other cases, the desired location is a moving location in front of the moving location of the device as the user is moving with the device.

3. Gesture to Enter or Exit 3D

In addition to the 3D control, the mapping application of some embodiments allows a user to transition a map view from a two-dimensional (2D) presentation to a 3D presentation through gestural inputs of the multi-touch interface of the device. For instance, through a two finger gestural input, the user can be made to experience "pushing" down a 2D map view into a 3D map view, or "pulling" up a 3D map view into a 2D map view. This can also be thought of as pulling down a virtual camera from a 2D (directly from above) view into a 3D (side angle) view through the two-finger gesture.

Figure 7:
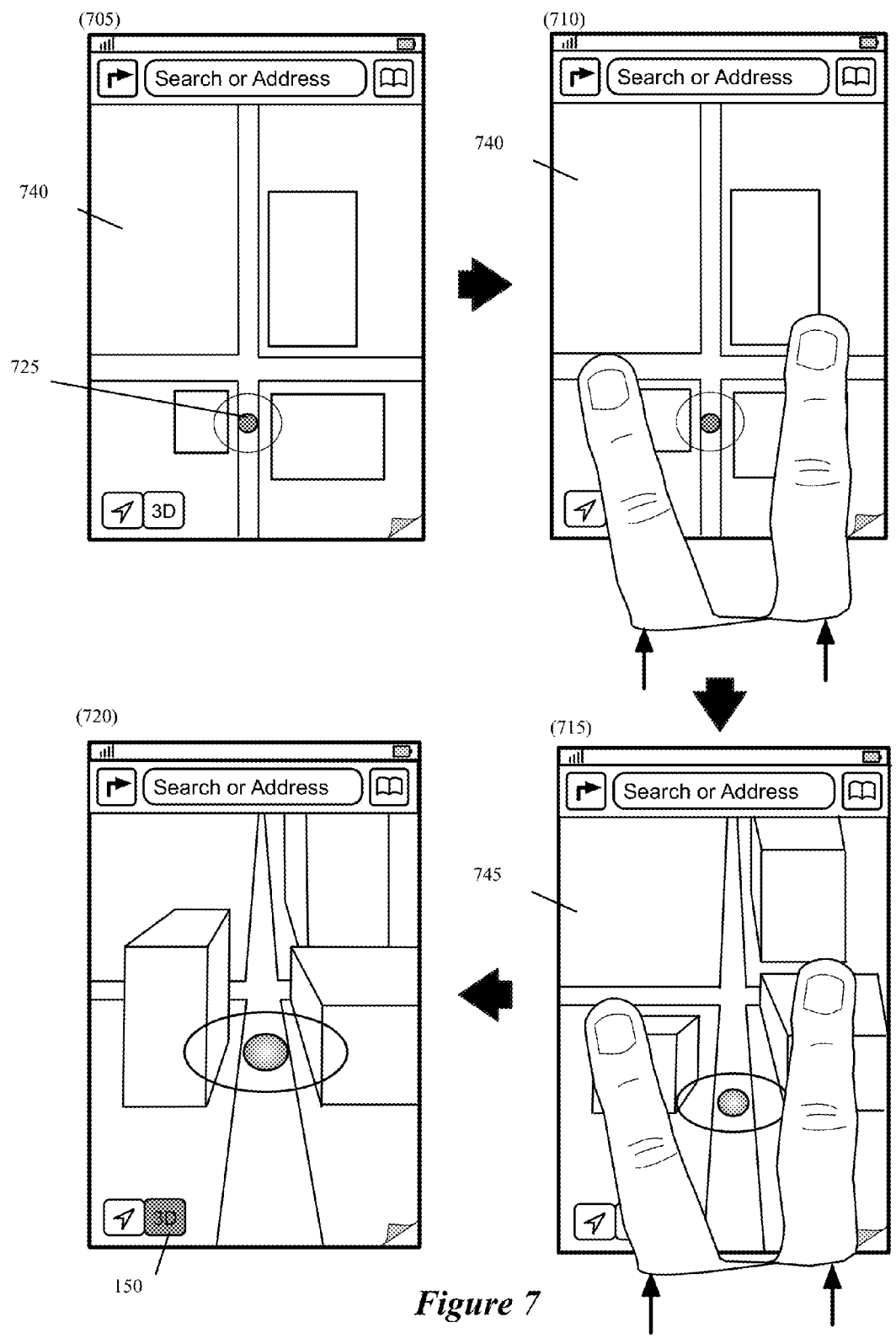
FIG. 7 illustrates one example of two finger gestures for pushing down a 2D map into a 3D map.

Different embodiment use different two finger gestural operations to push down a 2D map view into a 3D map view, or pull up a 3D map view into a 2D map view. FIG. 7 illustrates one example of two finger gestures for pushing down a 2D map into a 3D map. This figure presents this example in terms of four stages of operation of the UI of the mapping application. The first stage 705 shows the application UI presenting a 2D map view about a current location 725 of the device.

The second stage 710 then shows the start of a two finger gesture operation to push down the 2D view 740 until a 3D view is presented. In some embodiments, the application identifies a push down of the 2D map when it detects that two contacts are placed horizontally or approximately horizontally on a 2D map and move upwards together. Some embodiments require the movement to exceed a certain amount in order to impose an inertia that acts against the pushing of a 2D map into a 3D map, and thereby prevent such a transition to occur accidentally.

Other embodiments use other schemes to transition from a 2D map to a 3D map through a gestural input. For instance, the application of some embodiments performs such a transition when a user places two fingers vertically with respect to each other and exerts a greater force on the top finger so as to trigger one of the sensors of the device (e.g., gyroscope, etc.) or to trigger a rotation of the fingers. Yet other embodiments require an opposite operation to be performed to transition from the 2D map view to a 3D map view. For instance, some embodiments require the two horizontally aligned fingers to move downwards on the 2D map in unison in order to push down the 2D view into a 3D view.

The third stage 715 shows the two fingers of the user after they have moved up by a certain amount across the device's screen. It also shows that the 2D map 740 has been replaced with a 3D map 745. The fourth stage 720 shows the 3D map 745 at the end of the two finger gesture movement. The 3D control 150 appears highlighted in this stage to indicate that the current map view is a 3D map view.

In some embodiments, a 3D map view can be pulled up into a 2D map view by performing the opposite two-finger operation. Specifically, in these embodiments, the mapping application transitions between a 3D map and a 2D map when it detects two horizontal or approximately horizontal contacts on a 3D map that move downwards in unison by an amount greater than a threshold amount.

D. Animation when Entering and Exiting 3D

Figure 8:
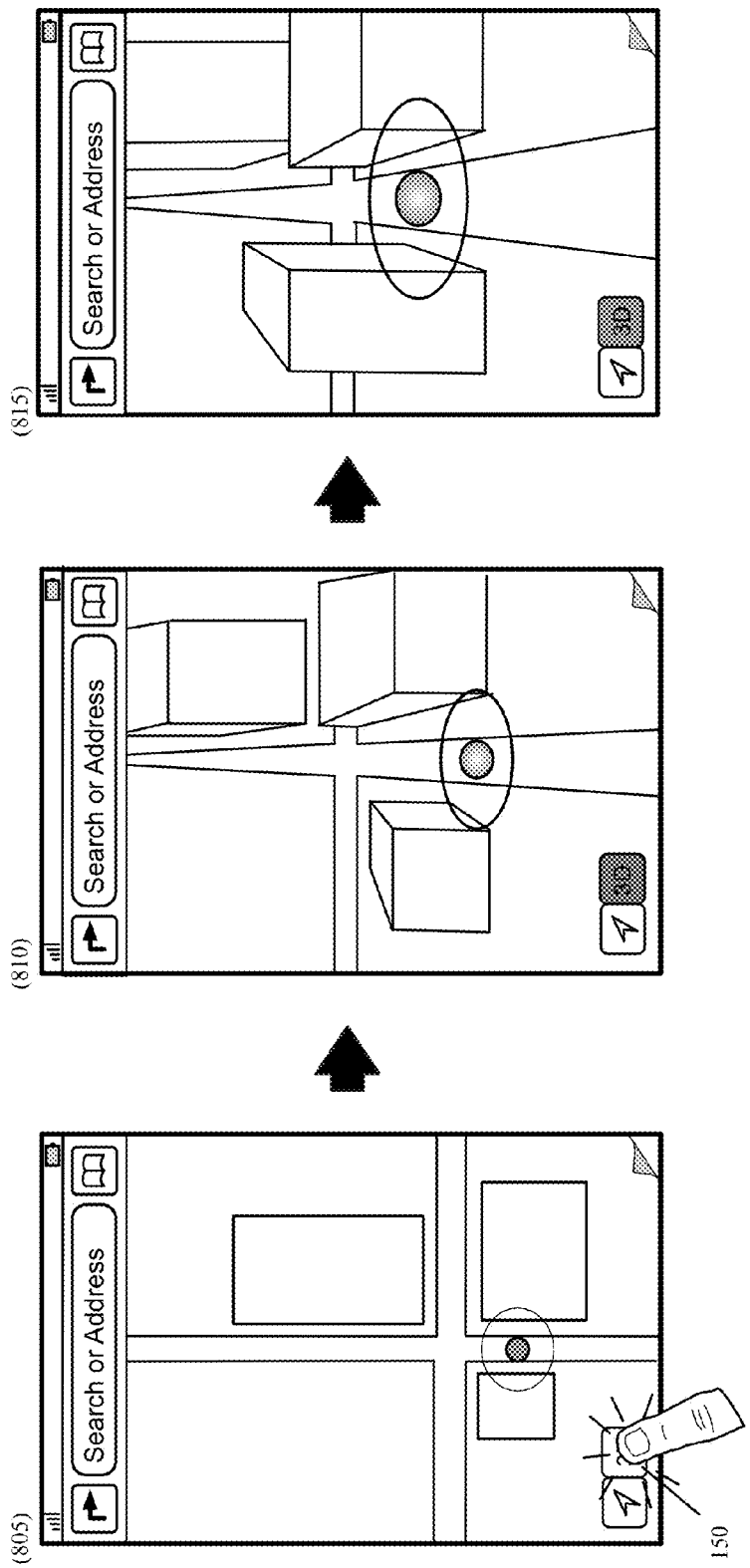
FIG. 8 illustrates a transition from a 2D map view to a 3d map view.

When transitioning from a 2D map view to a 3D map view, some embodiments provide an animation that shows object that appear as flat in the 2D map view as rising and becoming larger in the 3D map view. Generating such animation that shows object rising/falling and becoming larger/smaller is further described in U.S. patent application Ser. No. 13/632,027, now published as U.S. Patent Publication No. 2014/0071119, entitled "Displaying 3D Objects in a 3D Map Presentation," concurrently filed with this application. This concurrently filed U.S. patent application Ser. No. 13/632,027, now published as U.S. Patent Publication No. 2014/0071119, is incorporated herein by reference. FIG. 8 illustrates this animation in three stages. The first stage 805 shows a user selecting the 3D control 150 when viewing a 2D map view. The second and third stages 810 and 815 show subsequent views (though not necessarily successive views) that the mapping application provides after it starts to provide a 3D map view. As the zoom in level increases between the second and third stages, the height of the buildings in the map views increases to provide an animation that conveys that the view is moving into the 3D scene from the 2D view.

When transitioning from the 3D view to the 2D view, the mapping application of some embodiments provides an opposite animation that shows the objects in the scene shrinking until they collapse into flat objects in a 2D map.

In some embodiments, the mapping application provides a transition from 2D to 3D or from 3D to 2D while the mapping application operates in the navigation mode or in the route inspection mode. These two operational modes of the mapping application are described further below.

Figure 9:
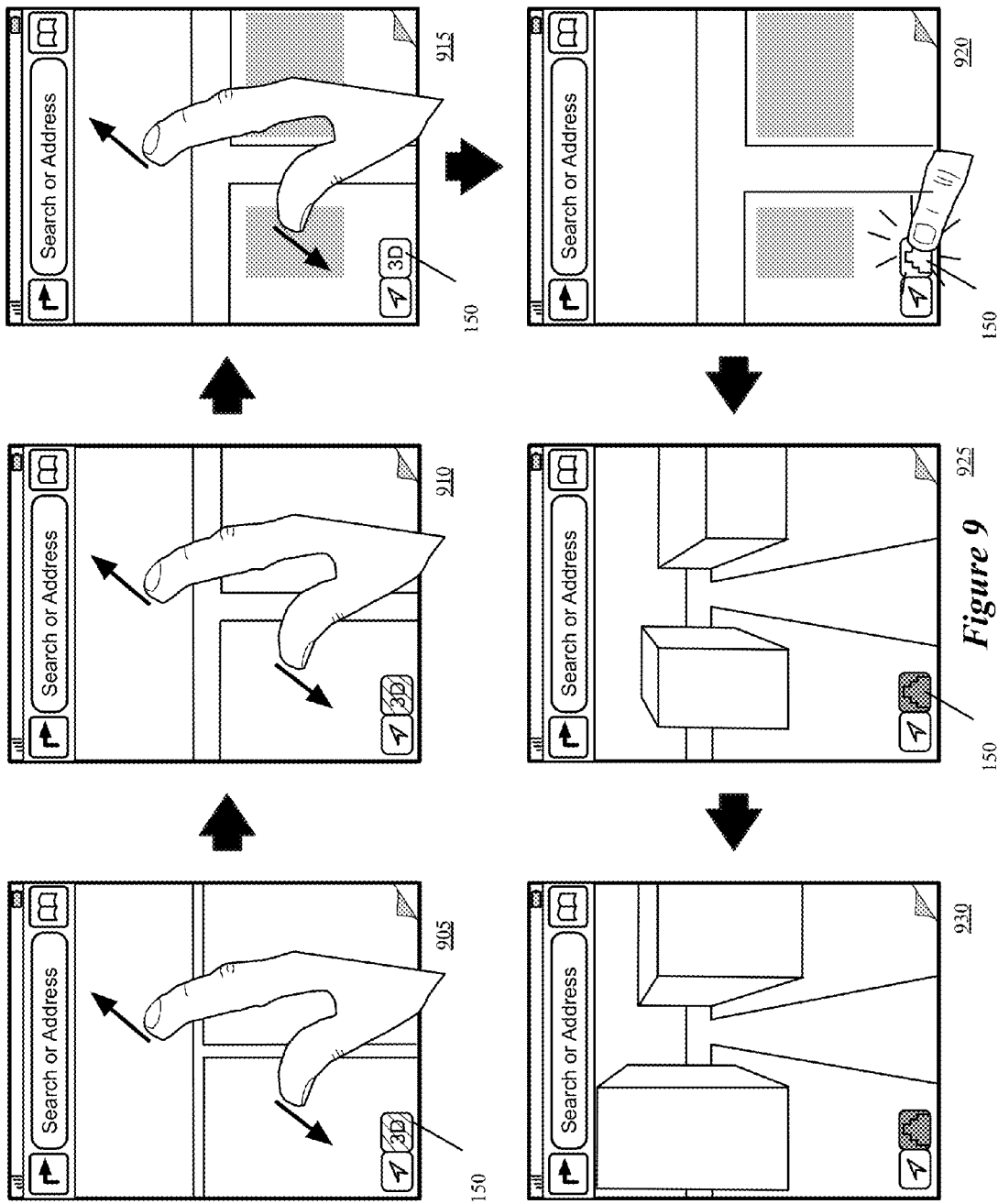
FIG. 9 illustrates that the mapping application of some embodiments changes the appearance of the 3D control to indicate different 2D and 3D states of the map view.

FIG. 9 illustrates in six different stages 905-930 that the mapping application of some embodiments changes the appearance of the 3D control to indicate different 2D and 3D states of the map view. The first stage 905 illustrates that the mapping application is displaying a map and the floating controls including the 3D control 150. The mapping application is displaying the map in 2D at a certain low zoom level (map has not been zoomed in much) as shown. The 3D control 150 is displayed using a first appearance (e.g., grey letters "3D") to indicate the 3D map data is not available at this particular zoom level. The first stage 905 also shows that the mapping application is receiving the user's gestural input to zoom in the map (i.e., to increase the zoom level).

The second stage 910 shows that the mapping application is displaying the map at a higher zoom level than it did at the previous stage 905. However, the 3D control 150 is maintaining the first appearance because the 3D map data is still not available even at this particular higher zoom level. The second stage 910 also shows that the mapping application is receiving another gestural input to zoom in the map further.

The third stage 915 shows that the mapping application is displaying the map at a higher zoom level than it did at the previous stage 910. The mapping application has changed the appearance of the 3D control 150 into a second appearance (e.g., "3D" in black letters) to indicate that the 3D map data is available at this zoom level. When the mapping application receives a selection of the 3D control 150, the mapping application of some embodiments would change the appearance of the 3D control 150 to a third appearance (e.g., "3D" in blue letters) and display the map in 3D (e.g., by changing into a perspective view from a straight-down view for 2D). The third appearance therefore would indicate that the map is displayed in 3D. The third stage 915 shows that the mapping application is receiving yet another gestural input to zoom in the map even further to a higher zoom level. The third stage 915 shows that the mapping application of some embodiments is displaying buildings in the map as grey boxes.

The fourth stage 920 shows that the mapping application is displaying the map at a higher zoom level than it did at the previous stage 915. The mapping application has changed the appearance of the 3D control 150 into a fourth appearance (e.g., a building icon in a first color as shown) in order to indicate that 3D immersive map data for rendering immersive 3D map view are available at this zoom level. The fourth stage 920 also shows that the mapping application is receiving a selection of the 3D control 150.

The fifth and sixth stages 925 and 930 show subsequent views (though not necessarily successive views) that the mapping application provides after it starts to provide a 3D immersive map view. The zoom level does not change between the fifth and sixth stages in some embodiments but the height of the buildings in the map views increases to provide an animation that conveys that the view is moving into the 3D immersive map view from the 2D view. Also, from the stage 920 to 925, the mapping application has changed the appearance of the 3D control into the fifth appearance (e.g., a building icon in a second color as shown) in order to indicate that the map is displayed in the 3D immersive view.

E. Browsing

1. Swipe

The mapping application allows a user to explore about a location that is shown in the map through a variety of mechanisms in some embodiments. For instance, as mentioned above, the mapping application of some embodiments allows a user to browse about a location by performing one or more swipe operations (e.g., by dragging a finger) across the touch-sensitive screen of the device. Such operations move the view presented by the application to new locations on the map. One example of the swipe operation in 3D map view was described above by reference to FIG. 4.

2. Rotation

Through gestural inputs, the mapping application also allows a user to rotate a 2D or 3D map in some embodiments. The mapping application in some embodiments is a vector mapping application that allows for direct manipulations (such as rotation and 2D/3D manipulations) of the map while browsing it. However, some of the effects to the map can be disorienting. Without an easy way to get back to north-up orientation (i.e., an orientation where the north direction is aligned with the top of the device), some users may have difficulty interacting with the map views. To solve this, the mapping application of some embodiments provides the floating compass control on the map. As mentioned, this compass serves both as an indicator that points to north and as a button to restore a north-up orientation. To further minimize clutter on the map, the mapping application only shows this button when the map is rotated.

Figure 10:
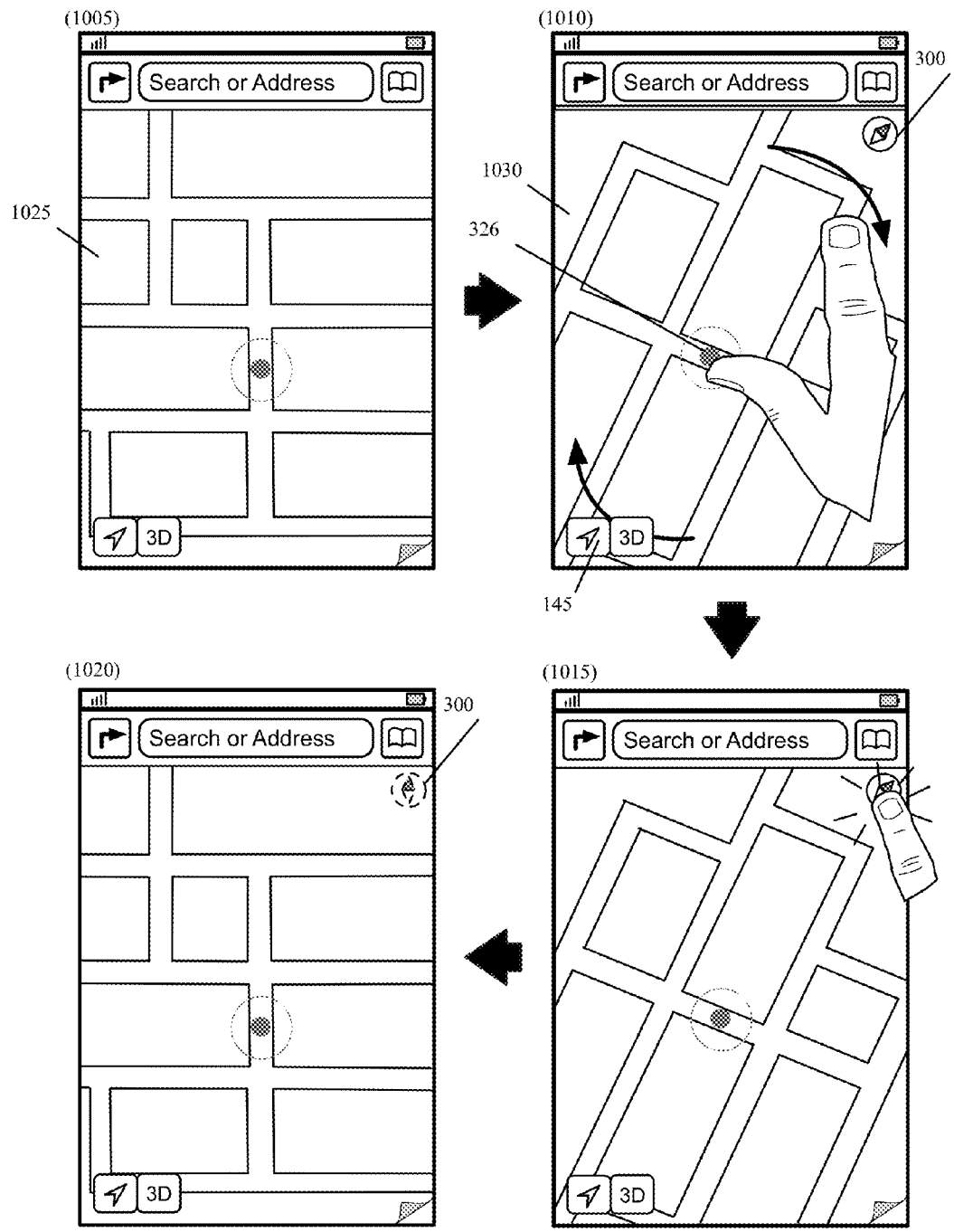
FIG. 10 illustrates an example of rotating a 2D map and using a compass to straighten the rotated map.

FIG. 10 illustrates an example of rotating a 2D map and using the compass to straighten the rotated map in some embodiments of the invention. This figure illustrates this example in four stages. The first stage 1005 illustrates a 2D map view 1025. The second stage 1010 illustrates the rotation of this map view through a two finger gesture. A user performs the gesture in this example by placing two fingers on the map view and pulling one finger down while pushing one finger up. This rotational motion of the fingers causes the application to rotate the map into the rotated map view 1030. In some embodiments, the mapping application computes the midpoint between the two fingers and uses it as an anchor point for the rotation. In some such embodiments, the mapping application uses a position of non-moving finger as an anchor point if one of the two fingers does not move. In some embodiments, the mapping application uses the location of the position control 326 as an anchor point for the rotation when the position control is present in the view (e.g. by a selection of the position control 145) regardless of the finger locations.

The second stage 1010 also shows that in response to the rotation of the map, the application has presented the compass 300 on the map to indicate the north direction on the rotated map. The third stage 1015 then shows the user's selection of the compass 300. The fourth stage 1020 then shows that after the selection of the compass, the application rotates the map back to the map view 1025 (i.e., north-up orientation).

Figure 11:
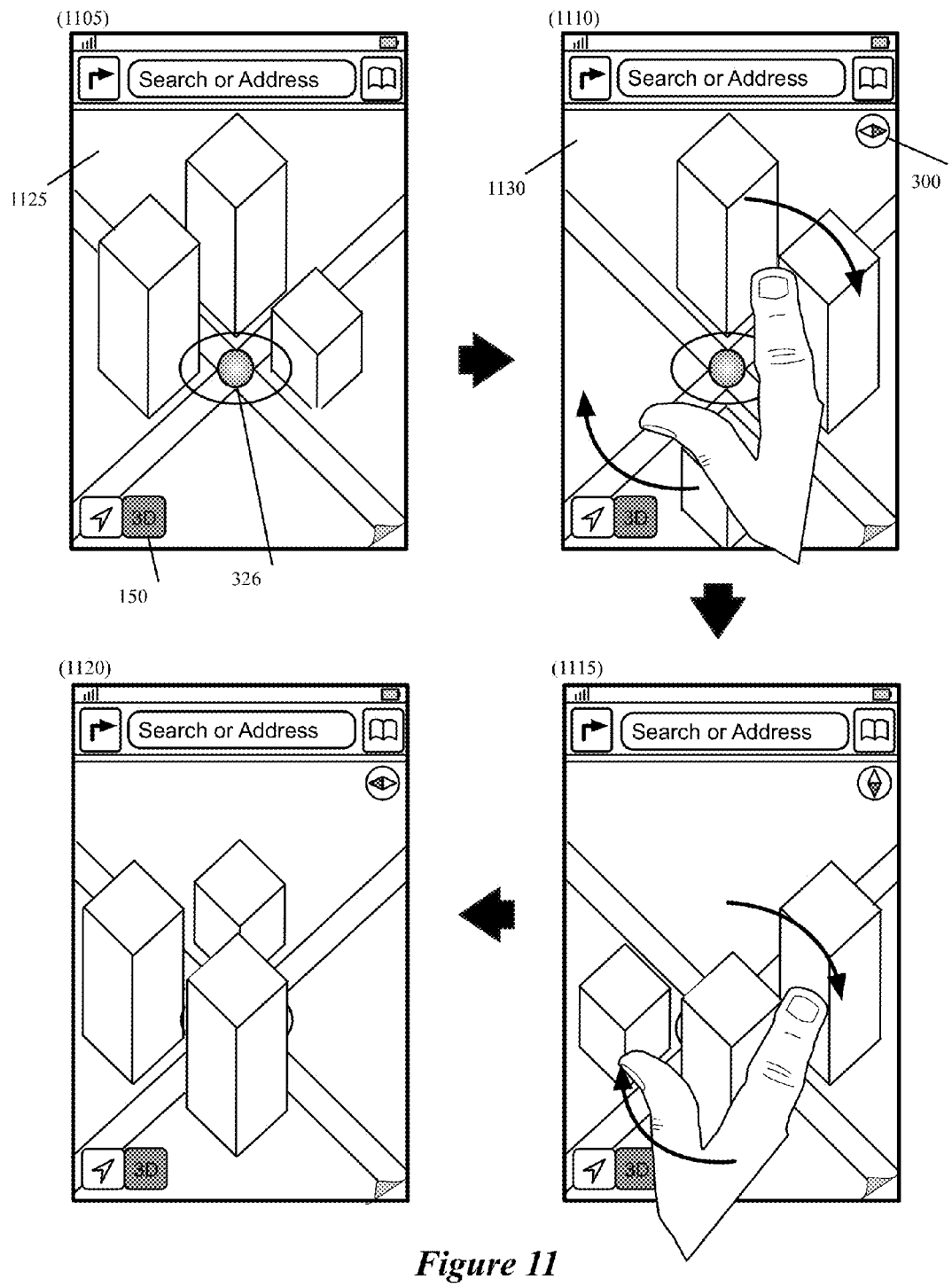
FIG. 11 illustrates another example of rotating a map in some embodiments of the invention.

FIG. 11 illustrates another example of rotating a map in some embodiments of the invention. This figure illustrates this example in four stages 1105-1120. In this example, the map is a 3D map. Hence, the first stage 1105 illustrates a 3D map view 1105. The second stage 1110 illustrates the rotation of this map view through a two finger gesture. As before, the user performs the gesture in this example by placing two fingers on the map view and pulling one finger down while pushing one finger up. This rotational motion of the fingers causes the application to rotate the map into the rotated map view 1130. In this example, the rotation is about the current position of the device because, as mentioned above, the current location indicator 326 is present in the map view 1125.

The second stage 1110 also shows that in response to the rotation of the map, the application has presented the compass 300 on the map to indicate the north direction on the rotated map. The third stage 1115 then shows further rotation of the map in response to user's another two finger gesture. The compass 300 still indicates the north direction but has rotated along with the rotated map. The fourth stage 1120 then shows even further rotation of the map and the compass 300.

In some embodiments, the mapping application does not allow the user to rotate a 2D or 3D map at some zoom levels. For instance, when the map is zoomed out (to a low zoom level), the mapping application does not rotate the map upon receiving the user's gestural input (e.g., two figure rotation operation) to rotate the map. In some embodiments, a module of the mapping application that is responsible for the virtual camera movement checks the current zoom level and decides to ignore such instructions if the map should not be rotated at the current zoom level.

In some other embodiments, the application rotates the map a particular distance when the user provides the gestural input for rotating the map, but rotates the map back to a default orientation (e.g., North) when the user releases or stops the gestural input.

In some embodiments, the mapping application provides an inertia effect for rotation of a map. When a user provides a particular type of gestural input (e.g., input that terminates at an angular or translational velocity greater than a threshold velocity) to rotate the map, the mapping application generates an inertia effect that causes the map to continue rotating and decelerate to a stop. The inertia effect in some embodiments provides the user with a more realistic interaction with the map that mimics behaviors in the real world.

Figure 12:
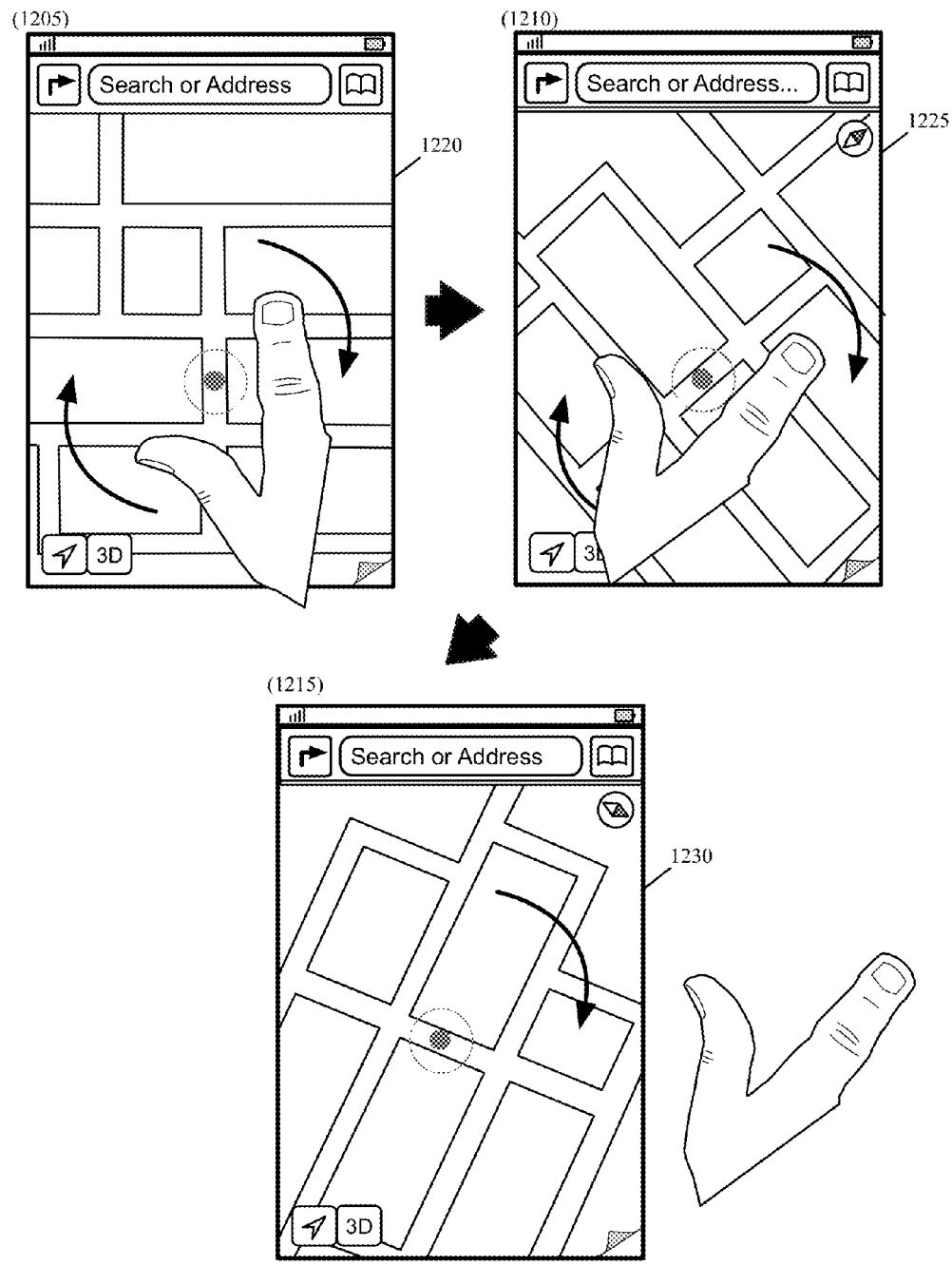
FIG. 12 illustrates a rotation operation along with an inertia effect.

FIG. 12 illustrates at three different stages 1205-1215 the rotation operation along with an inertia effect for the rotation operation. The inertia effect is shown in terms of 2D map views in this figure for simplicity of illustration. However, the mapping application of some embodiments provides the inertia effect when the map is viewed in the 3D mode. The first stage 1205 shows a 2D map view 1220 of a 2D map. In some embodiments, the mapping application performs the process 1300 described below by reference to FIG. 13 to perform the rotation operation.

As shown, the 2D map view 1220 includes several streets running in a parallel or perpendicular directions. The first stage 1205 also shows that a user is providing input to rotate the 2D map view 1220. Specifically, the user is performing a gesture to rotate the 2D map view 1220 by touching two fingers at two locations on the touchscreen and rotating the two fingers in a clockwise direction, as indicated by the two arrows depicted in the figure. In this example, the highlighting of the fingertips are illustrated for purposes of explanation. In some embodiments, the mapping application does not actually display the highlighting around the fingertips.

The second stage 1210 shows the 2D map immediately after the user has completed the input to rotate the 2D map. For this example, the user completed the input by lifting the two fingers off the touchscreen of the device, as indicated by the highlighting around the fingertips no longer shown. In addition, the second stage 1210 shows a 2D map view 1225 of the 2D map rendered by the mapping application. As shown, the mapping application has rotated the 2D map in a clockwise direction from the 2D map view 1220 to the 2D map view 1225. The streets shown in the first stage 1205 have rotated approximately 45 degrees in clockwise direction.

The mapping application of different embodiments utilizes different methods to implement an inertia effect for a rotation operation. For instance, in some embodiments, the mapping application determines an angular (or translational) velocity of the user's input at or near the instance at which the user stops the movement of the fingers or lifts the fingers from the touchscreen, based on one of the fingers or an average of both of the fingers. When the user repeats stopping the figures without lifting and starting to move the fingers again, the mapping application of some embodiments treats each stop as an end of an input while in other embodiments the mapping application treats it as one input until the user lifts the fingers from the screen.

The mapping application uses the angular velocity to determine an angle amount (e.g., degrees) for the inertia effect and determines the manner at which the virtual camera used to view the 2D map decelerates (e.g., constant, exponential, logarithmic, etc.) the angular velocity to rotate the determined angle amount. In some embodiments, the mapping application renders and displays an animation of the inertia effect (e.g., a decelerating rotation of the 2D map from the 2D map view 1225 that rotates the 2D map the determined angle amount).

In some embodiments, the mapping application does not itself analyze the user's gestural inputs. For instance, the mapping application of these embodiments does not determine the angular velocity of the user's input. Instead, the mapping application of these embodiments receives the angular velocity determined by the operating system of the device on which the mapping application runs. The operating system of the device has an interface to receive the user's gestural inputs. The operating system analyzes the received inputs and provides the analysis to the mapping application. The mapping application will determine the inertia effect to apply based on the analysis of the inputs.

The third stage 1215 illustrates the 2D map after the mapping application has rendered and displayed the animation of the inertia effect. As shown, a 2D map view 1230 of the 3D map rendered by the mapping application is displayed. In the third stage 1215, the mapping application has rotated the 2D map farther clockwise after the user completed the input in the second stage 1210. As shown, the 2D map view 1230 in the third stage 1215 shows the streets rotated farther clockwise from the streets shown in the 3D map view 1225.

Figure 13:
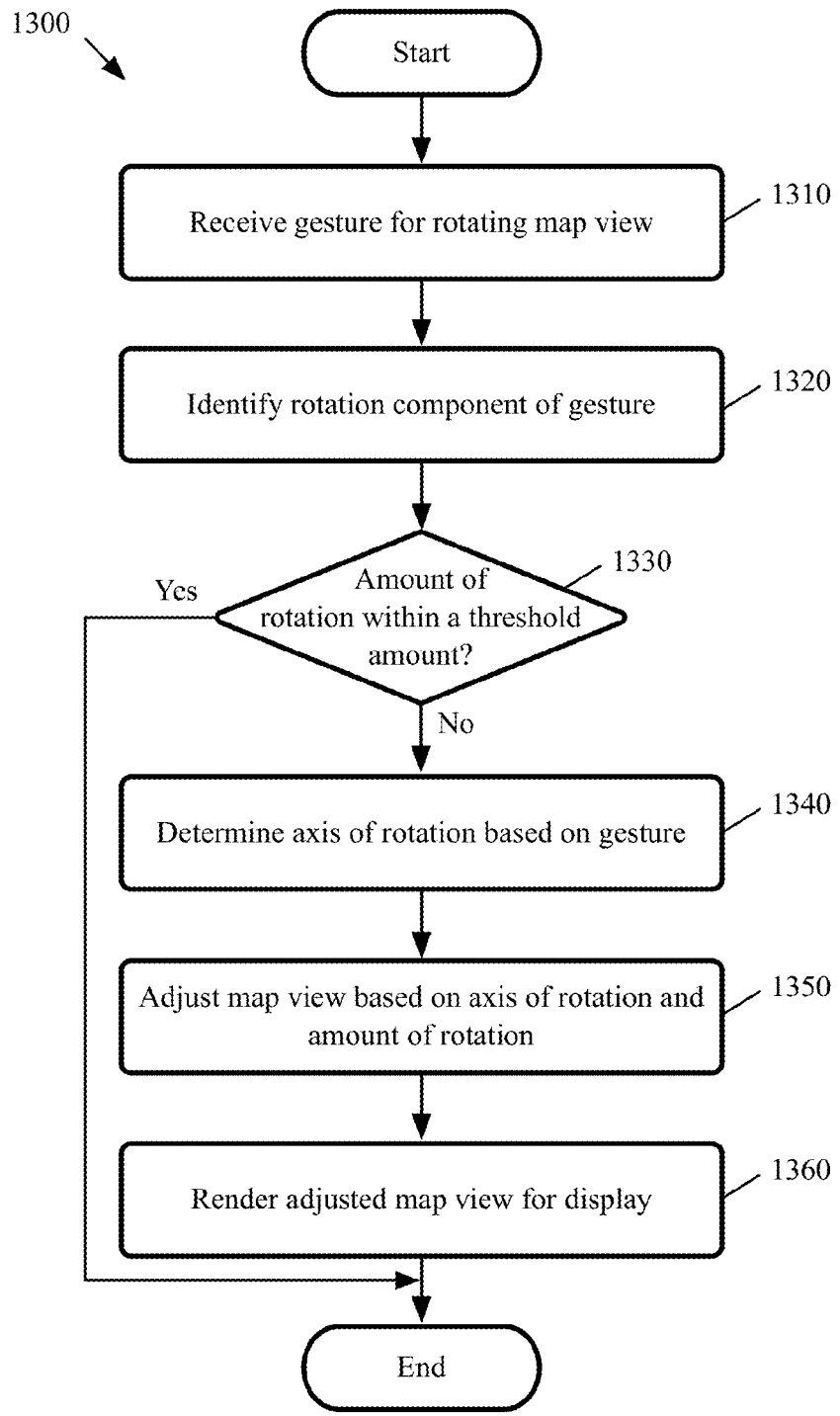
FIG. 13 illustrates a rotation operation along with an inertia effect.

In some embodiments, the mapping application also provides the inertia effect for operations other than rotating the map such as panning the map or entering or exiting 3D operations (e.g. panning, rotate, entering from 2D to 3D). Inertia effect for these other operations are further described in U.S. patent application Ser. No. 13/632,035, now published as U.S. Patent Publication No. 2013/0322702, entitled "Rendering Maps," concurrently filed with this application. This concurrently filed U.S. patent application Ser. No. 13/632,035, now published as U.S. Patent Publication No. 2013/0322702, is incorporated herein by reference. FIG. 13 conceptually illustrates a process 1300 of some embodiments for rotating a map view based on gesture input. In some embodiments, the mapping application performs the process 1300 when the mapping application is in a map viewing mode (e.g., a location browsing mode, a navigation mode, a 2D viewing mode, a 3D viewing mode, etc.) and the mapping application receives a gesture through a touchscreen of a device on which the mapping application is executing.

The process 1300 starts by receiving (at 1310) a gesture for rotating the map view. In some embodiments, a gesture for rotating the map view includes a multi-touch gesture received through a touchscreen (e.g., simultaneously touching the touchscreen with multiple fingers). In this example, the process 1300 receives a two-touch rotate gesture.

Next, the process 1300 identifies (at 1320) a rotation component of the received gesture. The process 1300 of some embodiments identifies the rotation component of the gesture by identifying an amount of rotation of the gesture's touch points. For instance, in some such embodiments, the process 1300 identifies the amount of rotation of the gesture's touch points by (1) determining a first vector from the initial location of one touch point to the initial location of the other touch point, (2) determining a second vector from a second location of the one touch point to a second location of the other touch point, and (3) determining a rotation direction based on the initial locations of the touch points and the second locations of the touch points.

The process 1300 then determines (at 1330) whether the amount of rotation is within a threshold amount. When the process 1300 determines that the amount of rotation is not within the threshold amount, the process 1300 ends. Otherwise, the process 1300 determines (at 1340) an axis of rotation based on the gesture. In some embodiments, the process 1300 determines the axis of rotation by (1) identifying a point along a vector from the initial location of one touch point to the initial location of the other touch point and (2) determining a point on map view that corresponds to the point along the vector (e.g., the point on the map that coincides with the point along the vector). The process 1300 uses the determined point on the map view as the location of an axis (e.g., a z-axis) about which the map view is rotated.

Next, the process 1300 adjusts (at 1350) the map view based on the axis of rotation and the amount of rotation. In some embodiments, the process 1300 adjusts the map view by rotating the map view about the determined axis of rotation by the determined amount of rotation in the determined rotation direction. Different embodiments use different coordinate spaces for a map. For example, the map of some embodiments uses a Mercator unit coordinate space. In such embodiments, the process 1300 adjusts the virtual camera's position with respect to the map in order to adjust the map view. As another example, in some embodiments, the map uses a World Geodetic System (e.g., WGS 84) as the map's coordinate space. The process 1300 in some such embodiments adjusts the map with respect to the virtual camera's position in order to adjust the map view.

Finally, the process 1300 renders (at 1360) the adjusted map view for display on the device. In some embodiments, the rendered map view is an image that represents the adjusted map view. Then the process 1300 ends.

In some embodiments, the 3D map is rotatable at a defined range and/or set of zoom levels. For example, in some embodiments, the mapping application allows the 3D map to be rotated at a defined number of the highest zoom levels (e.g., zoom levels 10-20) and prevents the 3D map from being rotated at the remaining lower zoom levels (e.g., zoom levels 1-10). In some such embodiments, the mapping application does not generate instructions to rotate the 3D map when the mapping application receives input to rotate the 3D map at a zoom level that is defined to not allow rotation operations. In other such embodiments, the mapping application generates instructions to rotate the 3D map when the mapping application receives input to rotate the 3D map at a zoom level that is defined not to allow rotation operations, but the mapping application simply ignores the instructions. One of ordinary skill in the art will realize that the zoom levels at which rotation operations are allowed to be performed on a 3D map might be defined in any number of different ways in different embodiments.

3. Legend and Names Rotating

Figure 14:
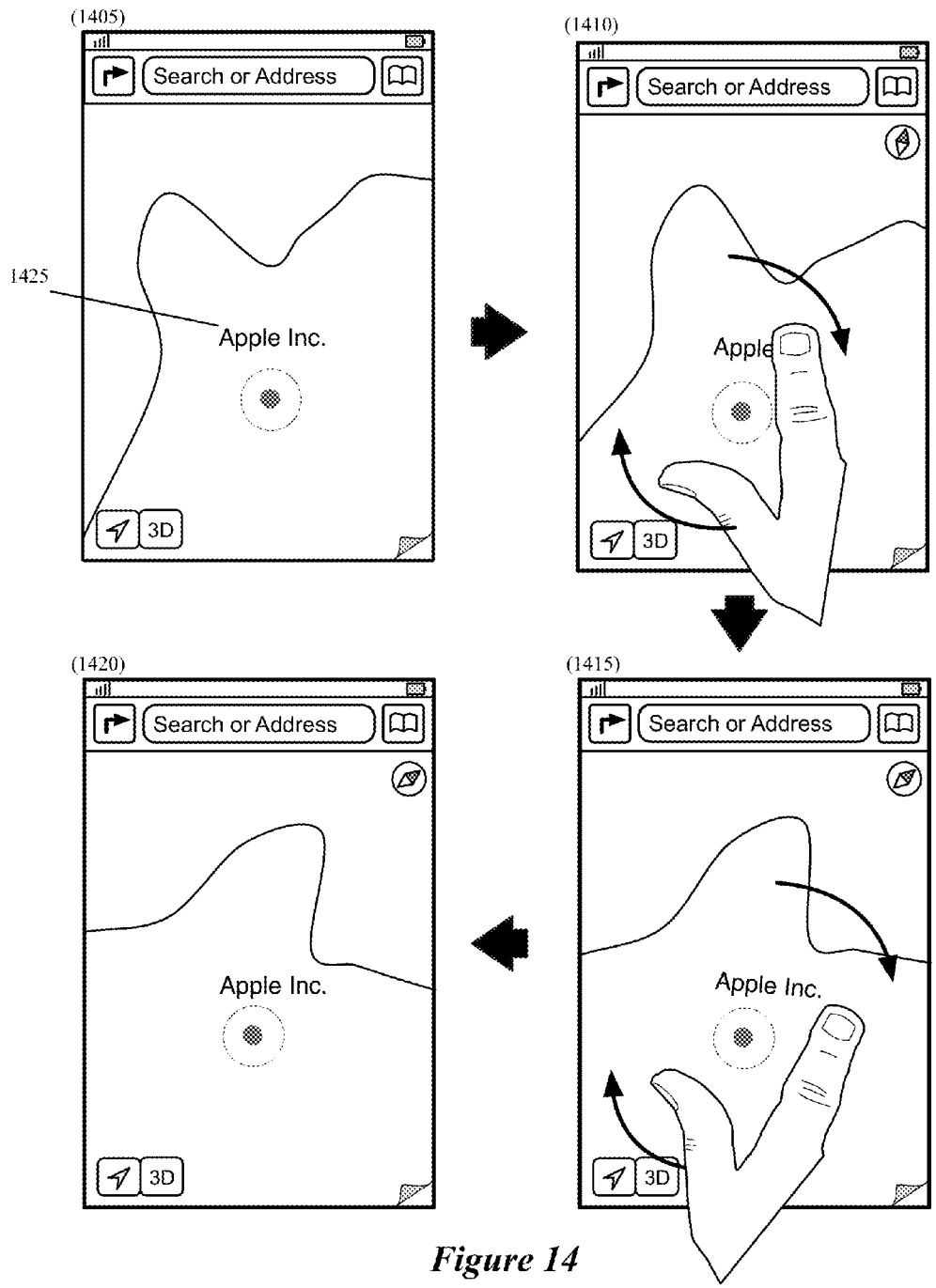
FIG. 14 illustrates that the mapping application of some embodiments uses novel techniques to adjust or leave unadjusted the text and/or symbols that appear in the map view as the map view rotates.

The mapping application of some embodiments uses novel techniques to adjust or leave unadjusted the text and/or symbols that appear in the map view as the map view rotates. FIG. 14 illustrates one example of this novel approach in terms of four stages 1405 to 1420 of UI operations. In this example, the name Apple Inc. appears at a location, which is 1 Infinite Loop, Cupertino Calif.

In the first stage 1405, the name Apple Inc. is upright in a particular map view. In the second and third stages 1410 and 1415, the map view rotates in response to a user's two finger rotation operation. In both of these stages, the name Apple Inc. is shown to slightly rotate at a much smaller angle than the rotation angle of the map. The behavior of the name Apple Inc. is as if this name is pinned at its center or top to the map but its center of gravity points downwards. Hence, whenever the map rotates, the name slightly rotates as well, but its center of gravity makes it rotate less and eventually brings back the name to its upright position. This upright position of the name Apple Inc. is shown in the fourth stage 1420. This stage shows the map view after the rotation operation has completed.

Maintaining the constant upright position of all the text and/or symbols in the a rotating map, however, might be a little bit distracting when the map has many text characters or symbols and many of them are fighting against the rotation to remain straight up. Accordingly, for some of the characters and/or symbols, the mapping application of some embodiments employs an alternative mechanism to adjust their orientation during a rotation.

Figure 15:
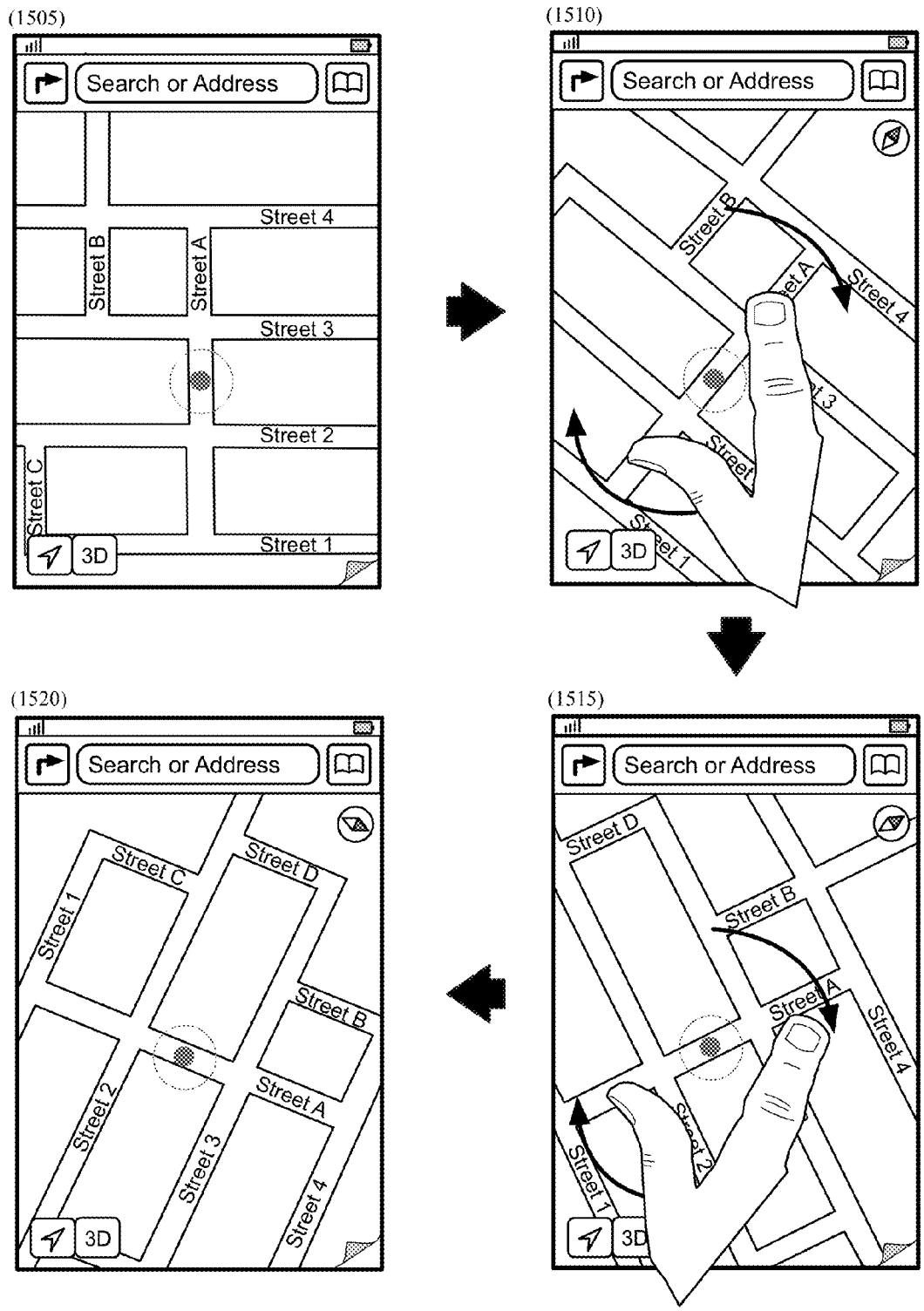
FIG. 15 illustrates an example of orienting text and/or symbols.

FIG. 15 illustrates one such alternative example in terms of four stages 1505 to 1520 of UI operations. In this example, the names of the streets are the characters that rotate after the map view has been rotated by a threshold amount.

In the first stage 1505, the street names are aligned with the upward and rightward direction of travel on the streets. In the second and third stages 1510 and 1515, the map view rotates in response to a user's two finger rotation operation. In both of these stages, none of the street names have rotated since the map has not been rotated by the necessary threshold amount. However, by the time the map is rotated to reach its orientation in the fourth stage 1520, the map has been rotated enough to pass a threshold amount, which would require some of the street names (streets 1-4) to have to be rotated to maintain their alignment with the upward travel direction.

4. Zooming and Bouncing

Figure 16:
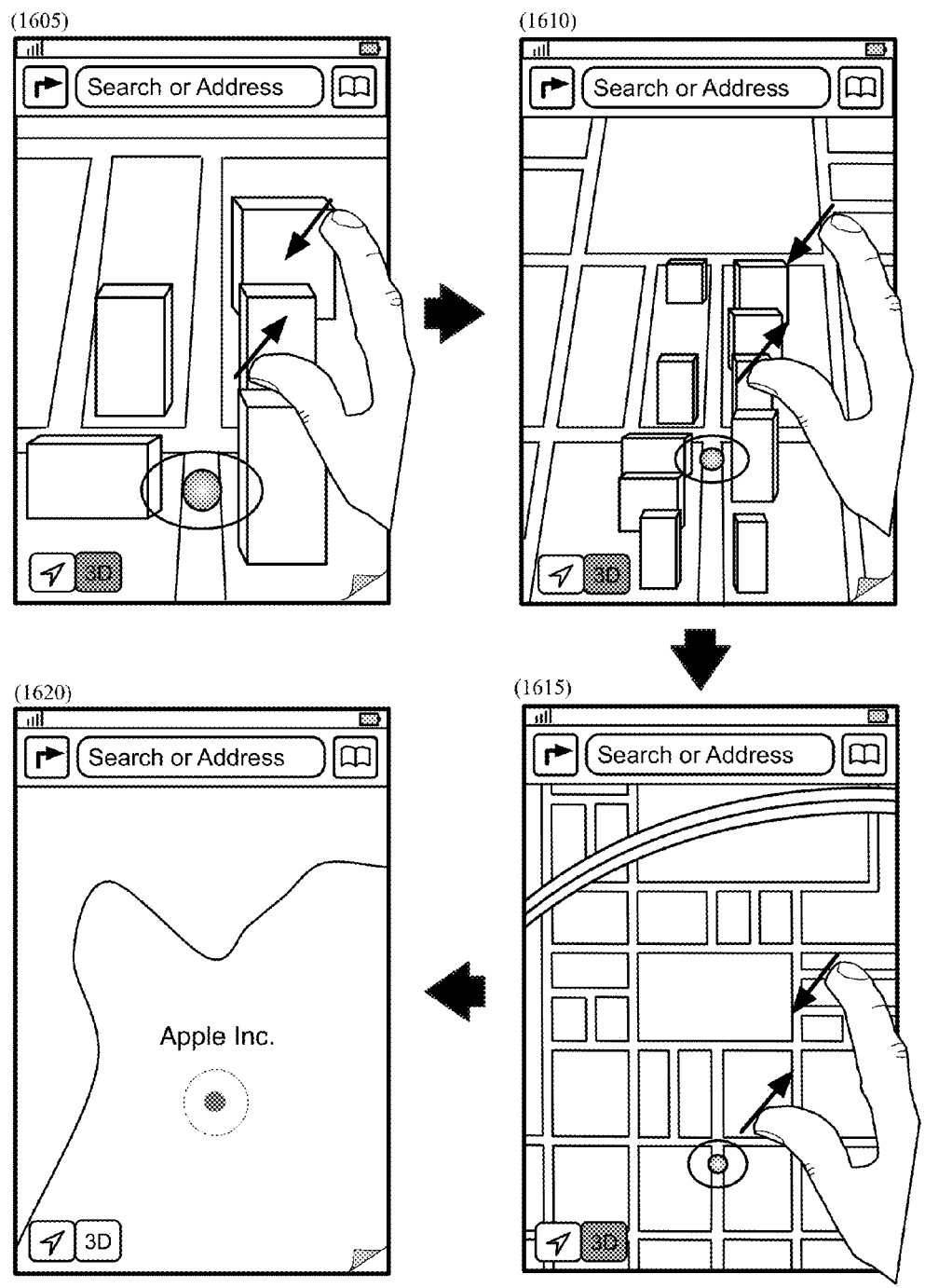
FIG. 16 illustrates an example in which the user transitions from the 3D map view to the 2D map view through two finger gesture operations.

FIG. 16 illustrates an example in which the user transitions from the 3D map view to the 2D map view through two finger gesture operations. This figure illustrates this transition in four stages 1605-1620. In the first three stages 1605-1615, the user performs a pinch operation that causes the application to zoom out of the 3D view presented in the first stage in successive steps, until the view changes into the 2D view illustrated in stage four 1620.

Alternatively, or in conjunction with the perspective adjustment feature described above by reference to FIG. 6, the mapping application of some embodiments allows the user to zoom in and out of a view of a 3D map (e.g., by providing gesture input with two fingers). FIG. 17 illustrates a zoom adjustment feature provided by the mapping application of some embodiments. In particular, FIG. 17 illustrates a virtual camera 1712 at three different stages 1701-1703 that show the movement of the virtual camera 1712 in response to zooming adjustments. As shown, FIG. 17 shows a location in a 3D map 1710 contains two buildings and two roads forming a T-junction.

The first stage 1701 shows a 3D map 1710 with a virtual camera 1712 at a particular position pointing towards the 3D map 1710. In this position, the camera 1712 is pointing to a location that may be a stationary position of the device or of a location being explored, or a moving position in front of a moving location of the device in a case where the map is used for navigation. Rendering a 3D map view based on the virtual camera 1712's position results in the 3D map view 1714.

The second stage 1702 shows the virtual camera 1712 at a different zoom level position pointing towards the 3D map 1710. The stage 1702 shows that a user has provided input to increase the zoom level of the view of the 3D map 1710 by touching two fingers near each other on the screen of the device and moving the fingertips apart while the fingers are touching the screen (e.g., a spread gesture).

The zoom-in adjustment is accomplished by the virtual camera 1712 moving closer to the 3D map 1710 along a line 1750. In some embodiments, the line 1750 that the mapping application uses to move the virtual camera 1712 along is a line formed by the front of the virtual camera 1712 and the virtual camera 1712's point of focus. The mapping application of some embodiments moves the virtual camera 1712 along a line formed by the front of the virtual camera 1712 and a location in the 3D map 1710 based on the user's input to zoom into the view of the 3D map 1710.

Rendering a 3D map view using the virtual camera 1712 at this position results in a 3D map view 1724 in which the buildings and the roads appear closer than the position shown in the 3D map view 1714. As indicated by the dashed-line version of the virtual camera 1712, the virtual camera 1712 moved closer towards the 3D map 1710 along the line 1750.

The third stage 1703 shows the virtual camera 1712 at a different zoom level position pointing towards the 3D map 1710. In this stage 1703, the user has provided input to decrease the zoom level of the 3D map 1710 by touching two fingers far apart on the screen of the device and moving the fingertips closer together while the fingers are touching the screen (e.g., a pinch gesture).

The zoom-out adjustment is accomplished by moving the virtual camera 1712 moving farther away from the 3D map 1710 along a line 1755. In some embodiments, the line 1755 that the mapping application uses to move the virtual camera 1712 along is a line formed by the front of the virtual camera 1712 and the virtual camera 1712's point of focus. The mapping application of some embodiments moves the virtual camera 1712 along a line formed by the front of the virtual camera 1712 and a location in the 3D map 1710 based on the user's input to zoom into the view of the 3D map 1710.

Rendering a 3D map view using the virtual camera 1712 at this position results in a 3D map view 1734 in which the buildings and the roads appear farther than the position illustrated in the 3D map view 1724. As shown by the dashed-line version of the virtual camera 1712, the virtual camera 1712 moved farther from the 3D map 1710 along the line 1755.

As described above, FIG. 17 illustrates several example zoom adjustment operations and the corresponding movement of a virtual camera in a 3D map that is used to render 3D map views of the 3D map. One of ordinary skill in the art will realize that any number of different zoom adjustments are possible. Additionally, the mapping application of some embodiments performs zoom adjustment operations in response to additional and/or different types of input (e.g., tapping the screen, double-tap the screen, etc.).

Figure 18:
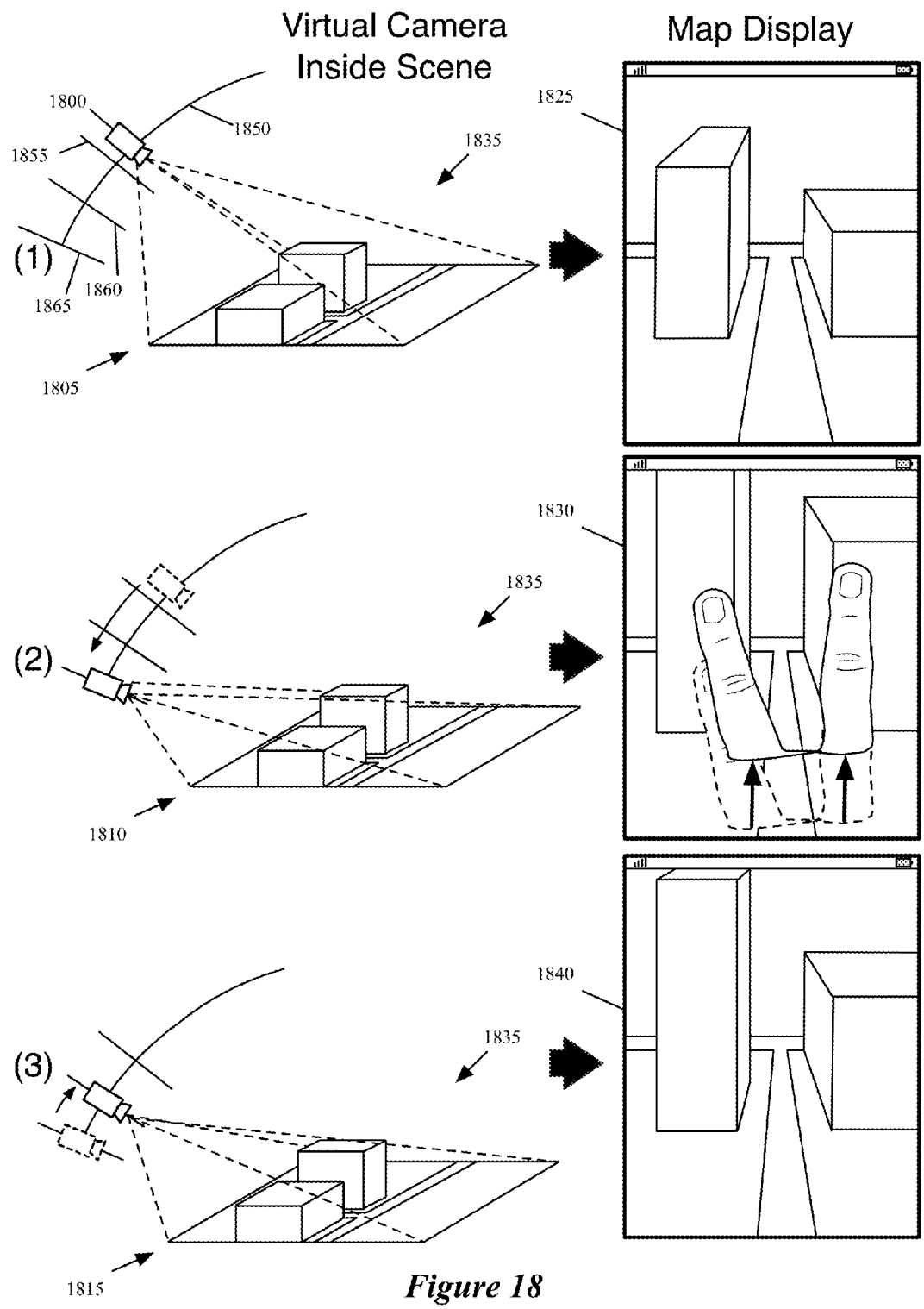
FIG. 18 conceptually illustrates a feature provided by the mapping application of some embodiments for maintaining the position of a virtual camera within a defined range along an arc.

FIG. 18 conceptually illustrates a feature provided by the mapping application of some embodiments for maintaining the position of a virtual camera within a defined range along an arc. In particular, FIG. 18 illustrates the virtual camera 1800 at three different stages 1805-1815 that show the virtual camera 1800's position maintained within a defined range of arc 1850. As shown in FIG. 18, a location in a 3D map 1835 includes two buildings and two roads forming a T-junction.

The first stage 1805 shows the virtual camera 1800 at a particular position along the arc 1850. As shown, the arc 1850 represents a defined range (e.g., angular range) within which the virtual camera 1800 is movable. The first stage 1805 also shows three positions 1855-1865 along the arc 1850 (e.g., perspective view angles). In this example, the mapping application moves the virtual camera 1800 along the arc 1850 between the high perspective end of the arc 1850 (e.g., the position along the arc 1850 when the virtual camera 1800 is most tilted downwards) and the position 1855 in a manner similar to that described above by reference to FIG. 5. Rendering a 3D map view of based on the virtual camera 1800's position in the first stage 1805 results in 3D map view 1825.

When the virtual camera 1800 passes the position 1855 while moving towards the low perspective end of the arc 1850, the mapping application reduces the speed (e.g., decelerates) at which the virtual camera 1800 moves towards the low perspective end of the arc 1850 regardless of the input provided by a user. In some embodiments, the mapping application reduces the speed of the virtual camera 1800 at a constant rate while, in some embodiments, the mapping application reduces the speed of the virtual camera 1800 at an exponential rate. Additional and/or different methods for decreasing the speed of the virtual camera 1800 are used in some embodiments.

The second stage 1810 shows that the virtual camera 1800 has moved to a position along the arc 1850 at or near the low perspective end of the arc 1850. As shown, a user is providing input to adjust the perspective of the view of the 3D map 1835 by touching two fingers on the screen and dragging the two fingers in an upward direction (e.g., a swipe gesture). In response to the input, the mapping application moved the virtual camera 1800 toward the low perspective end of the arc 1850 while tilting the virtual camera 1850 upwards. When the virtual camera reaches the position 1865 along the arc 1850, the mapping application prevents the virtual camera 1800 from moving lower beyond the position 1865 while the user continues to provide input to decrease the perspective of the view of the 3D map 1835 (e.g., the user continues to drag the two fingers upwards on the touchscreen).

In some embodiments, when the user stops to provide input to decrease the perspective of the view of the 3D map 1835 (e.g., the user lifts the two fingers off the touchscreen), the mapping application "bounces" or "snaps" the position of the virtual camera 1800 from the position 1865 up to the position 1860 along the arc 1850. As the mapping application is generating or rendering 3D map views of the 3D map 1835 based on the view of the virtual camera 1800 during the bounce or snap motion, the generated 3D map views provide a bounce animation that displays the 3D map view briefly bouncing or snapping down in order to indicate to the user that the perspective of the map view cannot be decreased any farther. Rendering a 3D map view using the virtual camera 1800 positioned at this angle results in a 3D map view 1830 in which the buildings and the roads are taller compared to the map view 1825.

The third stage 1815 shows the virtual camera 1800 after the mapping application bounced or snapped the position of the virtual camera 1800 to the position 1860 in response to the user ceasing to provide input. Different embodiments use different techniques for implementing the bounce or snap of the virtual camera 1800. For instance, the mapping application of some embodiments starts quickly accelerating the virtual camera 1800 along the arc 1850 for a defined distance or until the virtual camera 1800 reaches a defined speed. Then the mapping application decelerates the virtual camera 1800 for the remaining distance to the position 1860 along the arc 1850. Other ways to implement the bounce or snap effect are used in some embodiments. Rendering a 3D map view using the virtual camera 1800 positioned at the position 1860 along the arc 1850 in the third stage 1815 results in a 3D map view 1840 in which the buildings appear a little smaller and flatter and the roads appear a little smaller compared to the map view 1830.

As described above, FIG. 18 illustrates a technique for preventing a virtual camera from moving beyond the low perspective end of an arc. Alternatively or in conjunction with preventing the virtual camera from moving beyond the low perspective end of the arc, the mapping application of some embodiments utilizes a similar technique for preventing the virtual camera from moving beyond the high perspective end of the arc. In addition, FIG. 18 shows an example of a position along an arc at which to slow down a virtual camera, a position along the arc to prevent the virtual camera from moving past, and a position along the arc to which the virtual camera snaps or bounces back. Different embodiments define the positions any number of different ways. For instance, in some embodiments, the position along the arc at which to slow down the virtual camera is the same or near the position along the arc to which the virtual camera snaps or bounces back.

5. Rendering Module

Figure 19:
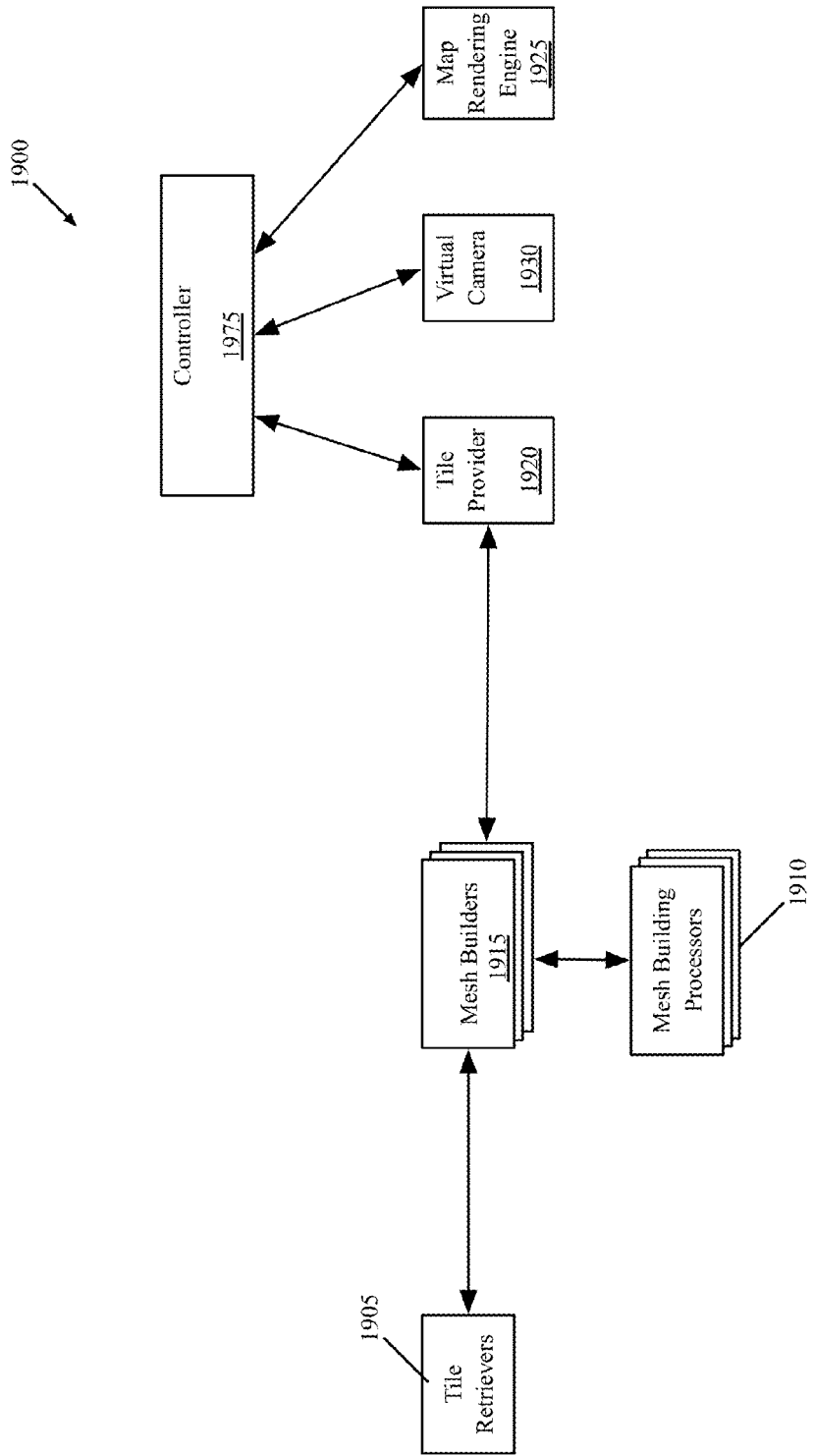
FIG. 19 conceptually illustrates a processing, or map rendering, pipeline performed by the mapping application of some embodiments in order to render a map for display at a client device.

FIG. 19 conceptually illustrates a processing, or map rendering, pipeline 1900 performed by the mapping application of some embodiments in order to render a map for display at the client device (e.g., on the display of the client device). In some embodiments, the map rendering pipeline 1900 may be referred to collectively as a map rendering module. A more detailed version of this processing pipeline is described in U.S. patent application Ser. No. 13/632,035, now published as U.S. Patent Publication No. 2013/0322702, entitled "Rendering Maps," concurrently filed with this application. This concurrently filed U.S. patent application Ser. No. 13/632,035, now published as U.S. Patent Publication No. 2013/0322702, is incorporated herein by reference. As illustrated, the processing pipeline 1900 includes tile retrievers 1905, a set of mesh builders 1915, a set of mesh building processors 1910, a controller 1975, a tile provider 1920, a virtual camera 1930, and a map rendering engine 1925.

The tile retrievers 1905 perform various processes to retrieve map tiles in some embodiments, according to requests for the map tiles from the mesh builders 1915. The mesh builders 1915, as are described below, identify existing map tiles (that are stored on a mapping service server or in a cache on the device performing the processing pipeline 1900) needed to build their respective meshes. The tile retrievers 1905 receive the requests for the map tiles, determine the best location from which to retrieve the map tiles (e.g., from the mapping service, from a cache on the device, etc.) and decompress the map tiles if required.

The mesh builders 1915 (also referred to as tile sources) of some embodiments are instantiated by the tile provider 1920 in order to build different layers of view tiles. Depending on the type of map being displayed by the mapping application, the tile provider 1920 may instantiate a different number and different types of mesh builders 1915. For instance, for a flyover (or satellite) view map, the tile provider 1920 might only instantiate one mesh builder 1915, as the flyover map tiles of some embodiments do not contain multiple layers of data. In fact, in some embodiments, the flyover map tiles contain an already-built mesh generated at the mapping service for which the flyover images (taken by a satellite, airplane, helicopter, etc.) are used as textures. However, in some embodiments, additional mesh builders may be instantiated for generating the labels to overlay on the flyover images when the application is in a hybrid mode. For a 2D or 3D rendered vector map (i.e., a non-satellite image map), some embodiments instantiate separate mesh builders 1915 to build meshes for landcover polygon data (e.g., parks, bodies of water, etc.), roads, place of interest marks, point labels (e.g., labels for parks, etc.), road labels, traffic (if displaying traffic), buildings, raster data (for certain objects at certain zoom levels), as well as other layers of data to incorporate into the map. Generating flyover view map is described in detail in PCT Application PCT/EP2011/054155, published as PCT Publication No. WO/2012/126500, entitled "3D Streets." PCT Application PCT/EP2011/054155, published as PCT Publication No. WO/2012/126500, is incorporated herein by reference.

The mesh builders 1915 of some embodiments, receive "empty" view tiles from the tile provider 1920 and return "built" view tiles to the tile provider 1920. That is, the tile provider 1920 sends to each of the mesh builders 1915 one or more view tiles (not shown). Each of the view tiles indicates an area of the world for which to draw a mesh. Upon receiving such a view tile, a mesh builder 1915 identifies the map tiles needed from the mapping service, and sends its list to the tile retrievers 1905.

Upon receiving the tiles back from the tile retrievers 1905, the mesh builder uses vector data stored in the tiles to build a polygon mesh for the area described by the view tile. In some embodiments, the mesh builder 1915 uses several different mesh building processors 1910 to build the mesh. These functions may include a mesh generator, a triangulator, a shadow generator, and/or a texture decoder. In some embodiments, these functions (and additional mesh building functions) are available to each mesh builder, with different mesh builders 1915 using different functions. After building its mesh, each mesh builder 1915 returns its view tiles to the tile provider 1920 with its layer of the mesh filled in.

The tile provider 1920 receives from the controller 1975 a particular view (i.e., a volume, or viewing frustrum) that represents the map view to be displayed (i.e., the volume visible from the virtual camera 1930). The tile provider performs any culling (e.g., identifying the surface area to be displayed in the view tile), then sends these view tiles to the mesh builders 1915.

The tile provider 1920 then receives the built view tiles from the mesh builders and, in some embodiments, performs culling on the built mesh using the particular view from the virtual camera 1930 (e.g., removing surface area too far away, removing objects that will be entirely behind other objects, etc.). In some embodiments, the tile provider 1920 receives the built view tiles from the different mesh builders at different times (e.g., due to different processing times to complete more and less complicated meshes, different time elapsed before receiving the necessary map tiles from the tile retrievers 1905, etc.). Once all of the layers of view tiles have been returned, the tile provider 1920 of some embodiments puts the layers together and releases the data to the controller 1975 for rendering.

The virtual camera 1930 generates a volume or surface for the pipeline 1900 to render, and sends this information to the controller 1975. Based on a particular location and orientation from which the map will be rendered (i.e., the point in 3D space from which the user "views" the map), the virtual camera identifies a field of view to actually send to the tile provider 1920. In some embodiments, when the mapping application is rendering the 3D perspective view for navigation, the field of view of the virtual camera is determined according to an algorithm that generates a new virtual camera location and orientation at regular intervals based on the movement of the user device.

The controller 1975 is responsible for managing the tile provider 1920, virtual camera 1930, and map rendering engine 1925 in some embodiments. In some embodiments, multiple tile providers may actually be instantiated, and the controller puts together several view tiles (e.g., map tiles and building tiles) to create a scene that is handed off to the map rendering engine 1925.

The map rendering engine 1925 is responsible for generating a drawing to output to a display device based on the mesh tiles (not shown) sent from the virtual camera. The map rendering engine 1925 of some embodiments has several sub-processes. In some embodiments, each different type of map element is rendered by a different sub-process, with the rendering engine 1925 handling the occlusion of different layers of objects (e.g., placing labels above or behind different buildings, generating roads on top of land cover, etc.). Examples of such rendering processes include a road rendering process, a building rendering process, and a label rendering process, a vegetation rendering process, a raster traffic rendering process, a raster road rendering process, a satellite rendering process, a polygon rendering process, a background raster rendering process, etc.

The operation of the rendering pipeline 1900 in some embodiments will now be described. Based on user input to view a particular map region at a particular zoom level, the virtual camera 1930 specifies a location and orientation from which to view the map region, and sends this viewing frustrum, or volume, to the controller 1975. The controller 1975 instantiates one or more tile providers. While one tile provider 1920 is shown in this figure, some embodiments allow the instantiation of multiple tile providers at once. For instance, some embodiments instantiate separate tile providers for building tiles and for map tiles.

The tile provider 1920 performs any culling necessary to generate an empty view tile identifying regions of the map region for which a mesh needs to be built, and sends the empty view tile to the mesh builders 1915, which are instantiated for the different layers of the drawn map (e.g., roads, land cover, POI labels, etc.). The mesh builders 1915 use a manifest received from the mapping service that identifies the different tiles available on the mapping service server (i.e., as nodes of a quadtree). The mesh builders 1915 request specific map tiles from the tile retrievers 1905, which return the requested map tiles to the mesh builders 1915.

Once a particular mesh builder 1915 has received its map tiles, it begins using the vector data stored in the map tiles to build the mesh for the view tiles sent from the tile provider 1920. After building the mesh for its map layer, the mesh builder 1915 sends the built view tile back to the tile provider 1920. The tile provider 1920 waits until it has received all of the view tiles from the various mesh builders 1915, then layers these together and sends the completed view tile to the controller 1975. The controller stitches together the returned tiles from all of its tile providers (e.g., a map view tile and a building view tile) and sends this scene to the rendering engine 1925. The map rendering engine 1925 uses the information in the map tiles to draw the scene for display.

II. Location Search

A. Search Field Behaviors

1. Search Field Function and Appearance

The search field of the mapping application in some embodiments is another UI tool that the application employs to make the transition between the different modalities seamless. In some embodiments, a user can initiate a search by tapping in the search field. This directs the application to present an animation that (1) presents an on-screen keyboard and (2) opens a search table full of invaluable completions. This table has some important subtleties. When the search field is tapped and before the terms are edited, or when the search field is empty, the table contains a list of "recents," which in some embodiments are recent searches and route directions that the user has requested. This makes it very easy to quickly bring up recently accessed results.

After any edit in the search field, the table is filled with search completions both from local sources (e.g., bookmarks, contacts, recent searches, recent route directions, etc.) and remote server suggestions. The incorporation of the user's contact card into the search interface adds additional flexibility to the design. When showing recents, a route from current location to the user's home is always offered in some embodiments, while it is offered in the contexts that are deemed to be "appropriate" in other embodiments. Also, when the search term matches at least part of an address label (e.g., 'Wo' for 'Work'), the application presents the user's labeled address as a completion in the search table in some embodiments. Together, these behaviors make the search UI a very powerful way to get results onto a map from a variety of sources. In addition to allowing a user to initiate a search, the presence of the search field in the primary map view in some embodiments also allows users to see the query corresponding to search results on the map and to remove those search results by clearing the query.

a) Viewing Recents

Figure 20:
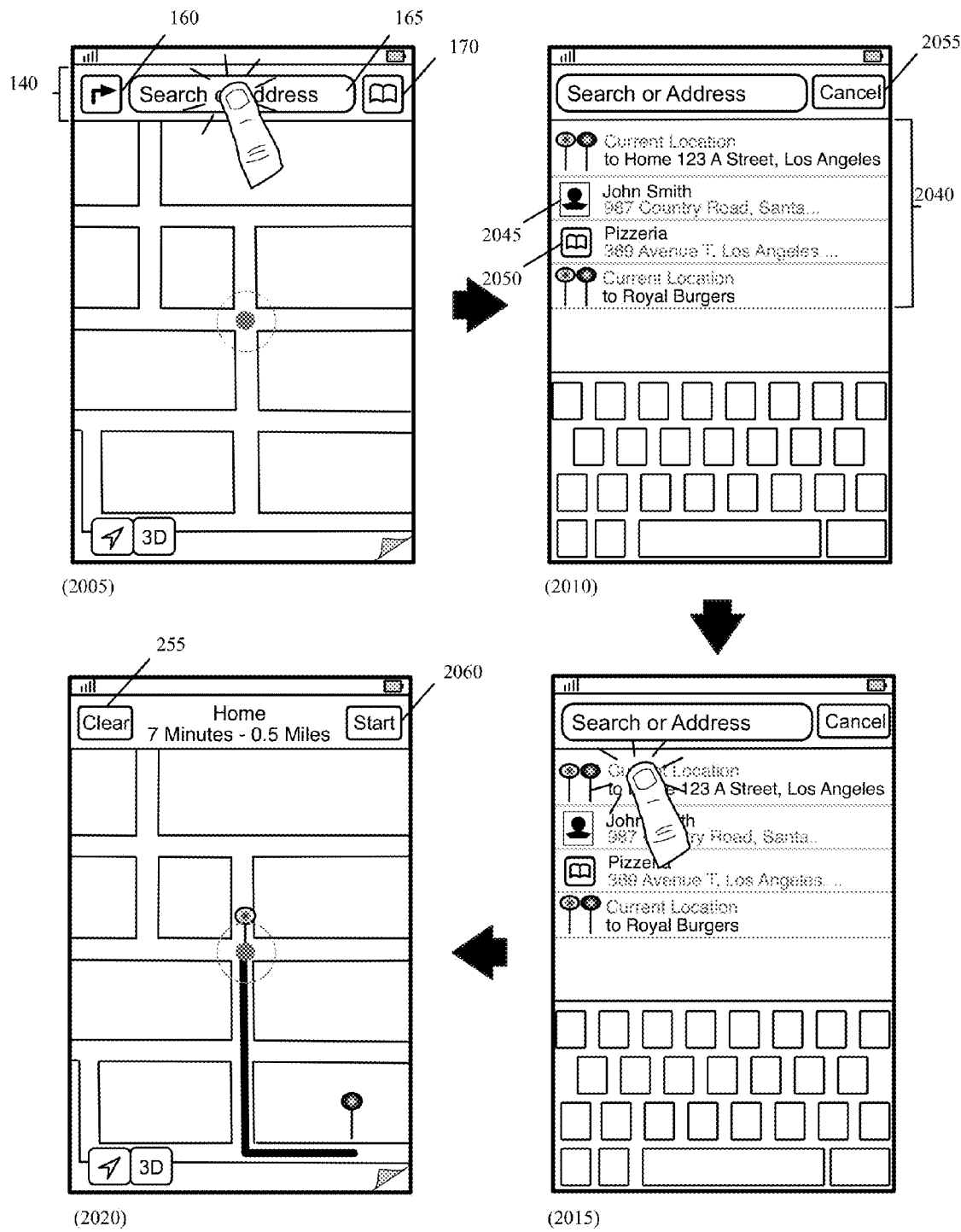
FIG. 20 illustrates a user's interaction with the application running on a user's device in order to display the search table with a list of the user's recent searches and recent route directions.

As described above, when the search field is initially tapped and before any search terms are provided or edited, or when the search field is empty, the search table displays a list of recent searched terms and searched route directions. FIG. 20 illustrates four stages 2005-2020 of a user's interaction with the application running on a user's device in order to display the search table with a list of the user's recent searches and recent route directions.

The first stage 2005 shows the device after the mapping application has opened. As mentioned above, the mapping application's UI has a starting page that in some embodiments (1) displays a map of the current location of the device, and (2) several UI controls arranged in the top bar 140 and as floating controls. In the first stage 2005, the user taps the search field 165, which is currently empty. The top bar 140 includes the direction control 160 and the bookmark control 170.

The second stage 2010 illustrates the application displaying a search table 2040 after receiving the user's tapping of the search field. This search table is displayed regardless of whether or not the user provides any search terms in the search field. The search table 2040 provides a list of suggested search completions, including recently searched terms and route directions. In particular, the search table indicates that the user recently searched for "John Smith" and "Pizzeria." Each of the search completions listed in the search table also indicates certain other useful information. For instance, an icon 2045 displayed next to "John Smith" indicates that this person is included in a contact list on the user's device and "Pizzeria" is currently saved as a bookmark, as indicated by a bookmark icon 2050.

The search table also lists the user's recent route directions, which includes directions to "Royal Burgers" illustrated at the bottom of the search table 2040. Also, the search table 2040 lists an option to obtain directions from the user's current location to their home address, which is illustrated as the first item of the search table 2040. When showing recents, a route from current location to the user's home is always offered in some embodiments. Moreover, the mapping application of some embodiments displays recent route directions only when the search field is empty. That is, once the user starts typing in a search query, the mapping application does not include recent route directions in the list of suggested search completions.

The second stage 2010 also illustrates that the mapping application of some embodiments removes the direction control 160 and the bookmark control 170 from the top bar 140. The mapping application inserts a cancel control 2055 for canceling out of the search table 2040 and going back to the map view shown in the previous stage 2005.

The third stage 2015 illustrates the user's selection of the directions to "Home" option, listed as the first item in the search table. By providing some of the most frequently requested user searches and direction requests at the top of the search table, including a direction to home option, the application provides a user the ability to quickly obtain information for their most common requests without having to extensively navigate the application to receive these results.

The fourth stage 2020 illustrates the mapping application displaying a route corresponding to directions from the user's current location to their home. The mapping application of some embodiments also removes the search field 165 and the cancel control 2055 from the top bar 140 and places the clear control 255 and a start control 2060. The start control 2060 in some embodiments is for starting the navigation according to the selected route. In some embodiments, the mapping application centers the current location indicator in the display area so that the route from the current location is displayed from the center of the display area.

A user may also provide a search query in the search field. When the user enters a full search term in the search field, the mapping application of some embodiments provides a list of items that match or include the search term that has been typed in the search field so far. For each particular search, the user has the option to select from the list of items displayed in the search table or the user may select a "search" button on the keyboard to execute a full search of the search term as it relates to the map and the user's current location.

b) Full Search Term

Figure 21:
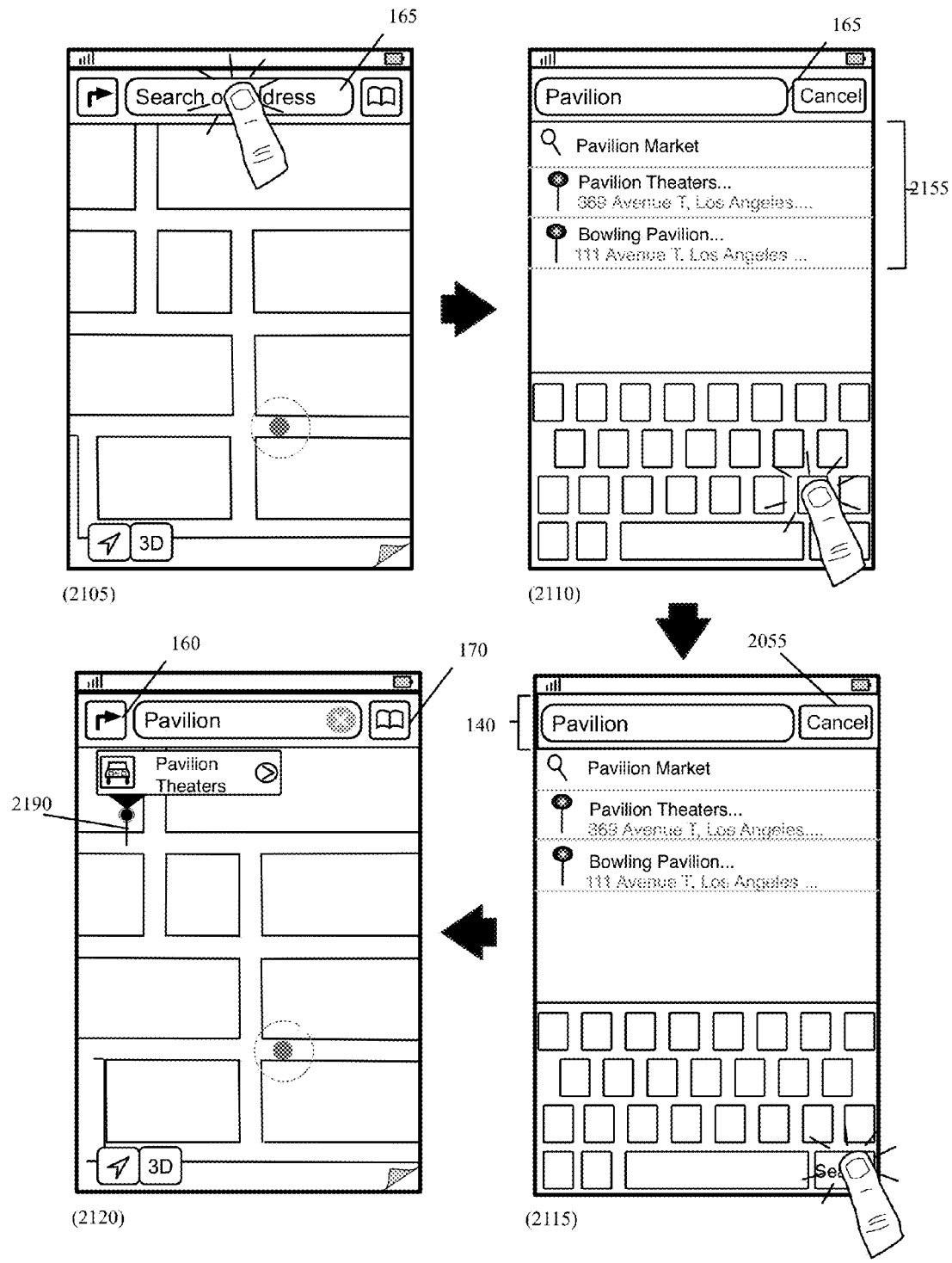
FIG. 21 illustrates an example of entering a search query in the search field and executing a search.

FIG. 21 illustrates in four stages 2105-2120 an example of the user's entering a search query in the search field and executing a search. In the first stage 2105, the user taps the search field 165. In this example, it is assumed that the user has not conducted a search prior to entering this search query or that the search history has been cleared by the user or the mapping application. Therefore, the mapping application does not provide a search table populated with recently searched terms and route directions.

The next stage 2110 shows the device after the user has typed in a search term "Pavilion." A search table 2155 illustrates a list of search completions for the user-entered query term "Pavilion." The listed search completions include suggested searches for "Pavilion Market", "Pavilion Theaters" and directions to "Bowling Pavilion" from the user's current location. However, the search completions for routes do not show the text "Current Location" in some embodiments. Instead, the mapping application displays the address of the destinations as shown. This is because the mapping application of some embodiments assumes that the user's typing in the letters indicates that the user intends to get to the destinations that match the search query and therefore the destination address is more useful to the user information than the indication that the route is from the current location to the destination.

Moreover, the list of suggested search completions in the search table does not display any bookmarks or contacts since there are no matching items stored locally on the user's device that match with "Pavilion" in this example. Furthermore, because the user has not executed any recent searches or directions for "Pavilion," all of the suggested search completions listed in the search table have been obtained from the remote servers in some embodiments. Obtaining data from remote servers is described further below.

Furthermore, the listed search completions may include search completions that match local geographies (e.g., streets, neighborhoods, cites, states or country). For instance, "Pavilion Street," or "City of Pavilion" may appear in the search completions list when there are such street or city exist. Also, as the user enters parts of an address (e.g., 220 Pavilion"), the remote servers may retrieve the most significant completion for this address if such address exists (e.g., 220 Promenade Drive, Skycity, Calif.").

The third stage 2115 illustrates the user disregarding any of the suggested search completions listed in the search table 2155 and instead selecting the "search" button on the keyboard. The fourth stage 2120 illustrates a map with a pin 2190 for "Pavilion Theaters." In some embodiments, the mapping application adjusts the zooming level of the map as is described further below. The mapping application in some of these embodiments does not display a pin for a location when the location falls out of the map at the current zooming level. As such, a pin for "Bowling Pavilion" is not shown in the map. The mapping application has also removed the cancel control 2055 from the top bar 140 and restored the direction control 160 and the bookmark control 170 in the top bar 140.

c) Partial Search Term and Automatic Completion

After any edit in the search field, the mapping application of some embodiments instantly fills the search table with automatic search completions. That is, as the user types in a search term in the search field, the mapping application provides a list of suggested search completions based on the characters that have been typed in at a particular instance in time. The mapping application of some embodiments obtains these suggested search completions from local sources (e.g., bookmarks, contacts, recent searches, recent route directions, etc.) and also from remote servers.

Figure 22:
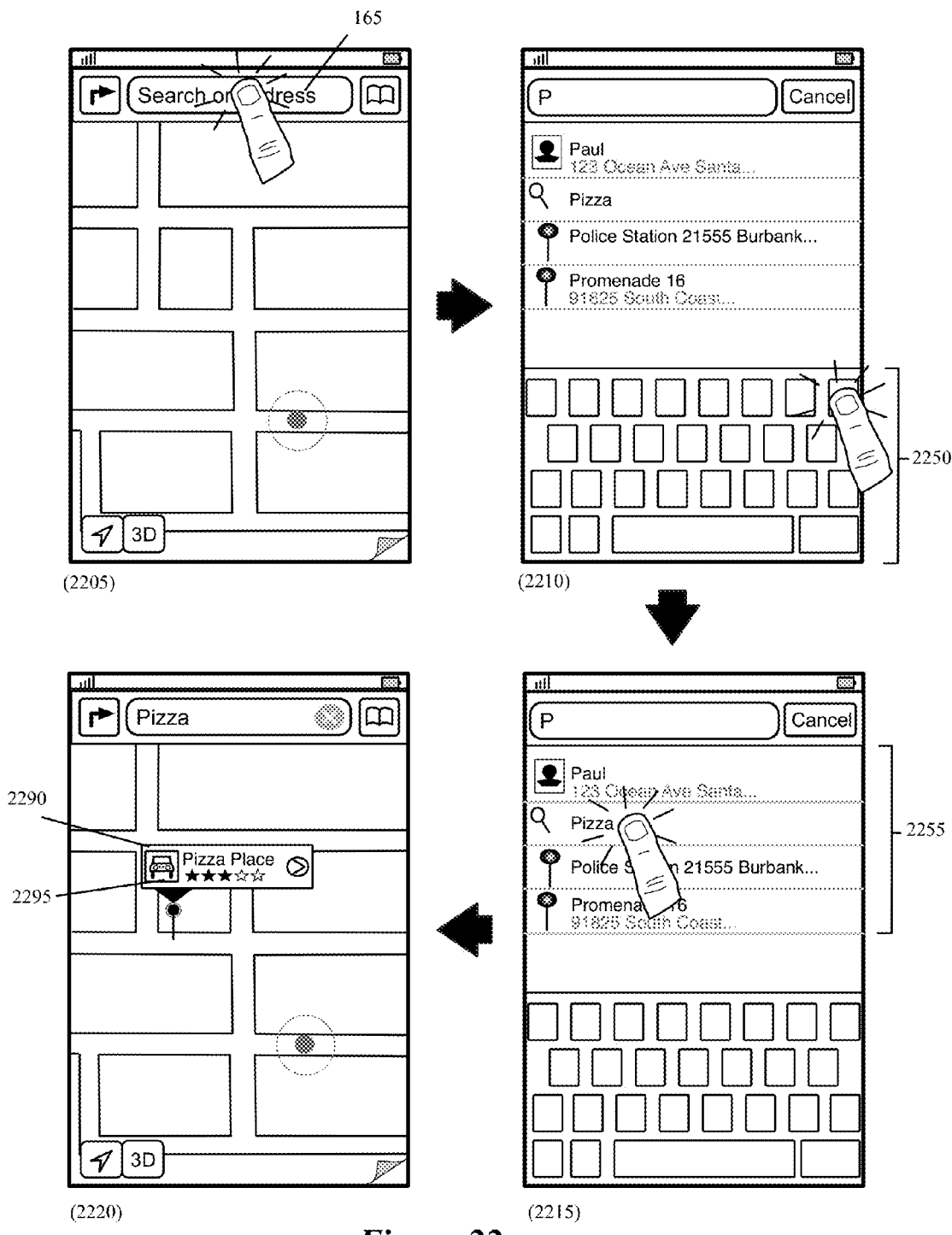
FIG. 22 illustrates an example of initiating a search query and the instantaneous display of a search table with a list of recommended search completions.

FIG. 22 illustrates four stages 2205-2220 of a user initiating a search query and the instantaneous display of a search table with a list of recommended search completions. In the first stage 2205, the user is tapping the search field 165 to initiate a search. The second stage 2210 illustrates the mapping application presenting an on-screen keyboard 2250 and the user entering, using the keyboard 2250, the letter "P" into the search field. After receiving this first letter, the application instantly presents a search table with a list of suggested search completions gathered from various sources (e.g., local on device and remote server suggestions).

The search table will continue to adjust and refine the list of suggested search completions in the search table as it receives more user input (i.e., more alphanumeric characters and symbols) and query terms in the search field. In some embodiments, the mapping application adjusts and refines the list as the user provides more input even if the user is misspelling the term being entered. For instance, when the user types in "Piza", the mapping application will show search completions that contains the correctly spelled word, "Pizza." The mapping application of some embodiments uses a spell-checking and correction mechanism as well as other data (e.g., search history, etc.) to find similarly spelled words to make the suggested list of search completions.

Each search completion may be derived from a variety of sources, both local on the user's device and derived from remote sources and servers. The mapping application of some embodiments lists the search completions from local sources ahead of the search completions from remote sources and servers. For instance, the search table illustrated in the second stage 2210 lists several search completions, including "Paul", "Pizza", directions to "Police Station" and directions to "Promenade" in that order from the top to the bottom of the list. "Paul" is derived from a contact card on the user's device; "Pizza" is derived from a previous user search stored in a search history file on the user's device; and directions to "Police Station" is derived from a recently searched route directions. As mentioned above, the search completions for routes do not show the text "Current Location" in some embodiments. Instead, the mapping application of some of these embodiments displays the address of the destinations. In some cases, the mapping application does not indicate the route is from the current location nor it displays the address of the destination. For instance, the directions to "Police Station" do not additionally show the address because the search completion itself includes the address of the police station.

However, "Promenade" is a search completion obtained from a remote server. A remote map server would suggest this completion based on the search queries that other users of the map server have used from the current location of the device. Hence, "Promenade" is listed at the bottom of the search table 2255 after the three suggested completions that the mapping application obtained locally. As is described further below, the mapping application of some embodiments orders locally obtained search completions.

In some embodiments, the mapping application's suggested completions and search results are based on the current location of the device. That is, the suggested completions and search results that fall within the region of the map that is within a range from the device's current location. Alternatively or conjunctively, the region of the map that is currently displayed in the display area is what the mapping application of some embodiments bases its suggestion and search results. In these embodiments, the mapping application favors the search completions and search results that fall within the currently displayed region of the map.

Moreover, the mapping application considers other factors when defining and adjusting the list of suggested search completions. In some embodiments, the mapping application considers the temporal factors. For instance, the mapping application breaks up the search history (i.e., the list of previously used search completions) into different periods of a day (e.g., late night, early morning, etc.), week, month and/or year, and favors the search completions and search results of a particular set of periods in which the time the current search being conducted falls.

The third stage 2215 illustrates the user selecting "Pizza" from the list of search completions displayed in the search table. The fourth stage 2220 illustrates the mapping application now displays a map with the location of "Pizza Place" illustrated as a banner 2290 and a pin on the map. The user may then select various icons displayed on the banner to perform a variety of functions including obtaining reviews for the restaurant, invoking navigation to the restaurant, or receiving directions to the restaurant, and various other features as are described further below.

The banner 2290 includes a route fetch control 2295 (depicted as an icon showing a car) for fetching a route (e.g., a driving route) from the current location to that pin without ever leaving the map view. The route fetch control is also for initiating navigation experience. For instance, the mapping application of some embodiments will provide one or more routes to the location of the pin from the current location of the device upon receiving a selection of the route fetch control. When a route is selected, the mapping application can start operating in a navigation mode or in a route inspection mode.

Figure 23:
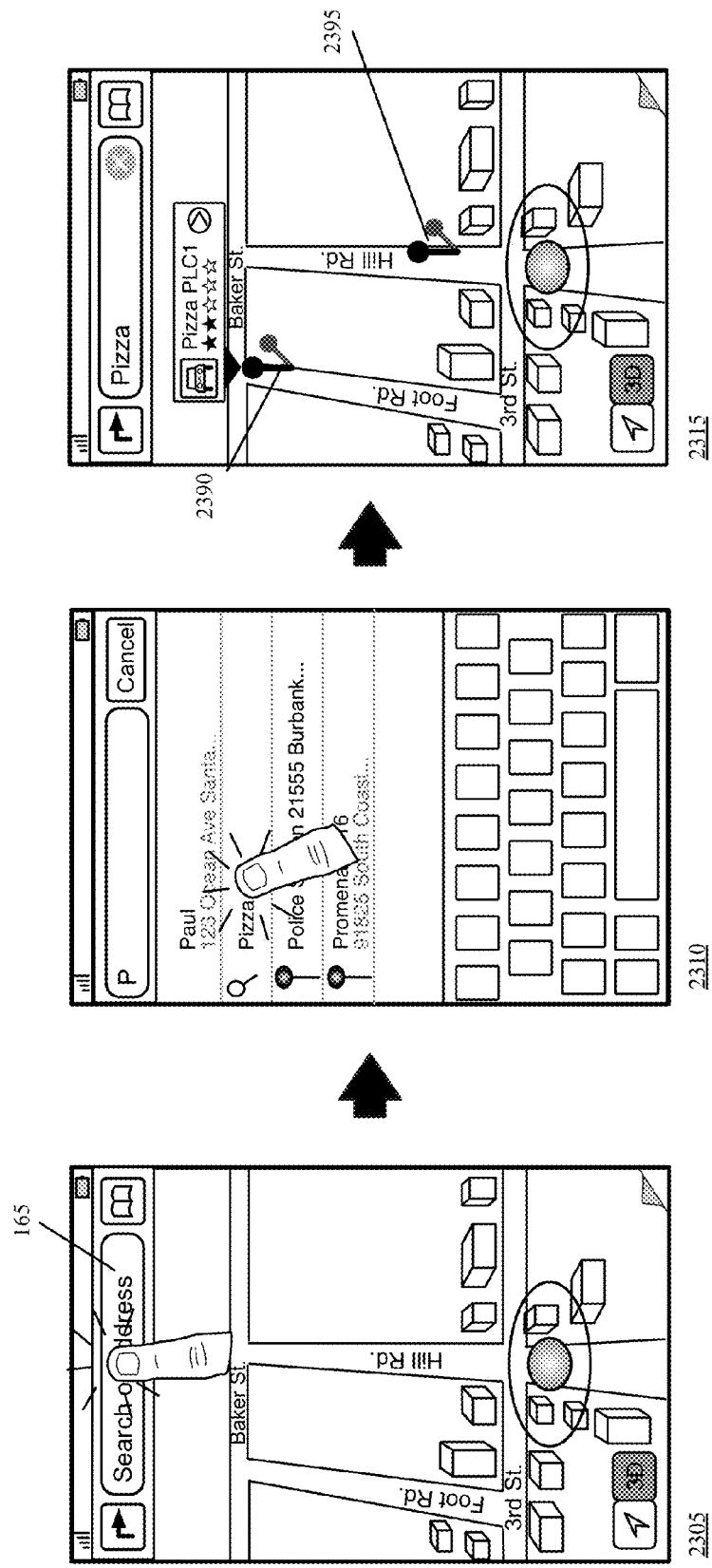
FIG. 23 illustrates an example of initiating a search query and the instantaneous display of a search table with a list of recommended search completions.

FIG. 23 illustrates three stages 2305-2315 of a user initiating a search query and the instantaneous display of a search table with a list of recommended search completions. The three stages 2305-2315 of FIG. 23 are similar to the stages 2205, 2215, and 2220 of FIG. 22 except that the map is in 3D view. In the first stage 2305, the user is tapping the search field 165 to initiate a search. The second stage 2310 illustrates the application instantly presents a search table with a list of suggested search completions gathered from various sources (e.g., local on device and remote server suggestions) after receiving a letter in the search field 165.

The second stage 2310 also illustrates the user selecting "Pizza" from the list of search completions displayed in the search table. The third stage 2315 illustrates the mapping application now displays a map with the location of "Pizza PLC1" and the location of "Pizza PLC2" (banner not shown) illustrated as associated pins 2390 and 2395 respectively on the map. The user may then select various icons displayed on the banner to perform a variety of functions including obtaining reviews for the restaurant, invoking navigation to the restaurant, or receiving directions to the restaurant, and various other features as are described further below.

d) Favoring Local Results

In order to provide certain search completions within the search table, the mapping application of some embodiments analyzes a variety of local information stored in the user's device. For instance, each user's device may contain a contacts list containing several contact cards. Each contact card may contain a variety of information and labels for each contact. For instance, each contact card may contain contact labels with information, if applicable, regarding the contact's first and last name, company name, home address, work address, mobile phone number, work phone number, e-mail address, URL, and various other information.

Likewise, the contact list may contain a specific contact card corresponding to the particular user of the mapping application, which the mapping application may specify as a "ME card." The mapping application may frequently access the user's ME card to utilize certain information required for certain application features, including the feature of obtaining directions from a user's current location to their home address or work address which are provided in numerous different contexts within the mapping application. In particular, the mapping application of some embodiments lists search completions that the mapping application obtains from the ME card on the top of search table.

Figure 24:
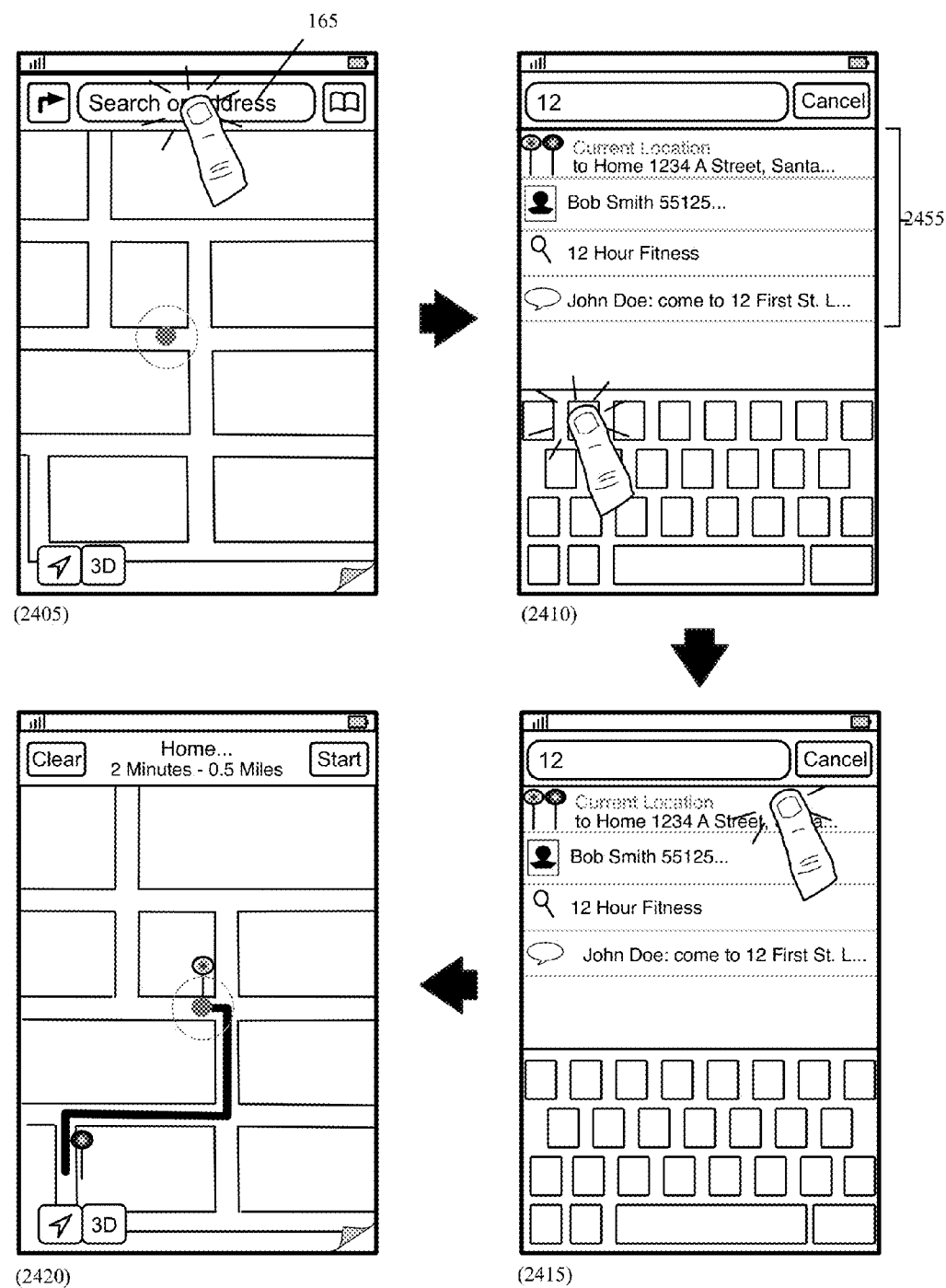
FIG. 24 illustrates an example of entering a partial address and obtaining directions to their home address as derived from their contact card.

FIG. 24 illustrates four stages 2405-2420 of a user entering a partial address and obtaining directions to their home address as derived from their contact or ME card. Specifically, FIG. 24 illustrates that the mapping application of some embodiments lists the user's home address on top of the search table 2455. In the first stage 2405, the user taps the search field to begin the process of entering their search query information.

During the second stage 2410, the user has entered a partial number, "12" that may match at least part to an address or a search term. In some embodiments, the application first matches the user entered search query with information contained in the user's ME card and in the user's contact list stored on their device. If the application detects any matching contact labels between the search query and the user's ME card, the application of some embodiments will display the information found in the identified contact as a suggested search completion listed at the top of the search table. In some embodiments, the mapping application displays the information found in the identified contact as a suggested search completion only if the matching information is address of the contact. Underneath this suggested search completion, the mapping application displays text (e.g., "Current Location") to indicate the route is from the current location to home. However, as mentioned above, the mapping application of some embodiments instead displays the destination address instead of or in conjunction with displaying this text, or does not display the text nor the destination address. The application will display other matching contact cards below the search completion originated from the ME card. In some embodiments, the mapping application may also present search completions not related to the ME cards. For instance, when the user enters a "12," the mapping application will present matching search completions from local previous search completions (including social networking sites messages) as well as matching search completions from remote servers.

The second stage 2410 illustrates the application automatically presenting the user's labeled home address derived from the user's ME card as a completion in the search table. The application detected a match between the user's entered query of "12" with the user's ME card that contained a home address label for "1234 A Street, Santa . . . " Since this match was derived from the user's ME card, the application prioritizes this locally derived information and displays it near the top of the list of suggested search completions in the search table. The search table also displays other search completions, including "Bob Smith", "12 Hour Fitness" and "John Doe", all derived from various local and remote resources. For instance, Bob Smith is currently stored in a contact list on the users device.

The third stage 2415 illustrates the user selecting the directions to home. The fourth stage 2420 illustrates the application displaying a map with a route corresponding to directions from the user's current location to the user's home.

Figure 25:
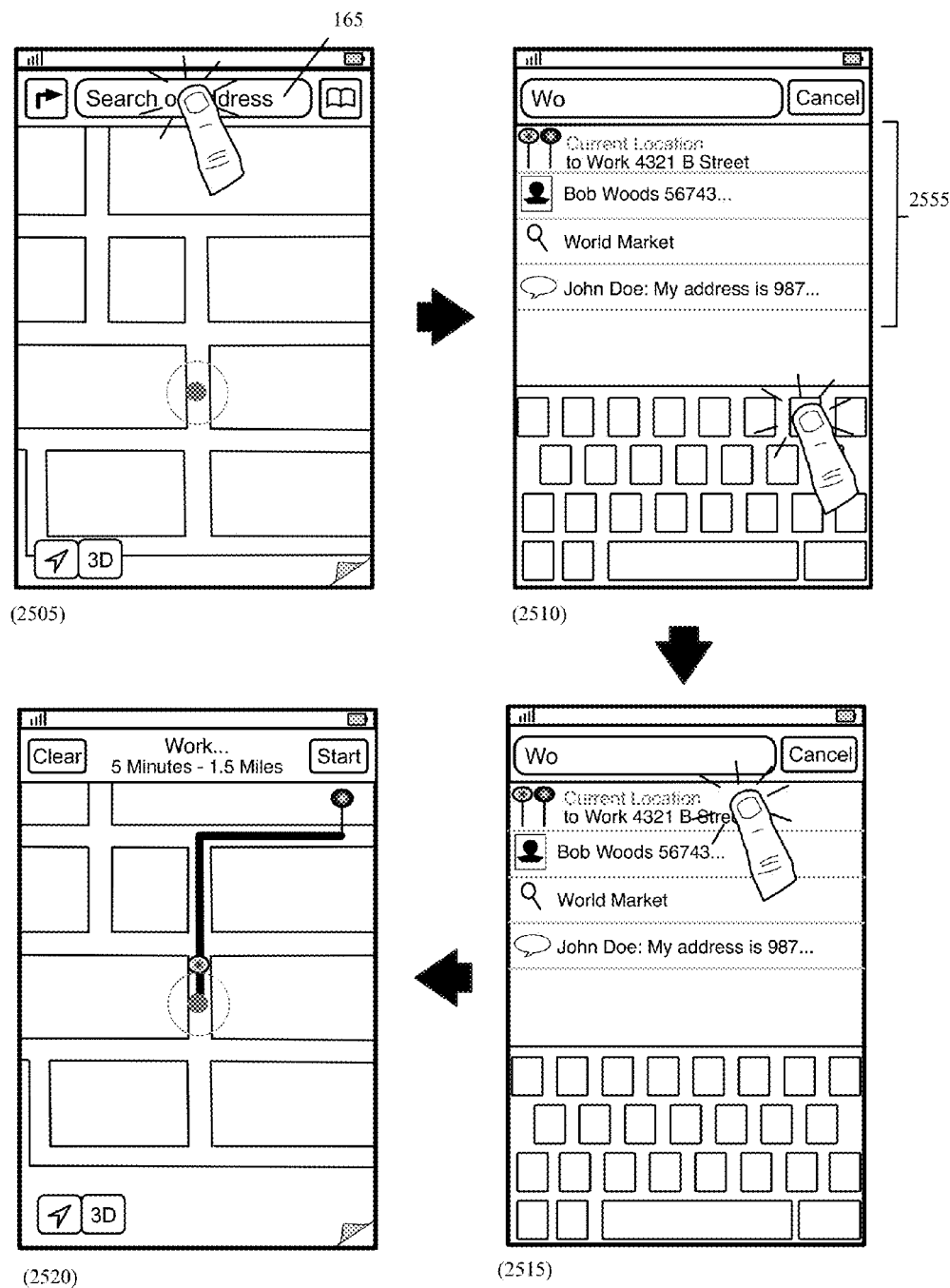
FIG. 25 illustrates an example of a user entering a partial search term and obtaining directions to their work address derived from their contact card.

The application may also analyze other information or labels stored in a user's contact list or contact card. FIG. 25 illustrates an example, in four stages 2505-1820, of a user entering a partial search term and obtaining directions to their work address derived from their contact card. Specifically, this figure illustrates that the mapping application of some embodiments lists the directions to the work address at the top or near the top of the search table.

In the first stage 2505, the user taps the search field 165 to begin the process of entering their search query. During the second stage 2510, the user has entered a partial search term, "Wo", that the application detects as a part of an address label for "Work" or "A's Work" stored in work label field of the user's contact card (or ME card). The application presents the user's labeled work address as a completion in the search table in some embodiments. As shown, the user's labeled work address at the top of the search table 2555. Underneath this suggested search completion, the mapping application displays text (e.g., "Current Location") to indicate the route is from the current location to home. However, as mentioned above, the mapping application of some embodiments instead may display the destination address instead of or in conjunction with displaying this text, or does not display the text nor the destination address.

As described above, the mapping application of some embodiments displays any information matched and derived from the contact list of the user's device near the top of the list of items in the search table but below the information matched and derived from the user's ME card. For instance, the search table 2555 also lists towards the top of the search table but below the user's labeled work address the contact information for "Bob Woods", derived from another contact card stored in the user's contact list. The search table next lists "World Market" as a suggested search completion provided by a remote server.

The order that each suggested search completion is listed in the search table may be derived from various ranking algorithms and heuristics that rank the strength of the relationship between the search query terms and the suggested search completion. One such heuristic is described further below. In some embodiments, search completions derived from local sources (e.g., a contact list) generally receive a higher priority than information derived from the remote servers. These search completions are likewise displayed at the top of the search table.

The third stage 2515 illustrates the user selecting the list item corresponding to directions to "Work" from the search table. The fourth stage 2520 illustrates the application displaying a map with a route corresponding to directions from the user's current location to the user's work.

e) Bookmarks

Figure 26:
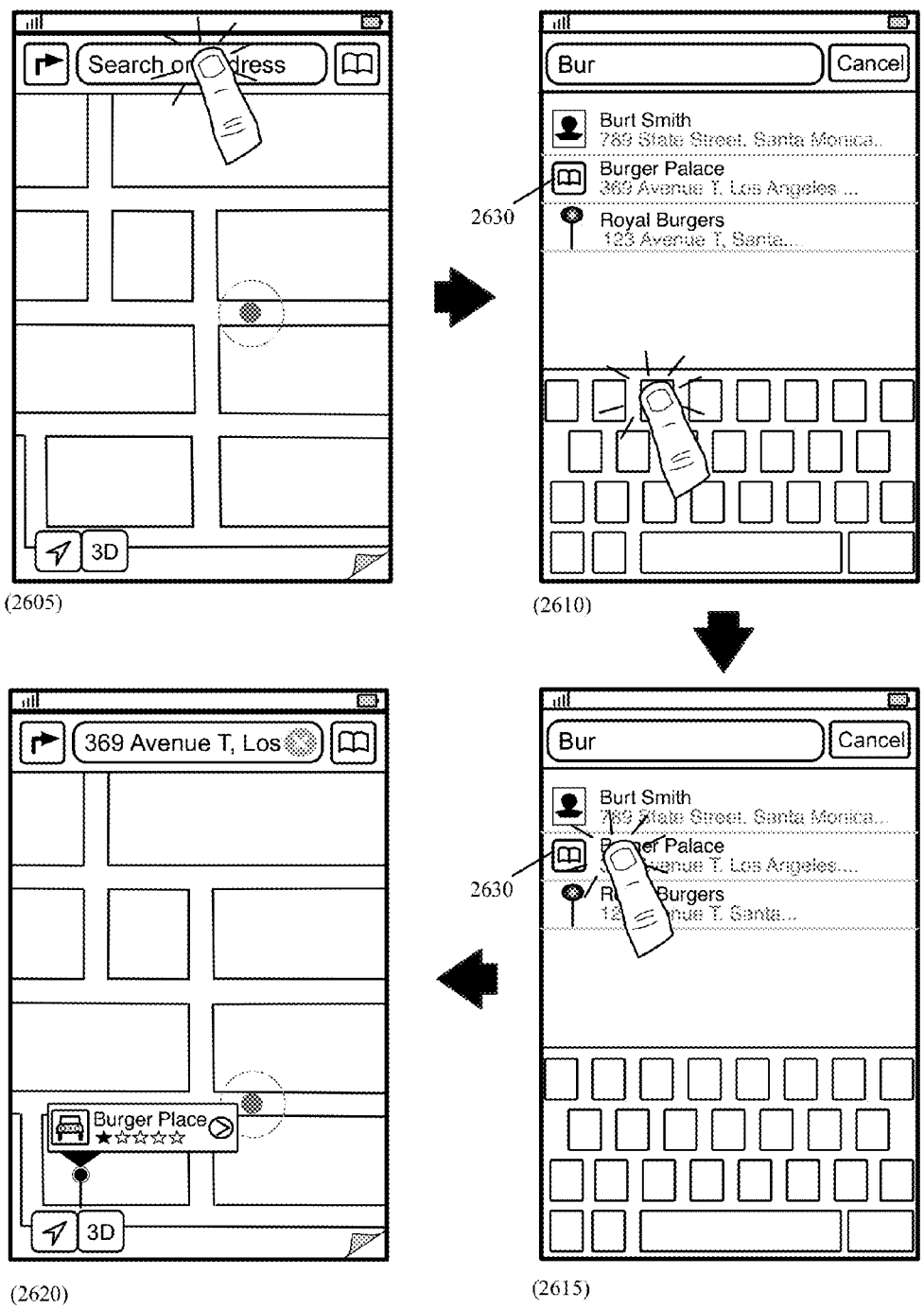
FIG. 26 illustrates an example of entering a partial search query and selecting a bookmark from the list of search completions in the search table.

Search completions listed in the search table may also be obtained, in some embodiments, by accessing a variety of other information stored locally on a user's device. For instance, some embodiments may analyze bookmark information stored on the user's device. Each bookmark may contain various location information for places in which the user has indicated an interest. FIG. 26 illustrates four stages 2605-2620 of a user entering a partial search query and selecting a bookmark from the list of search completions in the search table.

In the first stage 2605, the user taps the search field to begin the process of entering their search information. During the second stage 2610, the user has entered a partial search term, "Bur", in the search field. The application matches this partial query term to various local and remote suggestions. The application matches include "Burt Smith", "Burger Palace" and directions to "Royal Burgers." For this search query, the application presents the user's labeled bookmark as a suggested search completion in the search table. In particular, the application has matched "Bur" to "Burger Palace" because this restaurant is currently stored as a bookmark in the user's device, as indicated by the bookmark icon 2630 next to "Burger Palace."

In some embodiments, the information matched with the bookmarks of the user's device may be displayed in a particular sorted order within the search table. Some embodiments display the search completions derived from the bookmarks below the search completions derived from the user's contacts list. However, the search completions derived from the bookmarks may still be displayed above any of the remote server search suggestions. The search field in stage 2610 illustrates that the contact, "Burt Smith", is still displayed at the top of the list of suggested search completions since this was derived from a contact list on the user's device. Likewise, the user's bookmark for "Burger Palace" is displayed as the second item in the search table and directions from current location to "Royal Burgers" is displayed at the bottom of the list.

The search table in some embodiments may define a different priority order for displaying the items that are derived from the local sources on the device. For instance, some embodiments may factor the search history and frequency that a user selects different suggested search completions in order to determine the particular order that the suggested search completions are presented in the search table. For instance, if a user frequently searches for and selects "Burger Palace", corresponding to a bookmark on the device, the application may display this suggested search completion at the top of the list and "Burt Smith", corresponding to a contact card, as the second item in the list displayed in the search table. The third stage 2615 shows the user's selection of a bookmark for "Burger Palace." The fourth stage 2620 shows a pin and a banner for "Burger Palace."

f) Ordering Search Completions

As described above, for any particular search query, the search table is filled with search completions from 1) local sources (e.g., bookmarks, contacts, recent searches, recent route directions, etc.) and 2) remote server sources. The particular display order that the suggested search completions are displayed in the search table is derived using a variety of heuristics. In some embodiments, in general, the display order prefers search completions derived from local sources over those derived from remote sources.

Figure 27:
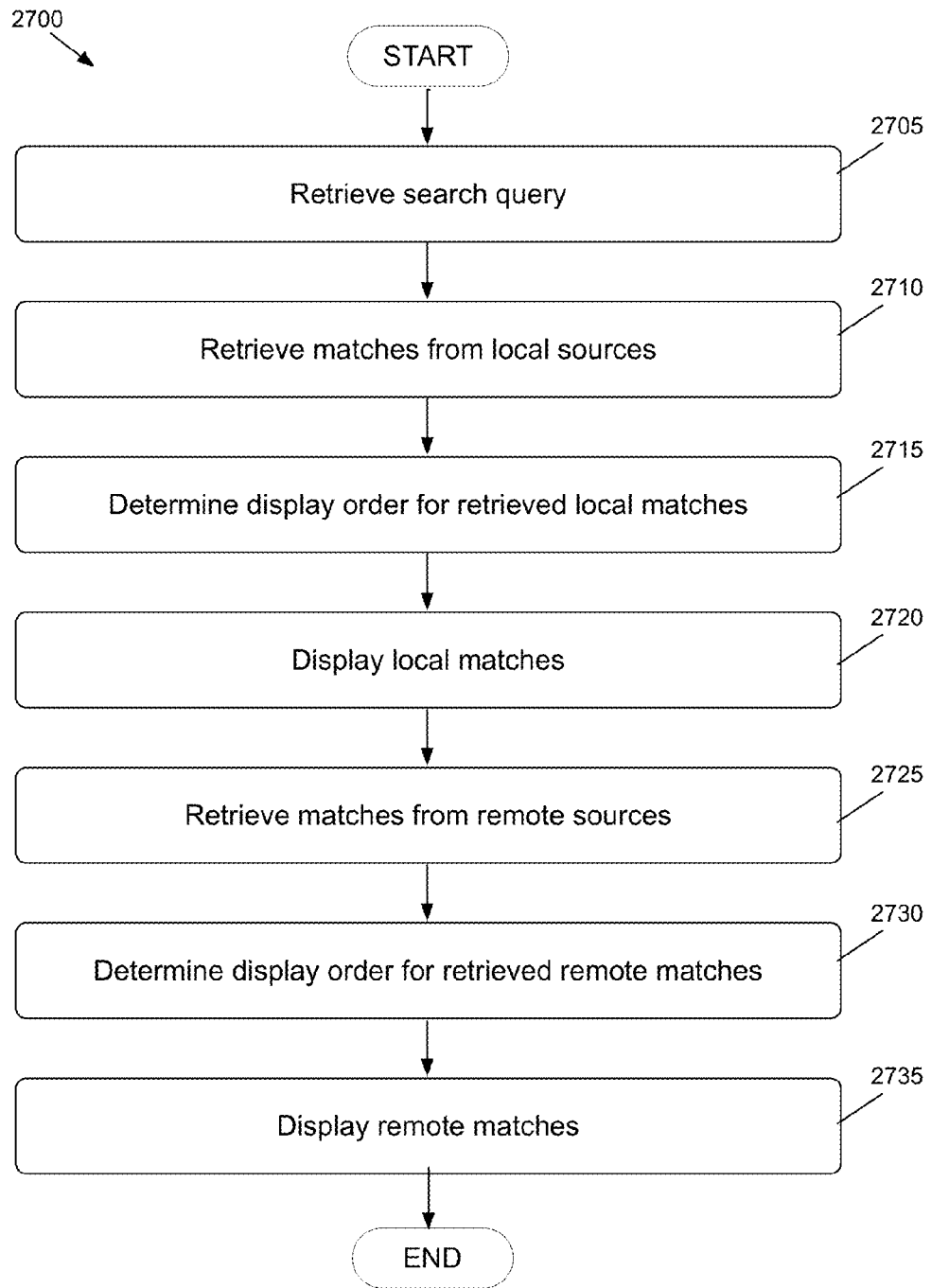
FIG. 27 conceptually illustrates a process that some embodiments perform to determine an order in which to display suggested search completions from different sources in a search table.

FIG. 27 conceptually illustrates a process 2700 that some embodiments perform to determine an order in which to display suggested search completions from different sources in a search table. In some embodiments, the process 2700 is performed by the mapping application. The process 2700 of some embodiments starts when the user starts to a search query in the search field.

The process 2700 begins by retrieving or receiving (at 2705) the search query entered in the search field. The process 2700 then retrieves (at 2710) matching information from one or more local sources. As mentioned above, local sources in some embodiments include the user's contact list, bookmarks, search histories, and recent directions. The process 2700 may match the query term with several information and labels stored in the contact card, including an address label, phone number, name, or URL, among other information stored in the contact card. The process may also match the search query with other local information, including bookmarks and user search history information.

Next, the process 2700 determines (at 2715) the display order for the retrieved matches from the local sources. In some embodiments, the process 2700 first orders matches from each local source based on certain criteria (e.g., frequency of usage of the completions, strength of association between search query and a match, etc.) and takes only a certain number (e.g., three) of top matches from each local source. In some embodiments, the process 2700 orders the retrieved matches based on the local sources. For instance, the process 2700 displays the matches in an order of the ME card, the contact list, bookmarks, and search histories. Other embodiments may have different order. The process 2700 then displays (at 2720) the retrieved matches from the local sources in the search table according to the determined (at 2715) display order.

The process 2700 then receives or retrieves (at 2725) search suggestions from remote sources (e.g., remote map servers) by sending the search query to the remote sources. In some embodiments, the process 2700 sends the search query to the remote sources and looks into the local sources to find matching information at the same time. In some embodiments, the servers may apply their own search ranking algorithm to identify and score particular search suggestions. The server may then send a particular number of identified search results to the mapping application, which the process 2700 may order and filter (at 2730) using own heuristics (e.g., frequency of usage of the completions, strength of association between search query and a match, etc.). For instance, in some embodiments, the process 2700 would suggest the top three server search suggestions in list of suggested search completions in the search table. Next, the process 2700 displays (at 2735) the matches from remote sources below the matches from the local sources. The process 2700 then ends.

Some embodiments may immediately present the local search suggestions and adjust these suggestions to include remote server suggestions as these are received from the server, which provides a "quasi" real time feel to the search process. For instance, if the search table provides enough screen space to list ten individual search completions or suggestions, the process may initially list all ten of these search suggestions from locally derived sources (e.g., bookmarks, contacts, search histories). The process may then replace these local search suggestions with suggestions received from the servers as they are obtained through the network. The process 2700 may constantly update the particular list of search suggestions as more information is received from the servers that may be considered more important than the information listed in the search table.

g) Displaying Search Results as a List

Figure 28:
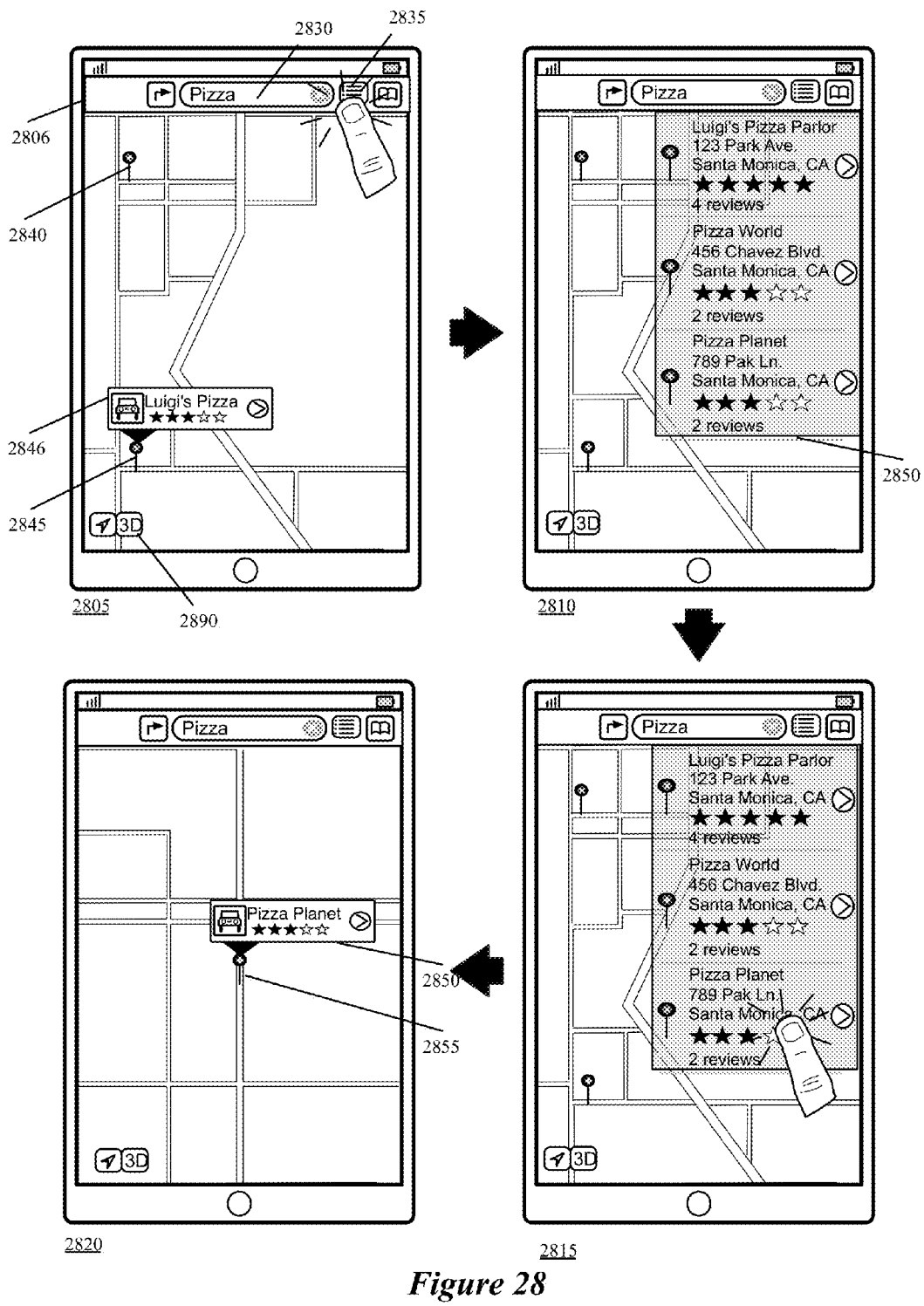
FIG. 28 illustrates an example of running the mapping application on a device that has relatively larger display area compared to a display area of a smaller device.

FIG. 28 illustrates an example of running the mapping application of some embodiments on a device 2800 that has relatively larger display area (e.g., a tablet device such as iPad® sold by Apple, Inc.) compared to a display area of a smaller device (e.g., a smartphone such as iPhone® sold by Apple Inc.). Specifically, FIG. 28 illustrates in four different stages 2805-2820 a user's interaction with the mapping application to display a list of search results in a device with a relatively larger display area.

The first stage 2805 shows that the mapping application has a top bar 2806 that includes a set of controls including a search field 2830 and a list view control 2835 for showing a list of search results. In some embodiments, the mapping application displays this list view control 2835 in the top bar 2806 upon completion of a search based on a search query as shown. In other embodiments, the mapping application places the list view control 2835 in the search field 2830. Yet in other embodiments, the mapping application places the list view control 2835 by sliding the list view control 235 out from under the 3D icon 2890.

In some such embodiments, the mapping application displays the list view control 2835 when the mapping application displays the search results in the map. In this example, the first stage 2805 shows that the mapping application has run a search using "Pizza" as a search query. The mapping application displays search results as two pins 2840 and 2845 in a map view. The mapping application of some embodiments also displays an informational banner 2846 for one of the two pins, which indicates that the point of interest (POI) represented by the pin is the top suggested result. The first stage 2805 also shows that the user is selecting the list view control 2835.

The second stage 2810 shows that the mapping application is displaying a list of POIs 2850 that the mapping application has found using the search query. The list has three POIs in this example. The first two POIs correspond to the pins 2845 and 2840, respectively. The mapping application does not show a pin that corresponds to the third POI, "Pizza Planet," because the third POI is not located within the region of the map that includes the first two POIs. In some embodiments, the mapping application shifts the map to display another region when a POI selected from the list is not located within the region of the map that is currently displayed.

The third stage 2815 shows that the mapping application is receiving a selection of the third entry. The fourth stage 2815 shows that the mapping application has shifted the map to display another region of the map that includes a pin 2855 that corresponds to the third POI. In some embodiments, the mapping application displays an animation for a duration of time to show that the map is being shifted to another region of the map. In some embodiments, the mapping application displays an informational banner for the third POI because the pin for the POI is the only pin in the map region.

h) Software Architecture

Figure 29:
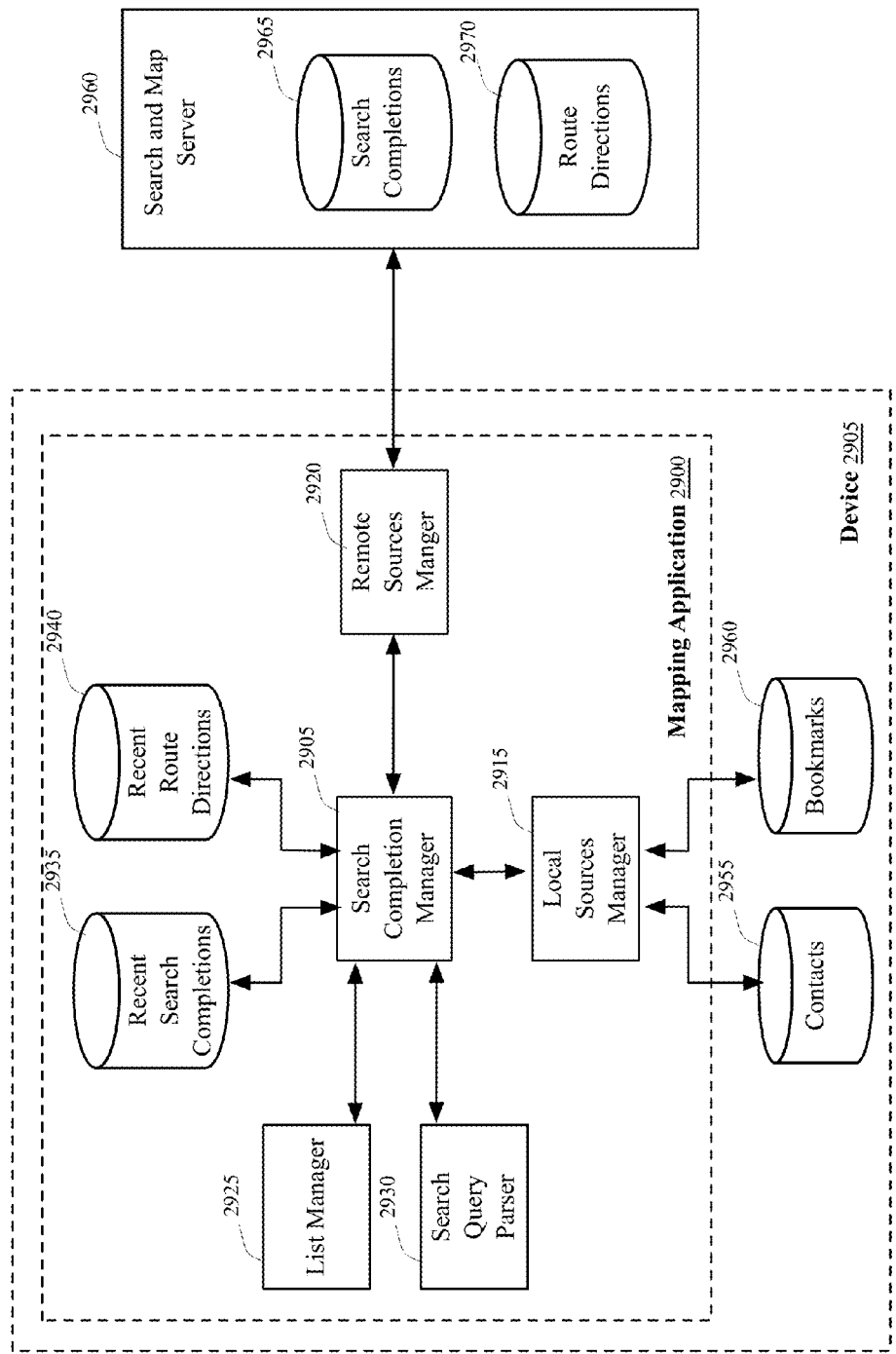
FIG. 29 illustrates an example architecture of a mapping application that provides a list of suggested search completions based on the search queries.

FIG. 29 illustrates an example architecture of a mapping application that provides a list of suggested search completions based on the search queries. In this example, a mapping application 2900 of some embodiments runs in a device 2905. As shown the mapping application 2900 includes a search completion manager 2910, a local sources manager 2915, a remote sources manager 2920, a list manager 2925, a search query parser 2930, a recent search completions repository 2935, and a recent route direction repository 2940. This figure also illustrates a search and map server 2960. The mapping application 2900, the device 2905, and the search and map server 2960 may each have numerous other modules but not depicted in this figure for simplicity of discussion.

The search query parser 2930 receives the search queries that user types in through an input manger (not shown) of the device 2905. The query parser 2930 sends parsed queries to the search completion manager 2910 so that the search completion manager 2910 can generate search requests to the remote sources manager 2920 and the local sources manager 2915. The search query parser 2930 also receives a tap input on a search field (e.g., the search field 165) and notifies the search completion manager of such input so that the search completion manager can retrieve recent search completions and recent route directions from the recent search completions repository 2935 and the recent route directions repository 2940.

The search completion manager 2910 looks up the recent search completions repository 2935 and the recent route directions 2940 when the search completion manager 2910 receives a notification from the search query parser that the user has tapped the search field when the search field is empty. In some embodiments, the search completion manger retrieves search completions and route directions used for a certain period of time (e.g., hours, days, weeks, etc.) before the tap input is received.

The search completion manager 2910 also directs the remote sources manager 2920 and the local sources manager 2915 to look for search completions based on the parsed search queries. The search completion manager 2910 then receives search completions and route directions that the remote source manager 2920 and the local sources manager 2915 return.

The search completion manager gathers the recent search completions, the recent route directions, the search completions and route directions received from the remote and local sources mangers 2920 and 2915, respectively, and filters out any duplicate completions and directions. The search completion manager then send these completions and directions to the list manager 2925.

The list manager 2925 orders the search completions and driving directions based on certain criteria. As mentioned above, these criteria include the time which the search completions and route directions are used, whether the completions and route directions are from the local sources or the remote sources, etc. The list manger 2925 then passes the ordered list to a display manager (not shown) of the device 2905 so that it can be displayed for the user.

The search completion manager also relays search requests (i.e., complete search queries selected from search completions list or search query that had been typed in the search field at the time the user selects "enter" or search control) and selected route directions and passes the requests and directions to a search request manager (not shown) which will conduct searches using the search requests or compute routes. The search completion manager 2910 stores the search requests (i.e., search completions actually used to conduct searches) and selected route directions (i.e., identifications of starting and destination locations) in the recent search completions repository 2935 and the recent route directions repository 2940, respectively.

The recent completions repository 2935 and the recent route directions repository 2940 are memory spaces to store recently used search requests and directions that have recently been used to compute routes. In some embodiments, the two repositories are caches for quick access.

The local sources manager 2915 looks up the contacts repository 2950 and the bookmarks repository 2955 to find contacts (e.g., ME cards) and bookmarks that at least partially match the parsed search queries received from the search completion manger 2910. The local sources manager 2915 then generates search completions based on the matching contacts and bookmarks and return them to the search completion manager 2910. The contacts and bookmarks stored in the repositories 2950 and 2955 are generated, maintained, and/or accessed by applications that run on the device 2905 and these applications include the mapping application 2900.

The remote sources manager 2920 sends the parsed search queries received from the search completion manager 2910 to one or more servers (not all shown) including the search and map server 2960. The remote sources manager 2920 receives search completions and/or route directions returned from the search and map server 2960 in response to the search queries sent to the server 2960. The remote source manager 2920 then sends the completions and route directions to the search completion manger 2910.

As shown, the search and map server includes a search completions repository 2965 and a route directions repository 2970. In some embodiments, the search and map server stores search requests and route directions that were used to compute routes in the repositories 2965 and 2970. The search and map server 2960 receives these search requests and route directions from devices, including the device 2905, that run instances of the mapping application of some embodiments, such as the mapping application 2900. The search and map server then generates a suggested search completions and route directions to the device 2905. In some embodiments, the search and map server includes two servers serving map data and generating routes, respectively. The search completions repository 2965 and the route directions repository 2970 of some embodiments are data storage structures for storing search request and route directions.

2. Clearing Search Results Through Search Field

Figure 30:
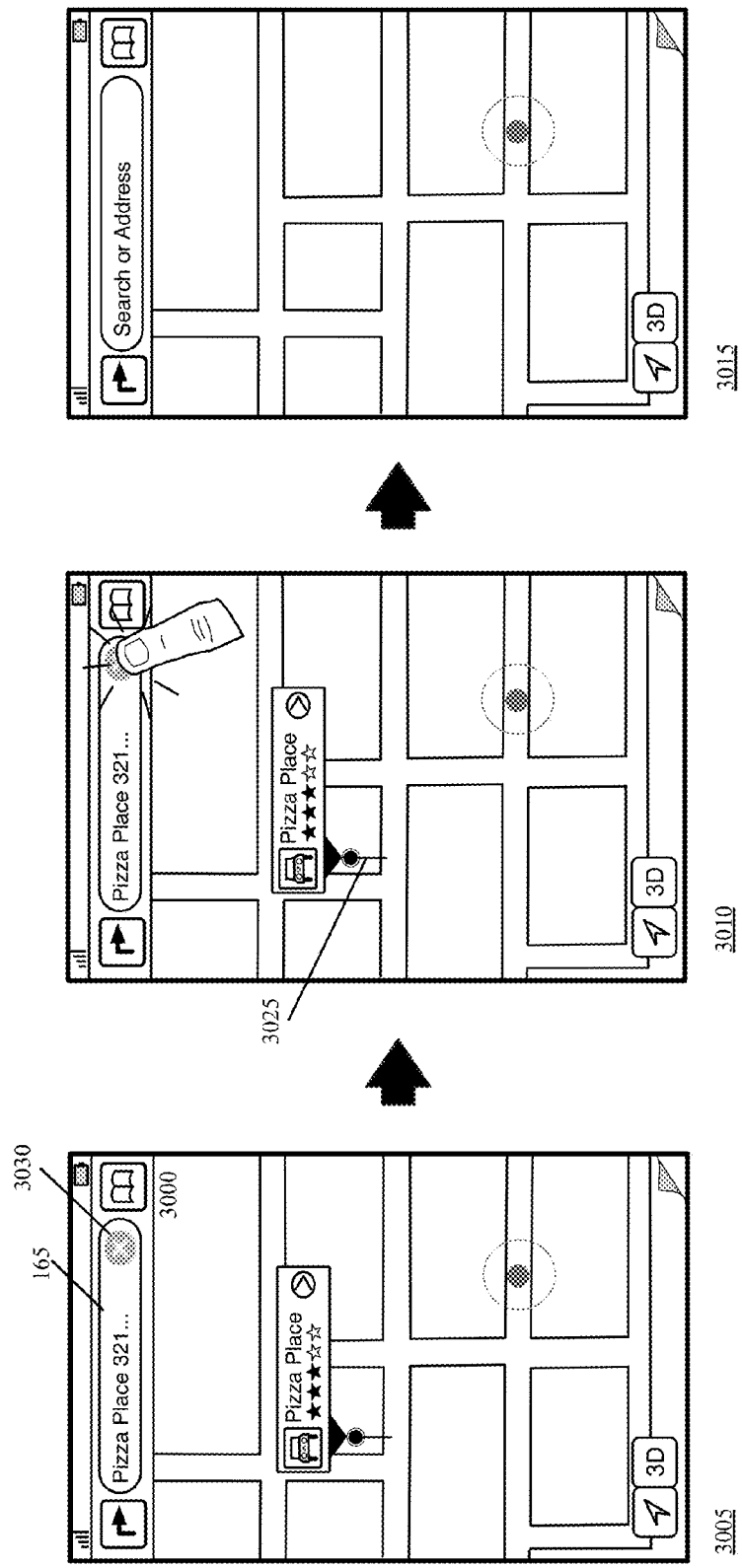
FIG. 30 illustrates an example of clearing search results from a map.

In addition to allowing a user to initiate a search, the presence of the search field in the primary map view in some embodiments also allows users to see the query corresponding to search results on the map and to remove those search results by clearing the query. FIG. 30 illustrates the user clearing results from a map 3000 in three stages 3005-3015.

The first stage 3005 illustrates the map displaying a pin 3025 for "Pizza Place." This pin 3025 may have been placed on the map 3000 through various different mechanisms. For instance, the user may have dropped a pin on the map and received a reverse direction's lookup, or the user may have entered a search query for "Pizza Place 321."

The second stage 3010 illustrates the user selecting an "X" button 3030 within the search field 165 that is used to clear any search query displayed in the search field 165. Furthermore, when clearing the search query, all search results (pins) displayed on the map that are related to the displayed search query will also be cleared from the map 3000. The third stage illustrates that after the user selects the "X" button 3030, the search field 165 is now empty and the pin for "Pizza Place" is no longer displayed on the map.

Figure 31:
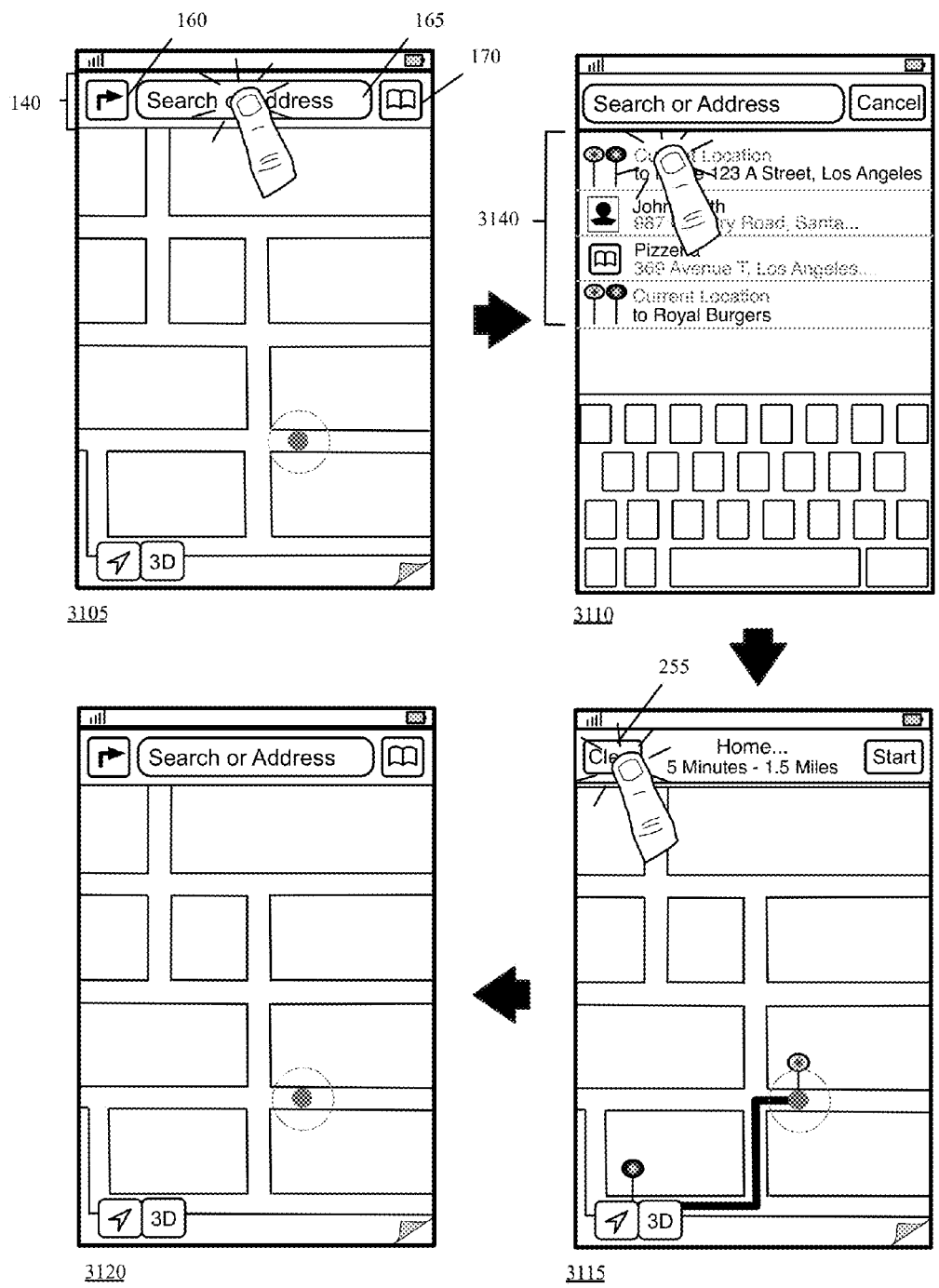
FIG. 31 illustrates an example of a user's interaction with the application running on a user's device in order to clear a selected search result displayed on the map.

FIG. 31 illustrates four stages 3105-3120 of a user's interaction with the application running on a user's device in order to clear a selected search result displayed on the map.

The first stage 3105 shows the device after the mapping application has opened. The second stage 3105 illustrates the application displaying a search table 3140 after receiving the user's tapping of the search field. This search table is displayed regardless of whether or not the user provides any search terms in the search field. The search table 3140 provides a list of suggested search completions, including recently searched terms and route directions. In particular, the search table indicates that the user recently searched for "John Smith" and "Pizzeria." The search table also lists the user's recent route directions, which includes directions to "Royal Burgers" illustrated at the bottom of the search table 3140. Also, the search table 3140 lists an option to obtain directions from the user's current location to their home address, which is illustrated as the first item of the search table 3140. The top bar 140 includes the direction control 160 and the bookmark control 170.

The second stage 3110 illustrates the user's selection of the directions to "Home." The second stage 3110 also illustrates that the mapping application of some embodiments removes the direction control 160 and the bookmark control 170 from the top bar 140. The mapping application inserts a cancel control 2055.

The third stage 3115 illustrates the mapping application displaying a route corresponding to directions from the user's current location to their home. As shown, the route has two pins for the start and ending points of the route. The mapping application of some embodiments also removes the cancel control 2055 from the top bar 140 and places the clear control 255 and the start control 2060. The third stage 3115 also illustrates the selection of the clear control 255. The fourth stage 3120 illustrates that the search field 165 is now empty and the pins for the start and end points for the route are no longer displayed on the map because the mapping application of some embodiments removed them from the map upon receiving the selection of the clear control 255.

B. Zoom Level Settings For The Map Displaying Search Results

When the user is viewing the map in a certain view and executes a search query, some embodiments will transition to a new map view that contains the search results for the user's query. The particular type of transition may include continuously adjusting the map zoom levels and possibly displaying an animation between the original map view and the new map view. The application considers a variety of factors in deciding the particular type of transition and whether or not to provide an animation between the different map views. Some factors may include the distance between the different map views given their particular zoom levels, the data available for providing an animation between the map views, the data bandwidth capabilities of the user's internet connection, and various other factors.

Figure 32:
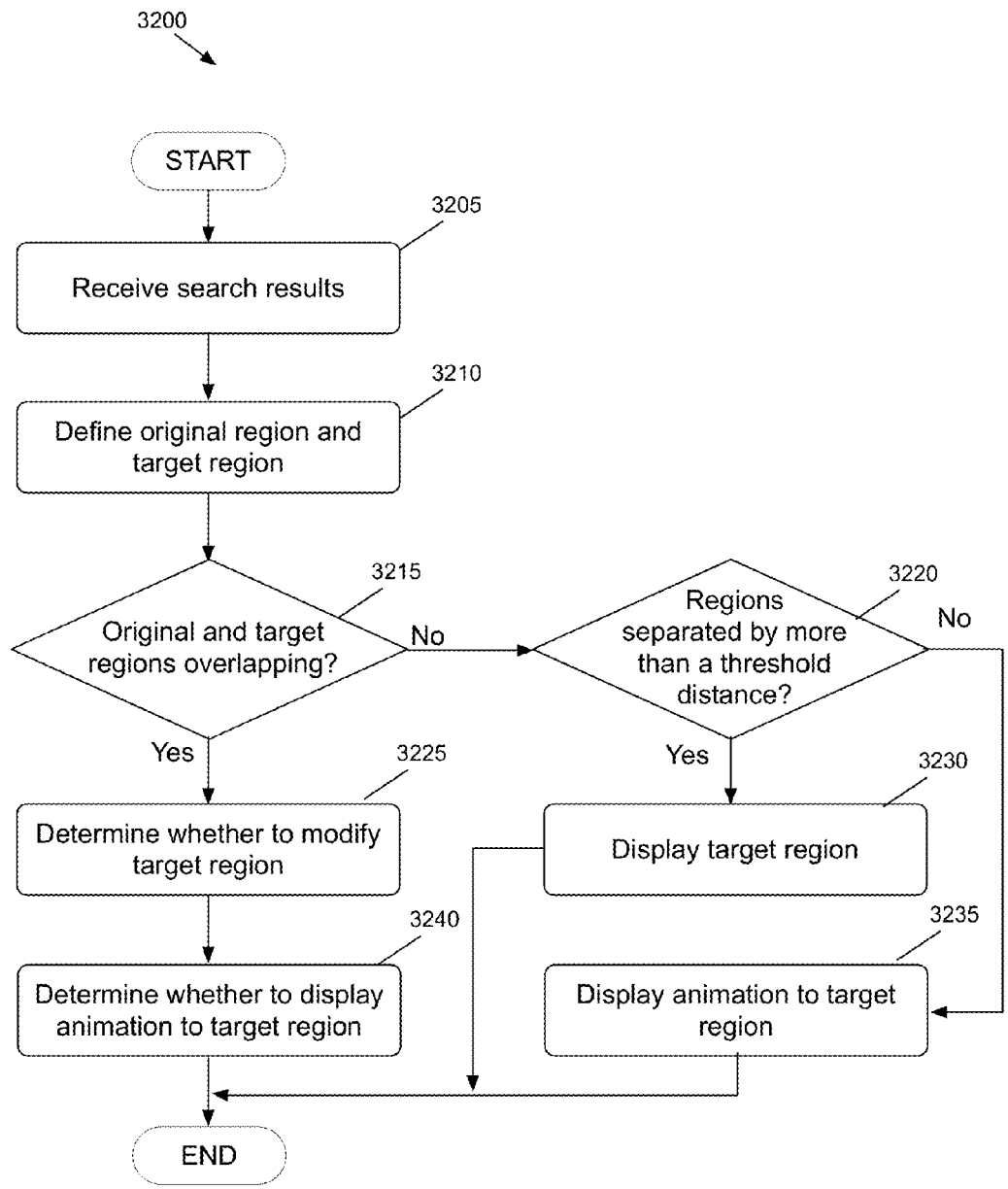
FIG. 32 illustrates a process that some embodiments perform to determine the particular type of transition to display between a user's current map view and a target map view that contains search results for a user's executed search query.

FIG. 32 illustrates a process 3200 that some embodiments perform to determine the particular type of transition to display between a user's current map view and a target map view that contains search results for a user's executed search query. The process 3200 in some embodiments is performed by the mapping application. The process 3200 in some embodiments starts when the mapping application produces the search results based on a user's search query.

The process 3200 begins by retrieving (at 3205) the search results. The process then defines (at 3210) the original region and the target region. The process 3200 in some embodiments considers the map being displayed to the user. The process 3200 defines this map display as the current map view that contains the original map region. The process 3200 then determines a proposed target map view with a target map region that it needs to display to the user in order to provide the optimal map view that displays some or all of the search results.

In some embodiments, the process 3200 initially defines (at 3210) the original region and the target region at the same zoom level. In some such embodiments, the process 3200 initially keeps the zoom level for the original region and sets the zoom level of the target region to the zoom level of the original region. The process 3200 also sets the orientation of the target region to the orientation of the original region. Moreover, different embodiments locate the target region differently. For instance, the process 3200 in some embodiments defines the target region to include at least one search result. Also, the process 3200 of some embodiments defines the target region by taking average coordinates of the search results and set the center of the target region to the average coordinate.

Next, the process 3200 determines (at 3215) whether the original region and the target region overlap at least partially. When the process 3200 determines (at 3215) that the two regions overlap at least partially, the process 3200 proceeds to 3225, which is described further below.

When the process 3200 determines (at 3215) that the original and target regions do not overlap, the process 3200 determines (at 3220) whether the two regions are separated by more than a threshold distance. In some embodiments, the process 3200 computes this threshold distance dynamically based on the current zoom levels of the original region and the target region. For instance, the computed threshold value is inversely proportional to the zooming levels. That is, the more the regions are zoomed in, the shorter the computed threshold distance is.

When the process 3200 determines (at 3220) that the two regions are separated by more than the threshold distance, the process 3200 displays (at 3230) the target region without animating from the original region to the target region. Otherwise, the process displays (at 3235) an animation to the target region from the original region. Different embodiments employ different animation techniques. For instance, the process 3200 in some embodiments employs cross fading of the original region and the target region to transition from the original region to the target region. The process 3200 in some embodiments may transition from the original region to the target region as if the viewpoint of the virtual camera overseeing the original region is moving to the target region.

When the process 3200 determines (at 3215) that the original region and the target region overlap at least partially, the process determines (at 3225) whether to modify the target region. The operation 3225 is described in further detail below by reference to FIG. 33. The process 3200 then determines (at 3240) whether to display animation to target region. The operation 3240 is described in further detail below by reference to FIG. 34.

Figure 33:
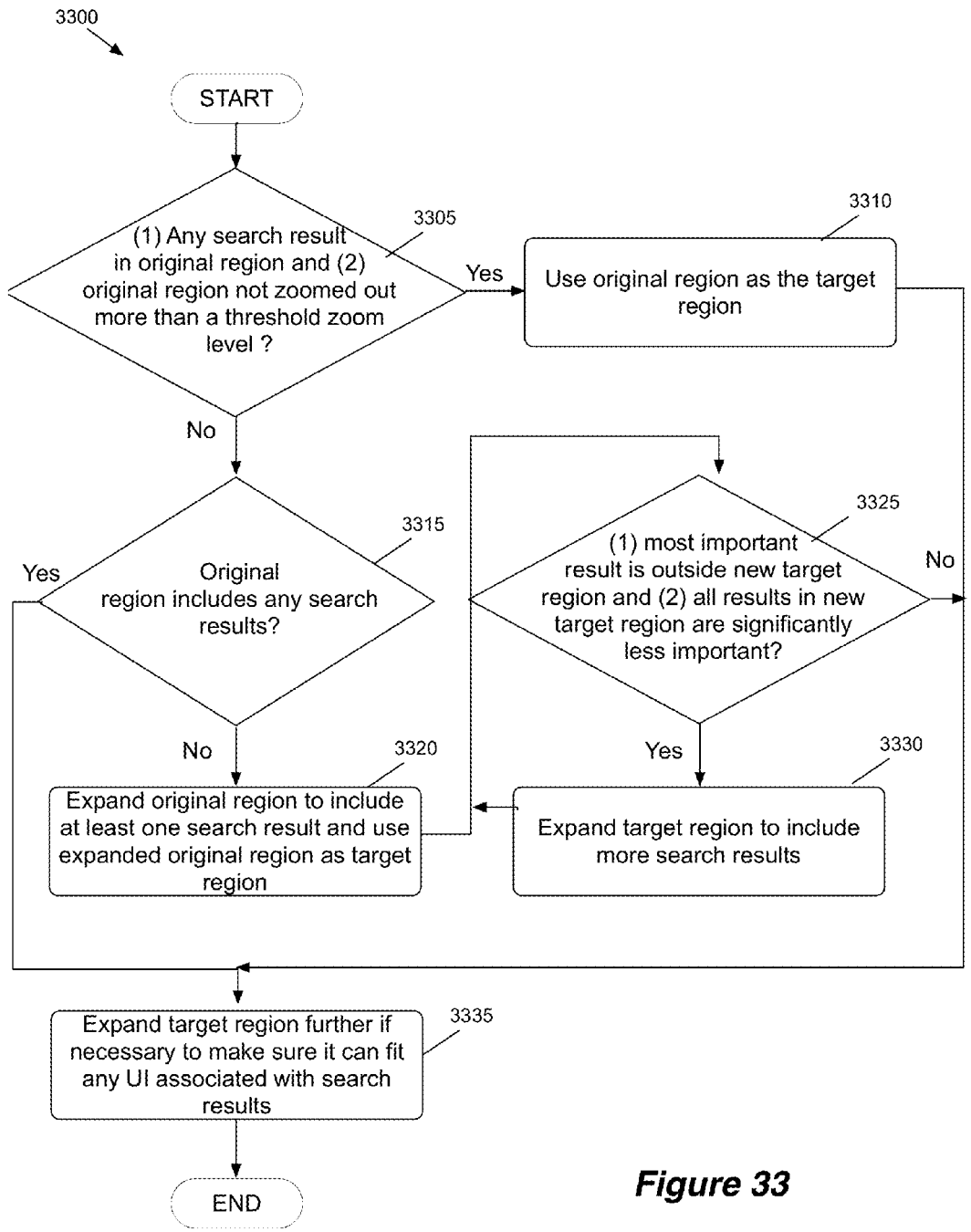
FIG. 33 illustrates a process that some embodiments perform to determine whether to modify the target region when the target region and the original region initially defined by the mapping application at least partially overlaps.

FIG. 33 illustrates a process 3300 that some embodiments perform to determine whether to modify the target region when the target region and the original region initially defined by the mapping application at least partially overlap. The process 3200 in some embodiments is performed by the mapping application.

The process 3300 begins by determining (at 3305) whether (1) the original region includes any search result and (2) the zoom level of the original region is less than a threshold zooming level (i.e., the original region is not zoomed out more than a threshold zoom level). When the process determines (at 3305) that the original region does not include any search result or the zoom level of the original region is not less than the threshold zooming level, the process 3300 proceeds to 3315, which is described further below.

When the process determines (at 3305) that the original region includes at least one search result and the zoom level of the original region is less than the threshold zooming level, the process 3300 uses (at 3310) the original region as the target region. The process 3300 then proceeds to 3335, which is described further below.

When the process determines (at 3305) that the original region does not include any search result or the zoom level of the original region is not less than the threshold zooming level, the process 3300 determines (at 3315) whether the original region includes any search result. When the process 3300 determines (at 3315) that the original region includes at least one search result, the process 3300 proceeds to 3335, which is described further below.

When the process 3300 determines (at 3315) that the original region includes no search results, the process 3300 expands (at 3320) the original region to include at least one search result and uses expanded original region as the target region. Different embodiments expand the original region differently. For instance, in some embodiments, the process 3300 expands in all directions from the center of the original region to include at least one search result while in other embodiments the process 3300 expands not in all directions from the center of the original region to include at least one search result. In some such embodiments, the process 3300 expands in such a way to include a search result that is closest to border of the original region.

Next, the process 3300 determines (at 3325) whether (1) the most important result is outside the target region and (2) all search results in the target region are significantly less important. Different embodiments assess the importance of a search result differently. For instance, some embodiments quantify the closeness of the search query to the search results and uses the quantified closeness to determine the importance. In particular, the process 3300 of some embodiments would consider the closest search result as the most important search result. Other embodiments employ other techniques to assess the importance of a search report. Moreover, the process 3300 of some embodiments will consider that a search result is significantly less important than another search result when the difference between the quantified closeness for the two search results is greater than a threshold difference.

When the process 3300 determines (at 3325) that the most important result is outside the target region and all search results in the target region are significantly less important, the process 3300 expands (at 3330) by a certain size to include one or more search results. The process 3300 then loops back to 3325 to make another determination to see whether to expand the target region further.

When the process 3300 determines (at 3325) that the most important result is not outside the target region or all search results in the target region are not significantly less important, the process 3300 expands (at 3335) the target region further when it is necessary to make sure the target region can accommodate any UI (e.g., an informational banner) associated with the search results. The process 3300 then ends.

Figure 34:
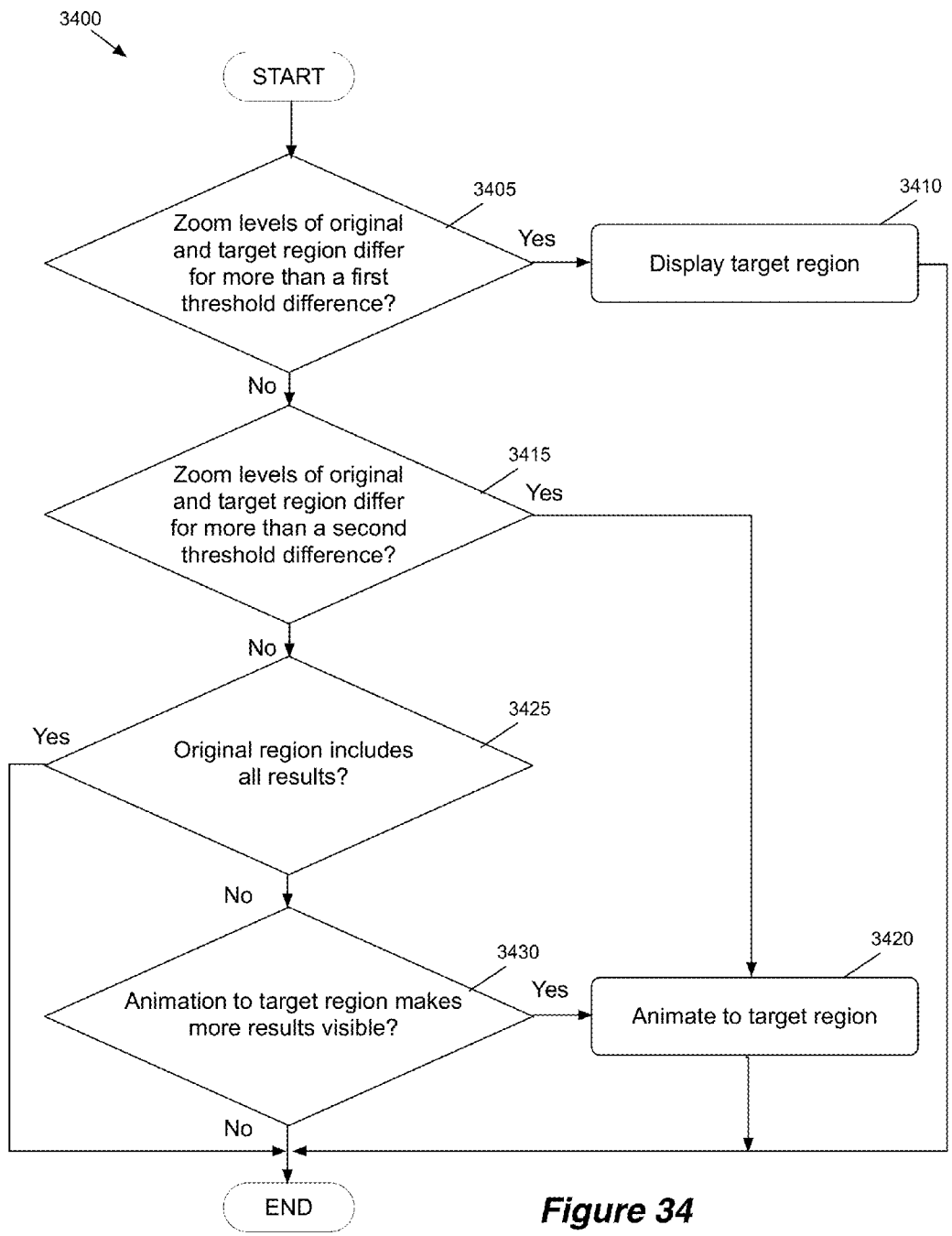
FIG. 34 illustrates a process that some embodiments perform to determine whether to display animation from the original region to the target region when (1) the target region and the original region initially defined by the mapping application at least partially overlaps and when the target region was considered for modification.

FIG. 34 illustrates a process 3400 that some embodiments perform to determine whether to display animation from the original region to the target region when (1) the target region and the original region initially defined by the mapping application at least partially overlap and when the target region was considered for modification. The process 3400 in some embodiments is performed by the mapping application.

The process 3400 begins by determining (at 3405) whether the zoom levels of the original and the target regions are different in more than a first threshold difference. In some embodiments, the first threshold difference represents the upper threshold difference between the zoom levels of the original and the target regions. In such case, the zoom levels of the original and the target regions are considered significantly different.

When the process 3400 determines (at 3405) that the zoom levels are significantly different, the process 3400 displays (at 3410) the target region without displaying an animation from the original region to the target region. When the process 3400 determines (at 3405) that the zoom levels are not significantly different, the process 3400 determines (at 3415) whether the zoom levels are different in more than a second threshold difference. In some embodiments, the second threshold difference represents the lower threshold difference between the zoom levels of the original and the target regions. When the difference between the zoom levels is below the upper threshold and the lower threshold value, the zoom levels of the original and the target regions are considered moderately different.

When the process 3400 determines (at 3415) that the zoom levels of the original and the target regions are moderately different, the process 3400 displays (at 3420) an animation from the original region to the target region. When the process 3400 determines (at 3415) that the zoom levels of the original and the target regions are not moderately different nor significantly different, the process 3400 determines (at 3425) whether the original region includes all the search results.

When the process 3400 determines (at 3425) that the original region includes all the search results, the process ends. Otherwise, the process 3400 proceeds to 3430 to determine whether displaying the animation would result in making more search results visible. The process 3400 in some embodiments examines the animation to see whether any search results would be rendered while the animation is displayed.

When the process 3400 determines (at 3430) that displaying the animation would result in making more search results visible, the process 3400 displays (at 3420) the animation from the original region to the target region. Otherwise, the process 3400 ends.

Figure 35:
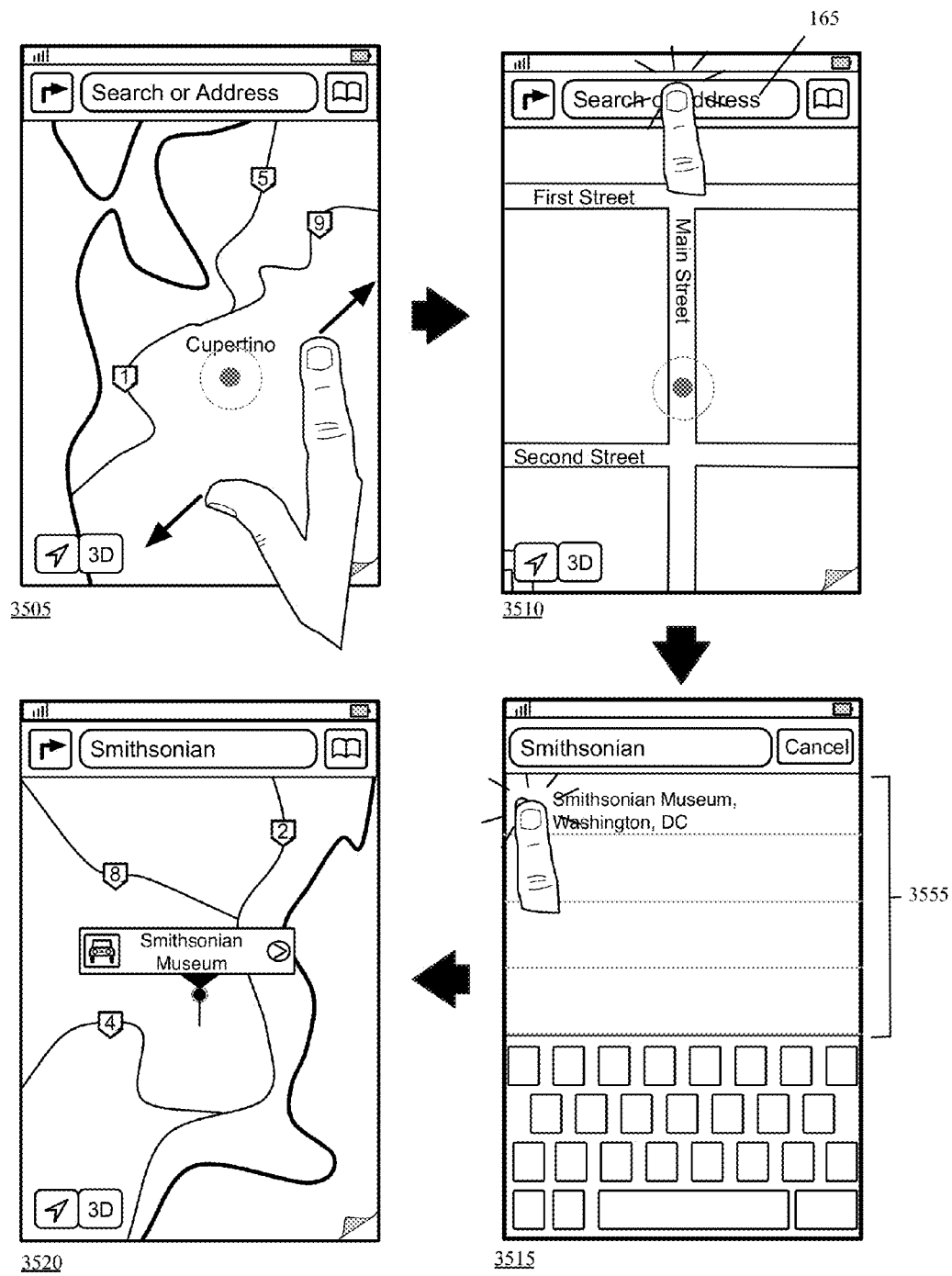
FIG. 35 illustrates a situation where the application displays a transition to a target map region containing a corresponding search result without providing any animation between the current map view and the target map view.

FIG. 35 illustrates four stages 3505-3520 of a situation where the application displays a transition to a target map region containing a corresponding search result without providing any animation between the current map view and the target map view. The first stage 3505 illustrates an original region of a map that shows, e.g., Cupertino, Calif. The map is at a particular zoom level that displays various freeways. The user is also adjusting this map, through gestural input) to zoom in to a more detailed view, as indicated by the movement of the user's thumb and index finger in an outward direction.

The second stage 3510 illustrates that the map is now at a more detailed zoom level (i.e., zoomed in), with several individual streets displayed including "First Street", "Main Street" and "Second Street." The user is also tapping the search field 165 to initiate a search. The third stage 3515 illustrates the user entering the search query "Smithsonian" into the search field and selecting "Smithsonian Museum, Washington, D.C." from the suggested search completion list in a search table 3555.

Upon selecting Washington, D.C., the application instantly displays a map of Washington D.C. without providing any animation. Because Cupertino, Calif. and Washington, D.C. are separated by a significant on-screen distance for the current map view and particular zoom level, the application instantly jumps to the map of Washington, D.C. without providing any animation in this example. For this given search, the application has determined that the on-screen distance between the map region displayed in the stage 3510 and the target map region required to display Washington D.C. is greater than a particular threshold, and thus, providing an animation for the given zoom level is not reasonable or feasible.

In some embodiments, when the target map region is too far away (e.g., beyond a threshold distance of hundreds of miles or thousands of miles) from the currently displayed map region or the user's current location, the mapping application displays a message (e.g., "Did you mean XYZ place in location A . . . ?") to ask whether the user has really intended to search the far-away target region. Alternatively or conjunctively, the mapping application may audibly present the message (e.g., by reading the message) to the user. In some embodiments, the mapping application does not provide the search results until the user responds to the message. In some embodiments, the mapping application provides alternative search results in addition to the message. For instance, the mapping application may provide a list of search results (e.g., "Smith's Onion, Cupertino, Calif.") that could be found within or near the currently displayed region or may provide the results of running a search with a search query that is similar, but is related to a location closer to the currently displayed region. If the user chooses the alternative results, the mapping application will display the search results on a region of the map that is closer to the currently displayed region.

Figure 36:
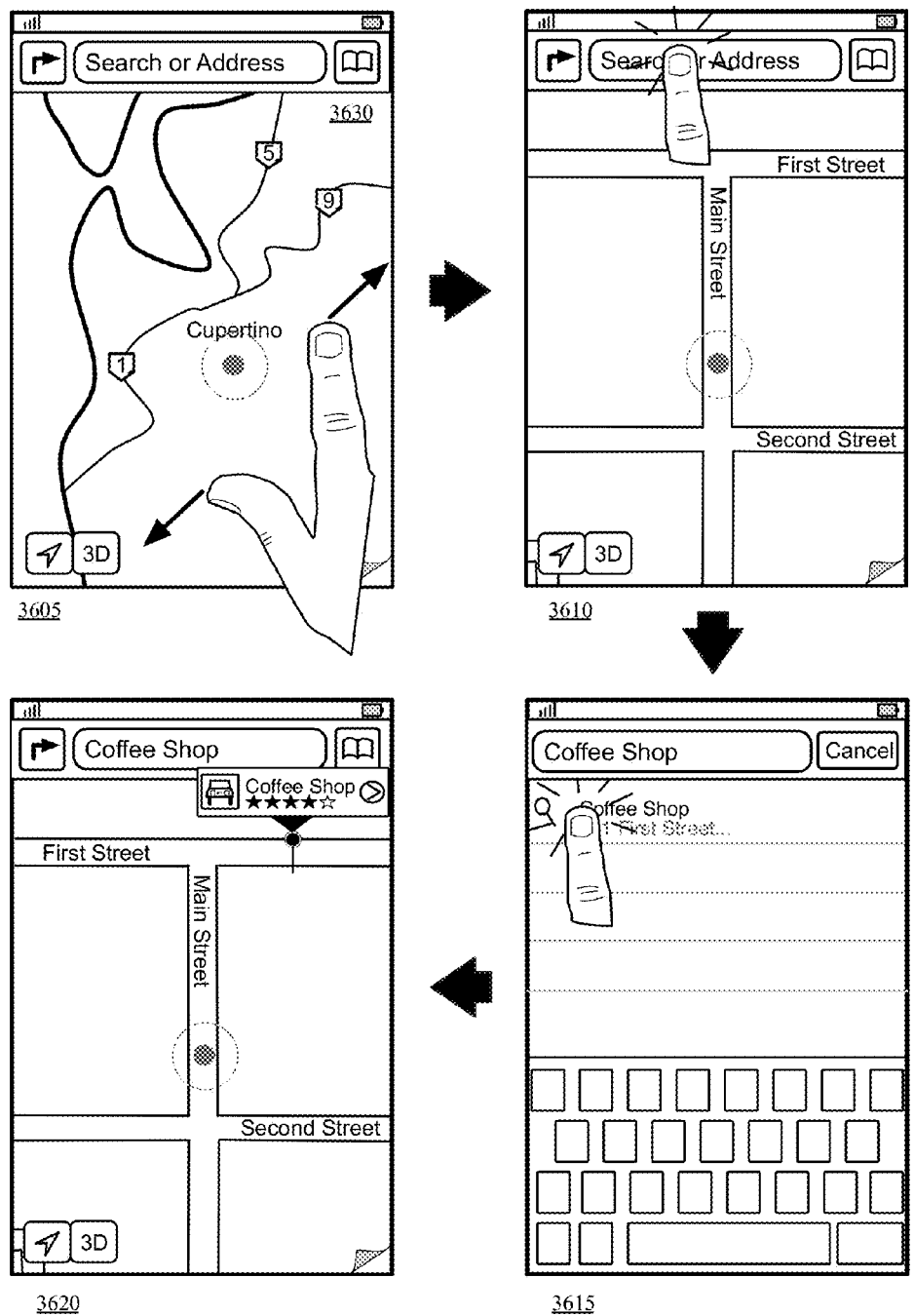
FIG. 36 illustrates a situation where the application detects search results within the original current map view and thus does not need to zoom or animate to any new target map region.

FIG. 36 illustrates four stages 3605-3620 of a situation in which the application detects search results within the original current map view and, thus, does not need to zoom the map or display an animation to any new target map region. The first stage 3605 illustrates a user viewing a map 3630 of Cupertino, Calif. The map 3630 is at a particular zoom level that displays various freeways. The user is also adjusting this map to zoom in to a more detailed view, as indicated by the movement of the user's thumb and index finger in an outward direction.

The second stage 3610 illustrates that the map is now at a more detailed zoom level, with several individual streets displayed including "First Street", "Main Street" and "Second Street." The user is also tapping the search field to initiate a search. The third stage 3615 illustrates the user entering the search query "Coffee Shop" into the search field and selecting Coffee Shop, located at "First Street" from the suggested search completion list in the search table. Upon selecting Coffee Shop, the application displays the same current map view that the user was viewing prior to the search request as shown in the fourth stage 3620. Since the search result for Coffee Shop located at First Street may be viewed in the user's current map view, the application does not need to adjust the zoom settings or provide any animation to display the target map region. The application has set the target map region containing the relevant search results to the current map region and, in doing so, has avoided changing between the views of different regions of the map.

Figure 37:
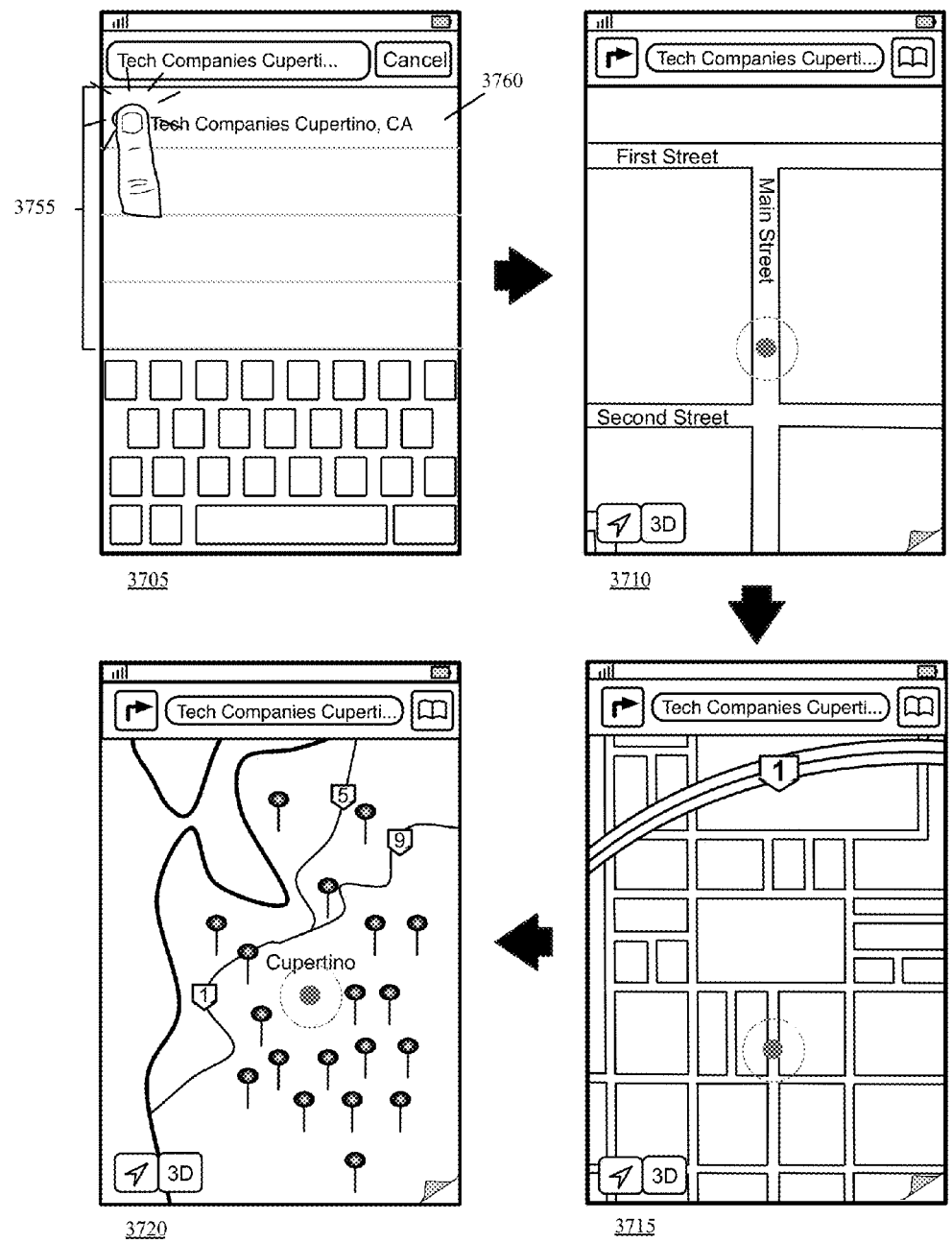
FIG. 37 illustrates a situation where the search results in the target map view are not within an original region such that the application expands the target region and displays an animation between the original region and the target region.

FIG. 37 illustrates in four different stages 3705-3720 that the mapping application of some embodiments zoom out of the current map region view in order to present several search results found based on a search query. The first stage 3705 illustrates the mapping application after the user has entered a search query "Tech Companies Cupertino." The search table 3755 displays a list of search results including a previous search query 3760. As shown, the user is selecting the search query 3760 from the search table 3760. The mapping application of some embodiments stores the search results for searches conducted using the mapping application.

The second stage 3710 shows the map of the current location at a detailed zoom level, with several individual streets displayed including "First Street", "Main Street" and "Second Street." Since the search results the tech companies in Cupertino are not located within the original current map region of the current map view, the application of some embodiments expands the map view so that the target region includes all of the search results that are located in the target region. The mapping application of some embodiments also determines that an animation of the map view from the current map region to the target region is needed because the zoom levels of the current region and the target region are significantly different.

The third stage 3715 illustrates the map at a different zoom level. The mapping application displays the map at this zoom level only momentarily as part of the animation that the mapping application displays in order to zoom out of the map to a zoom level for displaying the target region that is bigger than the original region. In some embodiments, the mapping application displays a 2D/3D transition as part of the animation.

The fourth stage 3720 illustrates the map at the zoom level of the target region. That is, the mapping application has completed displaying the animation to the target region from the original region displayed at the second stage 3710.

In some embodiments, the mapping application varies the duration of an animation for transitioning from the original region to the target region based on the amount of change involved in the transition. For instance, the mapping application of some embodiments animates the transition for a short duration when the original region and the target region are not too far or when the original and the target region overlap. The mapping application displays a longer animation when the distance between the two regions is relatively large (e.g., hundreds of miles). In some such embodiments, when the distance between the two regions is very large (e.g., thousands of miles), the mapping application may not display an animation at all.

III. Controls for Preview of Items on Maps

Some embodiments of the invention provide a novel user interface for presenting different types of detailed information about a point of interest (POI). This user interface is referred to as a "stage" in the description above and below. A stage in some embodiments includes a display area for displaying images of the POI and several tabs under which different types of information about the POI are grouped and presented to the user.

The mapping application of some embodiments provides several different ways to display a stage for a POI. As described above, the mapping application of some embodiments displays a banner above each of the pins that are displayed as search results. The user can select an item in the banner for a POI to open up the stage for that POI. The mapping application also allows the user to open up the stage of a POI by selecting the POI from a list of POIs that the mapping application of some embodiments presents for the search results of a search query. The mapping application also allows the user to open up the stage after dropping a pin at a location. Moreover, the mapping application allows the user to open up the stage for the current location.

Figure 38:
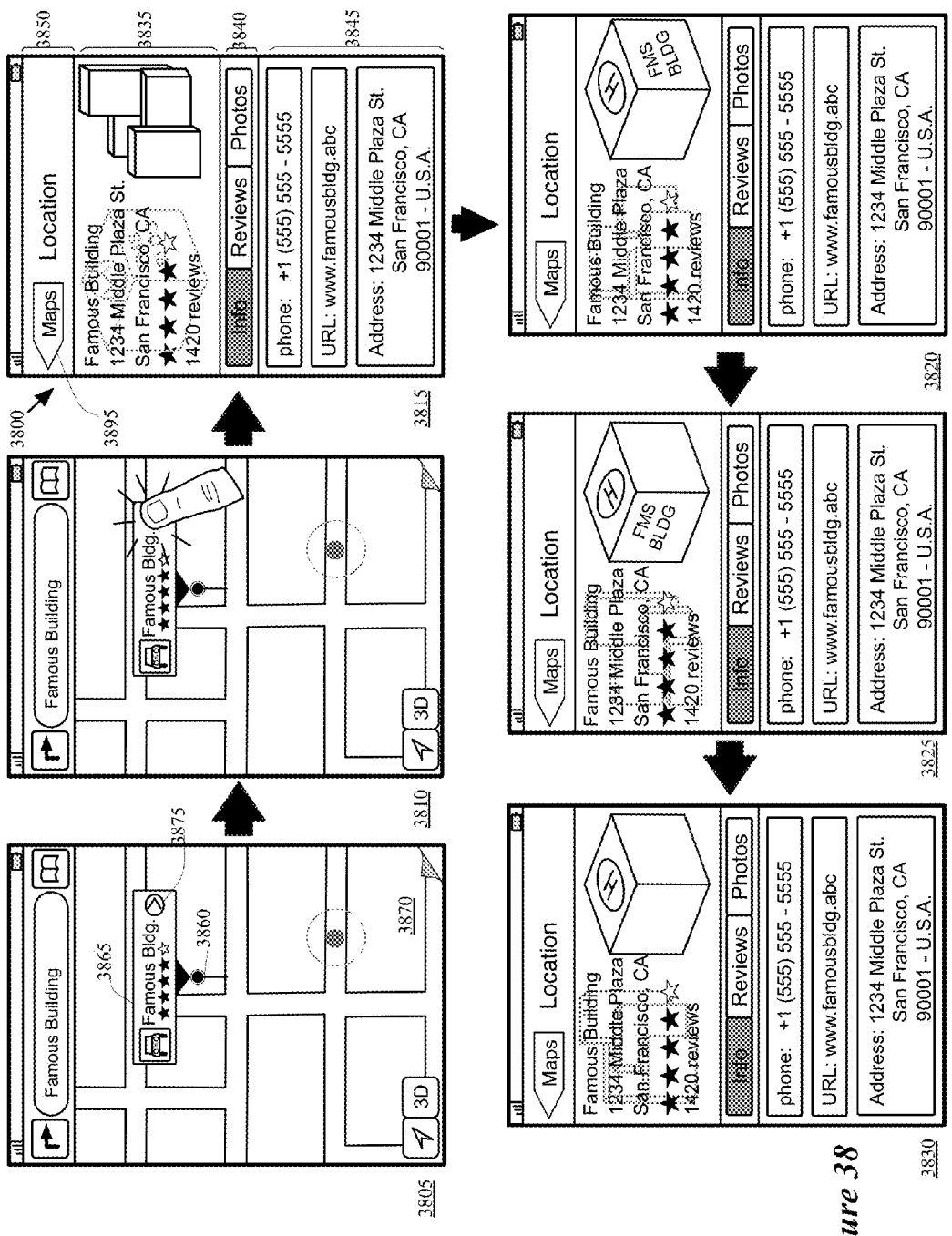
FIG. 38 conceptually illustrates a UI page for showing detailed information about a selected location.

FIG. 38 conceptually illustrates a GUI 3800, which is a "stage" for a selected POI. Specifically, FIG. 38 illustrates in six different stages 3805-3830 a mapping application of some embodiments that displays a 3D animation of the POI in a media display area 3835 of the GUI 3800. This figure illustrates that the GUI 3800 includes the media display area 3835, tabs 3840, information display area 3845, and a top bar 3850.

The media display area 3835 of some embodiments is for displaying different media of the POI. In some embodiments, the mapping application initially displays a 3D animation of the POI when the GUI 3800 is launched. For instance, when the POI is a building, the mapping application shows an animated 3D view of the building and the building's surroundings. In some embodiments, the mapping application displays the building as if the building is viewed from a camera mounted on a helicopter that is circling around the top of the building.

Different embodiments generate the 3D animation (3D video presentation) differently. For instance, the 3D animation is a video clip captured by a video capture device of an object orbiting the earth or a manned or unmanned aircraft flying at lower altitudes (e.g., a satellite, a space shuttle, an airplane, a helicopter, etc.).

The mapping application in some embodiments generates the 3D video presentation by performing a blending operation (e.g., the three dimensional perspective blending operation) on several images that are captured for a particular location by flying objects such as helicopters, airplanes, satellites, etc. These images can be still images or images from a part of a video clip captured by these objects.

In some embodiments, the 3D rendering operation generates the video clips from multiple images by transitioning through the images in a set amount of time. In some embodiments, this transition results in multiple video frames being generated by capturing different subsets of images from different perspective rendering positions in 3D scenes at different instances in time.

In some embodiments, the mapping application generates the 3D video presentation by moving a virtual camera above and around the POI (e.g., a building) and its surroundings in the 3D immersive map view or in the flyover view. For instance, the mapping application may move the virtual camera as if the virtual camera is shooting a video of the POI and the surroundings from a flying object circling around the top of the building. The virtual camera and the 3D immersive map view are described in detail in U.S. patent application Ser. No. 13/632,035, now published as U.S. Patent Publication No. 2013/0322702, entitled "Rendering Maps," concurrently filed with this application. This concurrently filed U.S. patent application Ser. No. 13/632,035, now published as U.S. Patent Publication No. 2013/0322702, is incorporated herein by reference.

When the data for the animated 3D view of the POI is not available (e.g., the data is not available in the map server or other local storage), the mapping application of some embodiments finds the next available type of image to display in the display area 3835. For instance, the mapping application may display a satellite view of the POI.

When the data for the animated 3D view of the POI is available but it requires some time to obtain the necessary data to display the animated 3D (e.g., because of a slow network connection of the device to the source of the necessary data), the mapping application of some embodiments identifies the next available type of media for that POI and displays that media in the media display area 3835 first. For instance, the mapping application of some embodiments displays in the media display area 3835 a satellite image of the POI. In some embodiments, in order to provide an animated effect, the mapping application rotates (e.g., clockwise) the satellite image of the POI rather than statically displaying a 2D satellite image.

When enough data for displaying the animated 3D view is obtained, the mapping application of some embodiments switches from displaying the satellite image of the POI to displaying the animated 3D view of the POI. The mapping application of different embodiments uses different effects to make the switch. For instance, the mapping application of some embodiments cross fades the 2D satellite image into the animated 3D view of the POI. In other embodiments, the mapping application may employ a Ken Burns effect to display the 3D animated view from the satellite image.

In some embodiments, the mapping application determines the type of media of the POI to initially display in the media display area 3835 based on the type of POI that is selected. For instance, when the POI is a restaurant, the mapping application of some embodiments initially displays images of culinary dishes the restaurant offers or interior images of the restaurant. When displaying such images, the mapping application of different embodiments employs different effects to display different images. The different effects that the mapping application may use include a Ken Burns effect, vignette effect, cross-fading, tiling, slide show, etc.

The mapping application of some embodiments overlays informational text on the media displayed in the media display area 3835. In some embodiments, the informational text is displayed toward the left side of the media display area 3835 as shown in the third stage 3815. However, the location of the informational text may be anywhere (e.g., center) in the media display area 3835. In some embodiments, the mapping application applies different effects to the portion of the media display area on which the informational text is overlaid so that the text appears legible. For instance, the mapping application may change the color of that portion or make the portion blurry. In other embodiments, the mapping application does not modify the image to make the informational text legible. Instead, the mapping application adjusts the informational text to make it legible as the portion of the image overlaid by the text changes.

The mapping application of some embodiments may also switch to other types of media from the type of media that is initially displayed when the GUI 3800 is launched. For instance, when the user selects an entry from the entries displayed under a "media" tab (not shown), the mapping application displays in the media display area 3835 the images associated with the selected entry or plays back in the media display area 3835 a video associated with the selected entry.

The tabs 3840 are tabs for displaying different sets of entries grouped for different types of information associated with the different tabs. In some embodiments, the GUI 3800 initially includes an "Info" tab, a "Reviews" tab, and a "Photos" tab as shown. When the info tab is selected, the mapping application displays in the information display area 3845 entries related to general information about the POI. As shown, the general information about the POI includes a phone number, a URL for the POI, address, etc. The entries to display when the reviews tab is selected include all the reviews gathered by information aggregation entities (e.g., Yelp, Facebook, Twitter, etc.) and supplied to the mapping application. Similarly, the entries to display when the photos tab is selected include photos gathered by the information aggregation entities. The tabs and entries displayed in the information display area 3845 is described in detail further below.

The top bar 3850 of some embodiments includes a back button 3895 for going back to the state prior to launching the GUI 3800. When the map with search results had been displayed prior to displaying the GUI 3800, the back button 3895 would indicate that the mapping application goes back to displaying the map with the search results. When the list of POIs had been displayed prior to displaying the GUI 3800, the back button 3895 indicates that the mapping application goes back to displaying the list.

The operation of the GUI 3800 is now described. At the first stage 3805, the mapping application displays a pin 3860 and a banner 3865 as a result of entering a search query "Famous Building." The next stage 3810 shows that user selects the arrow 3875 to launch the "stage" for this POI.

At the third stage 3815, the GUI 3800 has been launched. The mapping application displays the initial set of components of the GUI 3800, which includes the top bar 3850, the media display area 3835, the tabs 3840, and the information display area 3845. In the media display area 3835, the mapping application displays an animated 3D view of the famous building and other buildings near the famous building.

The mapping application also displays informational text about the famous building on the left side of the media display area 3835. The displayed information includes the name of the building, the address, star rating, and the number of reviews, as shown in media display area 3835. Behind the text, the mapping application initially displays an image of the famous building. As shown, the building appears faded because the mapping application has faded the portion of the image that appears behind the information text in order to make the text more prominent and legible. At this stage 3815, the information display area 3835 displays general information about this building (e.g., phone number, URL of the building, address, etc.) because the info tab is a default tab selection in some embodiments.

The next stage 3820 shows that the viewpoint of the virtual camera has changed such that the famous building appears next to the displayed informational text. Some other neighboring buildings are displayed behind the informational text. The viewpoint of the virtual camera also starts to circle around the top of the famous building.

The next stage 3825 shows that the virtual camera has moved to another side of the famous building. As shown, the "FMS BLDG" shown on a side of the building now appears in a southwest direction of the media display area 3845 in order to show that the virtual camera has moved counterclockwise with respect to the top of the building. The encircled "H" on top of the building also appears rotated since the last stage 3820. Furthermore, because the viewpoint of the virtual camera has changed, different neighboring buildings are displayed behind the informational text.

The next stage 3830 shows that the virtual camera has moved to yet another side of the famous building. The virtual camera has kept moving and is now on the side of the building from which "FMS BLDG" is no longer visible. The encircled "H" on top of the building appears further rotated. The mapping application of some embodiments keeps showing this animated 3D animated view (i.e., will have the virtual camera keep circling the top of the building) until the user provides further input (e.g., input to close the GUI 3800, selects photos from the entries under the photos tab, etc.).

Figure 39:
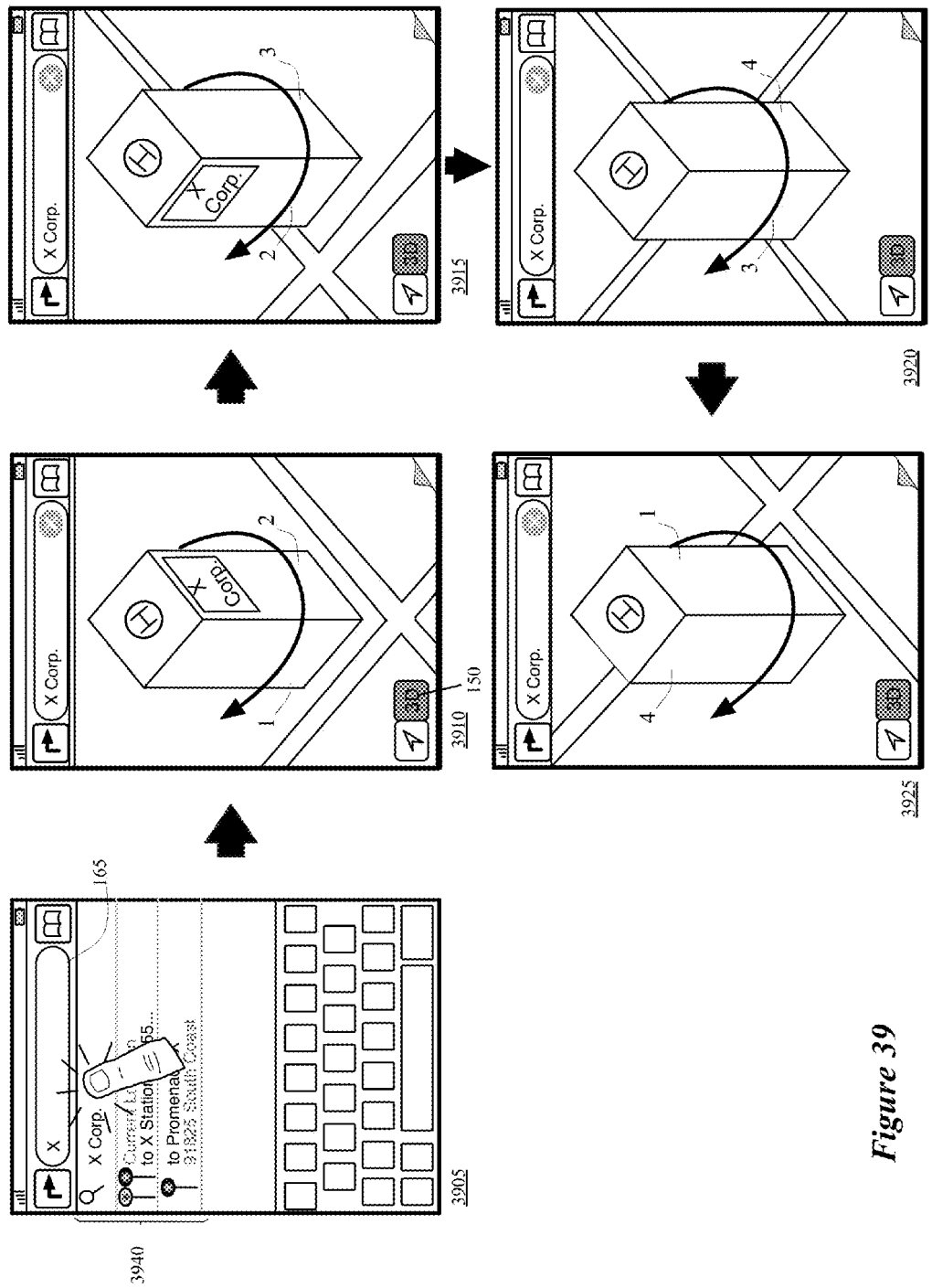
FIG. 39 illustrates an example of the mapping application using 3D rending operation to show a particular search result.

In some embodiments, the mapping application uses a 3D rendering operation to generate 3D presentation in its other mode of operation. For example, in some embodiments, the mapping application uses this operation to generate a 3D video presentation whenever a user performs a search for a particular location or specifies other search criteria, or whenever the user explores a location on the map. FIG. 39 illustrates in five different stages 3905-3925 an example of the mapping application using a 3D rending operation to show a particular search result.

The first stage 3905 illustrates the mapping application displaying a search table 3940 after receiving the user's entry of a first letter of a search query in the search field 165. As shown, the search table 3940 includes several search completions including "X Corp.," "X Station 555 . . . ," and "Promenade X." The first stage 3905 also illustrates that the "X Corp." is selected.

The second stage 3910 illustrates a 3D map view 3910 as indicated by the 3D control 150 being highlighted. In some embodiments, the mapping application automatically shows 3D animation of the POI when the user views the POI in 3D mode. The mapping application of some such embodiments still allows the user to rotate the map view (e.g., with two finger gesture). In some embodiments, the mapping application starts presenting 3D animation of the POI after a certain amount of time (e.g., a few seconds) elapses without receiving input from the user. The second stage 3910 also illustrates that the mapping application starts to present 3D animation of the building. As shown, the 3D animation is showing sides 1 and 2 of the X Corporation's building with side 2 having X Corporation's name. In this example, the 3D animation is a 3D video presentation shot from a flying object circling counterclockwise around the top of the building.

The third stage 3915 illustrates that the viewpoint has changed and the building appears to rotate clockwise as the flying object is circling counterclockwise. The 3D presentation is showing sides 2 and 3 of the X Corporation's building. The "H" sign on top of the building has also been rotated as shown.

The fourth and fifth stages 3920 and 3925 show further rotations of the building as the flying object is circling clockwise. The mapping application of some embodiments repeats the 3D presentation until the user provides an input (e.g., two finger gesture, input to exit the 3D mode, etc.) that stops or changes the animation.

Figure 40:
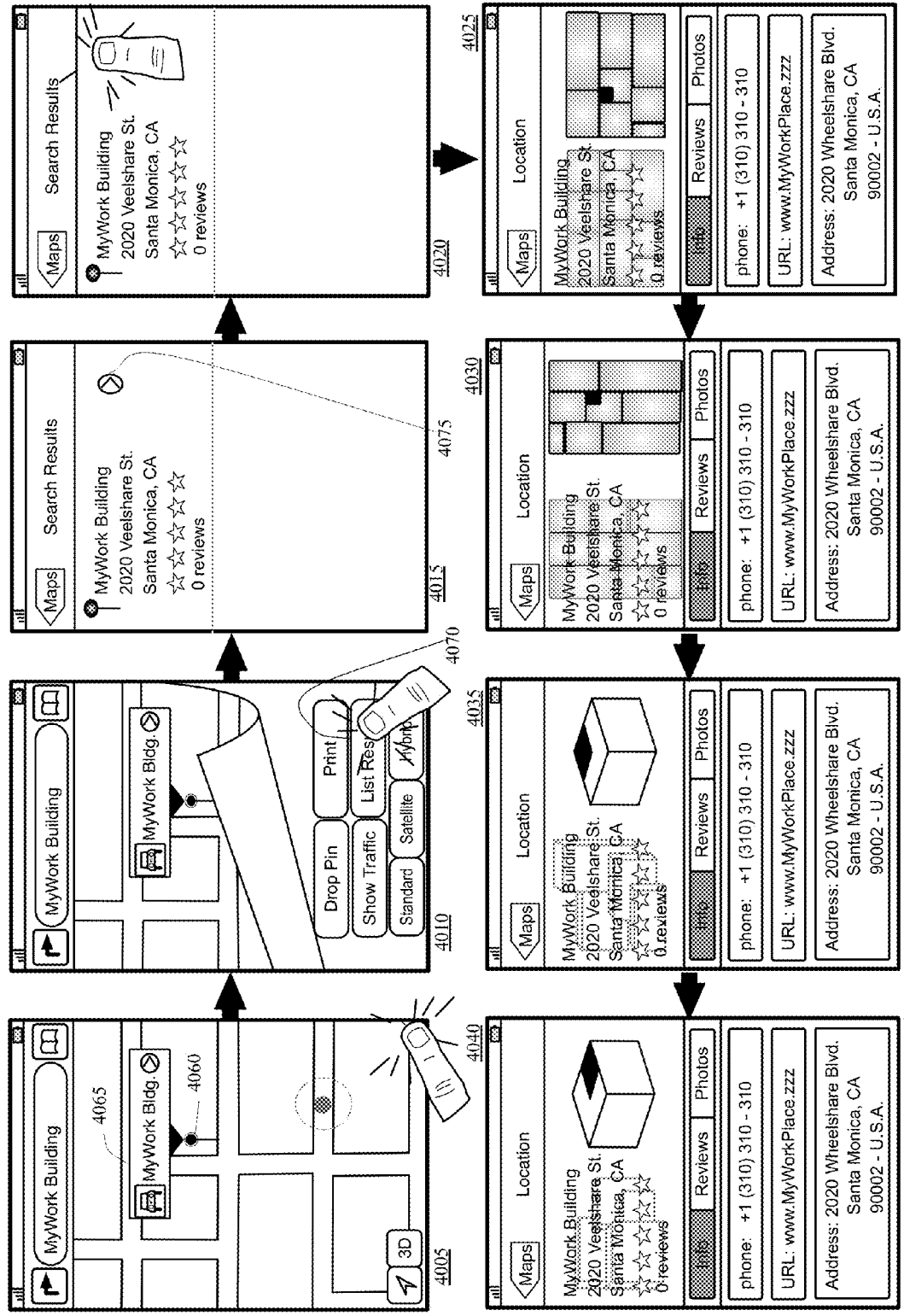
FIG. 40 conceptually illustrates displaying an animation of the satellite image of a location.

FIG. 40 conceptually illustrates the GUI 3800. Specifically, FIG. 40 illustrates in eight different stages 4005-4040 that the mapping application of some embodiments initially displays an animation of the satellite image of the POI in the media display area 3835 of the GUI 3800 and switches to a 3D animation of the POI when enough data for the 3D animation is obtained for displaying the 3D animation.

At the first stage 4005, the mapping application displays a pin 4060 and a banner 4065 as a result of entering a search query "MyWork Building." The user has also selected the lower right corner of the map to peel off the map and display a set of buttons, which are described above. The next stage 4010 shows the user selecting the "list" button 4070 to cause the mapping application to display the search results as a list.

At the third stage 4015, the mapping application displays a list of POIs after the user has selected list button 4070 at the previous stage 4010. The list in this example happens to include only one POI because the search query was sufficiently targeted for a specific result. The next stage 4020 shows the user selecting the entry 4075 to launch the "stage" for this POI. As shown, the user has selected the "MyWork Building" POI.

At the fifth stage 4025, the GUI 3800 has been launched. However, in contrast to the stage 3815 described above by reference to FIG. 38, the mapping application displays a satellite image of the actual building associated with the "MyWork Building" POI. The satellite image also shows other buildings near the building rather than an animated 3D view of the building. The satellite image is a 2D image of the top of the building taken from a significant distance from the top of the building (i.e., from a satellite). As shown, the mapping application also fades the portion of the image overlaid by the informational text so that the text appears clearly legible.

The next stage 4030 shows that the mapping application has rotated the satellite image clockwise to animate the satellite image. At the next stage 4035, the mapping application is cross fading the satellite image with the 3D animated view of the building because the mapping application has obtained enough data (e.g., from the map server or other source of the data) to display the 3D animated view of the building.

The next stage 4040 shows that the virtual camera for the 3D animated view has moved to another side of the "My Work Building." As shown, the black corner of the building now appears on the east direction of the media display area 3835 in order to show that the virtual camera has moved counter-clockwise with respect to the top of the building. Also, because the viewpoint of the virtual camera has changed, different neighboring buildings are displayed behind the informational text as shown.

Figure 41:
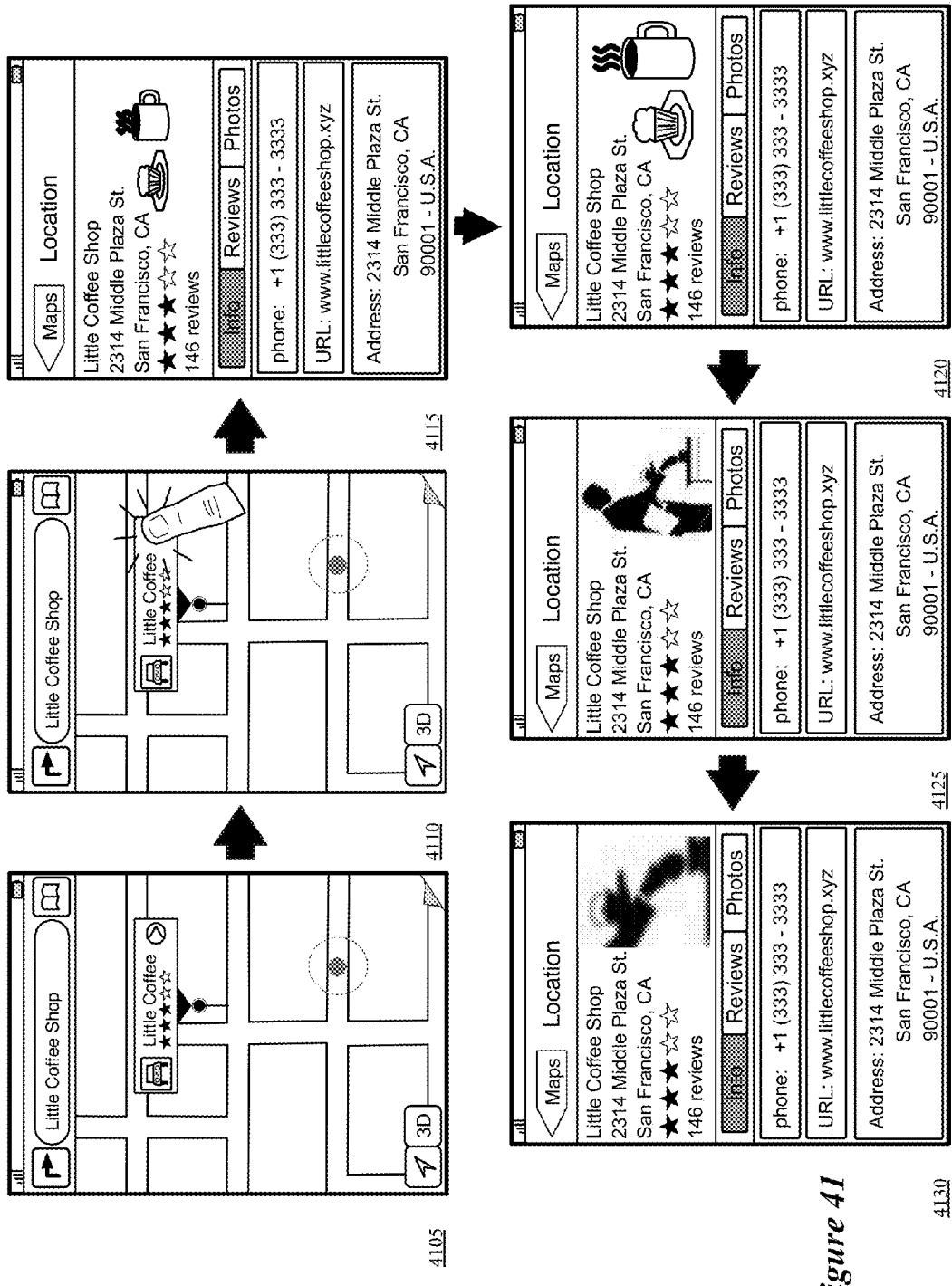
FIG. 41 illustrates displaying images of a location.

FIG. 41 conceptually illustrates the GUI 3800. Specifically, FIG. 41 illustrates in six different stages 4105-4130 that the mapping application of some embodiments initially displays images of the POI in the media display area 3835 of the GUI 3800 rather than an animated image of the building when images of the POI are more meaningful and informational to the user. For instance, when the selected POI is a business place (e.g., a restaurant or a coffee shop), the mapping application determines appropriate images to display based on user expectations. For example, the mapping application may show images of available food items and drinks of a restaurant, or show images of the interior setting of a coffee shop, etc., because such images may be more in line with user expectations rather than displaying exterior images of the building edifices in which these businesses are situated.

The first and second stages 4105 and 4110 are similar to the stages 3805 and 3810, respectively, in that the mapping application displays a set of POIs from which the user may select a POI. The second stage 4110 shows the user selecting a "Little Coffee Shop."

At the third stage 4115, the GUI 3800 has been launched. However, in contrast to the stages 3810 and 4025 described above by reference to FIGS. 38 and 40, the mapping application displays a set of images (e.g., images of coffee, donuts, etc.) rather than the images of the buildings. These images, as mentioned above, are gathered by information gathering entities such as Facebook, Twitter, etc. from which the mapping application obtains the information related to the selected POI.

Also as mentioned above, the mapping application of different embodiments employs different techniques to display the images. In this example, the mapping application is using a Ken Burns effect to sequentially display the images. The mapping application at this stage 4115 displays an image of a cup of coffee and a muffin that the Little Coffee Shop offers to customers (it is assumed that the customer or the owner of the shop snapped the image uploaded it to an information gathering entity, such as Yelp).

The next stage 4120 shows that the mapping application has zoomed in on the cup of coffee and the muffin as part of showing the images using the Ken Burns effect. The next stage 4125 shows that the mapping application is applying a cross fade to the image of the coffee and muffin with an image of the interior of the Little Coffee Shop. The next stage 4130 shows that the mapping application has completely zoomed in on the image of the interior.

Figure 42:
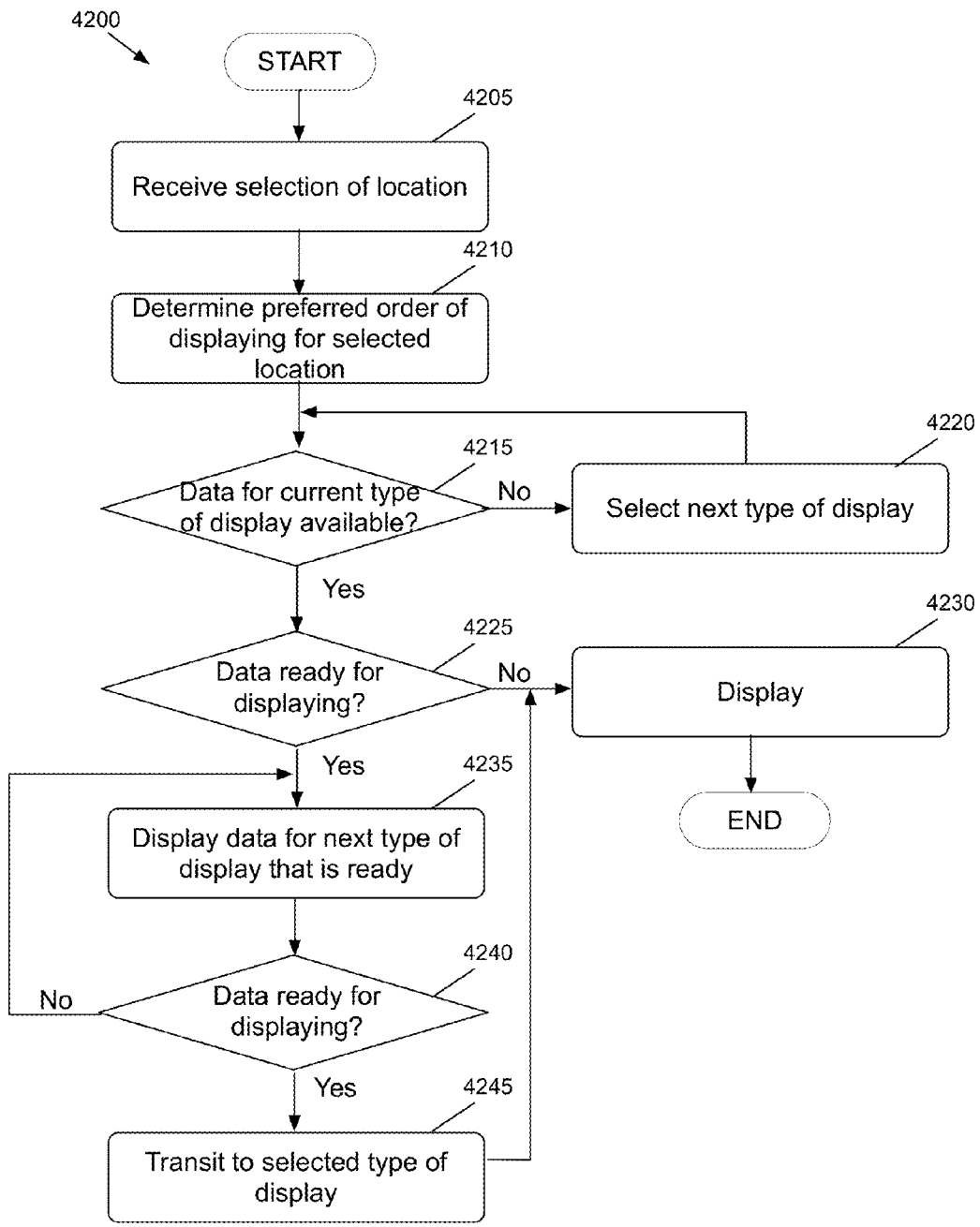
FIG. 42 conceptually illustrates a process that some embodiments perform to display different types of images when a "stage" is launched for showing detailed information about a location.

FIG. 42 conceptually illustrates a process 4200 that some embodiments perform to display different types of images when a "stage" is launched for showing detailed information about a POI. Specifically, the process 4200 is performed for displaying media in a media display area of the stage (e.g., the media display area 3835 displayed above by reference to FIGS. 38, 40, and 41). The process 4200 is performed by a mapping application in some embodiments. The process starts when the mapping application displays results of a search query.

The process 4200 begins by receiving (at 4205) a selection of a POI. The process 4200 receives the selection in one of several different ways. For instance, the process 4200 receives the selection when the user selects an arrow displayed in a banner displayed above a pin for the POI about which the user wishes to find more information. The process 4200 may also receive the selection when the user selects one of the POIs from a list of POIs that the mapping application of some embodiments displays upon the user's selection of a "list" button.

The process 4200 next determines (at 4210) the preferred order for displaying the different types of images. As mentioned above, there are different types of images that the mapping application of some embodiments displays. In some embodiments, the different types of images include images for the animated 3D view, satellite images, plain map images, images related to businesses (e.g., images of dishes offered, images of the interior setting, images of employees of the business, etc.).

In some embodiments, the process 4200 determines the preferred order based on the type of POI selected. For instance, when the POI is a business such as a restaurant, the process 4200 favors displaying images of available dishes offered by the restaurant. When the POI is a famous landmark like the Empire State Building, the process 4200 favors displaying images of the building and its surroundings. The process 4200 analyzes the data for the selected POI to determine the type of POI when determining the preferred order.

There are also different levels of images for a particular type of image. For instance, for images of landmarks, the different levels of images include animated 3D images, satellite images, plain map images, etc. These different image levels will contain different amounts of data and therefore take different amounts of time to retrieve the data through the network. For instance, the animated 3D images will likely contain the most amounts of data and therefore take the longest to download over the network from the source of the data.

The process 4200 then determines (at 4215) whether the data for the current level of images is available from the source. The process 4200 in some embodiments obtains the data from a map server or other server that serves the data upon receiving a request. However, not every POI has every level of images in the server. For instance, a building that is not well known or famous will likely not have image data for displaying a 3D animated view of the building. In some embodiments, by default, the current level of images to display is initially set to the 3D animated images level.

When the process 4200 determines (at 4215) that the data for the current level of images is not available, the process 4200 selects (at 4220) the next level of images to display for the POI. For instance, when the images for the animated 3D view are not available for the selected POI, the process 4200 selects (at 4220) the satellite image of the POI. The process 4200 then loops back to 4215 to determine whether the data for this next level of images is available.

When the process 4200 determines (at 4215) that the data for displaying the current level of images is available, the process 4200 determines (at 4225) whether all of the data has been received and whether the mapping application is ready to display the current level of images. In some cases, when the device on which the mapping application is running has a slow network connection through which to obtain the image data from the remote servers, there might not be enough image data to display the current level of images for the POI.

When the process 4200 determines (at 4225) that sufficient data for displaying the current level of images has been obtained, the process 4200 proceeds to 4230, which is described further below. When the process 4200 determines (at 4225) that the data for displaying the current level of images is not available, the process 4200 displays (at 4235) the next level of images ready to be displayed. That is, the process 4200 displays (at 4235) one of the next levels of images for which enough data has been obtained. When none of the next levels of images have enough data for displaying the images, the process 4200 displays a plain background image (a black image) in the media display area.

The process 4200 then determines (at 4240) whether the mapping application has obtained enough data for the current level of images. For instance, when the process 4200 displays a satellite image of the POI in the media display area, the process 4200 checks whether enough data for the animated 3D view has been obtained. When the process 4200 determines (at 4240) that insufficient data for the current level of images has been obtained, the process loops back to 4235 and keeps displaying the next level of images in the media display area while checking whether the data for the current level of images is ready.

When the process 4200 determines (at 4240) that enough data for the current level of images has been obtained, the process switches (at 4245) from the next level of images being displayed in the media display area to the current level of images. For instance, when the data for the 3D animated view is ready for display while displaying the satellite image of the POI, the process 4200 switches to the animated 3D view of the POI from the satellite image of the POI. Different embodiments use different techniques to make this switch. For instance, the process 4200 may apply a Ken Burns effect to make the transition from the next level of images to the current level of the images. The process 4200 next displays (at 4230) the current level of images. The process 4200 then ends.

Figure 43:
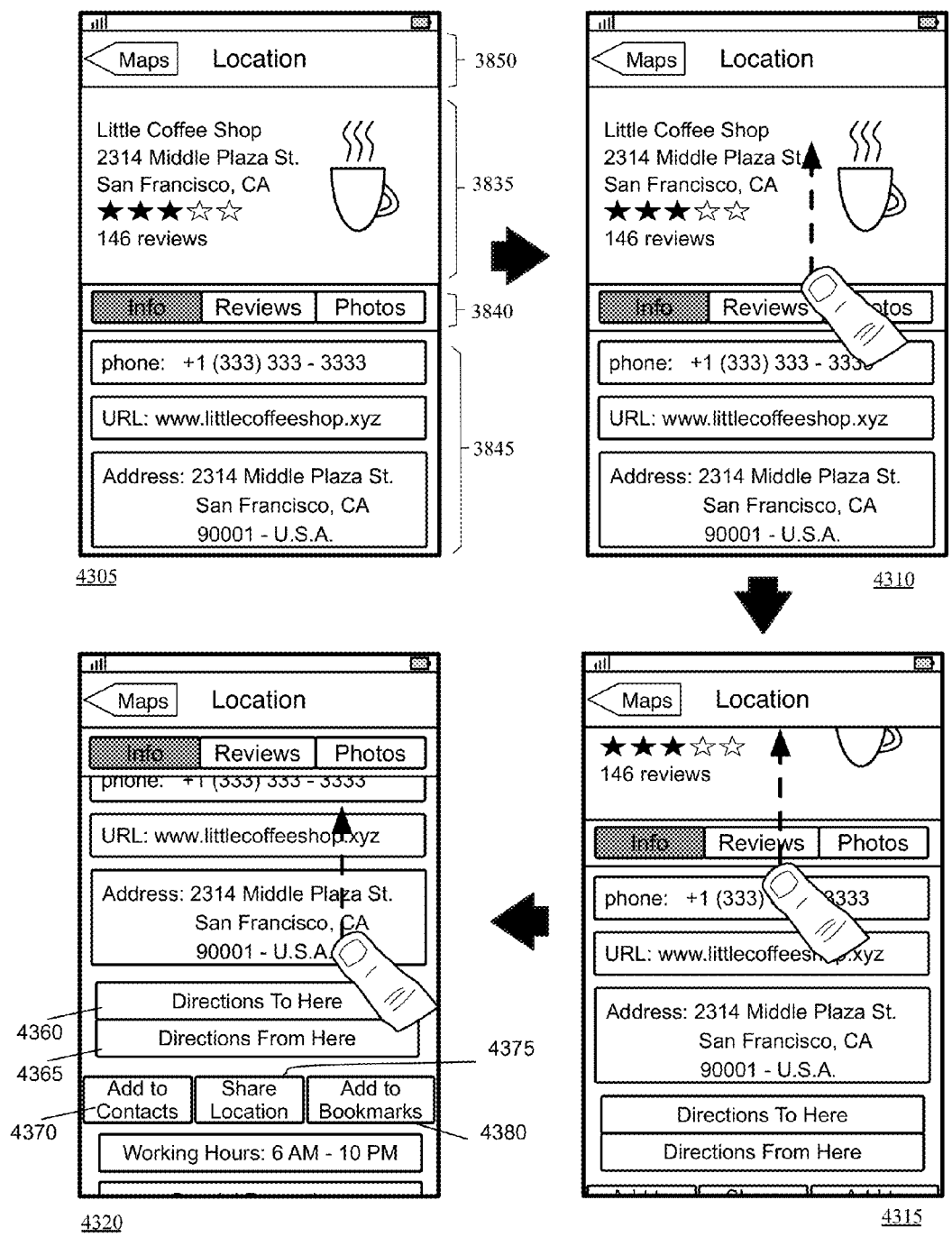
FIG. 43 illustrates scrolling off tabs.

FIG. 43 conceptually illustrates the GUI 3800. Specifically, FIG. 43 illustrates in four different stages 4305-4320 that the tabs 3840 are not scrolled off the "stage" (i.e., the GUI 3800) of a selected POI. In some embodiments, the GUI 3800 is scrollable. That is, the components of the GUI 3800 such as the media display area 3835, the tables 3840, and the information display area 3845 move up and down as the user scrolls the GUI 3800 up and down.

As mentioned above, the tabs 3840 are tabs for displaying different sets of entries grouped for different types of information associated with the different tabs. That is, the mapping application of some embodiments obtains the data that is related to the POI from different data gathering entities (e.g., tweets, RSS feeds, updates from Facebook, Yelp, Yahoo, Twitter, blogs, etc.) and categorizes the data into different groups based on the type of information contained in the data. For instance, the mapping application would categorize pieces of data carrying reviews about the POI into a "reviews" group and display them as entries in the information display area 3845 when the user selects the "reviews" tab. Different embodiments use different techniques to recognize the type of information that a piece of data is carrying. For instance, the mapping application looks for a set of keywords in the pieces of data.

Examples of tabs that the user might create or the mapping application may additionally provide include "activities" or "events" tabs which, when selected, would include any time-related information about the POI. For example, if the selected POI is a Major League ballpark, the entries under this tab may include information about the scheduled games for the team associated with the ball. As another example, when the selected POI is a movie theater, a selection of an entry may cause the mapping application to launch a ticket purchase application (e.g., Fandango) which the user can use to buy tickets for the available movies at that theater. One of ordinary skill will recognize that there are many other possible tabs that may be created with various functionality corresponding to the type of tab.

In some embodiments, the mapping application allows the user to create a new group by defining several keywords that the mapping application uses to sift the obtained pieces of data. In these embodiments, the mapping application adds a new tab for the new group and lists the pieces of data that include the keywords when the new tab is selected. When the mapping application includes a threshold number of tabs that can be displayed for a stage of the POI, the mapping application of some embodiments renders the tabs 3840 scrollable (e.g., horizontally) so that the user can scroll the tabs 3840 and select any desired tab. The mapping application of some embodiments also allows the user to remove an undesired tab.

As mentioned above, the GUI 3800 is scrollable vertically. However, the tabs 3840 will not get scrolled off the screen of the device regardless of the user's scrolling of the GUI 3800. That is, for example, when the GUI 3800 is scrolled upward such that the tabs 3840 would have fallen off of the screen, the mapping application of some embodiments keeps the tabs 3840 within the screen display area and slides the information display area 3845 underneath the tabs 3840.

An example operation of the GUI 3800 when the user scrolls the GUI 3800 is described by reference to the four stages 4305-4320 of FIG. 43. The first stage 4305 shows the GUI 3800 that is launched after the user's selection of the "Little Coffee Shop" from the map displaying the pin and banner for this POI or from the list of POIs.

The second stage 4310 shows the user making an upward swiping gesture from a location of the GUI 3800. The third stage 4315 shows that the media display area 3835, the tabs 3840, and the information display area 3845 have moved up within the screen. In particular, the media display area 3835 has almost entirely been scrolled off the screen, appearing to have slide underneath the top bar 3850. The mapping application has also expanded the information display area 3845 to display more entries for the selected info tab. The user is also making another upward swiping gesture (or continuing the initial upward swiping gesture, with or without pause) to scroll the GUI 3800 further up.

The fourth stage 4315 shows that the tabs 3840 have moved up below the top bar 3850 and the user moving the GUI 3800 even further up. However, the tabs 3840 have not fallen off of the screen nor slid underneath the top bar 3850. The mapping application has also stopped expanding the information display area 3845. As the user scrolls up the GUI 3800 further, the mapping application slides entries displayed in the information display area 3845 underneath the tabs 3840 and the top bar 3850 and brings out from the bottom of the information display area 3845 more entries that were previously not displayed in the information display area 3845, as shown in the fourth stage 4320.

The fourth stage 4320 also illustrates that the mapping application of some embodiments displays a set of selectable UI items 4360-4380. The UI item 4360 is for showing directions to the POI from the current location. The UI item 4365 is for showing directions from the POI to the current location. The UI item 4370 is for adding this POI into the contacts list of the mapping application. The UI item 4375 is for sharing this POI with other mapping applications for other devices of other users. The UI item 4380 is for adding this POI as a bookmark.

Figure 44:
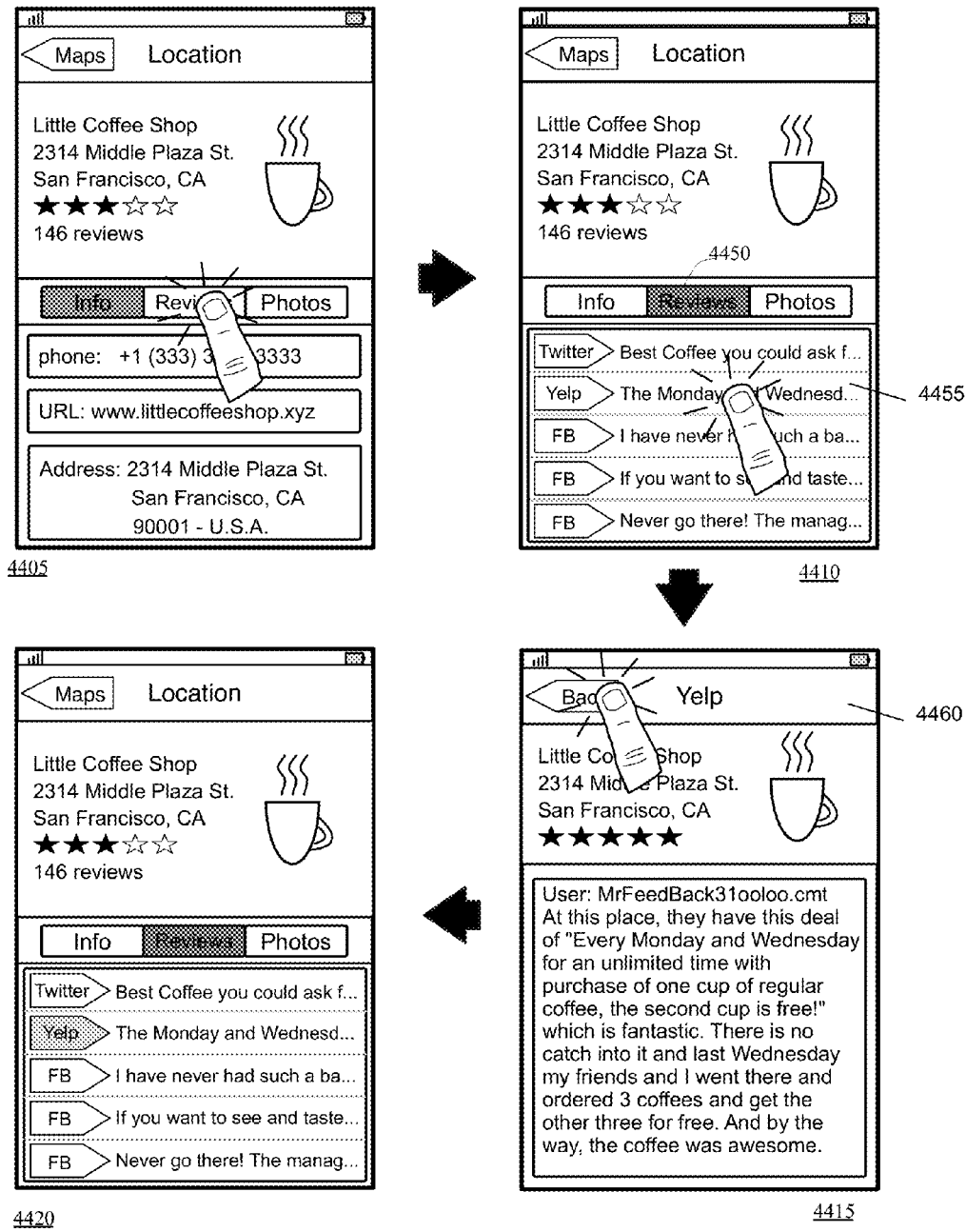
FIG. 44 illustrates launching a third-party application when the user selects an entry displayed in an information display area.

FIG. 44 conceptually illustrates the GUI 3800. Specifically, FIG. 44 illustrates four different stages 4405-4420 of the mapping application of some embodiments for launching a third-party application when the user selects an entry displayed in the information display area 3845.

In some embodiments, when an entry is selected from a list of entries displayed upon a selection of a tab of the "stage" for a selected POI, the mapping application launches a third-party application or opens up the third-party's website in a browser application that is concurrently running on the device on which the mapping application is running. The third-party application is typically the source (e.g., Yelp) of the selected entry. For example, when the user taps on a review displayed in the information display area 3845, the mapping application of some embodiments launches the third-party application (e.g., a Yelp application) to show the full text of the selected review or to allow the user to add a new review. In these embodiments, the mapping application will also provide means for the user to get back to the "stage" for the POI (e.g., the GUI 3800). For instance, the mapping application may display a "back" button in a top bar for the third-party application, which when selected will cause the "stage" for the POI to re-display.

In other embodiments, the mapping application does not launch a third-party application when an entry is selected from the list of entries. Instead, the mapping application will display the information associated with the entry "in place." That is, for example, the mapping application may expand the entry in the information display area 3845 and display the full review or provide the means to add a new review without leaving the mapping application. The mapping application of these embodiments would utilize an application programming interface (API) to request and obtain the full review from the source. The API in some embodiments is provided by the source (e.g., Yelp).

The first stage 4405 of FIG. 44 illustrates a user's selection of the reviews tab 4450. In the second stage 4410, the mapping application, upon receiving the selection, displays several reviews related to the Little Coffee Shop. As shown, the reviews originate from different sources such as Twitter, Facebook, Yelp, etc. In some embodiments, each review entry includes limited amounts of information. The mapping application of some of these embodiments allows the user to view the full review when the user selects the particular entry.

The second stage 4410 displays a user's selection of a review 4455 from the list of reviews displayed in the information display area 3845. In this example, the review 4455 originated from Yelp, as shown. The third stage 4415 shows that the mapping application has launched the Yelp application. The Yelp application displays the full content of the review 4455. The top bar 4460 of the page includes a "back" button, which when selected causes the mapping application to display the GUI 3800 again with the "reviews" tab selected. The third stage 4415 also shows the user selecting the back button. The fourth stage 4420 shows the GUI 3800 displayed once again. This stage shows the GUI 3800 identical to the GUI 3800 at stage 4410.

Figure 45:
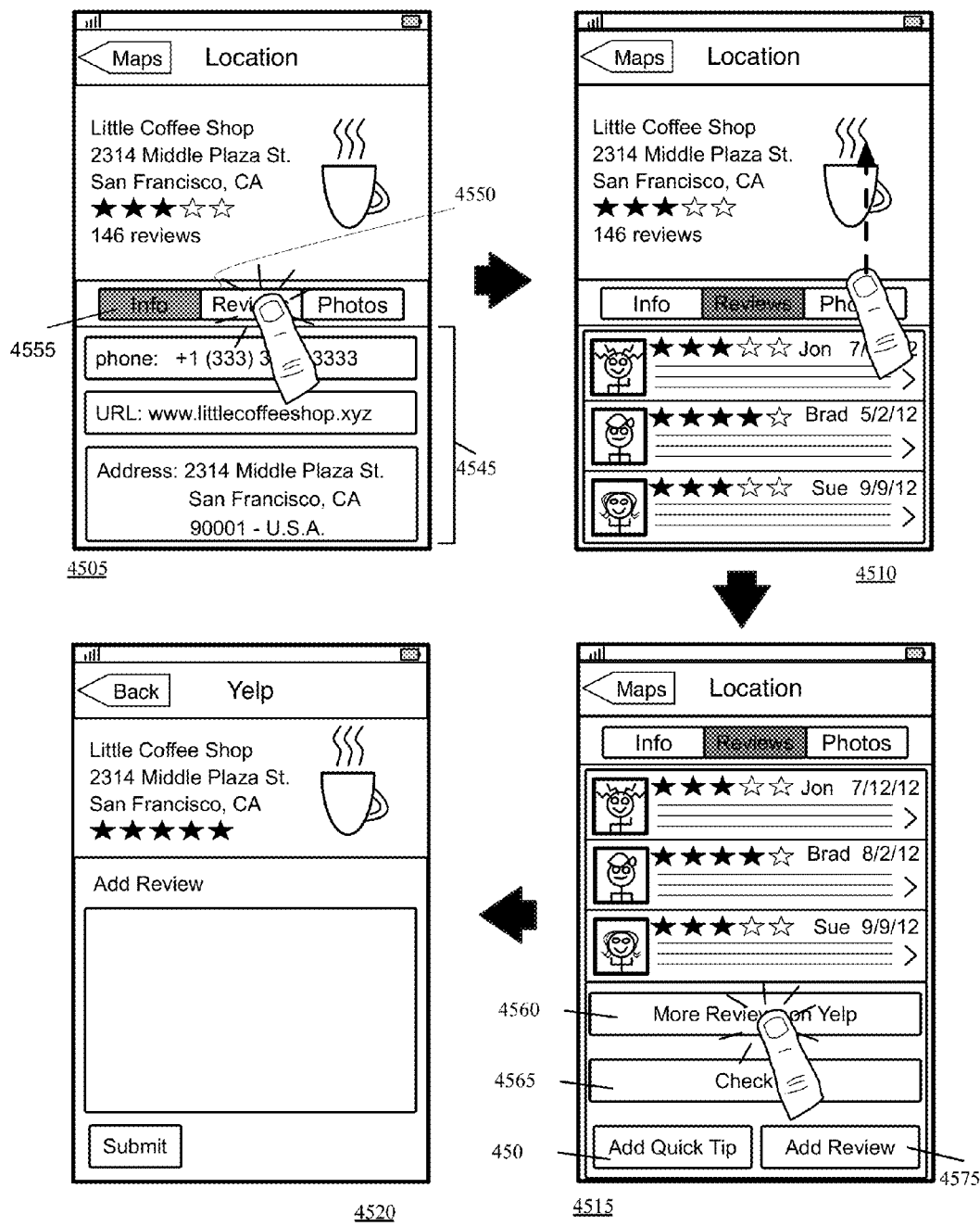
FIG. 45 illustrates launching a third-party application when the user selects a UI item for the third-party application.

FIG. 45 conceptually illustrates the GUI 3800. Specifically, FIG. 45 illustrates four different stages 4505-4520 of the mapping application of some embodiments for launching a third-party application when the user selects a UI item for the third-party application.

The first stage 4505 illustrates a user's selection of the reviews tab 4550 when the info tab 4555 is the currently selected tab. In the second stage 4510, the mapping application, in response to receiving the selection of the reviews tab, displays reviews related to the Little Coffee Shop. As shown, each review entry includes a thumbnail image of the person, star rating of the person, the date the review was uploaded, and the review (depicted as lines). The reviews originate from different sources such as Twitter, Facebook, Yelp, etc. The second stage 4510 also illustrates that the user is scrolling up the GUI 3800.

The third stage 4515 illustrates that the mapping application of some embodiments displays a set of selectable UI items 4560-4575 towards the bottom of expanded information display area 4545 as the GUI 3800 is scrolled up. The UI item 4560 is for launching a third-party application (e.g., Yelp's mobile application) or a website (e.g., Yelp's website) to view more reviews on the POI. The UI item 4565 is for launching another third-party application (e.g., Facebook's mobile application) or a website (e.g., Facebook's website) to trigger a special feature that the third-party application offers (e.g., check-in from Facebook). The UI item 4570 is for adding a quick tip. In some embodiments, a quick tip is a type of review in which the mapping application does not have to rely on a third-party application (i.e., without going through the third-party application or a website). The UI item 4575 is for adding a review. In some embodiments, the selection of the UI item 4575 causes the mapping application to launch a third-party application or a website to leave a review. The third stage 4515 also shows the selection of the UI item 4560.

The fourth stage 4520 illustrates a third-party application (e.g., Yelp's mobile application) that allows the user to add a review about the POI.

In some embodiments, the information provided by a third-party application (e.g., Yelp) may be different for different users based on the user's personal preferences for the particular third-party application. In order to determine a particular user's preferences, the mapping application communicates with the third-party application to determine the user's preferences and to retrieve information tailored for the user. In some embodiments, in order to display the user's personalized information from the third-party application, the user must have the third-party application installed on the same device that the user is using to run the mapping application. Furthermore, the user must also be currently logged into the third-party application in some embodiments. For example, a user must have the Yelp application downloaded on the same device they are using to run the mapping application and the user must be logged on the Yelp application at the time that they are accessing the Yelp feature from the mapping application. If the user satisfies these conditions, the particular information about a POI that gets displayed using the mapping application for the user will be tailored according to their personal preferences. Thus, different users will see different information on the POI based on the user's personal preferences.

In order to apply a particular user's preferences, the mapping application and the third-party application must first verify certain information. The mapping application initially verifies with the third-party application that the user is currently logged into the third-party application. After verifying that the user is currently logged into the application, the mapping application forwards data related to the particular POI (e.g., identification of the particular POI) in which the user is interested to the third-party application. The third party application retrieves the information related to the POI for the particular user and returns the information to the mapping application. The mapping application then displays the information "in place" (e.g., without going to the third-party application) to the user according to the user's preferences in some embodiments.

In some embodiments, the mapping application obtains authentication information (e.g., a token) from the third-party application. The mapping application uses this token to access the server serving up the information about POIs to the third-party application. For instance, the Yelp application has been authenticated and authorized to access the Yelp server. Then, the mapping application can be authorized to access the Yelp server by using the authentication information obtained from the Yelp application running on the same device. In these embodiments, the user's personal preferences would be maintained by the server so that when the mapping application asks for information (e.g., reviews) about a POI, the server returns the information that is conforming to the user's preferences. In other embodiments, it is not required that the user has logged into the third party application. In these embodiments, the mapping application may have the user log in directly to the server through the mapping application.

Figure 46:
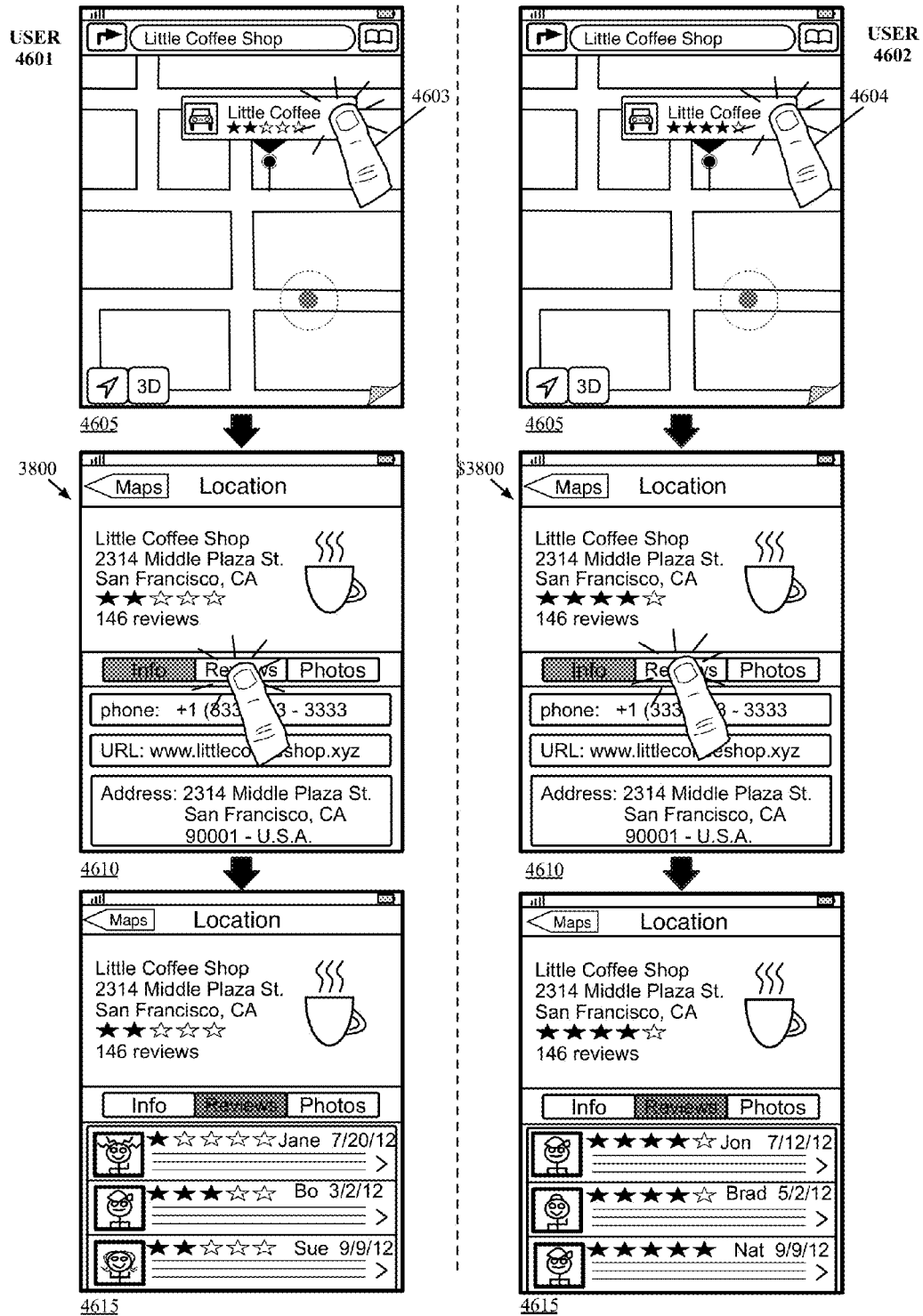
FIG. 46 illustrates the two mapping application instances running on two different devices for two different users showing two different sets of information for the same location.

FIG. 46 illustrates the two mapping application instances running on two different devices for two different users 4601 and 4602 (users not shown in the figure) showing two different sets of information for the same POI obtained from a particular third party application that is running on the two different devices. FIG. 46 illustrates the mapping application for each user in three stages 4605-4615.

During the first stages 4605, both users are viewing the map view of the mapping application. They have both searched for "Little Coffee Shop" using the search bar. Both users are also selecting the arrow (not shown, blocked by fingers 4603 and 4604 of the users 4601 and 4602, respectively) to launch the stage of the POI. At the second stages 4610, the GUI 3800 has been launched. The mapping application displays various information regarding the POI, including the address, telephone number, URL for the website, and user reviews, as shown. The users 4601 and 4602 are both also selecting the reviews tab 4550 to obtain information regarding user reviews of the coffee shop.

At the third stages 4615, the GUI 3800 shows the reviews obtained from the third-party application (e.g., Yelp). However, the user reviews that are displayed are different for the two users 4601 and 4602 because these reviews are retrieved based on the user's personal preferences. The first user sees three reviews by Jane, Bo and Sue whereas the second user sees reviews from Jon, Brad and Nat. This may occur when the users 4601 and 4602 have specified different personal preferences for the particular third party application. The first user 4601 may have indicated to the third-party application (i.e., Yelp in this example), that the user 4601 only wants to see reviews made by "food experts" and thus the reviews from Jane, Bo, and Sue who are experts are displayed. The second user 4602 may have indicated that the user 4602 wants to see reviews from everyone, and thus the reviews from Jon, Brad, and Nat who may be experts and non-experts are displayed. Thus, each user obtains information from the third-party application for a particular POI that is customized and tailored to their personal preferences.

Figure 47:
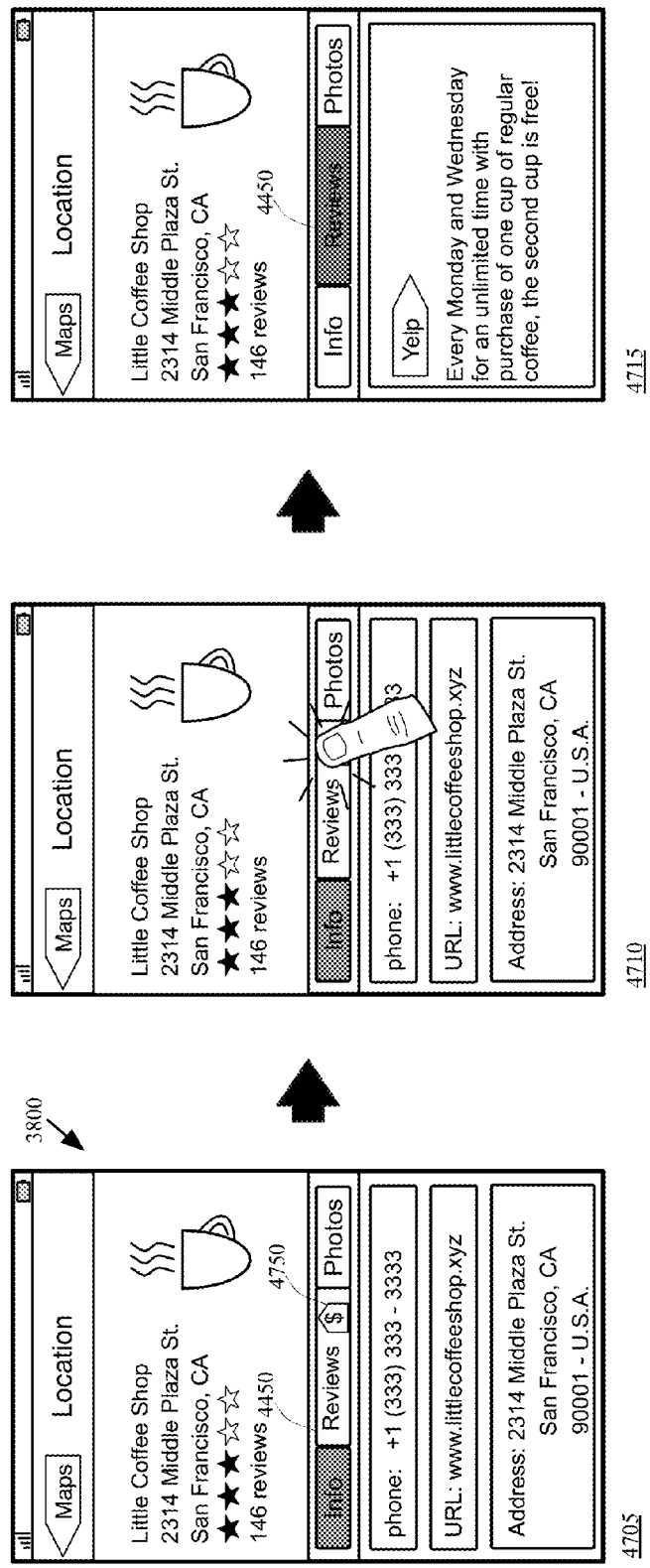
FIG. 47 illustrates displaying a tag on a tab in a stage for a selected location.

FIG. 47 conceptually illustrates the GUI 3800. Specifically, FIG. 47 illustrates in three different stages 4705-4715 that the mapping application of some embodiments displays a tag on a tab in a stage for a selected POI and displays a particular piece of information when the tag is selected.

In some embodiments, the mapping application displays a tag on a tab of the GUI 3800 to indicate an entry, which would be displayed upon selection of the tab, includes special information about the POI. For instance, a tag could be a "deal" tag that shows the POI has a deal and that information about the deal may be included in one of the entries that would be displayed upon the selection of the tag or the tab that has the tag on it. As such, a tag serves as an unread mark that indicates that there is an entry that the user has not viewed since the entry was obtained from its respective source.

The first stage 4705 shows the GUI 3800. The reviews tab 4450 has a tag 4750 attached to the tab. In some embodiments, the tag 4750 appears on the tab 4450 when an entry that includes information about the deal of the POI exists. The mapping application of different embodiments uses different appearances of tags. For instance, in some embodiments, the tag resembles a physical tag that is attachable to a document. The tag also includes one or more dollar signs to indicate that the POI has a money-saving deal for the customers of the POI.

The next stage 4710 displays a selection of the tag 4750 (e.g., by tapping). The third stage 4715 shows that the tag has disappeared from the tab 4450 and an entry for the deal is displayed in the information display area 3845. In some embodiments, the mapping application instead launches a third-party application or opens up the third-party's website in a browser application that is running on the device on which the mapping application is running. The third-party application or the webpage will then show the details of the deal for the selected POI.

Figure 48:
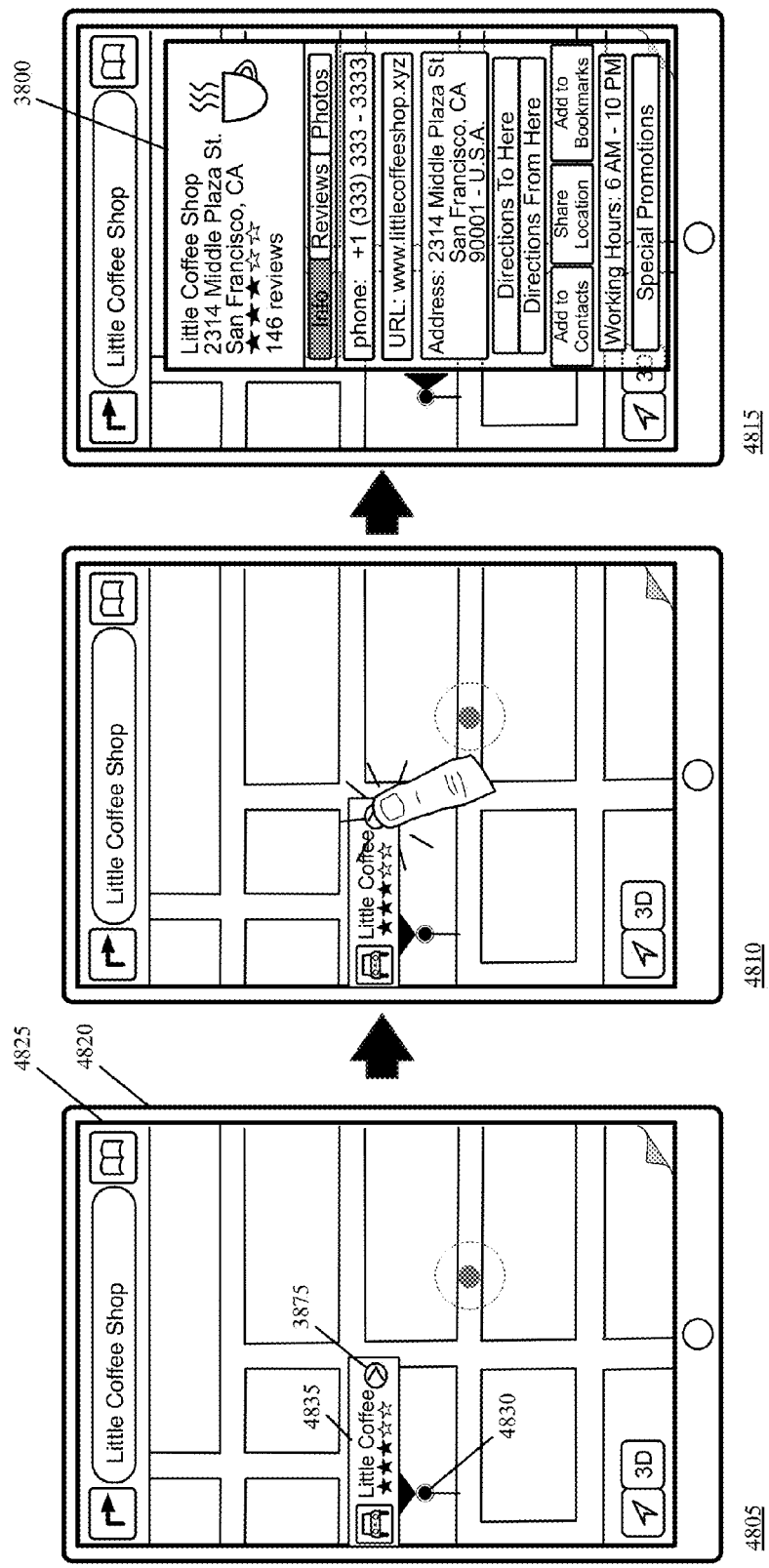
FIG. 48 illustrates a user's interaction with the mapping application of some embodiments to display a "stage" for a particular location.

FIG. 48 conceptually illustrates an example of the "stage" (e.g., the GUI 3800) of a POI displayed in a display area of a device 4820 that provides a relatively large display area. An example of such a device is a tablet device (e.g., iPad® sold by Apple Inc.). Specifically, Figure 48 illustrates in three different stages 4805-4815 a user's interaction with the mapping application to display the "stage" for a particular POI. As illustrated, the device 4820 provides a larger screen display area 4825 for viewing the mapping application compared to a device that has a relatively small display area (e.g., a smartphone such as iPhone® sold by Apple Inc.). The larger display area allows the mapping application to efficiently utilize the screen space to display different GUIs within the same map view and to minimize switching to different GUI screens. In particular, when a user selects the arrow for a particular POI, the mapping application opens up the "stage" for the POI directly overlaid on top of the map view of the mapping application without changing to a new GUI page.

At the first stage 4805, the mapping application displays a pin 4830 and a banner 4835. The banner may be the result of a user entering a search query for "Little Coffee Shop". The second stage 4810 illustrates the user selecting the arrow 3875 to launch the "stage" for this POI. At the third stage 4815, the mapping application has launched the GUI 3800 for the stage. The GUI 3800 is displayed in its entirety within the map view of the mapping application. In some embodiments, when the user is viewing the mapping application in a portrait orientation, the mapping application displays the "stage" for a particular POI in its entirety. In some embodiments, when the user views the mapping application on a tablet in a landscape orientation, the mapping application displays the "stage" for the POI, but the user may be required to scroll through the "stage" to view all of the information.

IV. Route Generation

As mentioned above, the mapping application tightly integrates the search and route identification experience by providing several different ways to get directions. One such way is through a selectable direction UI control (e.g., button) on the main map view (e.g., in the top left corner), which when selected presents a modal interface for editing directions and that enables the user to request more customized routes, such as routes that do not begin from the current location or a walking route instead of just driving routes.

In some embodiments, the mapping application allows the user to inspect these customized routes by sliding the signs showing maneuver instructions in and out of the UI page showing a route. This mode of operation of the mapping application is referred to as a route inspection mode or (manual) stepping mode, which is one of several modes of operation in which the mapping application of some embodiments is capable of operating. Examples of these operational modes include a navigation mode, a map browsing mode, and the route inspection mode.

A juncture is where two or more road segments meet. A route is a path between a starting location and a destination location in the map. A typical route has zero or many junctures along the path between the two locations. A maneuver instruction for a juncture in the route identifies the direction of the road segment to advance from the juncture. In some embodiments, the mapping application provides the user with a maneuver instruction only for some of the junctures along the route because the user may not need to perform a maneuver at every juncture in the route in order to reach the destination location. For instance, the user carrying the device may recognize that the user only needs to go straight by passing through several junctures until the user reaches a juncture at which to make a turn to get to the destination location. In this patent application, when a juncture has a maneuver instruction to display, that maneuver instruction is referred to as a "step."

In the navigation mode, the mapping application of some embodiments provides the user with a set of steps for a route between the device's current location to a destination location. Typically, the mapping application provides the user with these steps visually and audibly in the navigation mode. When the user carrying the device deviates from the route, the mapping application of some embodiments tracks the location of the device and re-calculates a new route from the deviated location in order to re-direct the user to the destination location from the deviated location. In other words, the mapping application of some embodiments operating in the navigation mode requires the device to be on a route at all times. Also, the mapping application of some embodiments operating in the navigation mode displays the steps by "popping up" the step rather than sliding the steps in and out of the display area. Furthermore, the information in the step (i.e., the maneuver instruction) that the mapping application displays while operating in the navigation mode is dynamic in some embodiments. That is, information such as estimated time of arrival, remaining time of the trip to the destination location, remaining distance from the current location of the device to the destination location or the next juncture with next step, etc. get updated by the mapping application as the device is moving along the route.

In the route inspection mode, the mapping application of some embodiments allows the user to slide the steps in and out of the display area to inspect each step in the route. Alternatively, the mapping application allows the user to manipulate the map (e.g., by zooming in and out, sliding the map in different directions) to display different junctures in the route. When a juncture with a step is displayed in the display area as a result of the user's manipulation of the map, the mapping application displays the step by sliding in the step (and sliding in and out any intermediate steps between the previously displayed step and the currently displayed step). In this manner, the user can inspect the route by manually sliding the steps in and out of the display area or by manipulating the map to display certain junctures of the route in the display area.

A. Route Initiation and Search

Figure 49:
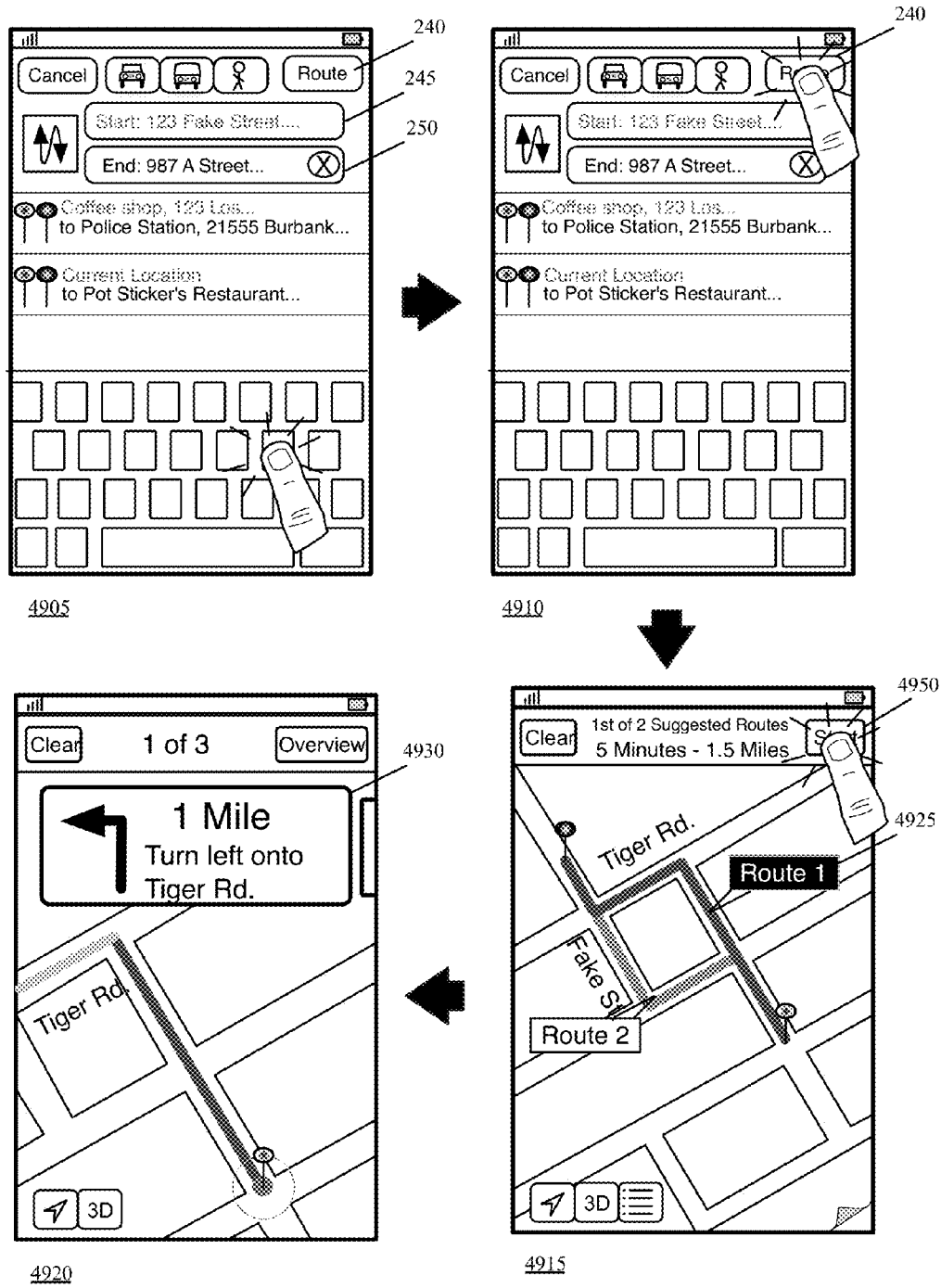
FIG. 49 illustrates an example of a user's interaction with the mapping application to obtain routing directions.

FIG. 49 illustrates an example in terms of four stages 4905-4920 of a user's interaction with the mapping application to obtain routing directions. Specifically, this figure illustrates that the mapping application starts to operate in the route inspection mode. The first stage 4905 illustrates the device after the user has selected the direction control 160 (not shown in this figure). The first stage 4905 also illustrates that the user has entered starting and ending locations for the route in the starting and ending fields 245 and 250.

The second stage 4910 illustrates the selection of the route generation control 240. In some embodiments, when the route generation control is selected, the mapping application sends the starting and ending locations information to a remote server to obtain the routes. The third stage 4915 shows two routes, route 1 and route 2 which the mapping application renders on the map based on the route information obtained from the remote server in some embodiments. The third stage 4915 also illustrates that the mapping application has selected route 1 by default. The user selects the start control 4950 for starting the navigation according to the selected route. The mapping application of some embodiments starts to operate in the route inspection mode upon receiving a selection of the start control 4950.

The fourth stage 4920 illustrates that the mapping application displays an instruction sign 4930, which in some embodiments is the first sign of a series of turn-by-turn instruction signs (not all of them shown in the figure) for browsing the selected route. The mapping application allows the user to browse the selected route by sliding the signs along a particular axis (e.g., horizontally). These scrollable instruction signs are described in detail further below. In some embodiments, the mapping application allows the user to browse the selected route when the starting location of the selected route is not the user's current location. Also, the mapping application of some embodiments disables or does not display the page curl when the mapping application is in this mode for allowing the user to browse or inspect a selected route as shown in this stage 4920.

Figure 50:
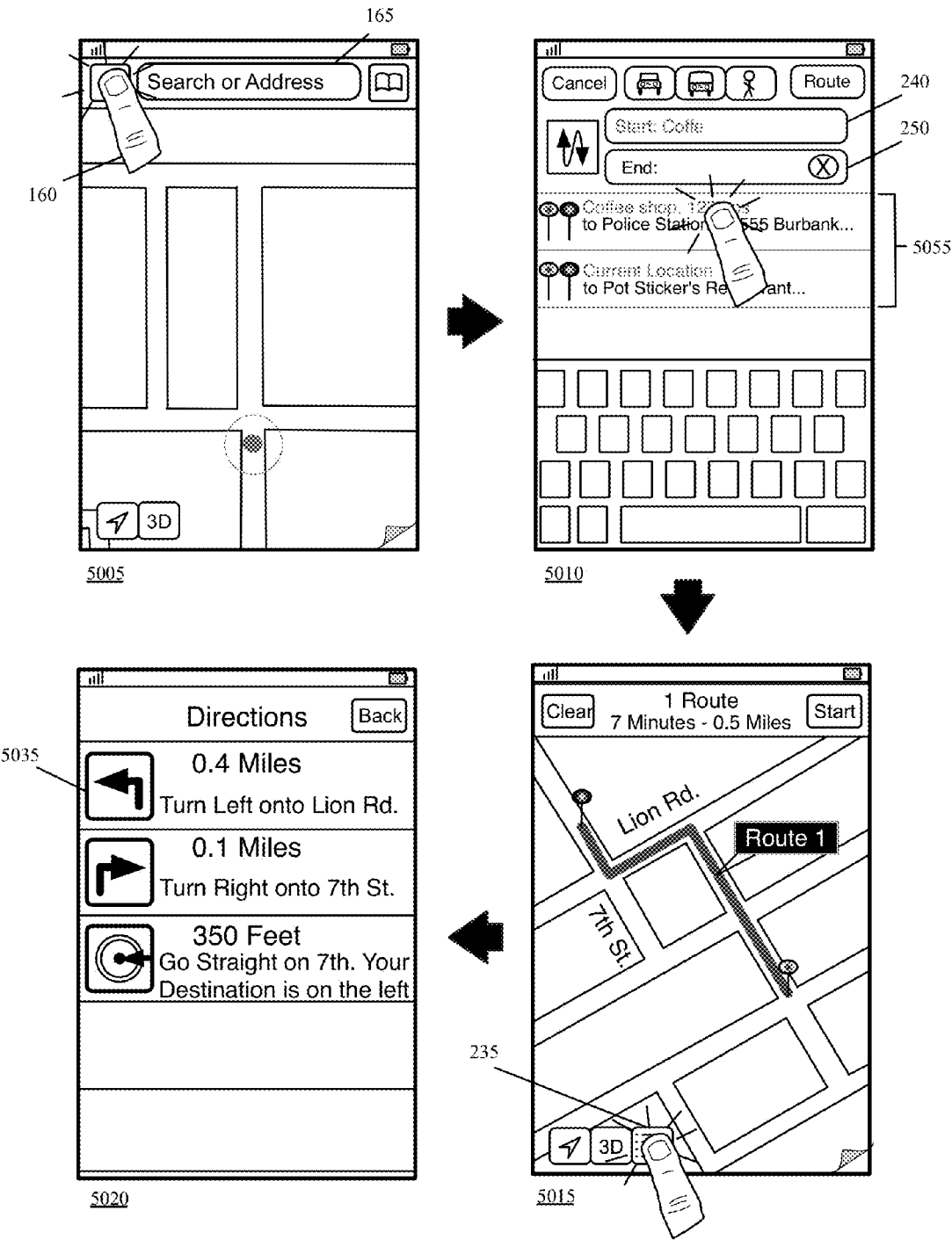
FIG. 50 illustrates an example of a user's interaction with the mapping application to obtain routing directions.

In addition to entering starting and ending locations for the route in the starting and ending fields 245 and 250, the mapping application of some embodiments allows the user to select a route from a list of previously searched routes. FIG. 50 illustrates an example in terms of four stages 5005-5020 of a user's interaction with the mapping application to obtain routing directions. This example is provided in the context of using the direction control 160 to obtain a route between two locations.

The first stage 5005 illustrates the mapping application displaying a map of a street view of a city. The user is initiating a tap of the direction control 160 located at the top left corner of the display next to the search field 165. The second stage 5010 next illustrates that the application presents a search table 5055 with a list of recent route directions that the user has previously searched. In this example, the user selects a route to a police station as shown.

The third stage 5015 illustrates the display of a map with the selected route between the device's current location to the destination for the selected route. This stage 5015 also illustrates the selection of the list view control 235. The fourth stage 5020 illustrates that the mapping application presents a list of turn-by-turn instructions to get to the destination. As shown, each instruction in the list includes a direction icon 5035 that shows the directions for the particular turn associated with the instruction. In some embodiments, each instruction in the list looks identical to a corresponding instruction sign 4935 described above by reference to FIG. 49.

Figure 51:
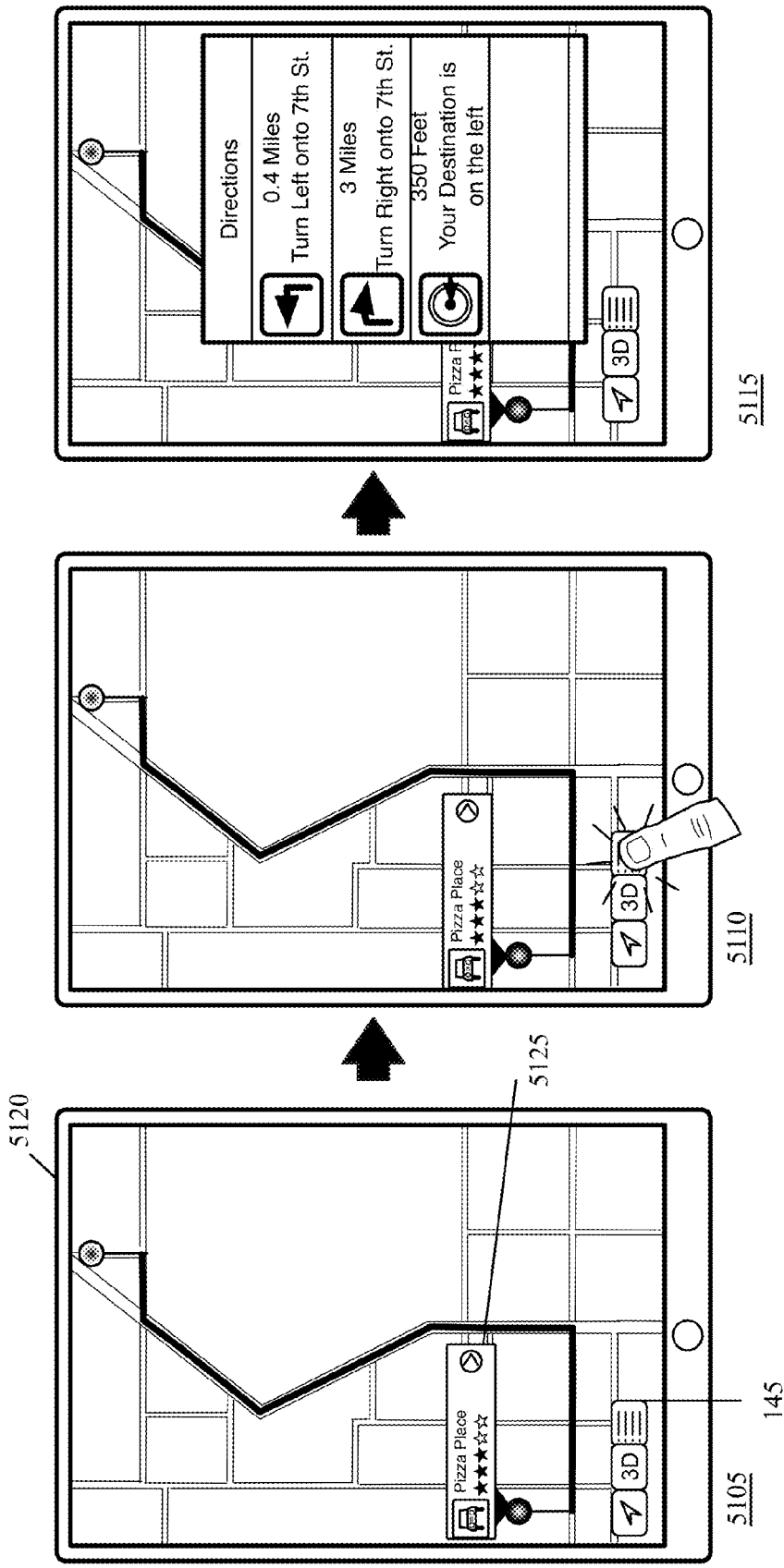
FIG. 51 conceptually illustrates an example of displaying routing directions in a display area of a device that is relatively large.

FIG. 51 conceptually illustrates an example of displaying routing directions in a display area of a device that is relatively large. An example of such a device is a tablet device (e.g., iPad® sold by Apple Inc.). Specifically, FIG. 51 illustrates in three different stages 5105-5115 a user's interaction with the mapping application to display a set of routing directions. As illustrated, the device provides a larger screen display area for viewing the mapping application when compared to display areas of smaller devices (e.g., a smartphone such as iPhone® sold by Apple Inc.). The larger display area allows the mapping application to efficiently utilize the screen space to display different UI items within the map view of the mapping application and to minimize changing the UI screens. For instance, when a user selects to view a list of routing directions, the mapping application displays the list routing directions directly overlaid onto the map without changing to a different UI screen.

The first stage 5105 illustrates a tablet device 5120 running a mapping application of some embodiments that is displaying a map view of a particular route between two locations. In particular, the user has obtained a route between the user's current location and the location for the POI "Pizza Place". The user may have obtained this route through several avenues, including the search feature, placing pins on the map, and various other mechanisms. The mapping application is also displaying a set of floating controls, including the list view control 145.

The second stage 5110 shows that the user is selecting the list view control 145 to obtain a list of the routing directions. The third stage 5115 illustrates that the mapping application now displays the list of routing directions overlaid on a portion of the map view of the mapping application.

In some embodiments, when the user selects individual routing directions from the list of routing directions, the mapping application displays the corresponding portion of the route associated with the selected routing direction on the map. If the corresponding portion of the route is not within the currently displayed map region, the mapping application shifts the map such that the region of the map that contains the corresponding portion is displayed.

B. Route Display and Review

In some embodiments, the mapping application allows a user to select and scroll through a set of selectable UI items representing the signs of the junctures along a selected route when the application presents the identified route to the user. As the user scrolls through each sign, the portion of the route associated with the currently in-focus sign is presented or highlighted (e.g., through color highlighting or through another geometry such as a circle or other mark, marking the portion). This operational mode of the mapping application of some embodiments is referred to as a route inspection mode. The mapping application operating in this mode allows the user to inspect the road by manipulating the UI items representing the instructional signs of some junctures of the route. In some embodiments, the mapping application operates in the route inspection mode (1) when the route being inspected is between two locations, neither of which is the current location of the device on which the mapping application is running, and (2) when the route is computed for walking (as opposed to driving) directions.

Figure 52:
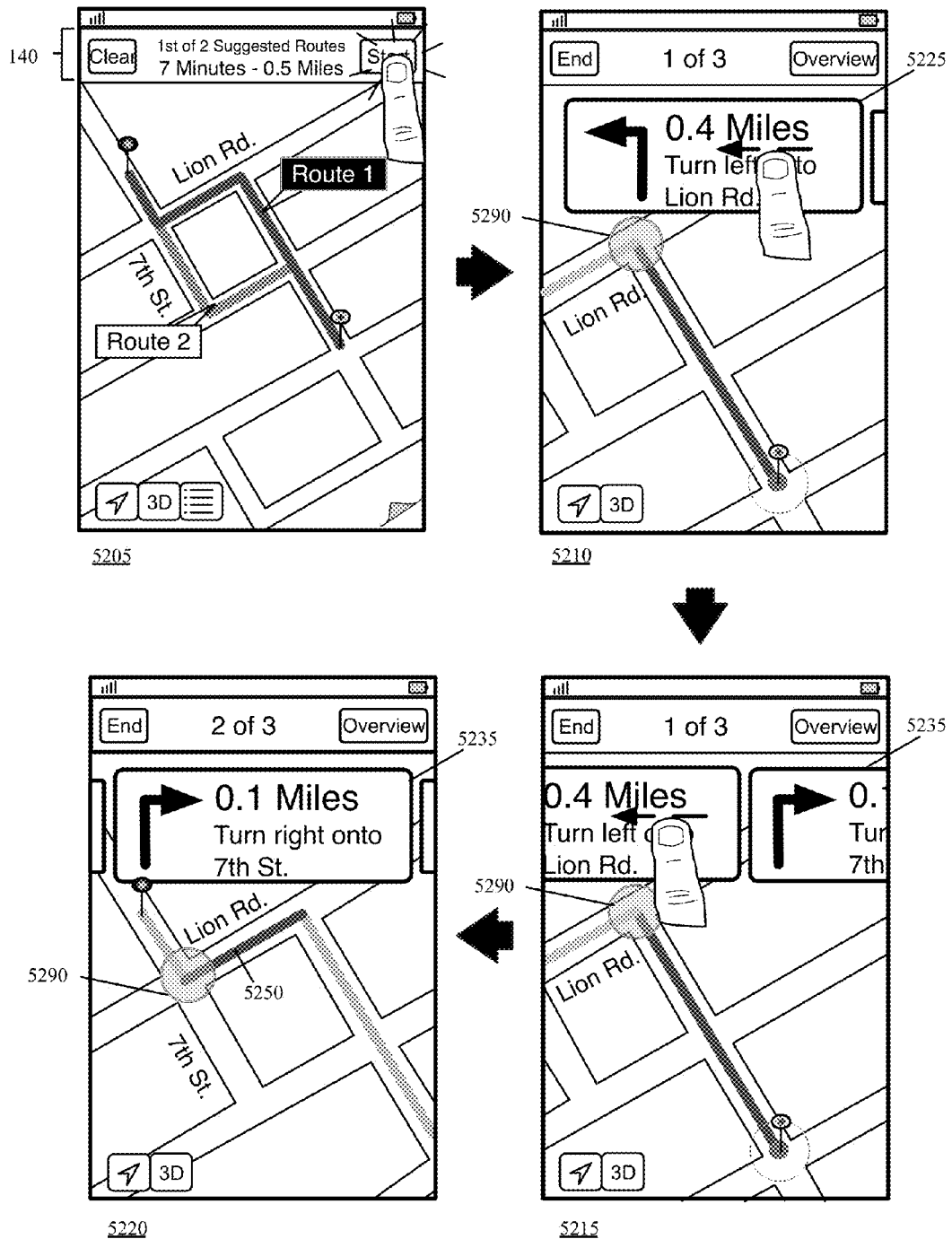
FIG. 52 illustrates scrolling through a set of scrollable instruction signs for a particular route selected by the user.

FIG. 52 illustrates an example of the route inspection mode in terms of four stages 5205-5220 of the user scrolling through a set of scrollable instruction signs for a particular route selected by the user. The first stage 5205 illustrates the user initiating a selected route between the starting and ending locations by tapping on the start control in the top bar 140. As described above, the second stage 5210 illustrates the first scrollable sign 5225 (a selectable UI item) that is presented for the particular route, as indicated by the "1 of 3" text displayed at the center on the top bar 140. Also, the mapping application is displaying a current juncture indicator 5290 on a juncture that the displayed sign 5225 represents. More details about a current juncture indicator is described in U.S. patent application Ser. No. 13/632,002, now published as U.S. Patent Publication No. 2013/0324164, entitled "Mapping Application with Automatic Stepping Capabilities," concurrently filed with the present application w. This concurrently filed U.S. patent application Ser. No. 13/632,002, now published as U.S. Patent Publication No. 2013/0324164, is incorporated herein by reference. The second stage 5210 also illustrates the user initiating a swiping gesture to the left on the first scrollable sign. The swiping gesture causes the sign to shift to the left of the map. In some embodiments, the user can tap the sign to shift it to the left (or right) of the map and display the next sign.

The third stage 5215 illustrates that a portion of the first scrollable sign 5225 has been scrolled off of the map display area and a new sign 5235 for the route has become partially visible. The user can see that the new sign displays a right turn arrow. The mapping application has not moved the current juncture indicator 5290 because the sign 5225 is still the current sign.

The fourth stage 5220 illustrates the display after the user has completed the swiping gesture of the first sign off of the map. The mapping application now displays the second sign 5235 for the list of routing directions, as indicated by the "2 of 3" text displayed at the top bar 140. This sign indicates that in 0.1 miles, the user needs to turn right onto 7th Street. Furthermore, the application has zoomed in on a portion of the map display area and highlighted a new segment 5250 of the route corresponding to the currently in-focus sign being presented. The application has also moved the current juncture indicator 5290 to the juncture indicated by the second sign 5235.

Figure 53:
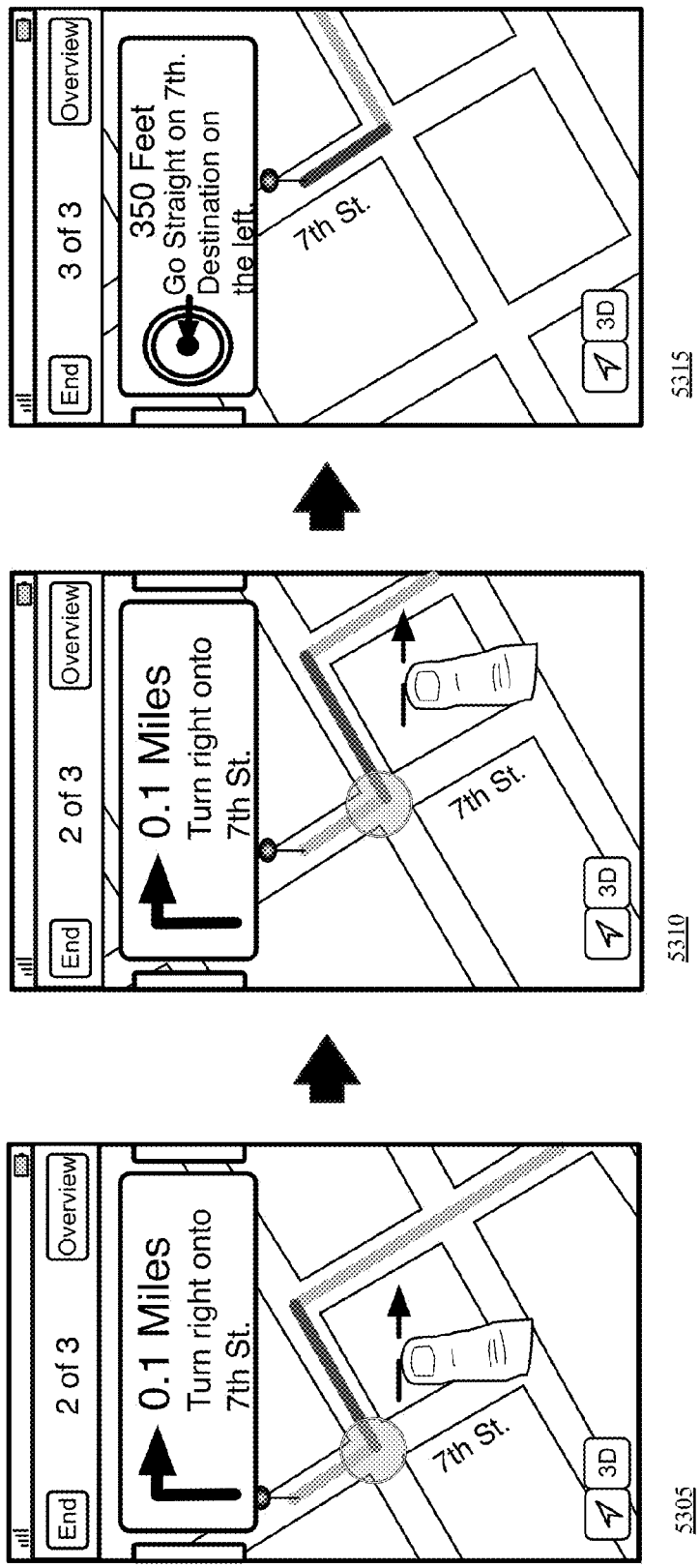
FIG. 53 illustrates scrolling through the different scrollable signs.

Alternatively, or conjunctively, the user can scroll through each sign by selecting different junctures of the route (e.g., by tapping) or navigating the map (through gestural input) in order to view a particular scrollable sign associated with a particular juncture. FIG. 53 illustrates in terms of three stages 5305-5315 a user navigating the map in order to scroll through the different scrollable signs.

The first stage 5305 illustrates the map with the overlaid sign, corresponding to the "2 of 3" sign in the route, for a particular juncture of the route between the starting and ending points. The application has also highlighted the corresponding portion of the route for this sign. The sign states that in 0.1 miles the user needs to turn right onto 7th Street. The first stage 5305 also illustrates that the user initiated a swipe gesture to navigate the map (e.g., swiping their finger to the right) in order to view a different region of the map.

The second stage 5310 illustrates a new region of the map that is displayed after the swiping gesture, corresponding to a shift to the left. The third stage 5315 illustrates that after the completed swiping gesture, a new scrollable sign is now overlaid on the map corresponding to the portion of the route that is now displayed in this particular region of the map. This sign is the third sign in the route as indicated by the "3 of 3" text displayed at the top center of the map. The sign indicates that in 350 feet, the user will arrive at the destination.

In order to navigate a set of routing directions, the user has the option to either scroll through the signs overlaid on the map, or navigate the map to scroll through the different signs. Also, when the user taps on a particular section of the route, the mapping application scrolls through the different signs to display a sign that corresponds to the particular section of the route. In some embodiments, the mapping application displays the sign for a juncture that is closest to the tapped portion of the route.

This scrolling feature of the mapping application allows a user to quickly ascertain all of the necessary maneuvers when traveling between two locations. This may be especially helpful in driving situations that require a significant number of lane changes to anticipate upcoming turns.

In some embodiments, the directional arrow shown in a scrollable instruction sign is a simple arrow. In other embodiments, when there is sufficient space on a sign or presentation for the use of a bigger sign, the mapping application of some embodiments in the navigation mode identifies a maneuver to perform at a juncture along a route by using a larger graphical directional indicator that includes (1) a prominent stylized arrow roughly representing the path of the vehicle, and (2) a de-emphasized set of lines and curves corresponding to other elements of the junction. In some embodiments that use this approach, a right turn at a T-junction will be represented by a large arrow with a right-angle joined with a smaller, dimmer segment that runs parallel to one of the large arrow's segments. The smaller segment in some embodiments will also be pushed off to the side so that the path taken by the vehicle dominates. More details about the arrows are described in U.S. patent application Ser. No. 13/632,121, now published as U.S. Patent Publication No. 2013/0322634, entitled "Context-Aware Voice Guidance," concurrently filed with this application. This concurrently filed U.S. patent application Ser. No. 13/632,121, now published as U.S. Patent Publication No. 2013/0322634, is incorporated herein by reference. In some embodiments, the mapping application uses a realistic looking road sign in place of the instructions with direction icons.

Figure 54:
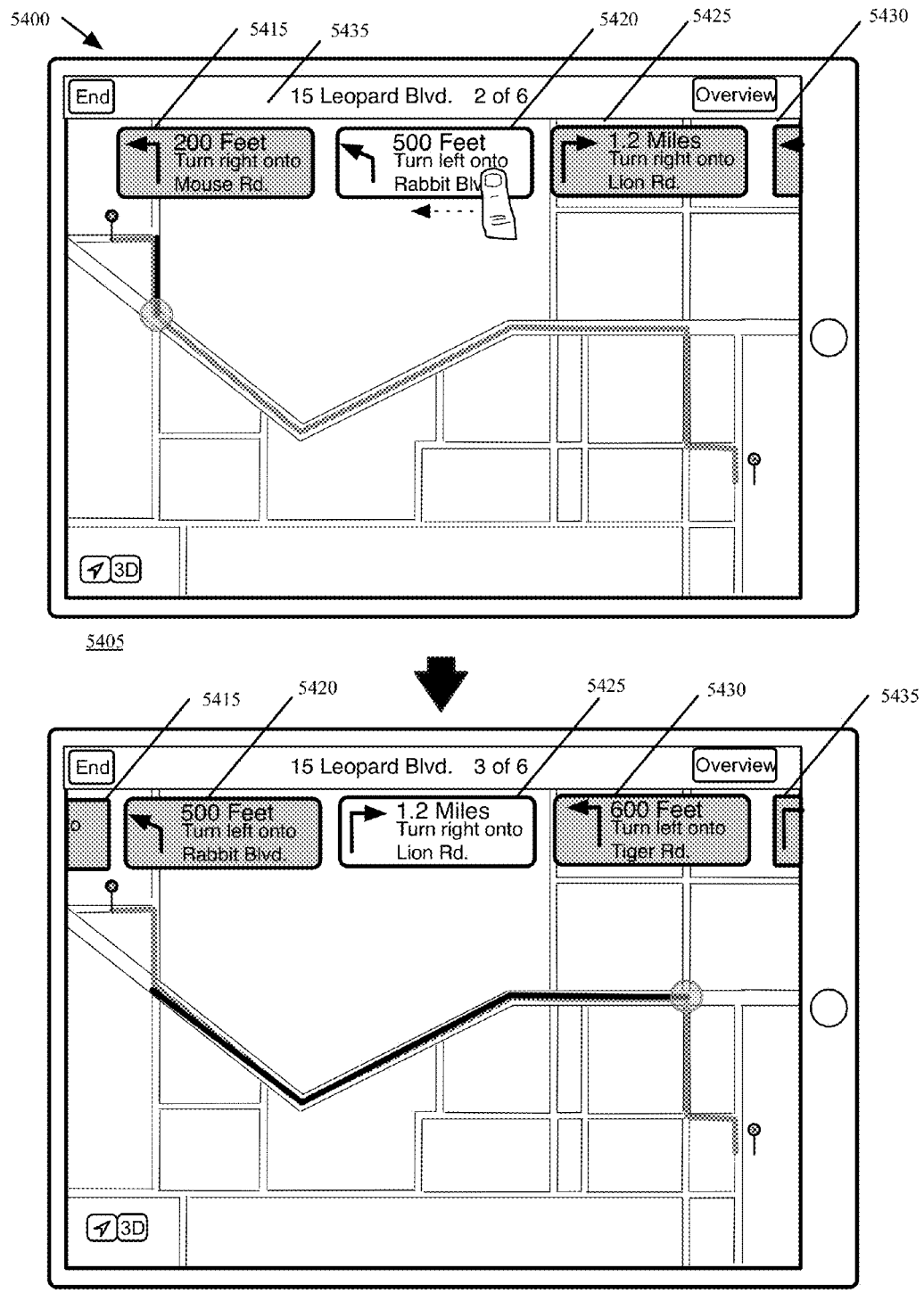
FIG. 54 illustrates an example of displaying a set of scrollable instructions signs for a particular route selected by a user.

FIG. 54 illustrates an example of displaying a set of scrollable instructions signs for a particular route selected by a user. A device 5400 on which the mapping application runs has a display area that is relatively large. An example of such a device is a tablet device (e.g., iPads®). This figure illustrates in two different stages 5405 and 5410 a user's interaction with the mapping application to step through the instruction signs.

When the mapping application is running on a device with a larger display area, the mapping application displays more signs in the display area at any given moment. In some embodiments, the mapping application displays a row of signs in the top portion of the display area with the current sign in the middle of the top portion. The number of signs that the mapping application can display varies depending on the device's orientation. That is, the mapping application can display more signs when the display area is in a landscape orientation than when the display area is in a portrait orientation.

The first stage 5405 shows that the mapping application is displaying three signs 5415-5425 and a portion of a fourth sign 5430. In this example, the signs 5415-5430 represent the first through the fourth instructions for the selected route that has a total of six steps. As a top bar 5435 indicates, the second instruction of the route is the current instruction and the sign 5420 is highlighted and placed in the middle of the top portion of the display area to indicate the sign 5420 is representing the current instruction. The first stage 5405 also shows that the user is swiping the sign 5420 to the left.

The second stage 5410 shows that the mapping application is displaying the sign 5425 for the third instruction of the route in the middle of the top portion of the display area. In this example, the mapping application has also highlighted the sign 5425 and the section of the route that corresponds to the sign is highlighted as shown. The top bar indicates that the current instruction is the third of the six instructions of the route. Also, the sign 5415 is now mostly slid out of the display area and the sign 5430 is now displayed fully. The mapping application is also displaying a portion of a fifth sign 5445 that represents the fifth instruction of the route.

Figure 55:
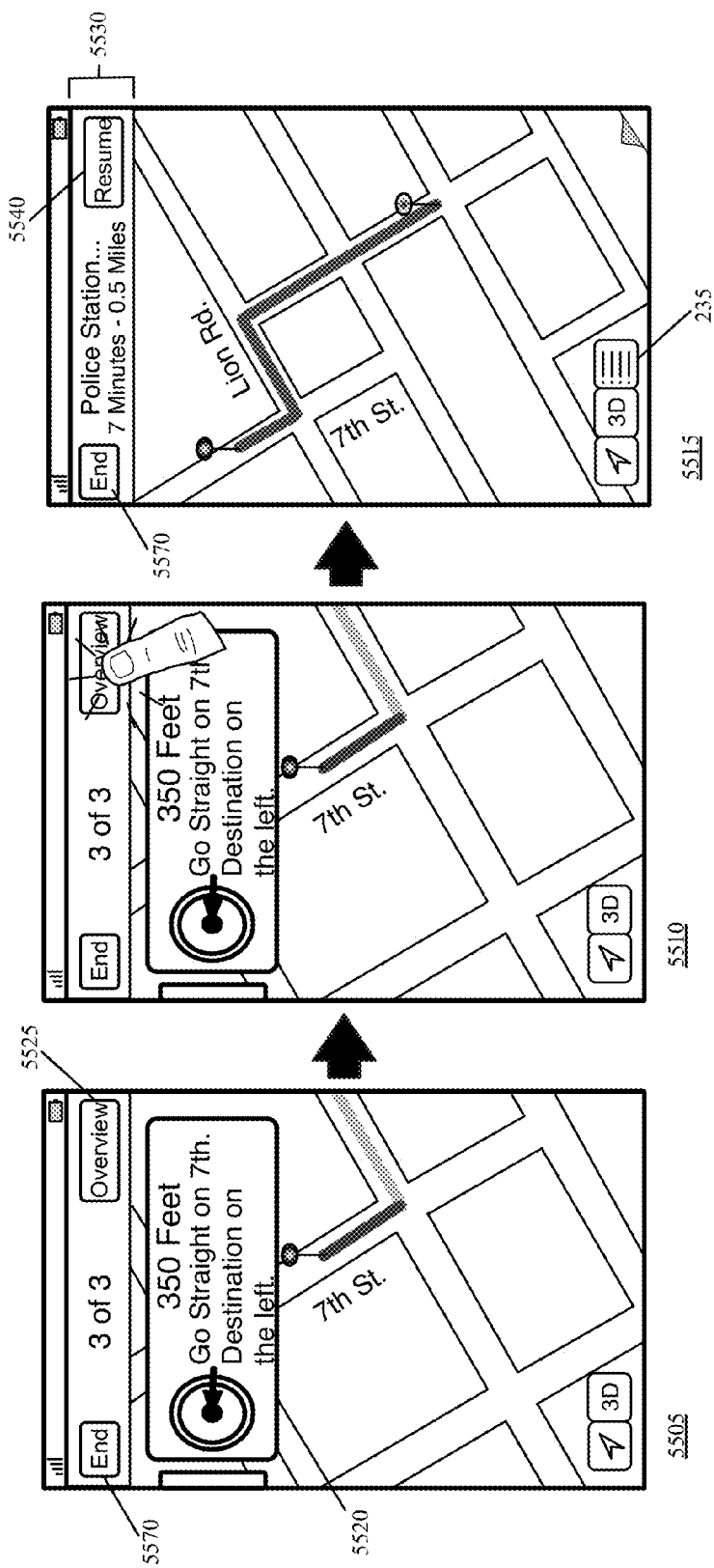
FIG. 55 illustrates an example of the user's interaction with the application to switch to the overview mode while reviewing a selected route.

The mapping application of some embodiments allows the user to switch to an overview mode while reviewing a selected route by scrolling the instruction signs. In the overview mode, the mapping application of some embodiments adjusts the zooming level of the map such that the entire route can be rendered on the map. The mapping application also allows the user to go back to the mode in which the user can resume reviewing the directional instructions. FIG. 55 illustrates an example in terms of three stages 5505-5515 of the user's interaction with the application to switch to the overview mode while reviewing a selected route.

The first stage 5505 is identical to the stage 5315 described above by reference to FIG. 53. That is, the user has scrolled to the last instructional sign 5520. The next stage 5510 illustrates the selection of an overview control 5525.

The third stage 5515 illustrates the map in the overview mode. The mapping application of some embodiments shows the map in the overview mode in response to receiving the selection of the overview control 5525. The mapping application has zoomed out the map such that the entire route is displayed within the map. In some cases, the mapping application displays only a partial route from the current location of the device and the destination location when the current location of the device is very close (e.g., within 100 meters) to the destination location.

Also, a top bar 5530 shows that the destination, which in this example is Police Station, is 7 minutes or 0.5 miles away from the current location of the device or the starting location for this particular route. The top bar 5530 now includes a resume control 5540, which in some embodiments is for resuming the navigation or inspection of the selected route. The mapping application also displays the list view control 235 in the map.

The top bar 5530 also shows the end control 5570. When the mapping application receives a selection of the end control 5570 while the mapping application is showing the overview of the selected route, the mapping application of some embodiments stops inspection of the selected route by going back to map browsing mode. The mapping application of some embodiments goes back to the map browsing mode by removing the selected route from the map, putting back the page curl, replacing the information and controls in the top bar with a set of other controls including a direction control, a search field, and a bookmark control. The mapping application of some embodiments does not shift the map to another region when switching to the map browsing mode from the inspection mode. The mapping application of some embodiments leaves the pins for the starting and destination locations in the map when the mapping application goes to the map browsing mode.

Figure 56:
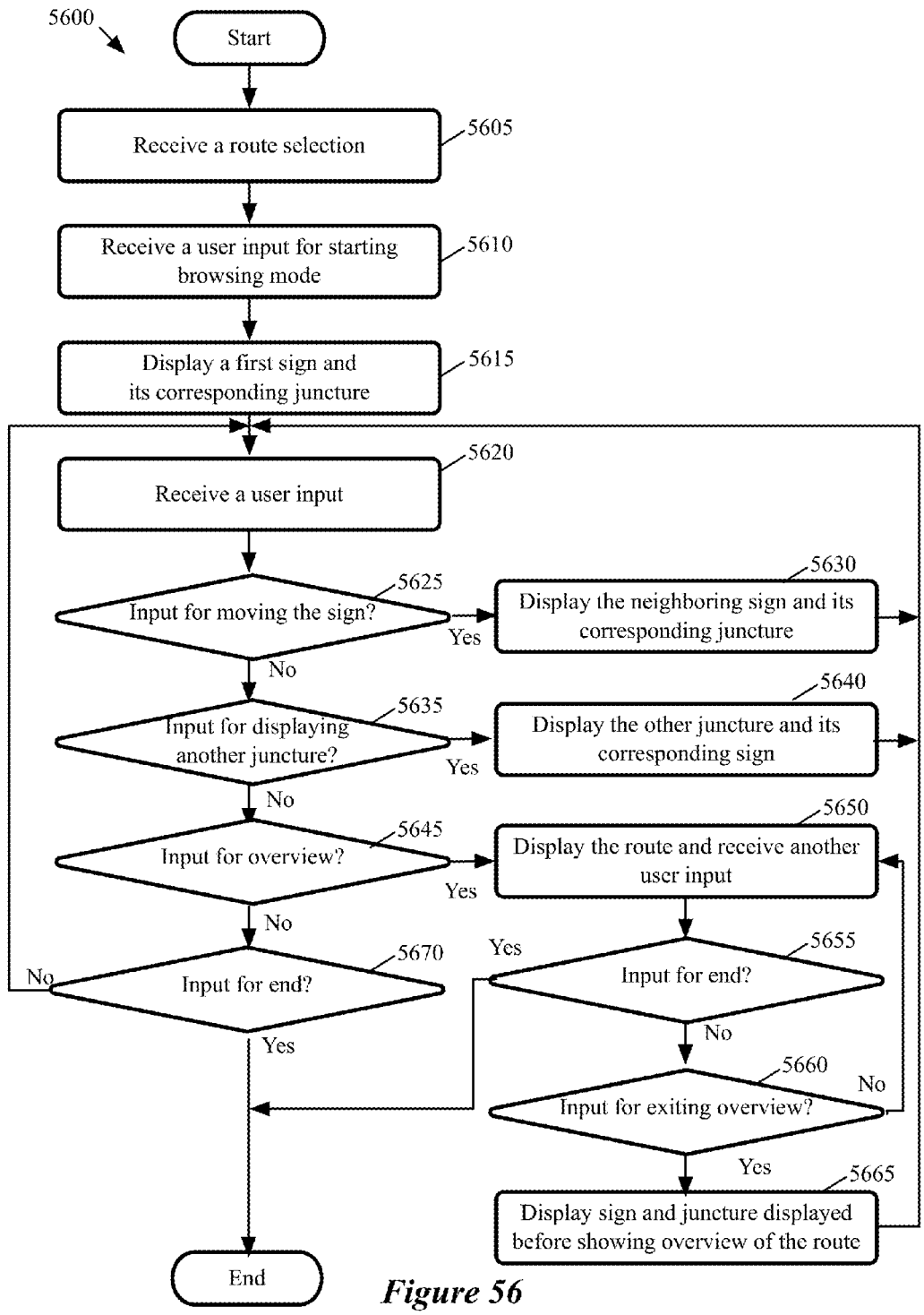
FIG. 56 conceptually illustrates a process that some embodiments perform to allow a user to browse signs for a set of instructions for the junctures in a route between a starting location and an ending location.

FIG. 56 conceptually illustrates a process 5600 that some embodiments perform to allow a user to browse through signs for a set of instructions for the junctures in a route between a starting location and an ending location. In some embodiments, the process 5600 is performed by the mapping application. The process 5600 starts when the mapping application has computed one or more routes between the starting location and the ending location.

The process 5600 begins by receiving (at 5605) a selection of a route. As shown in FIG. 49 above, the mapping application of some embodiments provides a recommended route when there are two or more generated routes between the starting and ending locations. When the user does not select another route, the mapping application takes the recommended route as the selected route upon receiving a selection of a start control, such as the start control 4950.

Next, the process 5600 receives (5610) a user input for starting browsing mode. In some embodiments, the mapping application enters the browsing mode when the user selects a start control, such as the start control 4950. At 5615, the process 5600 of some embodiments then displays a sign for the first juncture (i.e., the starting location) of the route and the sign's corresponding juncture (i.e., the first juncture) on the map.

The process 5600 then receives (at 5620) a user input. In some embodiments, the user input includes any gestural interaction with the mapping application. For instance, the user can zoom or swipe a map by touching one or more locations of the map. The user may also tap, swipe, etc., the currently displayed sign.

The process 5600 then determines (at 5625) whether the user input is for moving the currently displayed sign. In some embodiments, the process 5600 determines that the user input is for moving the currently displayed sign when the user taps the sign or swipes the sign in a certain direction. When the process 5600 determines that the user input is not for moving the currently displayed sign, the process 5600 proceeds to 5635, which is described further below.

When the process 5600 determines that the user input is for moving the currently displayed sign, the process 5600 displays (5630) a neighboring sign if possible according to the user input. For instance, the process 5600 displays the next or previous sign for the next or previous juncture in the route according to the user input. The process 5600 also displays the corresponding juncture of the route. In some embodiments, the process 5600 may zoom or shift to another region of the map in order to display the corresponding juncture of the sign being displayed. The process 5600 then loops back to 5620 to receive another user input.

When the process 5600 determines (at 5625) that the user input is not for moving the currently displayed sign, the process 5600 determines (at 5635) whether the input is for displaying a juncture other than the currently displayed juncture. In some embodiments, the process determines that the input is for displaying a juncture when the user manipulates the map (e.g., swipe, zoom, etc.) to display another region of the map or when the user taps on a portion of the route that is closer to another juncture of the displayed route. When the process 5600 determines (at 5635) that the user input is not for displaying another juncture, the process 5600 proceeds to 5645, which is described further below.

When the process 5600 determines (at 5635) that the user input is for displaying another juncture, the process 5600 displays (at 5640) the other juncture and the juncture's corresponding sign. This sign may not be a neighboring sign of the currently displayed sign. The process 5600 then loops back to 5620 to receive another user input.

When the process 5600 determines (at 5635) that the user input is not for displaying another juncture, the process 5600 determines (at 5645) whether the user input is for showing an overview of the route. In some embodiments, the process 5600 determines that the input is for displaying the overview of the route when the mapping application receives a selection of an overview control. When the process 5600 determines (at 5645) that the user input is not for showing the overview of the route, the process 5600 proceeds to 5670, which is described further below.

When the process 5600 determines (at 5645) that the user input is for displaying the overview of the route, the process 5600 of some embodiments displays (at 5650) the entire route in the map. The process also receives another user input while displaying the overview of the route. The process 5600 then determines (at 5655) whether the input is for ending the browsing mode. In some embodiments, the process 5600 determines that the input is for ending the browsing mode when the mapping application receives a selection of an end control, such as the end control 5570 described above by reference to FIG. 55. When the process 5600 determines (at 5655) that the user input is for ending the browsing mode, the process 5600 ends.

When the process 5600 determines (at 5655) that the user input is not for ending the browsing mode, the process determines (at 5660) whether the input is for exiting the overview of the route. In some embodiments, the process 5600 determines that the input is for exiting the overview when the mapping application receives a selection of a resume control, such as the resume control 5540 described above by reference to FIG. 55.

When the process 5600 determines (at 5660) that the input is not for exiting the overview mode, the process loops back to 5650 to display the route and to receive another user input. When the process 5600 determines (at 5660) that the input is for exiting the overview mode, the process exits the overview of the route and displays (at 5665) the sign and its corresponding juncture before showing the overview. The process then loops back to 5620 to receive another user input.

When the process 5600 determines (at 5645) that the input received (at 5620) is not an input for showing the overview of the route, the process 5600 determines (at 5670) whether the input is for ending the browsing mode. In some embodiments, the process 5600 determines that the input is for ending the browsing mode when the mapping application receives a selection of an end control. When the process 5600 determines (at 5670) that the user input is for ending the browsing mode, the process 5600 ends. Otherwise, the process loops back to 5620 to receive another user input.

C. Navigation Mode

Figure 57:
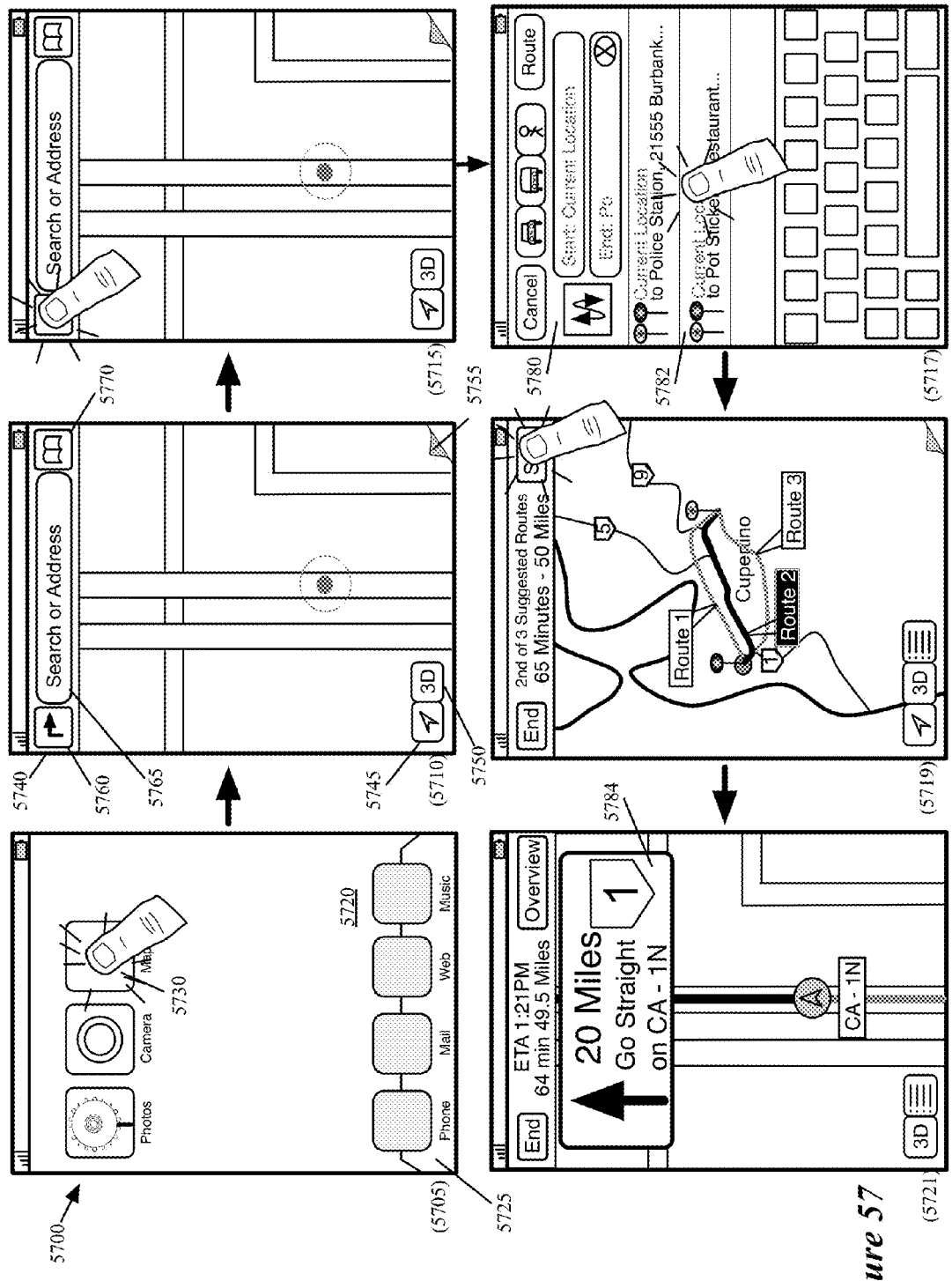
FIG. 57 illustrates an example of a device that executes the mapping application of some embodiments.

FIG. 57 illustrates an example of a device 5700 that executes the mapping application of some embodiments. This figure also illustrates an example of launching a route navigation in this application. FIG. 57 shows six stages 5705, 5710, 5715, 5717, 5719, and 5721 of interaction with the mapping application. The first stage 5705 shows UI 5720, which includes several icons of several applications in a dock area 5725 and on a page of the UI. One of the icons on this page is the icon for the mapping application 5730. The first stage shows a user's selection of the mapping application through touch contact with the device's screen at the location of this application on the screen.

The second stage 5710 shows the device after the mapping application has opened. As shown in this stage, the mapping application's UI has a starting page that in some embodiments (1) displays a map of the current location of the device, and (2) several UI controls arranged in the top bar 5740, and as floating controls.

The third stage 5715 of FIG. 57 illustrates that the selection of the direction control 5760 opens the direction entry page 5780, which is shown in the fourth stage 5717. The direction control is one of three mechanisms through which the mapping application can be directed to identify and display a route between two locations; the two other mechanisms are (1) a control in an information banner that is displayed for a selected item in the map, and (2) recent routes identified by the device that are displayed in the search field 5765. Accordingly, the information banner control and the search field 5765 are two UI tools that the application employs to make the transition between the different modalities seamless.

The fourth stage 5717 illustrates the user selecting one of the recent directions that was auto-populated in the table 5782. The fifth stage 5719 then shows three routes on a 2D map view between the specified starting and ending locations specified through the page 5780. It also shows the selection of the second route and some information about this route in a bar at the top of the layout. This bar is shown to include start and end buttons. The start button is shown to be selected in the fifth stage.

As shown by the sixth stage 5721, the selection of the start button directs the application to enter a turn-by-turn navigation mode. In this example, the application has entered a 2D turn-by-turn navigation mode. In other embodiments, the application will enter by default into a 3D turn-by-turn navigation mode. In this mode, the application displays a realistic sign 5784 that identifies the distance to the next junction maneuver in the navigated route and some other pertinent information. The application also displays a top bar that includes some information about the navigation as well as End and Overview buttons, for respectively ending the navigation and obtaining an overview of the remaining portion of the navigated route or the entire portion of the navigated route in other embodiments.

The application further displays the floating 3D control 5750 and the floating list control, which were described above. It should be noted that the list control was adaptively added to the floating control cluster upon entering the route inspection and route navigation modalities, while the position indicator was removed from the floating control upon entering the route navigation modality. Also, upon transition from the route inspection mode to the route navigation mode, the application performs an animation in some embodiments that involves the page curl uncurling completely before the application transitions into the navigation presentation.

In some embodiments, the animation transition includes removing the top bar, its associated controls and the floating controls from the navigation presentation, and moving the sign 5784 to the top edge of the presentation a short time period after starting the navigation presentation. As further described below, the application requires the user to tap on the navigated map to bring back the top bar, its controls and the floating controls, and requires another tap to remove these controls again from the map, in some embodiments. Other embodiments provide other mechanisms for viewing and removing these controls.

Figure 58:
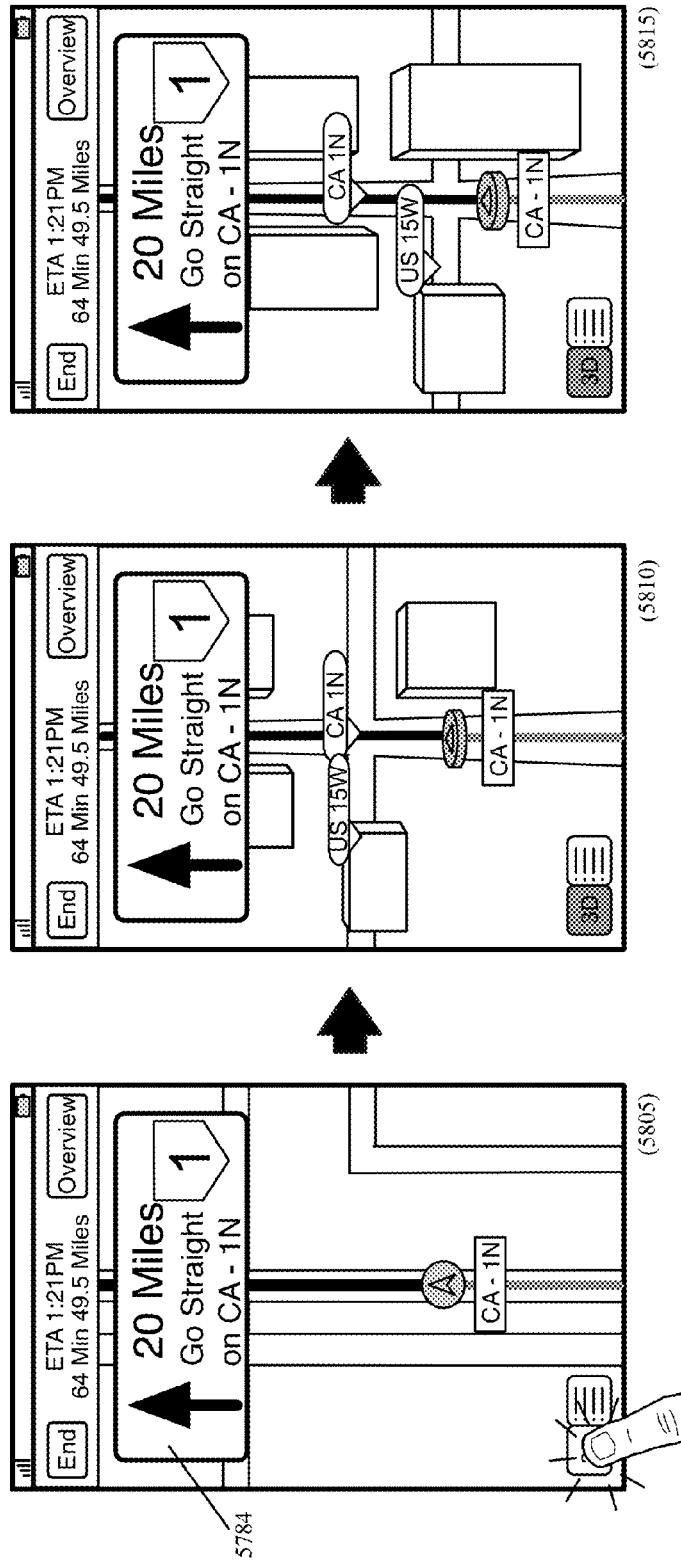
FIG. 58 illustrates how the navigation application of some embodiments provides the 3D control as a quick mechanism of entering a 3D navigating mode.

The navigation application of some embodiments can display navigation in either a 2D mode or a 3D mode. As mentioned above, one of the floating controls is the 3D control 5750 that allows a user to view a navigation presentation in three dimensions (3D). FIG. 58 illustrates how the navigation application of some embodiments provides the 3D control 150 as a quick mechanism for entering a 3D navigating mode. This figure illustrates this operation in three stages 5805-5815. The first stage 5805 illustrates the user selecting the 3D control 150 while viewing a two-dimensional navigation presentation.

The second stage 5810 illustrates the navigation presentation in the midst of its transition into a 3D presentation. As shown in this figure, the 3D control appears highlighted at this stage to indicate that the navigation presentation has entered a 3D mode. As mentioned above, the navigation application generates the 3D view of the navigated map in some embodiments by rendering the map view from a particular position in the three dimensional scene that can be conceptually thought of as the position of a virtual camera that is capturing the map view. This rendering will be further described below by reference to FIG. 59.

The third stage 5815 then illustrates the navigation presentation at the end of its transition into the 3D appearance. As shown by the difference between the heights of the buildings in the second and third stages, the transition from 2D to 3D navigation in some embodiments includes an animation that shows three dimensional objects in the navigated map becoming larger.

Figure 59:
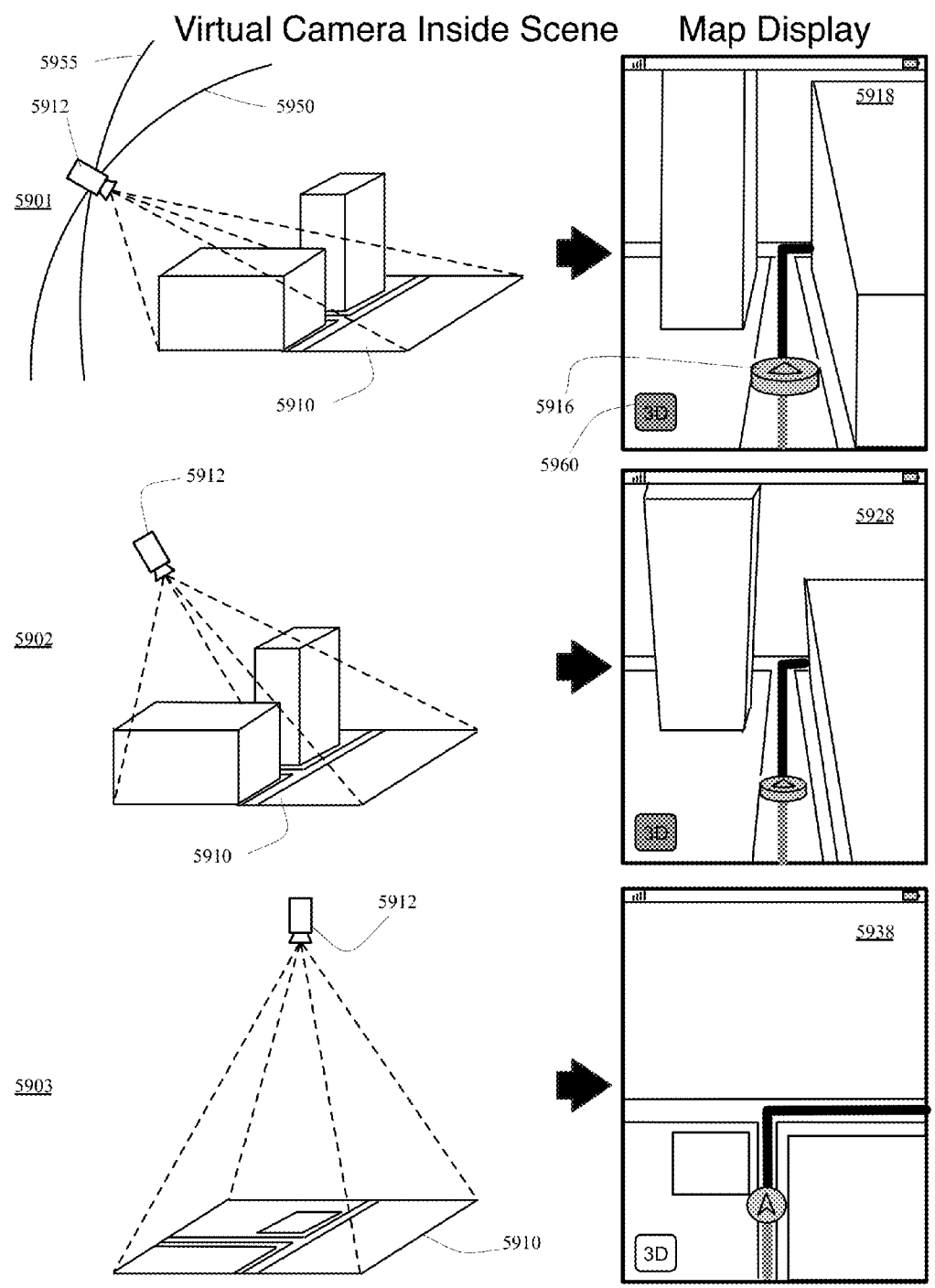
FIG. 59 illustrates concept of a virtual camera.

The navigation application of some embodiments is capable of displaying navigation maps from multiple perspectives. The application can show maps in three dimensions (3D) or in two dimensions (2D). The 3D maps are generated simulations of a virtual scene as seen by a virtual camera. FIG. 59 presents a simplified example to illustrate the concept of a virtual camera 5912. When rendering a 3D navigation map, a virtual camera is a conceptualization of the position in the 3D map scene from which the device renders a 3D view of the scene. FIG. 59 illustrates a location in a 3D navigation map scene 5910 that includes four objects, including two buildings and two intersecting roads. To illustrate the virtual camera concept, this figure illustrates three scenarios, each of which corresponds to a different virtual camera location (i.e., a different rendering position) and a different resulting view that is displayed on the device.

The first stage 5901 shows the virtual camera 5912 at a first position pointing downward at an angle (e.g., a 30 degree angle from the horizon) towards the 3D scene 5910. By rendering the 3D scene from the position and angle shown in stage 5901 the application generates the 3D map view 5918. From this position, the camera is pointing at a location that is a moving position in front of the device. The virtual camera 5912 is kept behind the current location of the device. "Behind the current location" in this case means backward along the navigation application's defined path in the opposite direction from the current direction that the device is moving in.

The navigation map view 5918 looks as though it was shot by a camera from above and behind the device's location indicator 5916. The location and angle of the virtual camera places the location indicator 5916 near the bottom of the navigation map view 5918. This also results in the majority of the screen being filled with the streets and buildings ahead of the present location of the device. In contrast, in some embodiments, the location indicator 5916 is in the center of the screen, with half of the screen representing things ahead of the device and the other half representing things behind the device.

The second stage 5902 shows the virtual camera 5912 at a different position, pointing downward toward the scene 5910 at a larger second angle (e.g., −45°). The application renders the scene 5910 from this angle, resulting in the 3D navigation map view 5928. The buildings and the roads are smaller than their illustration in the first navigation map view 5918. Once again the virtual camera 5912 is above and behind the location indicator 5916 in the scene 5910. This again results in the location identifier appearing in the lower part of the 3D map view 5928. The location and orientation of the camera also results again in the majority of the screen displaying things ahead of the car carrying the device, which is what someone navigating needs to know.

The third stage 5903 shows the virtual camera 5912 at a top-down view that looks downwards on a location on a 2D map that corresponds to the location in the 3D map scene 5910 that was used to render the 3D views 5918 and 5928. The scene that is rendered from this perspective is the 2D map view 5938. Unlike the 3D rendering operations of the first and second stages that in some embodiments are perspective 3D rendering operations, the rendering operation in the third stage is relatively simple as it only needs to crop a portion of the 2D map that is identified by a zoom level specified by the application or the user. Accordingly, the virtual camera characterization in this situation somewhat unnecessarily complicates the description of the operation of the application as cropping a portion of a 2D map is not a perspective rendering operation.

In some embodiments, the virtual camera can be made to move by changing the zoom level for viewing the map after the map enters a 3D mode, as further described below. In some of these embodiments, the application switches to a top-down mode (where the rendering position faces straight down) that produces 2D views when the zoom level reaches a particular zoom out level. As in the third stage 5903, the mapping application in some embodiments switches from rendering a 3D scene from a particular perspective direction to cropping a 2D scene when the camera switches from the 3D perspective view to a 2D top-down view. This is because in these embodiments, the application is designed to use a simplified rendering operation that is easier and that does not generate unnecessary perspective artifacts. In other embodiments, however, the mapping application uses perspective rendering operation to render a 3D scene from a top-down virtual camera position. In these embodiments, the 2D map view that is generated is somewhat different than the map view 5938 illustrated in the third stage 5903, because any object that is away from the center of the view is distorted, with the distortions being greater the farther the object's distance from the center of the view.

The virtual camera 5912 moves along different trajectories in different embodiments. Two such trajectories 5950 and 5955 are illustrated in FIG. 59. In both of these trajectories, the camera moves in an arc and rotates more downward as the camera moves upward on the arc. The trajectory 5955 differs from the trajectory 5950 in that, in the trajectory 5955, the camera moves backward from the current location as it moves up the arc.

While moving along one of the arcs, the camera rotates to maintain a point ahead of the location indicator at the focal point of the camera. In some embodiments, the user can turn off the three dimensional view and go with a purely two dimensional view. For example, the applications of some embodiments allow a three dimensional mode to be turned on and off by use of a 3D button 5960. The 3D button 5960 is essential to turn-by-turn navigation feature, where it has a role as an indicator and toggle. When 3D is turned off, the camera will maintain a 2D navigation experience, but when 3D is turned on, there may still be some top-down perspectives when 3D viewing angles are not appropriate (e.g., when going around a corner that would be obstructed in 3D mode).

Figure 60:
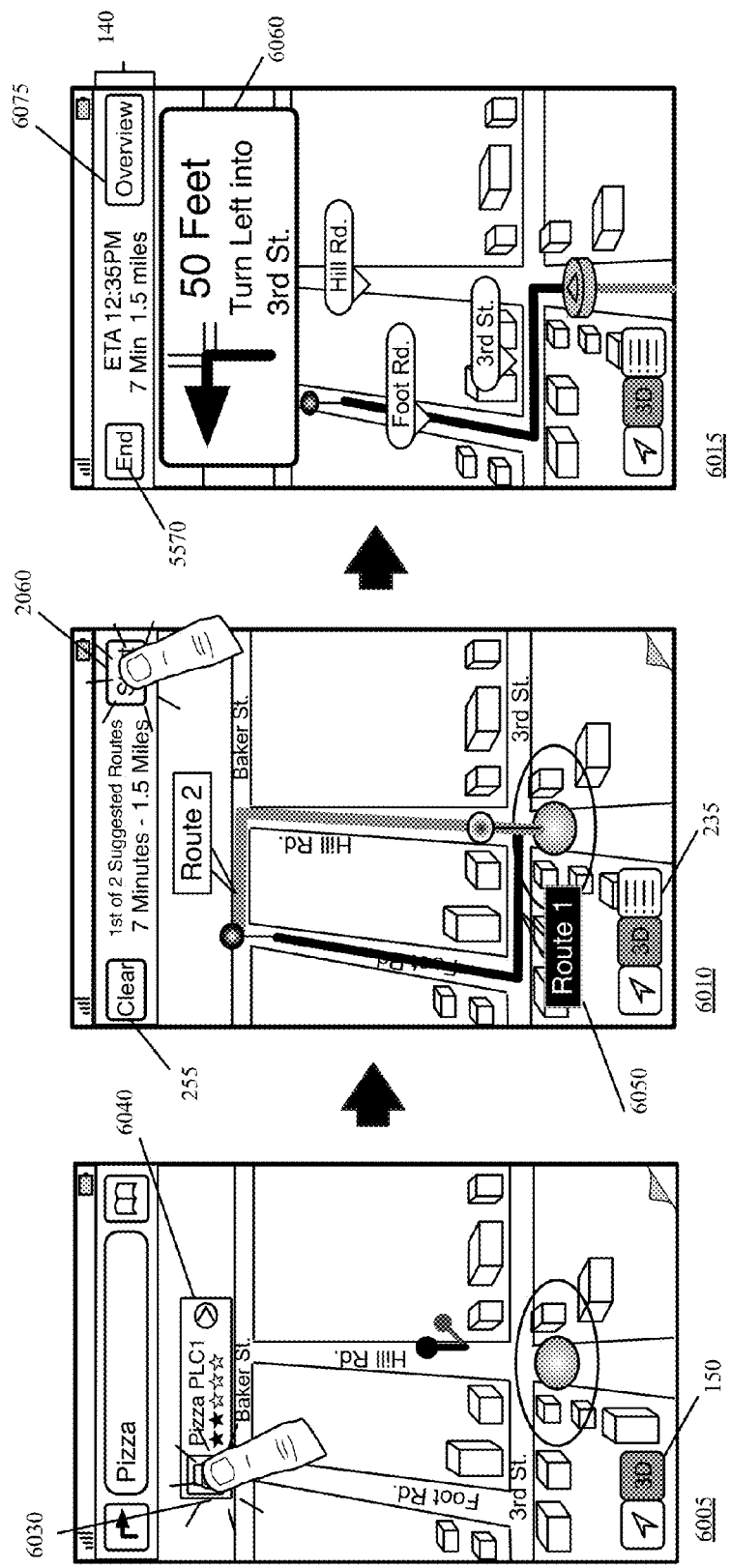
FIG. 60 illustrates an example of a user's interaction with the mapping application to obtain routing directions.

As another way of allowing the user to get navigation experience, the mapping application of some embodiments provides a UI item in an informational banner that appears by a pin that represents a POI. FIG. 60 illustrates an example in terms of three stages 6005-6015 of a user's interaction with the mapping application to obtain routing directions. This example is provided in the context of using a car icon 6030.

The first stage 6005 illustrates a map in a 3D map view. As shown, the 3D control 150 appears highlighted to indicate that the map is in a 3D map view. The first stage 6005 also illustrates two informational banners for the two pins for the search resulted from running a search with a search query "Pizza" as shown. The user selects the car icon 6030. As mentioned above, the car icon 6030 is for showing one or more routes to the location that is represented by a pin with which the banner that includes the car icon 6030 is associated. The banner 6040 which includes the car icon 6030 also shows brief description of the place, a star rating, and an arrow for launching a "stage" for the POI.

The second stage 6010 illustrates the two routes, route 1 and route 2, that the mapping application of some embodiments shows in response to the selection of the car icon 6030 in the previous stage 6005. The user has selected route 1 as indicated by highlighted banner 6050. The user also selects the start control 2060. As mentioned above, the start control 4950 in some embodiments is for starting the navigation according to the selected route.

The third stage 6015 illustrates that the mapping application displays an instruction sign 6060, which is the sign for the first instruction. The mapping application has replaced the clear control 255 and the start control 2060 with an end control 5570 and an overview control 6075 in the top bar 140. The end control 5570 is for ending the navigation of the route and the overview control 6075 is for showing the entire route in the map view by adjusting the zoom level of the displayed map if adjusting the zoom level is necessary to show the entire route. In some embodiments, the mapping application displays in the top bar 140 the estimated arrival time, the amount of time to get to the destination, and the remaining distance to the destination as shown.

When the mapping application receives a selection of the end control 5570 while the mapping application is operating in the route inspection mode, the mapping application of some embodiments stops inspection of the selected route by going back to map browsing mode. The mapping application of some embodiments goes back to the map browsing mode by removing the selected route from the map, putting back the page curl, and replacing the information and controls in the top bar with a set of other controls including a direction control, a search field, and a bookmark control. That is, the mapping application takes the appearance of the UI page back to a UI page similar to the UI page shown in the first stage 6005. The mapping application of some embodiments does not shift the map to another region when switching to the map browsing mode from the inspection mode.

It should be noted that while neither the route history entries in the search field nor quick-route navigation control perform actions that cannot be achieved with the selectable direction item, they serve as important accelerators that make it much easier to obtain the most commonly desired routes.

Some embodiments use a cinematic transition from the 2D map view into the 3D map view or vice versa. For instance, when the mapping application receives a selection of the 3D control 150 while showing a starting location of a route, the mapping application begins from the 2D map view and transitions smoothly from a first virtual camera view for the 2D map to a new virtual camera 3D view that is more zoomed in and pointing in the direction of the start of the route. In doing so, the virtual camera map performs a combination of translation, zoom, and rotation operations in order to reach the start of the route for navigation. That is, the virtual camera moves in an arc and rotates more upward as the camera moves downward along the arc. Also, the mapping application may rotate the arc itself to align the virtual camera viewpoint to the initial road segment of the route. In other words, the mapping application rotates the map during the cinematic transition.

Figure 61:
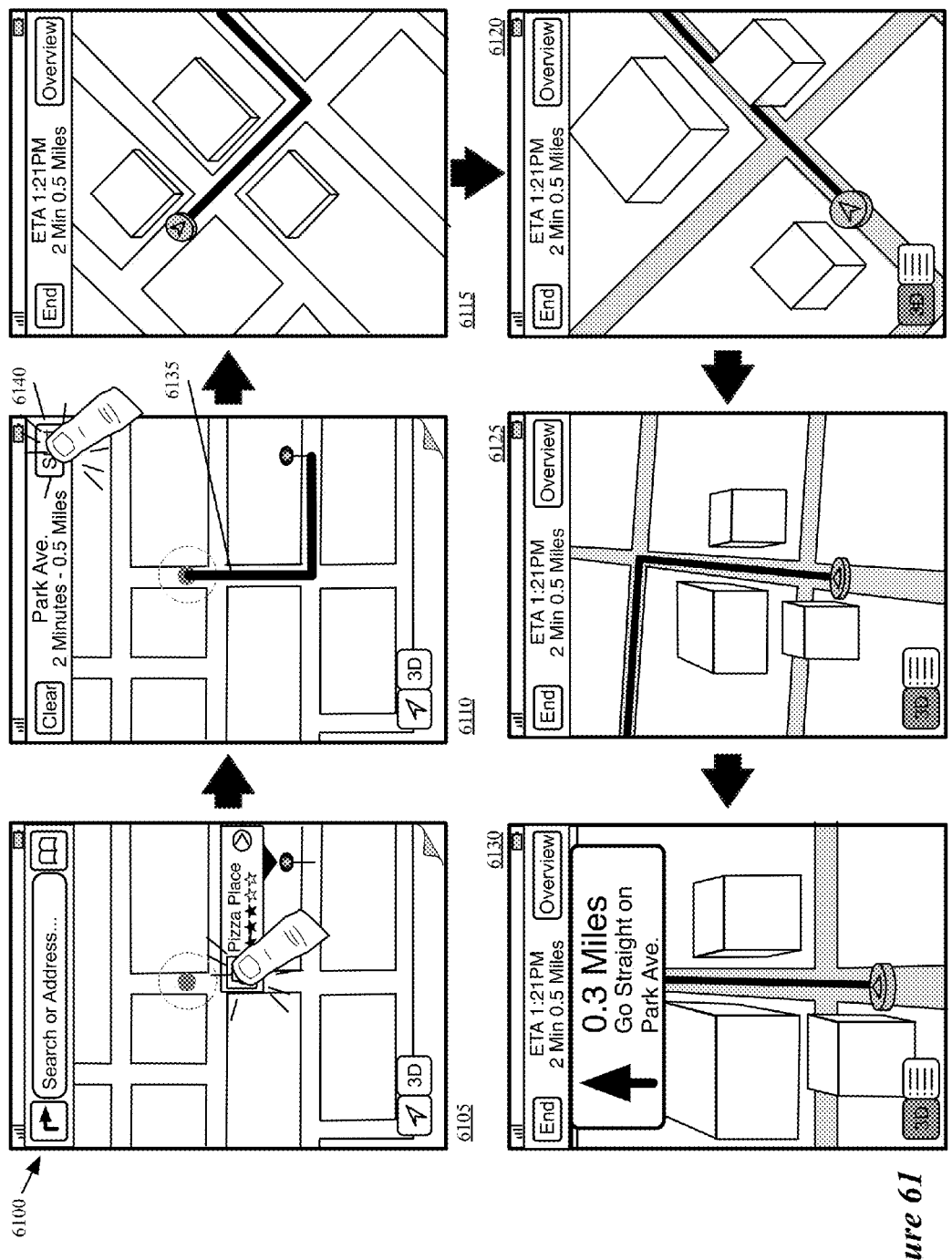
FIG. 61 illustrates a device that displays a mapping application as the application transitions from a non-immersive map view for map browsing into an immersive map view for navigation.

FIG. 61 illustrates a device 6100 that displays a mapping application as the application transitions from a non-immersive map view for map browsing into an immersive map view for navigation, over six stages 6105-6130.

The first stage 6105 illustrates a user selecting a quick-route button for a location "Pizza Place" in order to generate a route from the user's current location (near the center of the screen of device 6100) to the selected location. The second stage 6110 illustrates the mapping application displaying a route 6135 to reach the location "Pizza Place." At the second stage 6110, the user selects the "Start" UI control 6140. Accordingly, the application begins entering navigation.

As shown at the third through sixth stages 6115-6130, some embodiments use a cinematic transition from the 2D (or 3D) non-immersive map view into the 3D immersive map view. The application display begins from its current state (that shown at 6110) and transitions smoothly from the first virtual camera view to the new virtual camera view that is more zoomed in and pointing in the direction of the start of the route. In doing so, the virtual camera may perform a combination of translation, zoom, and rotation operations in order to reach the start of the route for navigation. As shown in these stages, the virtual camera moves and rotates into its eventual location behind the navigation location indicator (i.e., the puck) shown in the sixth stage 6130.

V. Multi-Mode Mapping Application

Figure 62A:
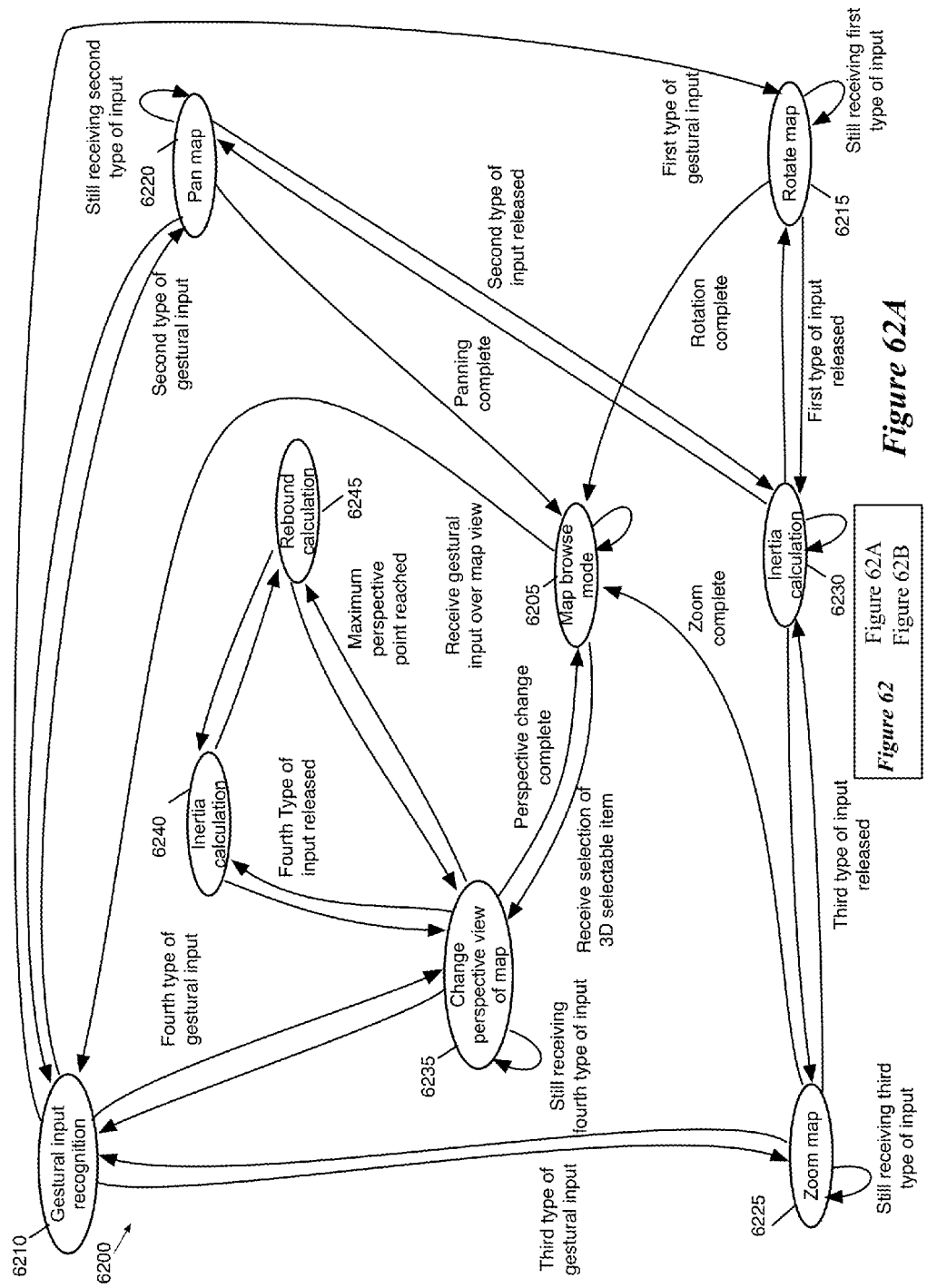
FIGS. 62A-62B conceptually illustrate a state diagram that describes different states and transitions between these states of the integrated mapping, search, and navigation application of some embodiments.
Figure 62B:
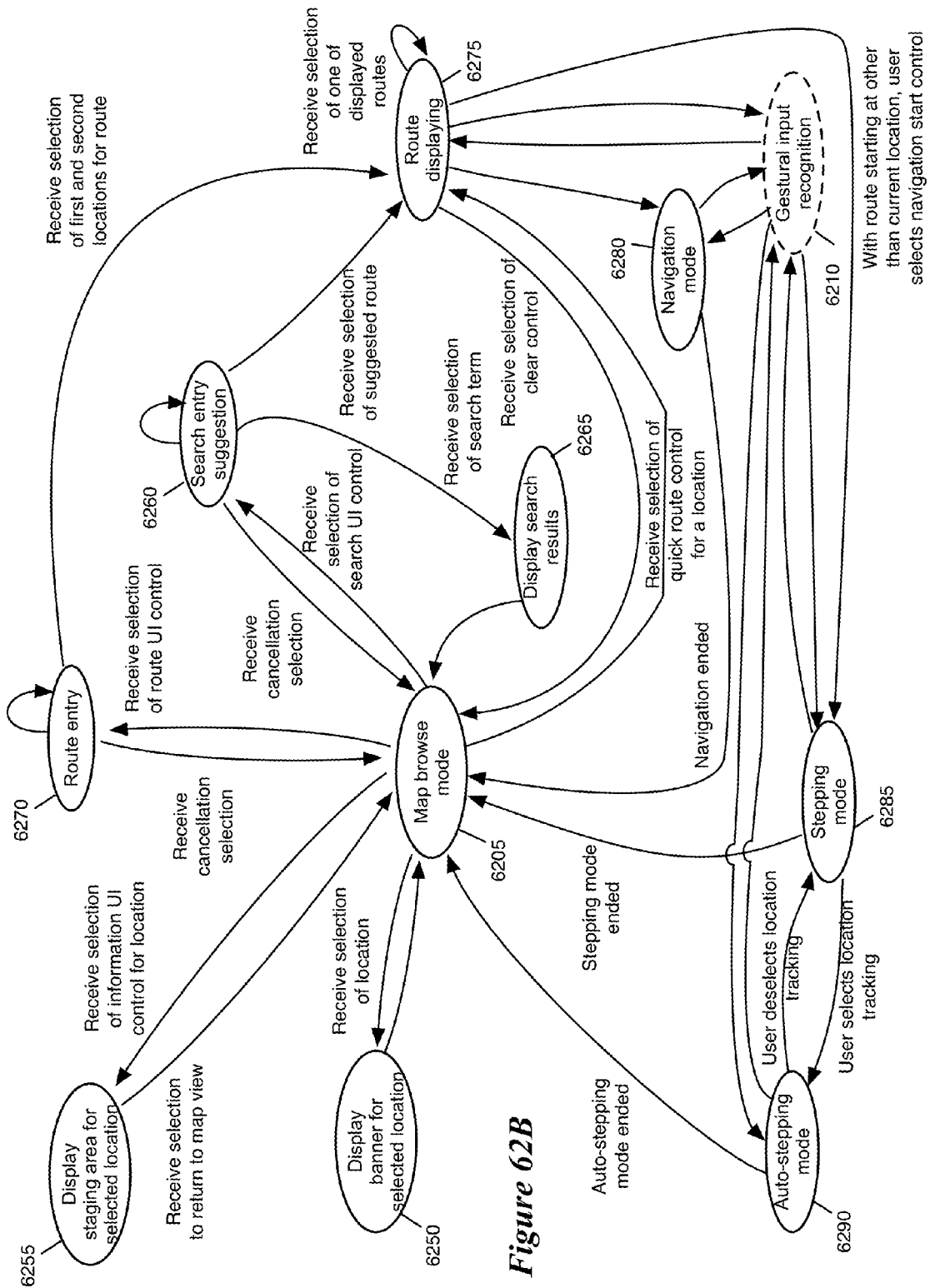

FIGS. 62A-62B conceptually illustrate a state diagram 6200 that describes different states and transitions between these states of the integrated mapping, search, and navigation application of some embodiments (e.g., the application described in the above sections). One of ordinary skill in the art will recognize that the application of some embodiments will have many different states relating to all different types of input events, and that the state diagram 6200 is specifically focused on a subset of these events. The state diagram 6200 describes and refers to various gestural interactions (e.g., multi-touch gestures) for changing states of the application. One of ordinary skill in the art will recognize that various other interactions, such as cursor controller gestures and button clicks, keyboard input, touchpad/trackpad input, etc., may also be used for similar selection operations.

When a user initially opens the mapping application, the application is in state 6205, the map browsing state. In this state 6205, the application will have generated and displayed a map view. To generate and display this map view, the application of some embodiments identifies a required set of map tiles for a region, requests the map tiles (e.g., from a mapping service server), generates a view of the map tiles from a particular location, orientation, and perspective of a virtual camera, and renders the map view to a device display. When in state 6205, the map view is static. With the application in state 6205, the user can perform numerous operations to modify the map view, search for entities (e.g., places of interest, addresses, etc.), retrieve a route for navigation, etc.

In some embodiments, the integrated application is displayed on a device with an integrated touch-sensitive display. Various gestural interactions over the map may cause the application to perform different modifications to the map view (e.g., panning, rotating, zooming, modifying the map perspective, etc.). When the integrated application receives gestural interactions over the map display (as opposed to touch inputs over various floating or non-floating controls overlaid on the map display), the application transitions to state 6210 to perform gestural input recognition.

The gestural input recognition state 6210 differentiates between different types of gestural input and translates these types of input into different map view modification operations. In some embodiments, the mapping application receives the gestural input as translated by the operating system of the device with the integrated touch-sensitive display. The operating system translates the touch input into gesture types and locations (e.g., a "tap" at coordinates (x,y), a "pinch" operation with separate touch inputs at two different locations, etc.). At state 6210, the integrated mapping application of some embodiments translates these into the different map view modification operations.

When the application receives a first type of gestural input (e.g., two separate touch inputs moving together in a rotational motion over the map view), the application transitions to state 6215 to rotate the map. To rotate the map view, some embodiments modify the location and/or orientation of the virtual camera that determines which portion of the map is rendered to create the map view. When in 3D mode, for example, the mapping application rotates the virtual camera about a particular position (e.g., the center of the touch inputs, the center of the display, a location indicator identifying the user's location, etc.). As the first type of gestural input continues, the mapping application remains in state 6215 to continue rotating the map.

When the user releases the first type of gestural input, the application of some embodiments transitions to state 6230 to perform an inertia calculation. In some embodiments, after the user releases certain types of touch inputs, the application continues to perform the associated map view modification for a particular amount of time and/or distance. In this case, after the user releases the rotation input, the application transitions to the inertia calculation state 6230 to calculate the additional rotation amount and the time over which this rotation should be performed. In some embodiments, the application slows down the rotation from the (angular) velocity at which the map was being rotated, as if a "frictional" force was applied to the map. As such, the inertia calculation of some embodiments is based on the speed of the first type of gestural input. From state 6230, the application transitions back to the map modification state that the application was previously in. That is, when the application transitions from state 6215 (the rotation state) to the inertia calculation state 6230, it then transitions back to state 6215 after performing the inertia calculation. After the rotation of the map is complete, the application transitions back to state 6205.

When the application receives a second type of gestural input (e.g., a single touch input moving over the map view), the application transitions to state 6220 to pan the map. To pan the map view, some embodiments modify the location of the virtual camera that determines which portion of the map is rendered to create the map view. This causes the map to appear to slide in a direction derived from the direction of the second type of gestural input. In some embodiments, when the map view is in a 3D perspective mode, the panning process involves performing a correlation of the location of the touch input to a location on the flat map, in order to avoid sudden unwanted jumps in the map view. As the second type of gestural input continues, the mapping application remains in state 6220 to continue panning the map.

When the user releases the second type of gestural input, the application of some embodiments transitions to state 6230 to perform an inertia calculation. In some embodiments, after the user releases certain types of touch inputs, the application continues to perform the associated map view modification for a particular amount of time and/or distance. In this case, after the user releases the panning input, the application transitions to the inertia calculation state 6230 to calculate the additional amount to move the map view (i.e., move the virtual camera) and the time over which this movement should be performed. In some embodiments, the application slows down the panning movement from the velocity at which the map was being panned, as if a "frictional" force was applied to the map. As such, the inertia calculation of some embodiments is based on the speed of the second type of gestural input. From state 6230, the application transitions back to the map modification state that the application was previously in. That is, when the application transitions from state 6220 (the panning state) to the inertia calculation state

6230, it then transitions back to state 6220 after performing the inertia calculation. After the panning of the map is complete, the application transitions back to state 6205.

When the application receives a third type of gestural input (e.g., two separate touch inputs moving closer together or further apart), the application transitions to state 6225 to zoom in on or out of the map. To change the zoom level of the map view, some embodiments modify the location (i.e., height) of the virtual camera that determines which portion of the map is rendered to create the map view. This causes the map view to include more (if zooming out) or less (if zooming in) of the map. In some embodiments, as the user zooms in or out, the application retrieves different map tiles (for different zoom levels) to generate and render the new map view. As the third type of gestural input continues, the mapping application remains in state 6225 to continue zooming in on or out of the map.

When the user releases the second type of gestural input, the application of some embodiments transitions to state 6230 to perform an inertia calculation. In some embodiments, after the user releases certain types of touch inputs, the application continues to perform the associated map view modification for a particular amount of time and/or distance (i.e., moving the virtual camera higher or lower). In this case, after the user releases the zoom input, the application transitions to the inertia calculation state 6230 to calculate the additional amount to zoom the map view (i.e., move the virtual camera) and the time over which this movement should be performed. In some embodiments, the application slows down the zooming movement from the velocity at which the map was being zoomed in on or out of (i.e., the speed at which the virtual camera changes height), as if a "frictional" force was applied to the camera. As such, the inertia calculation of some embodiments is based on the speed of the third type of gestural input. From state 6230, the application transitions back to the map modification state that the application was previously in. That is, when the application transitions from state 6225 (the zooming state) to the inertia calculation state 6230, it then transitions back to state 6225 after performing the inertia calculation. After the zooming of the map is complete, the application transitions back to state 6205.

For simplicity, the state diagram 6200 illustrates the map panning, zooming, and rotation processes using the same inertia calculation process (state 6230). However, in some embodiments, each of these different map modification processes actually uses a different inertia calculation to identify the slow-down and stop for its particular type of movement. In addition, some embodiments calculate and modify the inertia variables as the input is received rather than when the user removes the gestural input.

When the application receives a fourth type of gestural input (e.g., two separate touch inputs moving up or down the touch-sensitive display in unison), the application transitions to state 6235 to modify the perspective view of the map. To change the perspective view of the map, some embodiments move the virtual camera along an arc over the map, modifying both the location and orientation of the virtual camera (as the camera keeps the center of its field of view at a particular location on the map). In some embodiments, different zoom levels use different arcs along which the virtual camera moves. Each of these arcs has a top point at which the virtual camera is pointing straight down, giving a 2D perspective view of the map. In addition, each arc has a bottom point, that is the lowest point on the arc to which the virtual camera can be moved. Thus, the fourth type of gestural input can cause the application to change between a 2D map view and a 3D perspective map view in some embodiments. As the fourth type of gestural input continues, the mapping application remains in state 6235 to continue modifying the perspective view of the map.

When the user releases the fourth type of gestural input, the application of some embodiments transitions to state 6240 to perform an inertia calculation. In some embodiments, after the user releases certain types of touch inputs, the application continues to perform the associated map view modification for a particular amount of time and/or distance (i.e., moving the virtual camera higher or lower). In this case, after the user releases the perspective view change input, the application transitions to the inertia calculation state 6240 to calculate the additional amount to modify the perspective of the map view (i.e., move the virtual camera along its arc) and the time over which this movement should be performed. In some embodiments, the application slows down the movement from the velocity at which the map was changing perspective (i.e., the speed at which the virtual camera moves along its arc), as if a "frictional" force was applied to the camera. As such, the inertia calculation of some embodiments is based on the speed with which the fourth type of gestural input was performed.

In addition, for the perspective change operation, some embodiments transition to a rebound calculation state 6245. As stated, the perspective change operation has a maximum and minimum perspective shift allowed in some embodiments, which may depend on the zoom level of the current map view. Thus, in addition to an inertia calculation, the application performs a rebound calculation at state 6245. The rebound calculation uses the inertia calculation to determine whether the maximum point along the virtual camera arc will be reached and, if so, the velocity of the virtual camera at this point. Some embodiments allow the virtual camera to move slightly past the maximum point to hit a "rebound" point, at which point the application turns the virtual camera around on its arc, moving it back toward the maximum point. Some embodiments include such a bounce-back functionality only on one end of the virtual camera arc (e.g., the bottom of the arc), while other embodiments include the functionality on both ends of the arc. From the rebound calculation state 6245, the application transitions back to the inertia calculation state 6240, then back to the perspective changing state 6235 to display the map view movement. In addition, when the user performs the fourth type of touch input for long enough and the perspective reaches its maximum point, the application transitions directly from the state 6235 to state 6245 to calculate the rebound information and then transitions back to state 6235. After the modification to the perspective view of the map is complete, the application transitions back to state 6205.

The above states relate to the various multi-touch gestures over the map presentation that the integrated mapping, search, and navigation application translates into different modifications to the map presentation. Various other touch inputs can also cause the application to change states and perform various functions. For instance, some embodiments overlay a 3D selectable item on the map view (e.g., as a floating control), and selecting (e.g., with a tap input) the 3D item causes the application to transition to 6235 to modify the perspective of the map view. When the map view starts in a 3D perspective view, the application modifies the perspective into a 2D view; when the map view starts in the 2D view, the application modifies the perspective into a 3D view. After the modification, the application returns to state 6205.

When a user is viewing a map in state 6205, the application presents various labels as part of the map view. Some of these labels indicate places of interest, or other locations. When a user selects certain labels (e.g., for certain businesses, parks, etc.), the application transitions to state 6250 to display a banner for the selected location (e.g., an information display banner), then returns to the map browsing state (with the banner displayed over the map). In some embodiments, this banner includes (1) a quick-route navigation UI control (e.g., a button) that causes the application to retrieve a route (e.g., a driving route) from a current location of the device to the selected location without leaving the map view and (2) an information UI control (e.g., button) that causes the application to provide additional information about the location. When a user selects the UI control button, the application transitions from state 6205 to state 6255 to display a staging area for the selected location. In some embodiments, this staging area displays a media presentation of the selected location (e.g., a 3D video presentation, a flyover view of the selected location, a series of images captured for the location, etc.), as well as various information for the selected location (contact information, reviews, etc.). The application stays in the state 6255 as the user performs various operations to navigate the staging area and view information within the staging area. When a user selects a UI control to transfer back to the map view, the application transitions to state 6205.

From the map browsing view, the user can also easily access the search function of the application. When a particular UI control (e.g., a search bar) is selected, the application transitions to a search entry suggestion state 6260. At the search entry state, some embodiments display a touchscreen keyboard with which the user can enter a search term. The search term may be a business name, an address, a type of location (e.g., coffee shops), etc. While the user enters characters, the application remains in state 6260 and provides suggestions based on recent searches, the letters already entered, etc. Some embodiments may use prefix-based suggestions (e.g., suggestions starting with the characters already entered) as well as other suggestions (e.g., making spelling corrections to add characters at the beginning of the already-entered string, transpose characters, etc.). In some embodiments, the selections may also include recently entered routes in addition to locations. If the user selects a cancellation UI control at this stage, the application transfers back to state 6205 without performing a search.

When the user selects a search term (either a suggested term or a term that is entered completely by the user), the application transitions to state 6265 to display the search results over the map view, then transitions to state 6205 with the search results displayed. Some embodiments display the search results as selectable items (e.g., pins) on the map; selection of one of the items causes a transition to state 6250 to display the banner for the selected item. In addition, the application of some embodiments automatically selects one of the search results (e.g., a "best" result) and displays this banner as part of the state 6265.

As the application is a tightly integrated mapping, search, routing, and navigation application, the user can easily access the routing function from the map browsing state. When a particular UI control (e.g., a route entry button) is selected, the application transitions to the route entry state 6270. At the route entry state, some embodiments display a touchscreen keyboard with which the user can enter locations (e.g., addresses, place names, place types, etc.) into both "to" and "from" fields in order to request a route. While the user enters characters, the application remains in state 6270 and provides suggestions based on recent routes, recent searches, an auto-complete similar to that described for the search entry, etc. If the user selects a cancellation UI control at this stage, the application transfers back to state 6205 without retrieving a route.

When the user selects a route (e.g., by entering a "to" location and a "from" location), the application transitions to the route displaying state 6275. At this state, the application displays one or more routes from a first selected location to a second selected location over the map view (e.g., by overlaying route lines on the map view). Some embodiments automatically select a first one of the routes. The user can select any of the other routes (e.g., by tapping over the unselected route), with the application remaining in state 6275 (but modifying the display of the route lines to indicate the selection of the other route). In addition, when in state 6275, the application of some embodiments displays different UI controls related to routing and navigation, including a direction list control, a navigation start control, and others.

Also, various gestural interactions over the map on which the routes are displayed may cause the application to perform different modifications to the map view (e.g., panning, rotating, zooming, modifying the map perspective, etc.). When the integrated application receives gestural interaction over the map display while in the route display state 6275, the application transitions to state 6210 to perform gestural input recognition, with all of the gestural map modification operations (e.g., corollaries to states 6215-6245) available. That is, the application translates the gestural input into panning, rotation, zoom, and/or perspective change operations similar to those described above for states 6215-6245, with similar inertia and rebound features for the virtual camera movement. Whereas the operations 6215-6245 return to the map browsing state 6205, the corollary operations accessed from the route display state 6275 return to the route display state 6275.

In some embodiments, the route display state 6275 is accessible from other states as well. For instance, if a user selects the quick-route UI control on a banner while in state 6205, the application retrieves one or more routes from the current location of the device to the location with which the banner is associated. In addition, some embodiments display previously requested routes among the search suggestions at state 6260. When the user selects one of these suggested routes, the application transitions directly from state 6260 to state 6275 to display one or more routes over the map.

From the route display state 6275, the application can transition into various different modes depending on different controls selected by the user. When the user selects a UI control to clear the routes, the application transitions back to state 6205 to display the map without any routes. In addition, the integrated application may enter one or more navigation modalities from the route displaying state 6275.

When the selected route displayed at state 6275 starts at the current location of the device and the user selects a navigation starting control, the application transitions to the navigation state 6280. In some embodiments, the application displays a cinematic transition from the map view into a more immersive 3D view for navigation. Within the navigation state 6280 of some embodiments, a virtual camera follows the location of the user along the selected route in order to present the upcoming portions of the route. When either the route is completed (the device reaches the destination location) or the user selects a control to end navigation, the application transitions to state 6205 to present the map browsing view 6205.

In some embodiments, various gestural interactions over the map on which the routes are displayed may cause the application to perform different modifications to the map view (e.g., panning, rotating, zooming, modifying the map perspective, etc.) while in the navigation mode 6280. In some embodiments, only some of the described map modification operations are available in the navigation mode. For instance, some embodiments allow the user to zoom in or out, but do not allow any other modifications to the map. Thus, when the user provides gestural input, the gestural input recognition state 6210 filters out types of gestural input not associated with the zoom operation (and subsequently the application returns to state 6280). When the type of gestural input associated with the zoom operation is received, the gestural input recognition state recognizes this input and the application transitions to a state similar to state 6225, for changing the zoom level of the map (with the inertia calculation, in some embodiments).

Other embodiments may enable different map modification operations. For instance, in some embodiments all of the gestural map modification operations (e.g., corollaries to states 6215-6245) are available while in the navigation mode. Some embodiments allow a subset of the gestural map modification operations, such as zooming and a limited panning operation. The panning operation of some embodiments, upon receiving the type of gestural input associated with panning, moves the virtual camera (while in the navigation mode) to the side, then returns the virtual camera back to pointing along the route. Whereas the operations 6215-6245 return to the map browsing state 6205, the corollary operations accessed from the navigation state 6280 return to the navigation state 6280.

When the selected route displayed at state 6275 starts at a location other than the current location of the device (or the route is a walking route) and the user selects a navigation starting control, the application transitions to the stepping mode, or route inspection mode at state 6285. In some embodiments, the application displays the maneuvers performed along the route one at a time (e.g., as navigation signs). By providing gestural input (e.g., swipe gestures) to the maneuvers, the user can view the different maneuvers while in the route inspection mode. The maneuvers are overlaid on a map and at least a portion of the route is displayed in the map.

As in the route display mode, various gestural interactions over the map may cause the application to perform different modifications to the map view (e.g., panning, rotating, zooming, modifying the map perspective, etc.). When the integrated application receives gestural interaction over the map display while in the stepping mode 6285, the application transitions to state 6210 to perform gestural input recognition, with all of the gestural map modification operations (e.g., corollaries to states 6215-6245) available. That is, the application translates the gestural input into panning, rotation, zoom, and/or perspective change operations similar to those described above for states 6215-6245, with similar inertia and rebound features for the virtual camera movement. Whereas the operations 6215-6245 return to the map browsing state 6205, the corollary operations accessed from the stepping mode 6285 return to the stepping mode 6285.

Furthermore, in some embodiments the gestural input recognition recognizes at least one type of gestural input over the displayed maneuvers in order to switch between the maneuvers. When a particular type of gestural input (e.g., a swipe gesture) is received over the displayed maneuver (as opposed to over the map view), the application transitions to a state (not shown) for changing the displayed maneuver, then returns to state 6285.

When the integrated application receives gestural interaction over the map displayed while in the stepping state 6285, the application transitions to state 6210 to perform gestural input recognition, with all of the gestural map modification operations (e.g., corollaries to states 6215-6245) available. When the modification operations are done, the application returns to state 6285. When the user selects a control to end stepping through the maneuvers, the application transitions to state 6205 to present the map browsing view.

In addition, in some embodiments the application can transition from the stepping mode 6285 to an auto-stepping state 6290. When the user selects a location tracking control while the application is in state 6285, the application transitions to an automatic stepping mode 6290, which is a different navigation modality. When in the automatic stepping mode of some embodiments, the integrated mapping, search, and navigation application displays the maneuver to which the device's location is closest (e.g., as measured by a juncture at which the maneuver is performed). When the device moves (e.g., along the route) to a location closer to a different maneuver, the auto-stepping mode automatically displays the different maneuver. When the user deselects the location tracking control, the application transitions back to the stepping mode 6285. When the user selects a control to end navigation while in the auto-stepping state 6290, the application transitions to state 6205 to present the map browsing view.

As in the stepping mode 6285, various gestural interactions over the map may cause the application to perform different modifications to the map view (e.g., panning, rotating, zooming, modifying the map perspective, etc.). When the integrated application receives gestural interaction over the map display while in the auto-stepping mode 6290, the application transitions to state 6210 to perform gestural input recognition, with all of the gestural map modification operations (e.g., corollaries to states 6215-6245) available. That is, the application translates the gestural input into panning, rotation, zoom, and/or perspective change operations similar to those described above for states 6215-6245, with similar inertia and rebound features for the virtual camera movement. Whereas the operations 6215-6245 return to the map browsing state 6205, the corollary operations accessed from the auto-stepping mode 6290 return to the auto-stepping mode 6290. In addition, some embodiments automatically turn the location tracking control off when the user pans the map a particular distance, in which case the application returns to the stepping mode state 6285 rather than auto-stepping state 6290.

VI. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs.

Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 63:
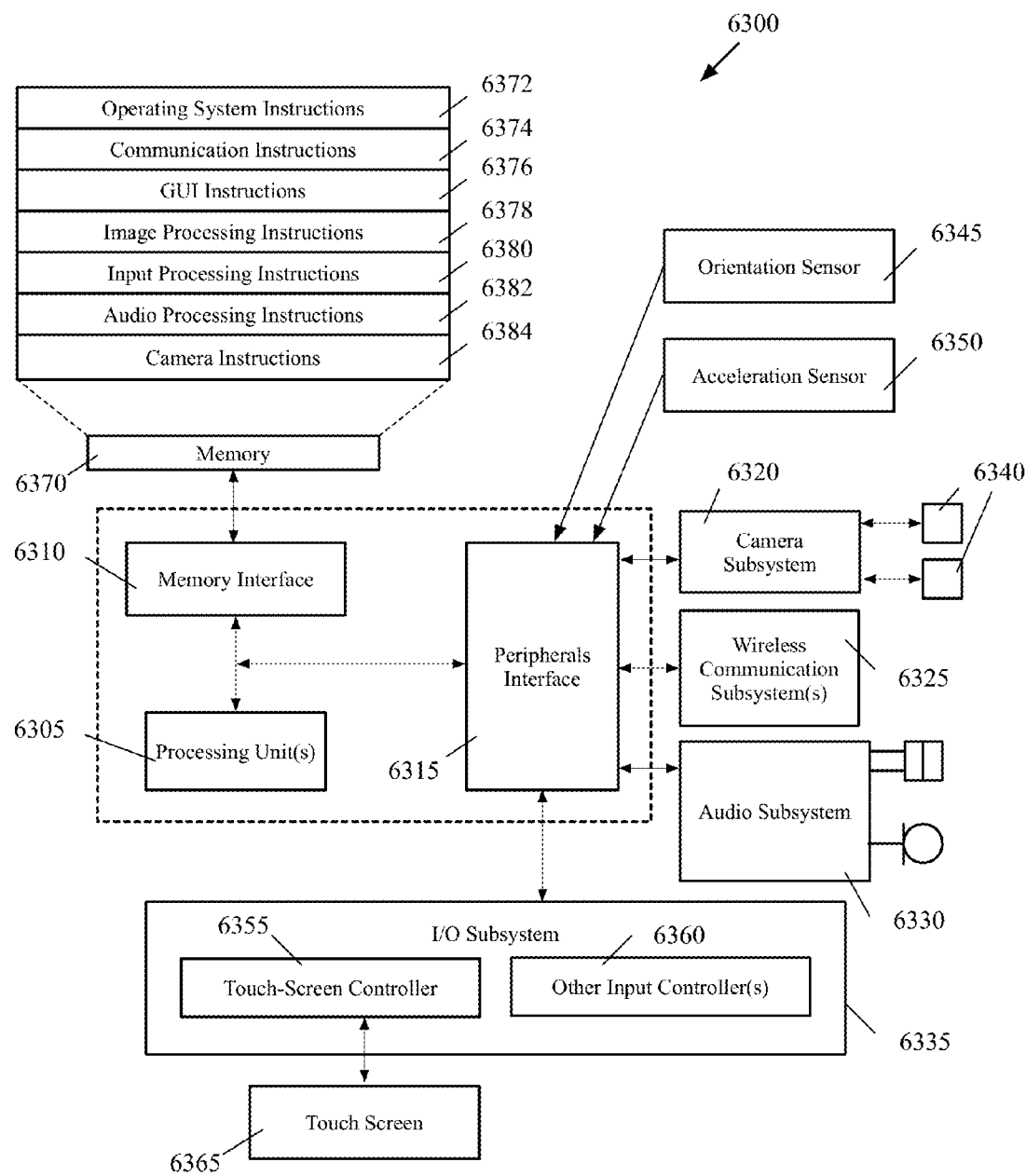
FIG. 63 is an example of an architecture of a mobile computing device.

The multi-mode mapping application of some embodiments operate on mobile devices, such as smartphones (e.g., iPhones®) and tablets (e.g., iPads®). FIG. 63 is an example of an architecture 6300 of such a mobile computing device. Examples of mobile computing devices include smartphones, tablets, laptops, etc. As shown, the mobile computing device 6300 includes one or more processing units 6305, a memory interface 6310 and a peripherals interface 6315.

The peripherals interface 6315 is coupled to various sensors and subsystems, including a camera subsystem 6320, a wireless communication subsystem(s) 6325, an audio subsystem 6330, an I/O subsystem 6335, etc. The peripherals interface 6315 enables communication between the processing units 6305 and various peripherals. For example, an orientation sensor 6345 (e.g., a gyroscope) and an acceleration sensor 6350 (e.g., an accelerometer) is coupled to the peripherals interface 6315 to facilitate orientation and acceleration functions.

The camera subsystem 6320 is coupled to one or more optical sensors 6340 (e.g., a charged coupled device (CCD) optical sensor, a complementary metal-oxide-semiconductor (CMOS) optical sensor, etc.). The camera subsystem 6320 coupled with the optical sensors 6340 facilitates camera functions, such as image and/or video data capturing. The wireless communication subsystem 6325 serves to facilitate communication functions. In some embodiments, the wireless communication subsystem 6325 includes radio frequency receivers and transmitters, and optical receivers and transmitters (not shown in FIG. 63). These receivers and transmitters of some embodiments are implemented to operate over one or more communication networks such as a GSM network, a Wi-Fi network, a Bluetooth network, etc. The audio subsystem 6330 is coupled to a speaker to output audio (e.g., to output voice navigation instructions). Additionally, the audio subsystem 6330 is coupled to a microphone to facilitate voice-enabled functions, such as voice recognition (e.g., for searching), digital recording, etc.

The I/O subsystem 6335 involves the transfer between input/output peripheral devices, such as a display, a touch screen, etc., and the data bus of the processing units 6305 through the peripherals interface 6315. The I/O subsystem 6335 includes a touch-screen controller 6355 and other input controllers 6360 to facilitate the transfer between input/output peripheral devices and the data bus of the processing units 6305. As shown, the touch-screen controller 6355 is coupled to a touch screen 6365. The touch-screen controller 6355 detects contact and movement on the touch screen 6365 using any of multiple touch sensitivity technologies. The other input controllers 6360 are coupled to other input/control devices, such as one or more buttons. Some embodiments include a near-touch sensitive screen and a corresponding controller that can detect near-touch interactions instead of or in addition to touch interactions.

The memory interface 6310 is coupled to memory 6370. In some embodiments, the memory 6370 includes volatile memory (e.g., high-speed random access memory), non-volatile memory (e.g., flash memory), a combination of volatile and non-volatile memory, and/or any other type of memory. As illustrated in FIG. 63, the memory 6370 stores an operating system (OS) 6372. The OS 6372 includes instructions for handling basic system services and for performing hardware dependent tasks.

The memory 6370 also includes communication instructions 6374 to facilitate communicating with one or more additional devices; graphical user interface instructions 6376 to facilitate graphic user interface processing; image processing instructions 6378 to facilitate image-related processing and functions; input processing instructions 6380 to facilitate input-related (e.g., touch input) processes and functions; audio processing instructions 6382 to facilitate audio-related processes and functions; and camera instructions 6384 to facilitate camera-related processes and functions. The instructions described above are merely exemplary and the memory 6370 includes additional and/or other instructions in some embodiments. For instance, the memory for a smartphone may include phone instructions to facilitate phone-related processes and functions. Additionally, the memory may include instructions for a multi-mode mapping application. The above-identified instructions need not be implemented as separate software programs or modules. Various functions of the mobile computing device can be implemented in hardware and/or in software, including in one or more signal processing and/or application specific integrated circuits.

While the components illustrated in FIG. 63 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 63 may be split into two or more integrated circuits.

B. Computer System

Figure 64:
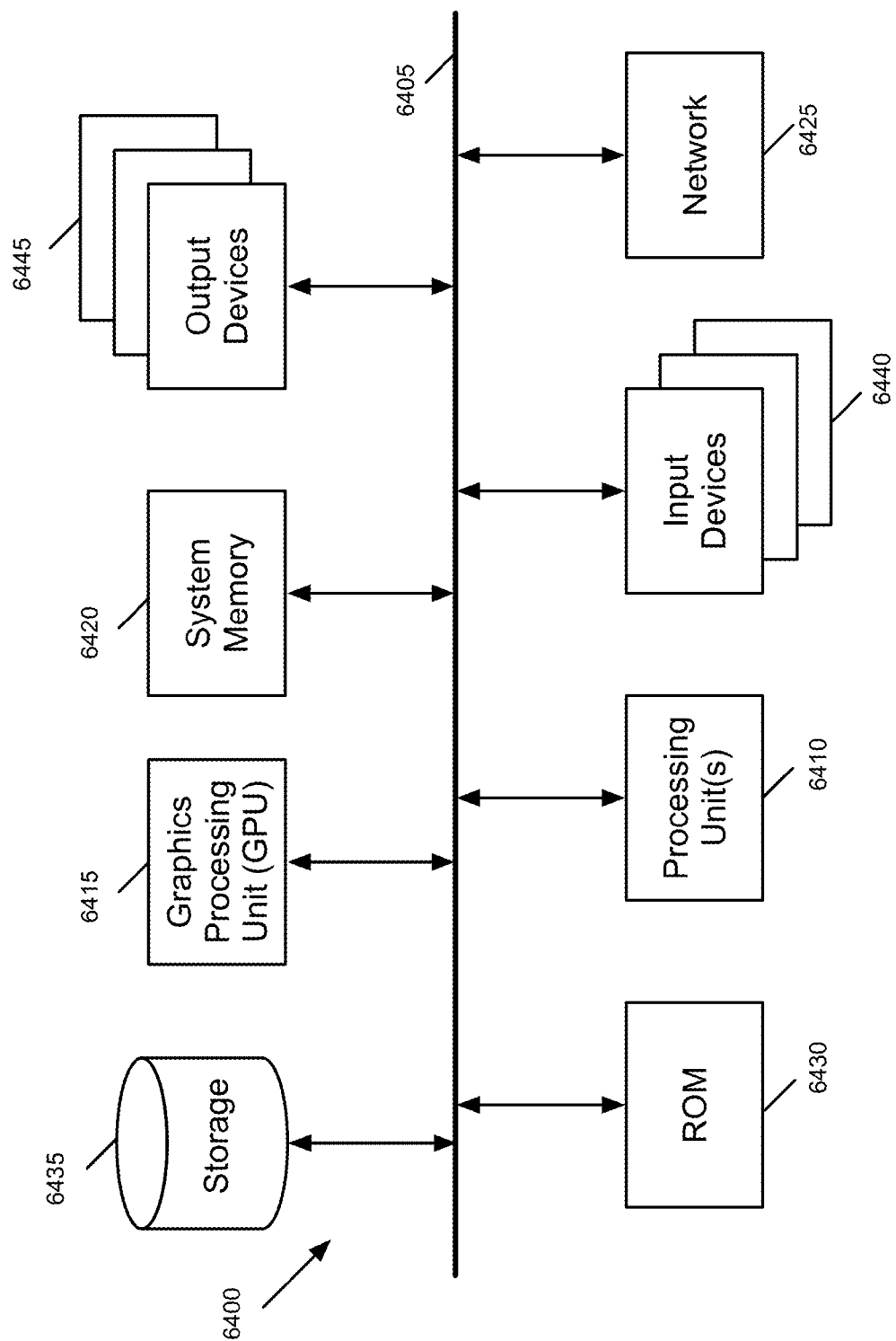
FIG. 64 conceptually illustrates an example of an electronic system with which some embodiments of the invention are implemented.

FIG. 64 conceptually illustrates another example of an electronic system 6400 with which some embodiments of the invention are implemented. The electronic system 6400 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 6400 includes a bus 6405, processing unit(s) 6410, a graphics processing unit (GPU) 6415, a system memory 6420, a network 6425, a read-only memory 6430, a permanent storage device 6435, input devices 6440, and output devices 6445.

The bus 6405 collectively represents all system, peripheral, and chip set buses that communicatively connect the numerous internal devices of the electronic system 6400. For instance, the bus 6405 communicatively connects the processing unit(s) 6410 with the read-only memory 6430, the GPU 6415, the system memory 6420, and the permanent storage device 6435.

From these various memory units, the processing unit(s) 6410 retrieves instructions to execute and data to process in order to execute the processes of the invention. The processing unit(s) may be a single processor or a multi-core processor in different embodiments. Some instructions are passed to and executed by the GPU 6415. The GPU 6415 can offload various computations or complement the image processing provided by the processing unit(s) 6410. In some embodiments, such functionality can be provided using CoreImage's kernel shading language.

The read-only-memory (ROM) 6430 stores static data and instructions that are needed by the processing unit(s) 6410 and other modules of the electronic system. The permanent storage device 6435, on the other hand, is a read-and-write memory device. This device is a non-volatile memory unit that stores instructions and data even when the electronic system 6400 is off. Some embodiments of the invention use a mass-storage device (such as a magnetic or optical disk and its corresponding disk drive, integrated flash memory) as the permanent storage device 6435.

Other embodiments use a removable storage device (such as a floppy disk, flash memory device, etc., and its corresponding drive) as the permanent storage device Like the permanent storage device 6435, the system memory 6420 is a read-and-write memory device. However, unlike storage device 6435, the system memory 6420 is a volatile read-and-write memory, such a random access memory. The system memory 6420 stores some of the instructions and data that the processor needs at runtime. In some embodiments, the invention's processes are stored in the system memory 6420, the permanent storage device 6435, and/or the read-only memory 6430. From these various memory units, the processing unit(s) 6410 retrieves instructions to execute and data to process in order to execute the processes of some embodiments.

The bus 6405 also connects to the input and output devices 6440 and 6445. The input devices 6440 enable the user to communicate information and select commands to the electronic system. The input devices 6440 include alphanumeric keyboards and pointing devices (also called "cursor control devices"), cameras (e.g., webcams), microphones or similar devices for receiving voice commands, etc. The output devices 6445 display images generated by the electronic system or otherwise output data. The output devices 6445 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 64, bus 6405 also couples electronic system 6400 to a network 6425 through a network adapter (not shown). In this manner, the computer can be a part of a network of computers (such as a local area network ("LAN"), a wide area network ("WAN"), or an Intranet), or a network of networks, such as the Internet. Any or all components of electronic system 6400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

VII. Map Service Environment

Figure 65:
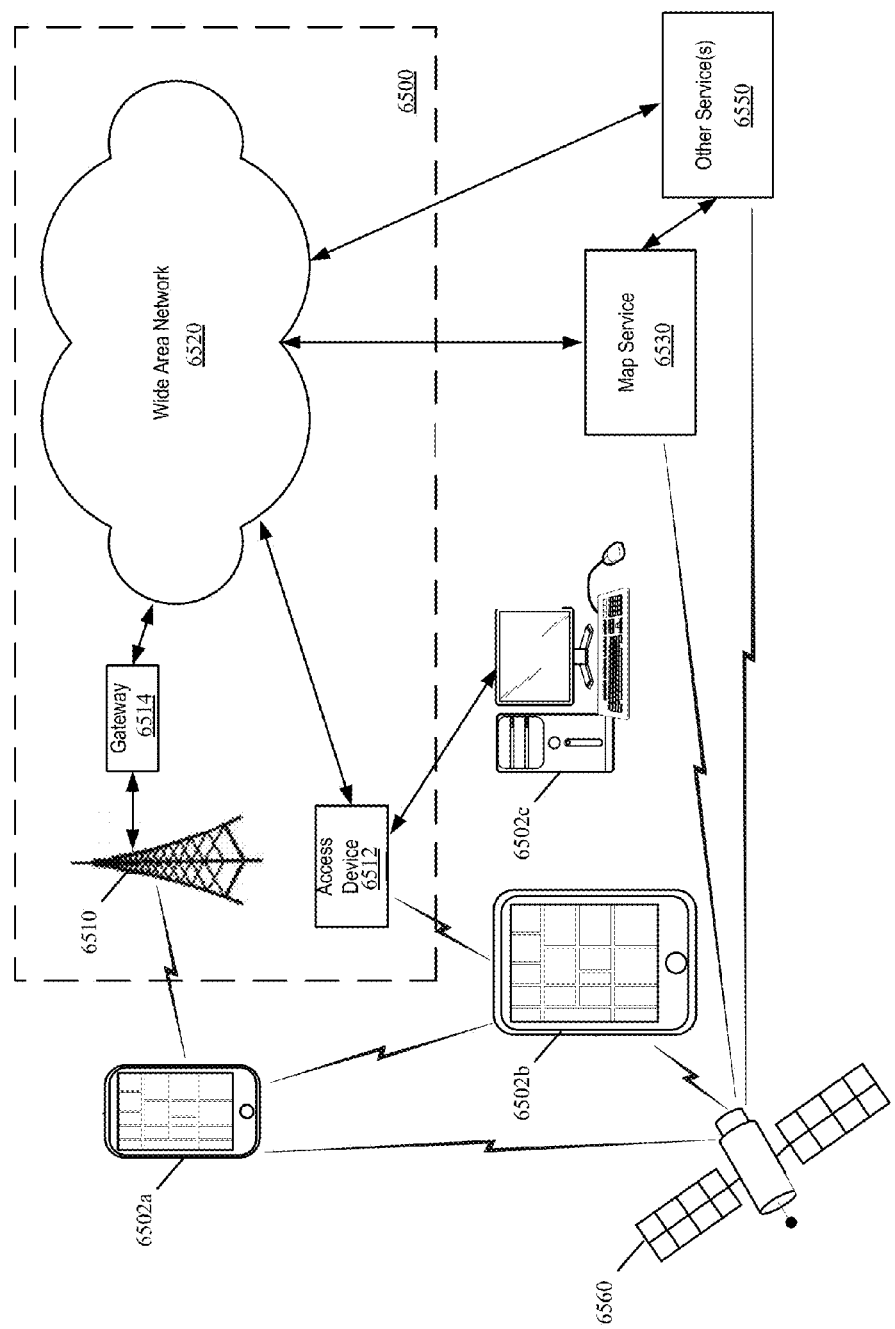
FIG. 65 illustrates a map service operating environment, according to some embodiments.

Various embodiments may operate within a map service operating environment. FIG. 65 illustrates a map service operating environment, according to some embodiments. A map service 6530 (also referred to as mapping service) may provide map services for one or more client devices 6502a-6502c in communication with the map service 6530 through various communication methods and protocols. A map service 6530 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculations (e.g., ferry route calculations or directions between two points for a pedestrian), real-time navigation data (e.g., turn-by-turn visual navigation data in two or three dimensions), location data (e.g., where the client device currently is located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. Client devices 6502a-6502c may utilize these map services by obtaining map service data. Client devices 6502a-6502c may implement various techniques to process map service data. Client devices 6502a-6502c may then provide map services to various entities, including, but not limited to, users, internal software or hardware modules, and/or other systems or devices external to the client devices 6502a-6502c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wired or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service respond to client device requests for map services. These requests may be a request for a specific map or portion of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 6502a-6502c) are implemented on different portable-multifunction device types. Client devices 6502a-6502c utilize map service 6530 through various communication methods and protocols. In some embodiments, client devices 6502a-6502c obtain map service data from map service 6530. Client devices 6502a-6502c request or receive map service data. Client devices 6502a-6502c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as a Global Positioning Satellite (GPS) system. A client device may display map image data that reflects the current location of the client device and update the map image data in real-time. A navigation system may provide auditory or visual directions to follow a certain route.

A virtual camera is implemented to manipulate navigation map data according to some embodiments. Some embodiments of client devices allow the device to adjust the virtual camera display orientation to bias toward the route destination. Some embodiments also allow the virtual camera to navigation turns simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. In some embodiments, the client devices also order or prioritize map service data in certain techniques. For instance, a client device detects the motion or velocity of a virtual camera, which if exceeding certain threshold values, lower-detail image data is loaded and rendered for certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wired or wireless network type).

FIG. 65 illustrates one possible embodiment of an operating environment 6500 for a map service 6530 and client devices 6502a-6502c. In some embodiments, devices 6502a, 6502b, and 6502c communicate over one or more wired or wireless networks 6510. For example, wireless network 6510, such as a cellular network, can communicate with a wide area network (WAN) 6520, such as the Internet, by use of gateway 6514. A gateway 6514 in some embodiments provides a packet oriented mobile data service, such as General Packet Radio Service (GPRS), or other mobile data service allowing wireless networks to transmit data to other networks, such as wide area network 6520. Likewise, access device 6512 (e.g., IEEE 802.11g wireless access device) provides communication access to WAN 6520. Devices 6502a and 6502b can be any portable electronic or computing device capable of communicating with a map service. Device 6502c can be any non-portable electronic or computing device capable of communicating with a map service.

In some embodiments, both voice and data communications are established over wireless network 6510 and access device 6512. For instance, device 6502a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 6510, gateway 6514, and WAN 6520 (e.g., using Transmission Control Protocol/Internet Protocol (TCP/IP) or User Datagram Protocol (UDP)). Likewise, in some implementations, devices 6502b and 6502c can place and receive phone calls, send and receive e-mail messages, and retrieve electronic documents over access device 6512 and WAN 6520. In various embodiments, any of the illustrated client devices may communicate with map service 6530 and/or other service(s) 6550 using a persistent connection established in accordance with one or more security protocols, such as the Secure Sockets Layer (SSL) protocol or the Transport Layer Security (TLS) protocol.

Devices 6502a and 6502b can also establish communications by other means. For example, wireless device 6502a can communicate with other wireless devices (e.g., other devices 6502b, cell phones, etc.) over the wireless network 6510. Likewise devices 6502a and 6502b can establish peer-to-peer communications 6540 (e.g., a personal area network) by use of one or more communication subsystems, such as Bluetooth® communication from Bluetooth Special Interest Group, Inc. of Kirkland, Wash. Device 6502c can also establish peer to peer communications with devices 6502a or 6502b (not shown). Other communication protocols and topologies can also be implemented. Devices 6502a and

6502*b* may also receive Global Positioning Satellite (GPS) signals from GPS satellites 6560.

Devices 6502*a*, 6502*b*, and 6502*c* can communicate with map service 6530 over one or more wire and/or wireless networks, 6510 or 6512. For instance, map service 6530 can provide map service data to rendering devices 6502*a*, 6502*b*, and 6502*c*. Map service 6530 may also communicate with other services 6550 to obtain data to implement map services. Map service 6530 and other services 6550 may also receive GPS signals from GPS satellites 6560.

In various embodiments, map service 6530 and/or other service(s) 6550 are configured to process search requests from any of the client devices. Search requests may include but are not limited to queries for businesses, addresses, residential locations, points of interest, or some combination thereof. Map service 6530 and/or other service(s) 6550 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 6530 and/or other service(s) 6550 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 6530 and/or other service(s) 6550, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 6530 and/or other service(s) 6550 provide one or more feedback mechanisms to receive feedback from client devices 6502*a*-6502*c*. For instance, client devices may provide feedback on search results to map service 6530 and/or other service(s) 6550 (e.g., feedback specifying ratings, reviews, temporary or permanent business closures, errors etc.); this feedback may be used to update information about points of interest in order to provide more accurate or more up-to-date search results in the future. In some embodiments, map service 6530 and/or other service(s) 6550 may provide testing information to the client device (e.g., an A/B test) to determine which search results are best. For instance, at random intervals, the client device may receive and present two search results to a user and allow the user to indicate the best result. The client device may report the test results to map service 6530 and/or other service(s) 6550 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

What is claimed is:

1. For a device running a mapping application that includes a display area for displaying a map on a touch-sensitive display screen of the device and a set of graphical user interface (GUI) items, a method for providing routes, the method comprising:
    displaying a route on the displayed map between a starting location and a destination location; and
    displaying a plurality of movable GUI items, each GUI item for providing a maneuvering instruction to guide a user through the route, each maneuvering instruction associated with a region of the map,
    wherein when a first movable GUI item that provides a first maneuvering instruction is displayed, a first region of the map that is associated with the first maneuvering instruction is displayed on the display area, and
    wherein when a second movable GUI item that provides a second maneuvering instruction is displayed, a second region of the map that is associated with the second maneuvering instruction is displayed on the display area,
    wherein the first movable GUI item moves out of the display area and the second movable GUI item moves into the display area in response to the user performing a swipe gesture on the first region of the map to display the second region of the map on the touch-sensitive display screen.

2. The method of claim 1 further comprising moving, in response to the swipe gesture, the first region of the map out of the display area and moving the second region of the map into the display area.

3. The method of claim 1, wherein each movable GUI item comprises a navigation sign that resembles a road sign in an area of the map in which the route is displayed.

4. The method of claim 3, wherein the maneuvering instruction relates to a juncture along the route and comprises at least an instructional arrow and a remaining distance to the destination location or to a next juncture along the route.

5. The method of claim 1, wherein the first maneuvering instruction and the second maneuvering instruction are neighboring maneuvering instructions in a sequence of maneuvering instructions.

6. The method of claim 1, wherein a particular region of the map that is associated with a particular maneuvering instruction includes a juncture for which the particular maneuvering instruction guides the user.

7. The method of claim 6, wherein the juncture for which the particular maneuvering instruction guides the user appears differently from other junctures of the particular region.

8. The method of claim 1, wherein the swipe gesture is a first swipe gesture in a first direction, wherein the second movable GUI item moves out of the display area and the first movable GUI item moves into the display area when the user performs a second swipe gesture on the second region of the map on the touch-sensitive display screen in a second direction to display the first region of the map.

9. The method of claim 1, wherein each of the movable GUI items resembles a road sign.

10. The method of claim 1, wherein a maneuvering instruction of a sequence of maneuvering instructions is for guiding the user at a juncture in the route.

11. The method of claim 1, wherein the displayed route is a first route, the method further comprising displaying at least a second route between the starting and destination locations on the map.

12. The method of claim 1 further comprising:
providing a user interface (UI) item for showing an overview of the route; and
upon receiving a selection of the UI item for showing the overview, displaying the entire route in the map.

13. The method of claim 1 further comprising:
providing a user interface (UI) item for showing an overview of the route; and
upon receiving a selection of the UI item for showing the overview, displaying a scrollable list of maneuvering instructions in a sequence.

14. A non-transitory machine readable medium storing a mapping application which when executed by at least one processing unit of a device provides a graphical user interface (GUI), the GUI comprising:
a touch-sensitive display screen;
a first display area for displaying a set of user interface (UI) items, each UI item providing a maneuvering instruction in a sequence of maneuvering instructions for guiding a user through a route between a starting location and a destination location, each maneuvering instruction in the sequence corresponding to a region of a map; and
a second display area for displaying a first region of the map corresponding to a first maneuvering instruction in the sequence, the first maneuvering instruction provided by a first UI item that is displayed in the first display area, wherein the first region of the map moves out of the second display area and a second region of the map corresponding to a second maneuvering instruction in the sequence moves into the second display area when the user performs a swipe gesture on the first region of the map on the touch-sensitive display screen and,
wherein, in response to the swipe gesture, the first UI item also moves out of the first display area and a second UI item that provides the second maneuvering instruction moves into the first display area.

15. The non-transitory machine readable medium of claim 14, wherein the first display area is translucently overlaid on the second display area such that the UI items appear to move over the map displayed in the second display area.

16. The non-transitory machine readable medium of claim 14, wherein each UI item in the set of UI items comprises a navigation sign that resembles a road sign of an area of the map in which the route is displayed.

17. The non-transitory machine readable medium of claim 14, wherein a particular region of the map that is associated with a particular maneuvering instruction includes a juncture for which the particular maneuvering instruction guides the user.

18. The non-transitory machine readable medium of claim 17, wherein the juncture, for which the particular maneuvering instruction guides the user, appears differently from other junctures of the particular region of the map.

19. The non-transitory machine readable medium of claim 14, wherein each maneuvering instruction relates to a juncture along the route and comprises at least an instructional arrow and a remaining distance to the destination location or to a next juncture along the route.

20. The non-transitory machine readable medium of claim 18, wherein the juncture for which the particular maneuvering instruction guides the user is highlighted.

21. The non-transitory machine readable medium of claim 16, wherein a UI item for displaying a maneuvering instruction resembles a road sign by having a similar color as the road sign.

22. The non-transitory machine readable medium of claim 14, wherein the GUI further comprises a UI item that, when selected, causes the second display area to display the entire route in the map.

23. The non-transitory machine readable medium of claim 14, wherein the GUI further comprises a UI item for causing the second display area to display a scrollable list of the maneuvering instructions in the sequence.

24. A non-transitory machine readable medium storing a mapping application which when executed by at least one processing unit of a device displays a map on a touch-sensitive display screen of the device, the application comprising sets of instructions for:
displaying, on a first display area, a set of user interface (UI) items, each UI item providing a maneuvering instruction in a sequence of maneuvering instructions for guiding a user through a route between a starting location and a destination location, each maneuvering instruction in the sequence corresponding to a region of a map; and
displaying, on a second display area, a first region of the map corresponding to a first maneuvering instruction in the sequence, the first maneuvering instruction provided by a first UI item that is displayed in the first display area, wherein the first region of the map moves out of the second display area and a second region of the map corresponding to a second maneuvering instruction in the sequence moves into the second display area when the user performs a swipe gesture on the first region of the map on the touch-sensitive display screen, wherein, in response to the swipe the first UI item also moves out of the first display area and a second UI item that provides the second maneuvering instruction moves into the first display area.

25. The non-transitory machine readable medium of claim 24, wherein the first display area is translucently overlaid on the second display area such that the UI items appear to move over the map displayed in the second display area.

26. The non-transitory machine readable medium of claim 24, wherein, each maneuvering instruction relates to a juncture along the route and comprises at least an instructional arrow and a remaining distance to the destination location or to a next juncture along the route.

27. The non-transitory machine readable medium of claim 24, wherein a particular region of the map that is associated with a particular maneuvering instruction includes a juncture for which the particular maneuvering instruction guides the user.

* * * * *